(12) United States Patent
Thompson et al.

(10) Patent No.: US 12,363,156 B1
(45) Date of Patent: Jul. 15, 2025

(54) SYSTEMS AND METHODS FOR VERIFICATION AND VALIDATION OF CYBER RESILIENCE

(71) Applicant: AS0001, Inc., Carmel, IN (US)

(72) Inventors: Jonathan J. Thompson, Carmel, IN (US); Simon Mullaney, Dublin (IE)

(73) Assignee: AS0001, Inc., Carmel, IN (US)

( * ) Notice: Subject to any disclaimer, the term of this patent is extended or adjusted under 35 U.S.C. 154(b) by 0 days.

(21) Appl. No.: 19/041,988

(22) Filed: Jan. 30, 2025

Related U.S. Application Data

(63) Continuation-in-part of application No. 18/628,343, filed on Apr. 5, 2024, now Pat. No. 12,244,703, which is a continuation-in-part of application No. 18/203,630, filed on May 30, 2023.

(60) Provisional application No. 63/457,671, filed on Apr. 6, 2023, provisional application No. 63/347,389, filed on May 31, 2022.

(51) Int. Cl.
*H04L 29/06* (2006.01)
*H04L 9/40* (2022.01)

(52) U.S. Cl.
CPC .................. *H04L 63/1433* (2013.01)

(58) Field of Classification Search
USPC .......................................................... 726/25
See application file for complete search history.

(56) References Cited

U.S. PATENT DOCUMENTS 7,592,829 B2    9/2009  Walmsley et al.
8,166,314 B1    4/2012  Raizen et al.
(Continued)

FOREIGN PATENT DOCUMENTS

| CA | 3131208 A1 | 1/2023 |
| EP | 3 179 696 A1 | 6/2017 |
| WO | WO-2008/147400 A1 | 12/2008 |

OTHER PUBLICATIONS

De Brito Goncalves, Joao Paulo et al. Securing E-Health Networks by applying Network Slicing and Blockchain Techniques. 2021 IEEE 18th Annual Consumer Communications & Networking Conference (CCNC). https://ieeexplore.ieee.org/stamp/stamp.jsp?tp=&arnumber=9369546 (Year: 2021).*

(Continued)

*Primary Examiner* — Jeremiah L Avery
(74) *Attorney, Agent, or Firm* — Foley & Lardner LLP

(57) ABSTRACT

Systems, methods, and computer-readable storage media for compliance verification and validation of cyber resilience in a distributed entity or third-party network (DETPN). Some methods can include generating or identifying, by one or more processing circuits, one or more compliance parameters for a plurality of entities or third-parties on the DETPN. Some methods can include determining, by the one or more processing circuits, at least one compliance level. Some methods can include receiving or identifying, by the one or more processing circuits, environmental data of the DETPN. Some methods can include determining, by the one or more processing circuits at a second timing phase, an updated at least one compliance level for at least one of the plurality of entities or third-parties based at least on the environmental data. In some implementations, some methods can include generating and storing, by the one or more processing circuits, one or more tokens.

20 Claims, 28 Drawing Sheets

(56) References Cited

U.S. PATENT DOCUMENTS

| | | |
|---|---|---|
| 8,316,237 B1 | 11/2012 | Felsher et al. |
| 10,003,584 B1 | 6/2018 | Roth et al. |
| 10,728,019 B2 | 7/2020 | Winslow et al. |
| 11,023,585 B1 | 6/2021 | Light et al. |
| 11,057,426 B2 | 7/2021 | Davis |
| 11,122,073 B1 | 9/2021 | Cai et al. |
| 11,128,457 B2 | 9/2021 | Murdoch et al. |
| 11,188,896 B1 | 11/2021 | Hertzog et al. |
| 11,233,647 B1 | 1/2022 | Fontaine |
| 11,475,136 B2 * | 10/2022 | Brannon ............... G06F 21/577 |
| 11,681,811 B1 | 6/2023 | Dixit |
| 11,729,204 B1 | 8/2023 | Coull et al. |
| 11,750,643 B1 | 9/2023 | Imrem et al. |
| 11,757,923 B1 | 9/2023 | Vandeventer et al. |
| 11,777,992 B1 | 10/2023 | Cross et al. |
| 11,783,062 B2 | 10/2023 | Lounsberry |
| 11,811,818 B1 | 11/2023 | Vandeventer et al. |
| 11,816,223 B1 | 11/2023 | Vandeventer et al. |
| 11,818,120 B2 | 11/2023 | Jen et al. |
| 11,824,888 B1 | 11/2023 | Vandeventer et al. |
| 11,870,799 B1 | 1/2024 | Imrem et al. |
| 11,870,812 B2 | 1/2024 | Li |
| 11,893,121 B1 | 2/2024 | Imrem et al. |
| 11,895,141 B1 | 2/2024 | Vandeventer et al. |
| 12,015,630 B1 * | 6/2024 | Cross ................. H04L 63/1433 |
| 12,107,869 B1 | 10/2024 | Kannan et al. |
| 12,126,995 B2 | 10/2024 | Hua et al. |
| 2015/0163206 A1 | 6/2015 | McCarthy et al. |
| 2016/0218875 A1 | 7/2016 | Le Saint et al. |
| 2017/0041296 A1 | 2/2017 | Ford et al. |
| 2018/0367310 A1 | 12/2018 | Leong et al. |
| 2019/0130113 A1 | 5/2019 | Obermeier et al. |
| 2019/0182287 A1 | 6/2019 | Hanley et al. |
| 2019/0319940 A1 | 10/2019 | Hamel et al. |
| 2020/0036707 A1 | 1/2020 | Callahan et al. |
| 2020/0195621 A1 | 6/2020 | Li et al. |
| 2020/0201679 A1 * | 6/2020 | Wentz ...................... G06F 9/468 |
| 2020/0329055 A1 * | 10/2020 | Tyagi ................. H04L 63/1416 |
| 2020/0358804 A1 * | 11/2020 | Crabtree ............... H04L 63/102 |
| 2021/0021644 A1 * | 1/2021 | Crabtree ............... G06F 16/951 |
| 2021/0029156 A1 | 1/2021 | Sharifi Mehr |
| 2021/0067536 A1 * | 3/2021 | Mylrea ................. H04L 9/3239 |
| 2021/0084057 A1 | 3/2021 | Chhabra |
| 2021/0112078 A1 * | 4/2021 | Huston, III ............. H04L 63/04 |
| 2021/0201229 A1 | 7/2021 | Moon et al. |
| 2021/0234702 A1 | 7/2021 | Bekiyants |
| 2021/0234885 A1 | 7/2021 | Campbell |
| 2021/0264054 A1 | 8/2021 | Anson et al. |
| 2021/0314293 A1 | 10/2021 | Soundararajan et al. |
| 2021/0367964 A1 | 11/2021 | Jones et al. |
| 2022/0060497 A1 * | 2/2022 | Crabtree ............. H04L 63/1425 |
| 2022/0060499 A1 | 2/2022 | Huda |
| 2022/0094596 A1 | 3/2022 | Jagannathan et al. |
| 2022/0114251 A1 * | 4/2022 | Guim Bernat ...... G06F 9/44505 |
| 2022/0198563 A1 | 6/2022 | Kaplan et al. |
| 2022/0329630 A1 * | 10/2022 | Li .......................... G06F 21/577 |
| 2022/0366494 A1 | 11/2022 | Cella et al. |
| 2023/0130649 A1 | 4/2023 | Schwartz et al. |
| 2023/0259632 A1 | 8/2023 | Marciano et al. |
| 2023/0308474 A1 | 9/2023 | Thompson |
| 2023/0370452 A1 | 11/2023 | Mannengal et al. |
| 2023/0403154 A1 | 12/2023 | Kaizer et al. |
| 2024/0013198 A1 | 1/2024 | Terborg et al. |
| 2024/0086918 A1 | 3/2024 | Gisolfi et al. |
| 2024/0121259 A1 | 4/2024 | Imrem et al. |
| 2024/0129318 A1 | 4/2024 | Vandeventer et al. |
| 2024/0184659 A1 | 6/2024 | Vandeventer et al. |
| 2024/0185191 A1 | 6/2024 | Bernardi |
| 2024/0370854 A1 | 11/2024 | Williams et al. |

OTHER PUBLICATIONS

Pustisek, Matevz et al. Secure Modular Smart Contract Platform for Multi-Tenant 5G Applications. IEEE Access, vol. 8. https://ieeexplore.ieee.org/stamp/stamp.jsp?tp=&arnumber=9163092 (Year: 2020).*

Jain, Neha; Sedamkar, R.R. A Blockchain Technology Approach for the Security and Trust in Trade Finance. 2020 14th International Conference on Innovations in Information Technology (IIT). https://ieeexplore.ieee.org/stamp/stamp.jsp?tp=&arnumber=9299060 (Year: 2020).*

Panda, Soumyashree S. et al. Authentication and Key Management in Distributed IoT Using Blockchain Technology. IEEE Internet of Things Journal, vol. 8, Issue: 16. https://ieeexplore.ieee.org/stamp/stamp.jsp?tp=&arnumber=9369319 (Year: 2021).*

Achleitner, Stefan et al. MLSNet: A Policy Complying Multilevel Security Framework for Software Defined Networking. IEEE Transactions on Network and Service Management, vol. 18, Issue: 1. https://ieeexplore.ieee.org/stamp/stamp.jsp?to=&arnumber=9300252 (Year: 2021).

Dauch, Kevin et al. Information Assurance Using a Defense In-Depth Strategy. 2009 Cybersecurity Applications & Technology Conference for Homeland Security. https://ieeexplore.ieee.org/stamp/stamp.jsp?tp=S&arnumber=4804455 (Year: 2009).

Foreign Action other than Search Report on GB dtd Jul. 9, 2024. 3 pages.

Foreign Search Report on GB2406664.9 dated Jul. 9, 2024. 4 pages.

Park, So-Hyun et al. Performance Evaluation of Open-Source Endpoint Detection and Response Combining Google Rapid Response and Osquery for Threat Detection. IEEE Access, vol. 10. https://ieeexplore.ieee.org/stamp/stamp.jsp?tp=&arnumber=9716119 (Year: 2022).

UK Combined Search and Abbreviated Examination Report for UK App. No. 2406659.9 dated Jul. 9, 2024, 5 pgs.

UK Combined Search and Examination Report for UK App. No. 2406664.9 dated Jul. 8, 2024, 3 pgs.

UK Search Report for UK App. No. 2406658.1 dated Jul. 8, 2024, 1 pg.

* cited by examiner

SYSTEMS AND METHODS FOR VERIFICATION AND VALIDATION OF CYBER RESILIENCE

CROSS-REFERENCE TO RELATED PATENT APPLICATIONS

The present application is a Continuation-In-Part of U.S. Non-Provisional patent application Ser. No. 18/628,343, filed Apr. 5, 2024, which is a Continuation-In-Part of U.S. Non-Provisional patent application Ser. No. 18/203,630, filed May 30, 2023, which claims the benefit of and priority to U.S. Provisional Application No. 63/457,671, filed Apr. 6, 2023, and U.S. Provisional Application No. 63/347,389, filed May 31, 2022, each of which are incorporated herein by reference in their entireties and for all purposes.

BACKGROUND

The present disclosure relates generally to computer security architecture and software for information security and cybersecurity. In a computer networked environment, entities such as people or companies have vulnerability that can result in security incidents. Some entities can desire to implement protections and some entities can desire to provide protections.

SUMMARY

Some implementations of the present disclosure relate to a method for compliance verification and validation of cyber resilience in a distributed entity or third-party network (DETPN). In some implementations, the method can include generating or identifying, by one or more processing circuits, one or more compliance parameters for a plurality of entities or third-parties on the DETPN. In some implementations, the method can include determining, by the one or more processing circuits, at least one compliance level for at least one of the plurality of entities or third-parties, the at least one compliance level corresponding with one or more of the one or more compliance parameters at a first timing phase. In some implementations, the method can include receiving or identifying, by the one or more processing circuits, environmental data of the DETPN. In some implementations, the method can include determining, by the one or more processing circuits at a second timing phase, an updated at least one compliance level for at least one of the plurality of entities or third-parties based at least on the environmental data, wherein the environmental data can include an indication of an occurrence of an event or action on the DETPN. In some implementations, the method can include generating, by the one or more processing circuits, one or more tokens can include the updated at least one compliance level corresponding with the occurrence of the event or the action. In some implementations, the method can include storing, by the one or more processing circuits, the one or more tokens.

In some implementations, the DETPN can include a plurality of computing systems, at least one (e.g., each) of the plurality of computing systems can include at least one data interface corresponding to obtaining or transmitting supply chain data. In some implementations, the method can include transmitting, by the one or more processing circuits, the at least one compliance level or at least one updated compliance level to the at least one data interface. In some implementations, the method can include receiving, by the one or more processing circuits, a response from the interface, wherein the response can include a request for a cyber resilience action. In some implementations, the method can include generating, by the one or more processing circuits, a cyber resilience action corresponding to at least the request and at least one compliance level.

In some implementations, the method can include monitoring, by the one or more processing circuits, the DETPN to identify one or more incidents based on accessing one or more endpoints of the DETPN. In some implementations, the method can include generating and recording, by the one or more processing circuits, an incident token corresponding to at least (i) the one or more incidents, (ii) the updated at least one compliance level, and/or (iii) a cybersecurity dimension of a posture of an entity or third-party. In some implementations, the method can include generating, by the one or more processing circuits, a response data structure based at least on the one or more incidents and the updated at least one compliance level, wherein the response data structure can include data corresponding with the identified one or more incidents and an impact on a security posture of at least one of the plurality of entities or third-parties. In some implementations, the method can include providing, by the one or more processing circuits, the response data structure to the DETPN for access by at least one entity or third-party of the plurality of entities or third-parties.

In some implementations, the impact on the security posture can include at least one of (i) an identification of a vulnerability in a computing environment of at least one of the plurality of entities or third-parties, (ii) a quantification of a potential risk associated with the identified vulnerability, (iii) an assessment of a likelihood of exploitation of the identified vulnerability, and/or (iv) a recommendation or plan for mitigating the identified vulnerability.

In some implementations, generating or identifying the one or more compliance parameters for a plurality of entities or third-parties on the DETPN can include identifying at least one (e.g., each) entity or third-party of the plurality of entities or third-parties on the DETPN based on accessing or interfacing with one or more endpoints of a computing environment of at least one (e.g., each) entity or third-party of the plurality of entities or third-parties and determining at least one shared entity or third-party parameter of the plurality of entities or third-parties on the DETPN. In some implementations, generating the one or more compliance parameters is further based on the shared entity or third-party parameter and a cyber resilience dataset, the cyber resilience dataset can include at least (i) historical incident data, (ii) compliance status records or tokens, and/or (iii) vulnerability assessments for the plurality of entities or third parties dataset.

In some implementations, the method can include determining, by the one or more processing circuits using the one or more tokens, at least one of the plurality of entities or third-parties being above a protection threshold corresponding to the one or more compliance parameters. In some implementations, the method can include generating, by the one or more processing circuits, for at least one of the plurality of entities or third-parties being above a protection threshold, a protection product for a third timing phase corresponding with the at least one compliance level or the updated at least one compliance level.

In some implementations, the timing phase can include at least one of (i) a timing interval corresponding with a compliance review cycle or a monitoring interval or (ii) a point in time corresponding with an event triggered instance or entity or third-party compliance state date.

In some implementations, determining at least one compliance level for at least one of the plurality of entities or third-parties can include determining at least one first compliance level at a first timing phase and at least one second compliance level at a second timing phase, and/or generating one or more tokens can include generating a first token corresponding to (1) the at least one first compliance level at the first timing phase and (2) the at least one updated compliance level and generating a second token corresponding to (1) the at least one second compliance level at the second timing phase and (2) the at least one updated compliance level, the method can include generating, by the one or more processing circuits, an entity or third-party response data structure based on at least one difference between the first token and second token. In some implementations, the method can include providing, by the one or more processing circuits, the entity or third-party response data structure to at least one entity or third-party within the DETPN.

In some implementations, the at least one compliance level at the first timing phase can correspond to a cryptographic proof of provenance obtained by the one or more processing circuits directly from at least one entity or third-party of the plurality of entities or third-parties and programmatically, wherein the at least one compliance level at the second timing phase can correspond to a validation by one or more authorized entities or third-parties, wherein a at least one compliance level at a third timing phase can correspond to documented evidence of an action, and/or wherein a at least one compliance level at a fourth timing phase can correspond to commitments made by the entity or third-party.

In some implementations, the method can include monitoring, by the one or more processing circuits, environmental data of a plurality of computing systems of the plurality of entities or third-parties with the DETPN. In some implementations, the method can include, in response to determining at least one of the plurality of entities or third-parties out of compliance with a cybersecurity parameter, issuing, by the one or more processing circuits, an alert to at least one of the plurality of entities or third-parties can include a recommendation to update one or more cybersecurity protection actions.

In some implementations, the method can include generating or identifying, by the one or more processing circuits, a graph neural network based at least on the one or more generated tokens, wherein the graph neural network can include a plurality of nodes and a plurality of edges, wherein at least one (e.g., each) node of the plurality of nodes represents at least one first generated token can include at least one compliance level and at least one (e.g., each) edge of the plurality of edges represents at least one or more associations between the at least one first generated token and an at least one additional generated token.

In some implementations, the method can include providing, by the one or more processing circuits, the at least one compliance level to a decentralized network, centralized network, and/or data source (DNCNDS). In some implementations, the method can include receiving or identifying, by the one or more processing circuits, one or more additional compliance parameters from at least one computing system connected to the DNCNDS. In some implementations, the determining (i) the at least one compliance level or (ii) the updated at least one compliance level can be further based on the one or more additional compliance parameters.

Some implementations of the present disclosure relate to a system for compliance verification and validation of cyber resilience in a DETPN. The system can include one or more processing circuits. In some implementations, the one or more processing circuits can be configured to generate or identify one or more compliance parameters for a plurality of entities or third-parties on a distributed entity network. In some implementations, the one or more processing circuits can be configured to determine at least one compliance level for at least one of the plurality of entities or third-parties or third-parties or at least one of a plurality of entities or third-parties, the at least one compliance level corresponding with one or more of the one or more compliance parameters at a first timing phase. In some implementations, the one or more processing circuits can be configured to receive or identify environmental data of the DETPN. In some implementations, the one or more processing circuits can be configured to determine, at a second timing phase, an updated at least one compliance level for at least one of the plurality of entities or third-parties or at least one of the entities based at least on the environmental data, wherein the environmental data can include an indication of an occurrence of an event or action on at least one of the distributed entity network or the DETPN. In some implementations, the one or more processing circuits can be configured to generate one or more tokens can include the updated at least one compliance level corresponding with the occurrence of the event or the action. In some implementations, the one or more processing circuits can be configured to store the one or more tokens.

In some implementations, the DETPN can include a plurality of computing systems, at least one (e.g., each) of the plurality of computing systems can include at least one data interface corresponding to obtaining or transmitting supply chain data, and/or the one or more processor circuits can be further configured to transmit the at least one compliance level or at least one updated compliance level to the at least one data interface. In some implementations, the one or more processing circuits can be configured to receive a response from the interface, wherein the response can include a request for a cyber resilience action. In some implementations, the one or more processing circuits can be configured to generate a cyber resilience action corresponding to at least the request and at least one compliance level.

In some implementations, the one or more processing circuits can be configured to monitor the DETPN to identify one or more incidents based on accessing one or more endpoints of the DETPN. In some implementations, the one or more processing circuits can be configured to generate and record an incident token corresponding to at least (i) the one or more incidents, (ii) the updated at least one compliance level, and/or (iii) a cybersecurity dimension of a posture of an entity or third-party. In some implementations, the one or more processing circuits can be configured to generate, a response data structure based at least on the one or more incidents and the updated at least one compliance level, wherein the response data structure can include data corresponding with the identified one or more incidents and an impact on a security posture of at least one of the plurality of entities or third-parties. In some implementations, the one or more processing circuits can be configured to provide the response data structure to the DETPN for access by at least one entity or third-party of the plurality of entities or third-parties.

In some implementations, generating or identifying the one or more compliance parameters for a plurality of entities or third-parties on the DETPN can include identifying at least one (e.g., each) entity or third-party of the plurality of entities or third-parties on the DETPN based on accessing or interfacing with one or more endpoints of a computing environment of at least one (e.g., each) entity or third-party of the plurality of entities or third-parties and determining at least one shared entity or third-party parameter of the plurality of entities or third-parties on the DETPN. In some implementations, generating the one or more compliance parameters is further based on the shared entity or third-party parameter and a cyber resilience dataset, the cyber resilience dataset can include at least (i) historical incident data, (ii) compliance status records or tokens, and/or (iii) vulnerability assessments for the plurality of entities or third parties dataset.

In some implementations, the one or more processing circuits can be configured to determine, using the one or more tokens, at least one of the plurality of entities or third-parties being above a protection threshold corresponding to the one or more compliance parameters. In some implementations, the one or more processing circuits can be configured to generate for at least one of the plurality of entities or third-parties being above a protection threshold, a protection product for a third timing phase corresponding with the at least one compliance level or the updated at least one compliance level.

In some implementations, determining at least one compliance level for at least one of the plurality of entities or third-parties can include determining at least one first compliance level at a first timing phase and at least one second compliance level at a second timing phase, and/or generating one or more tokens can include generating a first token corresponding to (1) the at least one first compliance level at the first timing phase and (2) the at least one updated compliance level and generating a second token corresponding to (1) the at least one second compliance level at the second timing phase and (2) the at least one updated compliance level. In some implementations, the one or more processing circuits can be configured to generate an entity or third-party response data structure based on at least one difference between the first token and second token. In some implementations, the one or more processing circuits can be configured to provide the entity or third-party response data structure to at least one entity or third-party within the DETPN.

In some implementations, the at least one compliance level at the first timing phase corresponds to a cryptographic proof of provenance obtained by the one or more processing circuits directly from at least one entity or third-party of the plurality of entities or third-parties and programmatically, wherein the at least one compliance level at the second timing phase corresponds to a validation by one or more authorized entities or third-parties, wherein a at least one compliance level at a third timing phase can correspond to documented evidence of an action, and/or wherein a at least one compliance level at a fourth timing phase correspond to commitments made by the entity or third-party.

Some implementations of the present disclosure relate to a non-transitory computer readable medium (CRM). In some implementations, the CRM can include one or more instructions stored thereon and executable by one or more processors to generate or identify one or more compliance parameters for a plurality of entities or third-parties on a distributed entity network. In some implementations, the CRM can include one or more instructions stored thereon and executable by one or more processors to determine at least one compliance level for at least one of the plurality of entities or third-parties or third-parties or at least one of a plurality of entities or third-parties, the at least one compliance level corresponding with one or more of the one or more compliance parameters at a first timing phase. In some implementations, the CRM can include one or more instructions stored thereon and executable by one or more processors to receive or identify environmental data of the DETPN. In some implementations, the CRM can include one or more instructions stored thereon and executable by one or more processors to determine, at a second timing phase, an updated at least one compliance level for at least one of the plurality of entities or third-parties or at least one of the entities based at least on the environmental data, wherein the environmental data can include an indication of an occurrence of an event or action on at least one of the distributed entity network or the DETPN. In some implementations, the CRM can include one or more instructions stored thereon and executable by one or more processors to generate one or more tokens can include the updated at least one compliance level corresponding with the occurrence of the event or the action. In some implementations, the CRM can include one or more instructions stored thereon and executable by one or more processors to store the one or more tokens.

Figure 1:
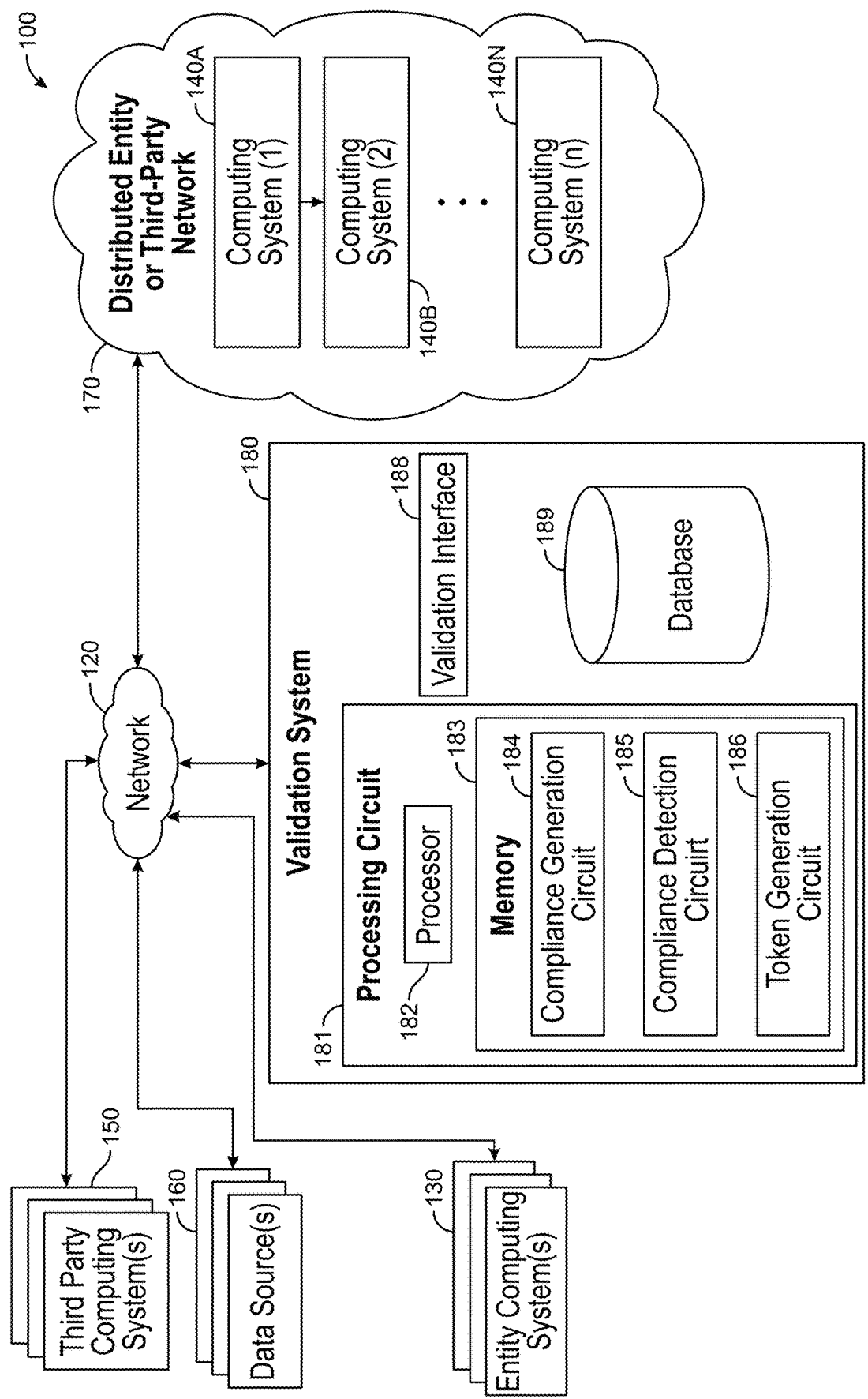
FIG. 1 depicts a block diagram of an implementation of a system for verifying and validating cyber resilience, according to some implementations.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Referring generally to the FIGURES, systems and methods relate generally to implementing a cyber security framework. In some implementations, the system includes implementations related to a security architecture that verifies and validates cyber resilience across a supply chain.

Generally, ensuring compliance verification and validation of cyber resilience in distributed entity or third-party networks (DETPNs) presents challenges, particularly in managing and adapting to dynamic cybersecurity threats across interconnected systems. Traditional approaches for cybersecurity compliance often rely on static assessments or manual audits, which fail to provide real-time adaptability or scalability to evolving threat landscapes. These methods generally fall into two categories: periodic compliance assessments (e.g., structured evaluations conducted at regular intervals to verify adherence to cybersecurity standards) and reactive incident-based evaluations (e.g., assessments initiated in response to detected cybersecurity incidents). Periodic assessments, while structured, often overlook emerging risks or ongoing vulnerabilities between cycles. Reactive evaluations are triggered post-incident, leading to delayed detection and response to cybersecurity events. These limitations result in insufficient monitoring and validation of cybersecurity resilience, particularly within DETPNs involving numerous third parties (e.g., suppliers, vendors, and/or distributors). Challenges in maintaining compliance across DETPNs is from the heterogeneity of systems (e.g., diverse configurations, software environments), varying cybersecurity standards (e.g., ISO, NIST), and/or the absence of automated mechanisms for consistent monitoring and response. These inefficiencies result in technical challenges that hinder the ability of organizations to proactively adapt to cybersecurity threats, impacting the overall resilience and reliability of DETPNs in safeguarding critical systems and data.

Implementations of the present disclosure relate to systems and methods for compliance verification and validation of cyber resilience in DETPNs. In contrast to traditional systems, which exhibit limitations in adaptability and scalability, the disclosed implementations address these issues through automated monitoring (e.g., continuous data analysis and threat detection), real-time and/or near real-time compliance evaluation (e.g., dynamic adjustments to compliance levels), and/or the generation of digital compliance tokens (e.g., data structures encapsulating cybersecurity compliance states) to capture and track cybersecurity states. The systems and methods described herein can generate compliance parameters (e.g., predefined rules, metrics, and/or thresholds for compliance evaluation) and/or determine compliance levels for entities and/or third parties within a DETPN. For example, compliance levels can be assessed at various timing phases (e.g., predefined intervals, event-triggered instances) based on environmental data (e.g., detected anomalies, system updates, and/or operational changes), including indications of cybersecurity events or actions within the DETPN. The systems and methods can also facilitate the generation of tokens representing compliance states (e.g., hierarchical records of compliance levels over time), facilitating structured tracking and validation of cybersecurity resilience over time. By using modeling processes and digital tokens, the disclosed implementations improve the accuracy, scalability, and/or efficiency of compliance verification and validation for DETPNs, thereby improving the capability to anticipate, withstand, and/or recover from adverse cybersecurity events.

This disclosure relates to systems and methods for compliance verification and validation of cyber resilience within distributed entity or third-party networks (DETPNs). The systems and methods facilitate the generation of compliance parameters (e.g., predefined conditions, thresholds, and/or metrics for evaluating cybersecurity adherence) and the determination of compliance levels (e.g., multi-tiered ratings indicating cybersecurity performance) for entities or third parties within a DETPN using automated processes. For example, the systems and methods can evaluate compliance at various timing phases (e.g., snapshots in time, periodic intervals, and/or in response to detected events) by analyzing environmental data (e.g., real-time system metrics, operational logs, and/or security alerts), including cybersecurity events or actions affecting the DETPN.

Some conventional approaches to cybersecurity compliance rely on static or periodic assessments (e.g., scheduled audits, predefined checklists), which often fail to capture dynamic threats or evolving risks within DETPNs. These approaches are limited in their ability to adapt to changes in the cybersecurity landscape, leading to vulnerabilities that can persist until the next scheduled assessment or a reactive evaluation post-incident. For example, static assessments can overlook ongoing changes in system configurations, network environments, and/or third-party relationships (e.g., new vendor integrations, evolving threat models), resulting in gaps in compliance monitoring. Reactive approaches, while responsive, are typically too late to prevent or mitigate cybersecurity incidents (e.g., malware infections, unauthorized access), reducing their effectiveness in maintaining cyber resilience.

Systems and methods in accordance with the present disclosure provide continuous and automated compliance verification and validation for DETPNs. The disclosed implementations can utilize systems to generate compliance parameters based on shared attributes of entities and/or third parties within a DETPN. For example, processing circuits can analyze historical incident data (e.g., past cybersecurity breaches, logged events), compliance status records (e.g., previously issued compliance tokens), and/or vulnerability assessments (e.g., security gap analyses, penetration test results) to generate compliance parameters customized and/or unique to the cybersecurity context of the DETPN. That is, the parameters can be used as criteria for evaluating the compliance levels of individual entities and/or third parties within the DETPN.

In some implementations, compliance levels can be determined at various timing phases. For example, an initial compliance level can be assessed during a first timing phase based on predefined compliance parameters and the current state of an entity or third party within the DETPN. Subsequently, compliance levels can be updated during later timing phases based on environmental data (e.g., system health metrics, detected anomalies, and/or operational events), such as detected cybersecurity events, system behaviors, and/or operational activities within the DETPN. The environmental data can include indications of events such as unauthorized access attempts (e.g., login failures, brute-force attacks), malware detections (e.g., identified malicious files, executed payloads), and/or changes in network configurations (e.g., firewall updates, new endpoint connections), which can impact the cybersecurity posture of entities and/or third parties within the DETPN.

The systems and methods also facilitate the generation of compliance tokens to encapsulate and track compliance states over time. For example, a compliance token can be the compliance level of an entity or third party during a specific timing phase (e.g., initial evaluation, post-incident reassessment), including any updates resulting from environmental data analysis. These tokens can serve as digital records for tracking compliance trends (e.g., improvements, regressions), validating cybersecurity measures (e.g., verification against predefined parameters), and/or informing resilience actions (e.g., recommendations for mitigation). For example, compliance tokens can be organized into a historical chain to provide a view of cybersecurity resilience over time, similar to a status page (e.g., visual dashboard) reflecting the compliance state of the DETPN.

In some implementations, the systems and methods can identify incidents within the DETPN by monitoring endpoints (e.g., servers, devices, and/or interfaces within the network) and analyzing environmental data. For example, processing circuits can detect anomalies or patterns indicative of cybersecurity threats (e.g., unusual traffic spikes, unauthorized data transfers) and/or generate incident tokens corresponding to these events. Incident tokens can capture details such as the nature of the incident (e.g., malware infection, DDoS attack), its impact on compliance levels (e.g., reduction in compliance tier), and/or the affected cybersecurity dimensions (e.g., data integrity, network availability). These tokens can be used to generate response data structures (e.g., JSON objects, XML files), which include actionable insights (e.g., recommendations for remediation, impact analysis) for addressing identified incidents and improving cybersecurity resilience within the DETPN.

The disclosed systems and methods also facilitate integration with knowledge graphs (e.g., semantic models for representing relationships between compliance tokens) for improved compliance validation and inference generation. For example, compliance tokens can be represented as nodes within a knowledge graph, with edges representing relationships between tokens (e.g., shared compliance parameters, common cybersecurity attributes). This representation facilitates the generation of contextual inferences (e.g., identifying safeguards, predicting potential vulnerabilities), such as identifying safeguards within the DETPN (e.g., firewall configurations, endpoint security measures), and/or determining the resilience of specific entities and/or third parties against identified threats. By using semantic relationships within the knowledge graph, the systems and methods can provide improved recommendations (e.g., specific mitigation strategies, prioritized actions, remediation workflows, incident response timelines, and/or any configuration updates) for improving cybersecurity resilience.

Additional features of the disclosed implementations include adaptive timing mechanisms for compliance evaluation (e.g., dynamic adjustment of evaluation intervals), dynamic generation of response data structures (e.g., automated reports, action plans), and/or integration with decentralized or centralized networks (e.g., blockchain, cloud platforms) for distributed compliance monitoring. These features improve the scalability and adaptability of the systems and methods, providing technical solutions for managing cybersecurity compliance within DETPNs.

For example, the implementations can update compliance parameters and evaluation criteria based on changes in the cybersecurity landscape (e.g., newly identified vulnerabilities, emerging threats, regulatory changes, system architecture updates, and/or evolving attack vectors), ensuring that compliance verification and/or validation remain effective (e.g., accurate, scalable, and/or consistent) against emerging threats (e.g., ransomware attacks, phishing campaigns, and/or supply chain vulnerabilities).

The systems and methods described herein provide improvements in cybersecurity compliance verification and validation by using modeling processes (e.g., real-time and/or near real-time monitoring, token-based tracking, compliance trend analysis, incident correlation, and/or any automated threat detection), digital tokens (e.g., compliance states, incident records, vulnerability assessments, event classifications, and/or any compliance history), and contextual inferences (e.g., semantic analyses, risk assessments, predictive modeling, anomaly detection, and/or any cybersecurity posture evaluations). These improvements address the limitations of traditional approaches (e.g., static evaluations, delayed responses, lack of scalability, limited adaptability), allowing organizations to proactively manage compliance and resilience within complex DETPNs, thereby enhancing systems to anticipate, withstand, and/or recover from cybersecurity events.

Additionally, many existing cybersecurity systems and architectures face several challenges that limit their effectiveness in managing and responding to cyber threats. One major challenge is the lack of integrated compliance and incident monitoring capabilities. In particular, many existing systems operate in silos, with separate tools for verification, validation, and/or monitoring. This lack of integration can lead to delays in identifying security gaps, miscommunication between entities within the supply chain, and/or a lack of overall visibility into the security posture of the supply chain and the individuals connected to the supply chain. Another problem is the lack of streamlined processes for engaging with third-party vendors for verification and validation services. Organizations often have to navigate through complex procurement processes, losing time that can be used to ensure the security of the supply chain. Additionally, organizations often struggle to accurately assess their readiness for verification and validation. They lack clear visibility into their own capabilities and limitations, and/or often do not have a way to communicate this information to potential service providers. Another problem with existing systems is the inability to dynamically adapt to changes in the security landscape. Many existing systems employ static verification methods that are unable to adjust to new threats as they arise. This leads to vulnerabilities as attackers continually evolve their strategies and methods. Moreover, static systems also fail to account for changes in the infrastructure and operation of the supply chain, such as the adoption of new technologies or changes in business processes, which can introduce new potential points of attack. This inability to dynamically adapt by capturing additional compliance levels in response to environmental data of the supply chain hampers the ability of the supply chain and connected organizations to maintain a robust security posture, leaving them exposed to a constantly evolving threat landscape.

Accordingly, the ability to verify and validate cybersecurity measures across supply chains provides organizations (e.g., entities, third-parties, vendors, providers, institution, individual, and/or company) improved security by creating a customized verification and validation framework to their specific needs. This framework helps organizations understand their current cybersecurity vulnerabilities in relation to the entire supply chain and also connects them with appropriate vendors offering targeted verification and validation plans. The customized framework enhances the protection of sensitive data, such as proprietary business data and financial information, and/or also helps safeguard the reputation of the entity. The implementations of verification and validation models for detecting and addressing vulnerabilities facilitates monitoring of various relationships, such as network, hardware, device, and/or systems, between entities and vendors and/or other third-parties. The improved approach of providing a customized verification and validation framework allows for improvements in cybersecurity by improving network security, infrastructure security, technology security, and/or data security.

Furthermore, by utilizing a customized verification and validation framework for entities and users, the systems can determine existing vulnerabilities, document them via tokenization, link them to specific assets and/or other tokens, and/or provide targeted protection strategies, offering the technical benefit of generating remediation recommendations and avoiding and/or preventing successful hacking activities, cyberattacks, data breaches, and/or other detrimental cyber-incidents across a supply chain. Moreover, the system uses data structures and tokenization techniques to provide technical benefits, including the automated generation of compliance reports and incident tokens. These tokens can encapsulate metadata, such as compliance levels, vulnerability assessments, and/or incident details, streamlining communication between entities and their cybersecurity vendors. For example, a modeler can determine an entity is compliant with network security standards, generating enhanced coverage under a shared insurance policy, reducing the administrative burden of managing policy claims during an incident. Additionally, the system can generate targeted remediation plans based on real-time and/or near real-time vulnerability assessments, offering entities a proactive and adaptive approach to addressing cybersecurity risks. The implementations can enhance overall supply chain resilience, allowing entities to maintain operational continuity even in the face of evolving cyber threats.

The framework provides a technical enhancement in centralized vulnerability management. Instead of relying on fragmented systems or manually maintained inventories of weaknesses, the system provides a unified view of the cybersecurity posture of an entity. For example, the system can automatically map vulnerabilities associated with specific endpoints, such as IP addresses or domain identifiers, and/or assess their potential impact on the broader supply chain. By integrating these insights into a single operational model, the system simplifies vulnerability management, reduces redundancies, and/or accelerates the implementation of mitigation strategies.

By incorporating the resilience stream, organizations can receive cyber resilience clarity, streamline configuration and coverage, reducing overhead, reduce drift, provide confidence through unified risk treatments and adaptive risk management, and/or receive faster coverage and fallback plans. This unified approach not only improves the efficiency of cybersecurity operations but also empowers entities to make informed decisions regarding vendor selection, resource allocation, and/or overall cyber security management. By addressing the limitations of existing architectures, the system framework provides a technical solution to the technical challenges of securing supply chains.

Systems And Methods for Verification and Validation of Cyber Resilience

Referring now to FIG. 1, a block diagram of an implementation of system 100 for a verification and validation system is shown, according to some implementations. The implementation shown in FIG. 1 includes a network 120, entity computing system(s) 130, third-party computing system(s) 150, data sources 160, a distributed entity or third-party network 170 (DETPN), and/or a validation system 180. In some implementations, the DETPN can include computing systems (e.g., computing system 140*a*, computing system 140*b*, . . . computing system 140*n*), herein referred to as computing systems 140*a-n* (collectively, computing systems 140). In some implementations, the validation system 180 can include a processing circuit 181, validation interface 188, and/or database 189. In some implementations, the processing circuit can include a processor 182 and memory 183. In some implementations, the memory can include a compliance generation circuit 184, compliance detection circuit 185, and/or token generation circuit 186. In some implementations, at least one (e.g., at least one (e.g., each)) of the systems or devices shown in FIG. 1 can be interconnected or communicate with other systems or devices via network 120. It should be understood that, although systems or devices of FIG. 1 can be described or illustrated herein in a singular form, the implementation shown FIG. 1 can include any number of such systems or device. Devices, systems, and/or components shown in FIG. 1 can be added, deleted, integrated, separated, and/or rearranged in various implementations of the disclosure.

Each system or device of FIG. 1 (e.g., network 120, entity computing system(s) 130, computing system(s) 140, third-party computing system(s) 150, data sources 160, DETPN 170, validation system 180, and/or other systems or devices) can include one or more processors, memories, network interfaces (sometimes referred to herein as a "network circuit") or user interfaces. For example, the network 120, entity computing system(s) 130, computing system(s) 140, third-party computing system(s) 150, data sources 160, DETPN 170, and/or validation system 180 can include one or more logic devices, which can be one or more computing devices equipped with one or more processing circuits that run instructions stored in a memory device to perform various operations. The processing circuit can be made up of various components such as a microprocessor, an ASIC, and/or an FPGA, and/or the memory device can be any type of storage or transmission device capable of providing program instructions. The instructions can include code from various programming languages commonly used in the industry, such as high-level programming languages, web development languages, and/or systems programming languages.

Each system or device of FIG. 1 can include memory that can store programming logic that, when executed by the processor, controls the operation of the corresponding computing system or device. The memory can also store data in databases. For example, memory can store programming logic that when executed by a processor within a processing circuit, causes a database to update parameters or store a system or event log. The network interfaces can allow the computing systems and devices to communicate wirelessly or otherwise. The various systems or devices shown in FIG. 1 can be implemented via hardware (e.g., circuitry), software (e.g., executable code), and/or any combination thereof. In some implementations, one or more systems or devices of FIG. 1 can also include one or more databases for storing data or receiving and providing data to other systems and devices on the network 120. In some implementations, one or more systems or devices of FIG. 1 can also include, provide, and/or display one or more graphical user interfaces or GUIs.

In some implementations, the systems or components of FIG. 1 can interface and/or otherwise communicate over network 120. Network 120 can include computer networks such as the Internet, local, wide, metro or other area networks, intranets, satellite networks, other computer networks such as voice or data mobile phone communication networks, combinations thereof, and/or any other type of electronic communications network. Network 120 can include or constitute a display network. As a non-limiting example, network 120 can implement transport layer security (TLS), secure sockets layer (SSL), hypertext transfer protocol secure (HTTPS), and/or any other secure communication protocol. In some implementations, network 120 can be composed of various network devices (nodes) communicatively linked to form one or more data communication paths between participating devices. The network 120 can facilitate communication between the various nodes, such as the entity computing system(s) 130, computing system(s) 140, third-party computing system(s) 150, data sources 160, DETPN 170, and/or validation system 180 (e.g., using an OSI layer-4 transport protocol such as the User Datagram Protocol (UDP), the Transmission Control Protocol (TCP), Stream Control Transmission Protocol (SCTP), and/or other protocols), at least one (e.g., at least one (e.g., each)) networked device can include at least one network interface for receiving and/or transmitting data, typically as one or more data packets. An illustrative network 120 is the Internet (however, other networks can be used). Network 120 can be an autonomous system (AS), e.g., a network that is operated under a consistent unified routing policy (or at least appears to from outside the AS network) and is generally managed by a single administrative entity (e.g., a system operator, administrator, and/or administrative group).

In some implementations, the entity computing system(s) 130, computing system(s) 140, third-party computing system(s) 150, data sources 160, DETPN 170, validation system 180 can execute and/or otherwise invoke a software application (e.g., a web browser, an installed application, and/or other application) to retrieve content from other computing systems and devices over network 120. Such an application can be configured to retrieve an interfaces and dashboards from the systems of devices of FIG. 1. In some implementations, entity computing system(s) 130, computing system(s) 140, third-party computing system(s) 150, data sources 160, DETPN 170, validation system 180, and/or validation interface 188 can refer to or include one or more computing devices, nodes, mobile devices, networked devices, smartphones, desktop computing devices, servers, tablets, smart watches, smart sensors, and/or any other device configured to facilitate receiving, displaying, and/or interacting with data (e.g., web pages, mobile applications, and/or other data). For example, the entity computing system(s) 130, computing system(s) 140, third-party computing system(s) 150, data sources 160, DETPN 170, validation system 180, and/or validation interface 188 can include an application to receive and display content and to receive user interaction with the content (e.g., a web browser, a mobile application, and/or other content).

In some implementations, the entity computing system(s) 130, computing system(s) 140, third-party computing system(s) 150, DETPN 170, and/or validation system 180 can be communicatively coupled to one or more databases, such as data sources 160 and/or database 189. The databases can be structured as a data repository that is configured to store data, such as cyber resilience data. For example, the data sources 160 and/or database 189 can include data structures for storing information such as, but not limited to, configuration data, compliance metrics, incident history logs, performance benchmarks, policy definitions, cryptographic data or keys, tokens, cyber resilience attributes, posture or state data, historical data, analytic results derived from cyber resilience modeling processes, and/or other data structures. In some implementations, data sources 160 can include one or more storage mediums.

In some implementations, the entity computing system(s) 130, computing system(s) 140, third-party computing system(s) 150, DETPN 170, and/or validation system 180 APIs can access and/or otherwise retrieve data of data sources 160 by performing database functions (e.g., managing, synchronizing, and/or linking data stored in data sources). The APIs can be but are not limited to SQL, ODBC, JDBC, NOSQL and/or any other data storage and manipulation API.

In some implementations, the entity computing system(s) 130 can include any computing device associated with an organization, entity, institution, user, and/or customer. For example, the entity computing system(s) 130 can include any computing infrastructures, networks, and/or devices managed by an entity to perform operations such as data storage, processing, and/or communication. In some implementations, the entity computing system(s) 130 can communicate or interface with various systems or devices of shown in FIG. 1 (e.g., exchanging data with the validation system 180 or DETPN 170, accessing or sharing resources with data sources 160, interacting with third-party computing system(s) 150, and/or other communication). For example, the entity computing system(s) 130 can interact with the DETPN 170 and validation system 180 to verify and validate cyber resilience data, organizational data, customer data, endpoint data, relationship data, and/or other data relating to organizations as further described herein.

In some implementations, the third-party computing system(s) 150 can include any computing devices or systems associated with an external organization, third-party, and/or entity. For example, the third-party computing system(s) 150 can include or refer to various devices or systems managed by vendors providing cybersecurity tools or services, insurers assessing or underwriting risk based on cyber resilience data, regulatory bodies performing compliance audits, cloud service providers hosting or securing data, third-party data analytics platforms evaluating cyber resilience metrics, software providers offering patches or updates, external auditors reviewing entity safeguards, consultants managing incident response strategies, managed service providers overseeing security operations, law enforcement agencies investigating cyber incidents, penetration testing firms conducting vulnerability assessments, threat intelligence platforms monitoring emerging threats, forensic analysis teams analyzing breach data, and/or any systems or entities supporting cybersecurity operations and resilience strategies. In some implementations, the third-party computing system(s) 150 can communicate or exchange data with various components of FIG. 1 (entity computing system(s) 130, computing system(s) 140, DETPN 170, validation system 180, compliance generation circuit 184, compliance detection circuit 185, token generation circuit 186, validation interface 188, database 189) to perform various operations, as further described herein.

In some implementations, the DETPN 170 can refer to any distributed entity or third-party network (e.g., supply chain, blockchain networks, peer-to-peer networks, cloud service providers, and/or any other networks)". That is, the DETPN 170 can refer to an interconnected network of entities and/or third-parties (e.g., vendors, supplies, distributors, customers, and/or other third-parties) involved in the creation, delivery, logistics, and/or maintenance of equipment, software, products or services, support, and/or any other networks. That is, at least one computing system of an entity, third-party, customer, or other system within the DETPN 170 is monitored, evaluated, and/or supported in maintaining compliance and resilience against cybersecurity threats, with automated processes to facilitate cyber verification, validation, and/or response. That is, the DETPN 170 can include any type of decentralized network implementing a distributed or node-based architecture, such as a blockchain, decentralized ledger, peer-to-peer networks, federated learning network, a content delivery network (CDN), and/or other decentralized communication architectures. In some implementations, the DETPN 170 can include or refer to a centralized network including multiple nodes managed by a centralized authority or controller. In some implementations, third-party system(s) 150 can refer to any third-party device or computing device.

For example, the centralized network can include a client-server model where a central server node coordinates data exchange with other nodes. That is, the centralized network can include any type of hierarchical network architecture, such as a local area network (LAN), wide area network (WAN), hub-and-spoke architecture, and/or cloud-based network. In some implementations, the DETPN 170 can include or refer to a data source including one or more repositories for storing, managing, and/or accessing data. For example, the DETPN 170 can include or refer to databases, distributed storage systems, and/or file repositories configured to store cyber resilience data, compliance records, operational metrics, and/or other storage components. That is, the DETPN 170 can include any type of storage medium or infrastructure, such as relational databases, NoSQL databases, and/or object-based storage systems. In some examples, the DETPN 170 can include cloud-based storage platforms, on-premises storage devices, and/or hybrid storage systems that combine local and remote storage resources.

For example, the DETPN 170 can be a networked system such as a supply chain including multiple independent entities (e.g., computing systems 140*a-n*) interconnected to provide and/or consume services, exchange data, coordinate logistics, manage inventory, and/or any other operational tasks. In some implementations, the computing system(s) 140 (e.g., computing systems 140*a-n*) can be any computing devices or systems associated with an entity (e.g., entity computing system(s) 130), an external organization (e.g., third-party computing system(s) 150), customer, and/or other stakeholders in a supply chain such as vendors and/or suppliers. References to "organizations" herein can refer to but is not limited to any combination of computing systems (e.g., computing system(s) 140, entity computing system(s) 130, third-party computing system(s) 150. These systems can perform various functions including, but not limited to any function of entity computing system(s) 130 or third-party computing system(s) 150.

As used herein, the term "supply chain" refers to a distributed network including interconnected systems, computational nodes, and processes that are configured for the exchange, storage, and processing of resources, including data, materials, and digital signals. The supply chain network can be represented as a set of interrelated entities, such as servers, computing devices, storage systems, and/or communication interfaces, that collectively execute tasks for managing operations across multiple domains. These tasks can include the transmission and processing of digital information, the transfer of physical materials, and/or the execution of computational workflows. The network can also include one or more processing circuits configured to detect, analyze, and respond to events and/or conditions that can affect the operational state of the systems within the network. For example, the supply chain can integrate with technical components such as blockchain-based verification systems, distributed storage architectures, encryption algorithms, authentication protocols, peer-to-peer communication frameworks, and/or monitoring subsystems that evaluate security and operational performance metrics. Such a supply chain network can further incorporate mechanisms for evaluating system states, executing threat detection processes, and/or ensuring compliance with system-level operational parameters.

In some implementations, validation system 180 can be a component of (e.g., part of) or a separate component from the DEPTN 170. For example, the validation system 180 can be connected with the DETPN via another network or communication channel (e.g., network 120). That is, the validation system 180 can be an external system configured to receive data or metrics associated with the DEPTN 170 via network 120 and transmit data or instructions to one or more components (e.g., computing system 140) and/or nodes of the DETPN 170 via network 120. In another example, the validation system 180 can be included within the DETPN 170 (e.g., as a component and/or system within DETPN 170). That is, the validation system 180 can include or refer to any system, device, node, and/or group of nodes within the DETPN 170 that facilitates data exchange, compliance generation, compliance evaluation, cyber resilience operations, workflow orchestration, system coordination, and/or any other operation relating to verification and/or validation of cyber resilience within DETPN 170. In some implementations, validation system 180 can operate as a central and/or master monitoring and/or validating system in an interconnected network of entities or third-parties (e.g., DETPN 170) in generating or determining compliance levels, generating tokens, receiving or identifying environmental data and/or communicating with computing systems (e.g., entity computing system(s) 130, third-party computing system(s) 150, etc.) via a network (e.g., network 120, DETPN 170, etc.). In some implementations, the validation system 180 can include or refer to one or more computing devices configured to exchange data or perform operations via the DETPN 170. In some implementations, validation system 180 can execute and/or otherwise perform various operations to generate, determine, configure, model, identify, store, and/or provide data within a DETPN.

The memory 183 can be one or more devices (e.g., RAM, ROM, Flash memory, hard disk storage) for storing data and/or computer code for completing and/or facilitating the various processes described herein. The memory 183 can be or include non-transient volatile memory, non-volatile memory, and/or non-transitory computer storage media. Memory 183 can include database components, object code components, script components, and/or any other type of information structure for supporting the various activities and information structures described herein. Memory 183 can be communicably coupled to the processor 182 and include computer code or instructions for executing one or more processes described herein. The processor 182 can be implemented as one or more application integrated circuits (ASICs), field programmable gate arrays (FPGAs), a group of processing components, and/or other suitable electronic processing components. As such, the validation system 180 can be configured to run a variety of application programs and store associated data in a database of the validation system 810 (e.g., database 189). One such application can be to provide data to the compliance generation circuit 184, compliance detection circuit 185, and/or token generation circuit 186.

The system 100 can implement at least a portion of a compliance validation and verification (CVV) pipeline, such as an ETL (Extract, Transform, Load) pipeline, a CI and/or CD (Continuous Integration and/or Continuous Deployment) pipeline, or a machine learning (ML) pipeline. The system 100 can be used to process and/or analyze data by any of various systems described herein, including but not limited to cybersecurity systems, distributed network systems, supply chain management systems, token generation systems, monitoring systems, incident response systems, and/or any resilience evaluation systems.

Generally, the CVV pipeline can include operations performed by the system 100. For example, the CVV pipeline can include any one or more of an ingestion stage, a transformation stage, a validation stage, and/or an output stage. Each stage of the CVV pipeline includes one or more components of the system 100 that perform the functions described herein. In some implementations, one or more of the stages can be performed during the training of AI models. Additionally, one or more of the stages can be performed during the inference phase using the AI models.

The system 100 (e.g., implementing the CVV pipeline) can generate or identify one or more compliance parameters for a plurality of entities or third-parties on the DETPN. In some implementations, implementing the CVV pipeline can include the system 100 determining at least one compliance level for at least one of the plurality of entities or third-parties, the at least one compliance level corresponding with one or more of the one or more compliance parameters at a first timing phase Additionally, implementing the CVV pipeline can include the system 100 receiving or identifying environmental data of the DETPN. Further, implementing the CVV pipeline can include the system 100 determining at a second phase, an updated at least one compliance level for at least one of the plurality of entities or third-parties based at least on the environmental data, wherein the environmental data includes an indication of an event of action on the DETPN. Additionally, implementing the CVV pipeline can include the system 100 generating one or more tokens including updating at least one compliance level corresponding with the occurrence of the event of the action. Implementing the CVV pipeline can include the system 100 storing the one or more tokens. Thus, the CVV pipeline can improve security and compliance modeling of the DETPN.

In some implementations, the ingestion stage can be the stage in the CVV pipeline in which the system 100 can generate or identify one or more compliance parameters. The system 100 can include at least one compliance generation circuit 184. The compliance generation circuit 184 can generate or identify one or more compliance parameters for a plurality of entities or third-parties on the DETPN. That is, the compliance generation circuit 184 can analyze data from various sources within the DETPN to determine relevant compliance parameters. For example, during the ingestion stage, the compliance generation circuit 184 can collect and process data from endpoints within the DETPN to identify compliance parameters. In some implementations, the compliance generation circuit 184 can generate and/or otherwise interact with data by utilizing historical incident data, compliance status records, and/or vulnerability assessments. The compliance parameters can be specific metrics or criteria used to evaluate the compliance level of entities or third-parties. That is, the compliance parameters can represent benchmarks for assessing the cyber resilience of the DETPN. For example, the compliance generation circuit 184 can identify compliance parameters such as encryption standards, access control measures, and incident response protocols.

The compliance generation circuit 184 can be configured to generate and/or identify, by one or more processors, one or more compliance parameters for a plurality of entities or third-parties on a distributed network (e.g., DETPN 170). For example, compliance parameters can include parameters, criteria, metrics, and/or conditions that are used to evaluate the adherence of entities or third-parties to predefined cybersecurity standards or requirements. Additionally, compliance parameters can include benchmarking requirements, such as parameters corresponding to a number or requests for cyber resilience. That is, compliance parameters can include measurable or definable attributes used to evaluate systems, processes, and/or organizations in meeting specific regulatory, industry, and/or contractual requirements. For example, compliance parameters can include establish technical and procedural controls to safeguard sensitive data, assess and mitigate vulnerabilities, and/or maintain system integrity. For example, the compliance parameters can mandate the implementation of advanced access control mechanisms, such as role-based access control (RBAC) and multi-factor authentication (MFA), alongside encryption protocols for data at rest and in transit.

Additionally, the compliance requirements can specify vulnerability management practices, including regular scanning, patch management, and/or risk-based prioritization of remediation efforts, as well as incident response protocols that define detection, reporting, and/or remediation timelines. Furthermore, the compliance parameters can enforce adherence to established standards such as ISO 27001, NIST CSF, and/or PCI DSS, mandate audit trails and log retention policies for forensic and compliance purposes and require ongoing employee training to enhance cybersecurity awareness. Additionally, the compliance parameters can correspond to any parameter relating to organization compliance, accountability, security posture, and/or other cyber resilience data in relation to past, current, and/or evolving cyber threats. Taken together, one or more compliance parameters can be applied to, compared with, and/or otherwise evaluated against one or more organizations (e.g., entities, third-parties) within a DETPN (e.g., supply chain).

For example, the compliance generation circuit 184 can generate or identify compliance parameters by identifying at least one (e.g., each) organization (e.g., customer, entity, third-party) on the supply chain (e.g., DETPN) based on accessing or interfacing with one or more endpoints of a computing environment of at least one (e.g., each) organization (e.g., customer, entity, third-party). Additionally, the compliance generation circuit 184 can determine at least one shared parameter between the plurality of organizations (e.g., customer, entity, third-party) on the supply chain (e.g., DETPN). For example, the compliance generation circuit 184 can generate compliance parameters based on a shared parameter (e.g., shared entity or third-party parameter) and a cyber resilience dataset. That is, the cyber resilience dataset can include historical incident data, compliance status records or tokens, vulnerability assessments for the organizations, and/or other data.

In some implementations, the generated compliance parameters can define access control policies, such as role-based access and session management protocols, cryptographic standards like AES-256 and RSA-2048 for data encryption, and/or network security configurations, including firewall rules and secure communication protocols like TLS 1.3. That is, the compliance parameters can establish the specific technical benchmarks organizations must adhere to in order to maintain a secure environment, such as incident response metrics, including Mean Time to Detect (MTTD) and Mean Time to Respond (MTTR), and/or audit requirements for logging administrative actions and ensuring regulatory compliance (e.g., GDPR, PCI DSS, and/or ISO 27001). Additionally, the cyber resilience dataset can include historical incident data, which can provide insights into breach timelines, root cause analyses, and/or the financial impacts of past incidents, as well as compliance records or tokens that can verify certifications and audit results. Furthermore, the dataset can encompass vulnerability assessments, such as CVSS scores and penetration testing reports, along with threat intelligence feeds that can include Indicators of Compromise (IoCs) and emerging threat trends. The dataset can also incorporate supply chain data, which can assess the cybersecurity posture of vendors and partners, and/or operational metrics like recovery time objectives (RTO) and backup success rates. The compliance parameters and datasets can collectively facilitate a comprehensive evaluation of cybersecurity resilience and risk management.

In some implementations, the compliance generation circuit 184 can receive or identify environmental data of the DETPN. For example, environmental data can include information representing the operational or situational context of the DETPN (e.g., information about ongoing events, actions, and/or external conditions that affect cybersecurity). For example, the compliance generation circuit 184 can use environmental data to account for real-time and/or near real-time threat intelligence, such as active malware campaigns or known vulnerabilities, to adjust compliance parameters. In some implementations, environmental data can include operational factors like network traffic patterns, system uptime metrics, and/or the status of infrastructure components, which can provide context for evaluating the applicability and priority of specific compliance measures.

In some implementations, the environmental data can include external conditions, such as regulatory changes, geopolitical events, and/or sector-specific cyber risks of a supply chain (e.g., conditions of the DETPN). That is, environmental data can include conditions that can influence the weighting or selection of compliance parameters. For instance, if a regulatory update introduces stricter encryption requirements, the compliance generation circuit 184 can adjust parameters to prioritize the implementation of stronger cryptographic protocols. Additionally, the circuit can leverage environmental data to identify and incorporate context-specific conditions, such as heightened risk levels during a merger or acquisition, ensuring that compliance parameters remain aligned with the current operational landscape of the DETPN, such as for insurance eligibility.

In some implementations, the transformation stage can be the stage in the CVV pipeline in which the system 100 can determine compliance levels. The system 100 can include at least one compliance detection circuit 185. The compliance detection circuit 185 can determine at least one compliance level for at least one of the plurality of entities or third-parties, the at least one compliance level corresponding with one or more of the one or more compliance parameters at a first timing phase. That is, the compliance detection circuit 185 can analyze the compliance parameters to assess the compliance level of entities or third-parties at a specific point in time. For example, during the transformation stage, the compliance detection circuit 185 can evaluate data against compliance parameters to determine initial compliance levels.

In some implementations, the validation system 180 can include a compliance detection circuit 185. The compliance detection circuit 185 can be configured to determine, by one or more processors, compliance levels for any number (e.g., at least one (e.g., each), one, etc.) of the plurality of organizations (e.g., third-parties, entities, customers). In some implementations, the compliance levels correspond to one or more of the compliance parameters. In some implementations, the compliance levels are based on the compliance parameters generated or identified by the compliance generation circuit. For example, the compliance levels can be generated by assessing the adherence of an organization to specific compliance parameters, such as access control measures, encryption standards, vulnerability management practices, and/or incident response protocols of an integrated supply chain. That is, the compliance levels can reflect the degree to which an organization or group of organizations meet or fail to meet these technical benchmarks, individually or as a distributed organization. For instance, if an organization properly implements network security configurations, such as firewall rules and secure communication protocols (e.g., TLS 1.3), the compliance level for network security can be rated as "Compliant" or "High."

In some implementations, the validation stage can be the stage in the CVV pipeline in which the system 100 can receive or identify environmental data. The system 100 can include at least one compliance detection circuit 185. The compliance detection circuit 185 can receive or identify environmental data of the DETPN. That is, the compliance detection circuit 185 can collect data related to the operational environment of the DETPN, including network traffic, system logs, and external threat intelligence. For example, during the validation stage, the compliance detection circuit 185 can monitor network traffic to detect unusual patterns that can indicate a cyber threat. In another example, during the validation stage, the compliance detection circuit 185 can analyze cryptographic signatures in data transmissions to verify integrity and detect tampering. In yet another example, during the validation stage, the compliance detection circuit 185 can evaluate endpoint activity for unauthorized processes and/or anomalous behaviors. In yet another example, during the validation stage, the compliance detection circuit 185 can correlate detected anomalies with external threat intelligence feeds to assess potential risks. In some implementations, the compliance detection circuit 185 can identify environmental data by analyzing system logs to detect anomalies or unauthorized access attempts. The environmental data can include indications of events or actions such as attempted breaches, malware detections, or system failures.

In some implementations, the compliance detection circuit 185 can determine compliance level(s) in a tiered and/or hierarchical classification. That is, the compliance detection circuit 185 can determine compliance levels using a tiered and/or hierarchical classification system (e.g., L1, L2, L3, L4), which can be the degree to which a third party meets the cybersecurity compliance parameters. For example, an "L1" classification can indicate full compliance with all parameters, including advanced encryption standards (e.g., AES-256), implementation of multi-factor authentication (MFA), and/or regular vulnerability scans. An "L2" classification can be substantial compliance but with minor gaps, such as missing specific audit logs or delayed patching of non-critical systems. In some implementations, the classification can include further granularity, where higher tiers (e.g., L3, L4) can indicate partial or minimal compliance, reflecting significant deficiencies in implementing controls like endpoint protection, secure configuration baselines, and/or incident response planning.

Additionally, the hierarchical classification can be used to prioritize remediation efforts, where lower-tier entities (e.g., L3, L4) can be flagged for immediate action. For example, the validation system 180 can include automated decision-making processes, such as restricting data sharing or limiting access to sensitive systems for entities below a specific compliance tier. In some implementations, the classification can integrate with external frameworks (e.g., NIST CSF, ISO 27001) to map compliance levels directly to industry-standard maturity models, facilitating standardized reporting and benchmarking across organizations. Tiered and/or hierarchical classification can help provide scalability and actionable evaluation across a number of organizations (e.g., entities, customers, third-parties) within a supply chain (e.g., DETPN).

In some implementations, the compliance detection circuit 185 can determine compliance levels (e.g., compliance status) at a timing phase. That is, a timing phase can refer to a specific interval or snapshot in time during which compliance is assessed based on predefined parameters. For example, the compliance detection circuit 185 can determine compliance at a particular point in time, such as during periodic audits, scheduled assessments, and/or in response to specific events (e.g., a system update or the introduction of a new regulatory requirement). In some implementations, the timing phase can be defined as a recurring interval (e.g., quarterly, annually) or based on certain triggers, such as a vulnerability being detected or a security breach occurring. This interval allows the compliance detection circuit 185 to evaluate the adherence of the organization to compliance parameters at that specific moment, capturing the status of controls and policies, such as access control, patch management, and/or encryption protocols. Additionally, the timing phase can provide for a snapshot of compliance that can be compared against historical data or used to track trends over time, providing valuable insights into the evolving compliance posture of the organization.

In some implementations, the compliance detection circuit 185 can receive or identify environmental data of the supply chain (e.g., DETPN). For example, environmental data can include information representing the operational or situational context of the supply chain (e.g., DETPN), including as details about ongoing events, actions, and/or external conditions that can affect cybersecurity. For example, the compliance detection circuit 185 can use environmental data to assess how an active ransomware campaign or a zero-day vulnerability impacts the ability of a third party to meet compliance parameters, such as incident response readiness or endpoint security measures. This data can also include real-time and/or near real-time factors like unusual network activity, changes in system configurations, and/or alerts from intrusion detection systems (IDS), which can influence compliance levels.

In some implementations, the environmental data can include external conditions, such as region or industry-specific regulatory updates, supply chain disruptions, geopolitical events, and/or other conditions to provide additional context for evaluating compliance. For instance, during a heightened threat landscape, compliance levels can be adjusted to account for increased requirements for monitoring, encryption, and/or data backup procedures. Additionally, the compliance detection circuit 185 can integrate historical environmental data, such as patterns of past incidents or seasonal cyberattack trends, to provide a more nuanced compliance level assessment. This adaptive use of environmental data can facilitate a more accurate and context-sensitive detection of compliance levels across the DETPN.

In some implementations, the compliance detection circuit 185 can determine, at a second timing phase, updated compliance levels for a number of organizations (e.g., vendors, third-parties, entities, customers). In some implementations, a second timing phase can be a subsequent point or interval during which compliance is reassessed (e.g., analyzing updates such as changes in environmental data or detected events or incidents). In some implementations, the compliance detection circuit 185 can determine updated compliance levels at a second timing phase by reassessing the adherence of the organization to compliance parameters in light of changes in environmental data. A second timing phase can serve as a subsequent interval, triggered by periodic schedules, specific events, and/or detected anomalies within the distributed third-party network (DETPN). For example, environmental data can include indications of events such as a newly discovered zero-day vulnerability, a surge in network traffic indicative of a distributed denial-of-service (DDoS) attack, and/or an action such as the deployment of a software patch.

At the second timing phase, the compliance detection circuit can reevaluate compliance levels by factoring in how the entity or third party responded to these events or actions. For instance, if an organization promptly patched a vulnerability and demonstrated effective incident response, the updated compliance level can reflect an improvement, such as moving from "Medium" to "High" compliance. Conversely, if the organization failed to address a detected incident or did not implement necessary countermeasures, the compliance level can be downgraded, such as from "Compliant" to "Non-Compliant."

In some implementations, the second timing phase can also assess the cumulative impact of multiple events on the DETPN. For example, if environmental data indicates a pattern of recurring threats or incidents, the compliance detection circuit can incorporate this information into the updated compliance level to emphasize the need for long-term strategic improvements, such as enhanced monitoring or risk mitigation protocols. This dynamic reassessment during the second timing phase ensures that compliance levels remain aligned with the current threat landscape and operational realities of the DETPN.

In some implementations, the updated compliance level can be based at least on environmental data. In some implementations, the environmental data can include an indication of an occurrence of an event or action to the supply chain (e.g., on the DETPN). That is, the event or action can be a detected cybersecurity incident, system behavior, and/or operational activity. The compliance detection circuit 185 can assess the impact of detected incidents on the security posture of the various organizations. That is, the event or action can be a detected cybersecurity incident, anomalous system behavior, and/or operational activity affecting the supply chain (e.g., DETPN). For example, the compliance detection circuit 185 can assess the impact of events such as a supply chain compromise involving unauthorized access to a vendor system, a phishing campaign targeting a third-party organization, operational changes like the deployment of unvetted software updates, and/or other occurrences that can influence overall security posture or organizations within a supply chain (e.g., DETPN).

In some implementations, the environmental data can include telemetry (e.g., network traffic data, system performance metrics, security event logs, and/or any endpoint activity traces) from or on the DETPN, including Indicators of Compromise (IoCs) associated with malware infections, changes in endpoint security configurations, logs of failed login attempts indicative of an attack, and/or indicators. The compliance detection circuit 185 can evaluate environmental data to determine the compliance level of an organization or chain of organizations within a supply chain. Additionally, the compliance detection circuit 185 can compare compliance levels with organizational responses and alignment with predefined compliance parameters, including timely incident detection, adherence to patch management policies, and/or activation of incident response protocols. In some implementations, the compliance detection circuit 185 can include operational activities in generating compliance levels. That is, the compliance level can be associated or compared to parameters related to the onboarding of new vendors or the integration of new technologies into the supply chain. For example, the compliance detection circuit 185 can compare the cyber resilience of an organization before and after a newly added vendor is integrated into the supply chain, where the new vendor can exhibit compliance or noncompliance affecting the organization.

In some implementations, the validation system 180 can include a token generation circuit 186. In some implementations, the token generation circuit 186 can generate one or more tokens including the at least one updated compliance level corresponding with the occurrence of the event or the action. In some implementations, the validation system 180 can include and/or incorporate system 1200 and components within to incorporate or otherwise perform verification, validation, and/or tokenization and discussed herein. For example, the passport system 1200 can be used by system 100 to generate tokens including compliance levels and other data of an entity (e.g., via the token generation circuit 186). Token system 1202 can include or be communicable coupled with a token generation circuit (e.g., token generation circuit 186) to generate any of the various tokens described herein for one or more organizations. For example, token system 1202 and/or token generation circuit 186 can generate a compliance token, an insurability compliance token, a cyber security compliance token, a coverage token, a threat token, and/or other tokens relating to the cyber resilience of an organization.

In some implementations, the output stage can be the stage in the CVV pipeline in which the system 100 can generate one or more tokens. The system 100 can include at least one token generation circuit 186. The token generation circuit 186 can generate one or more tokens including the updated at least one compliance level corresponding with the occurrence of the event or the action. That is, the token generation circuit 186 can create tokens that encapsulate the compliance status of entities or third-parties based on recent events or actions within the DETPN. For example, during the output stage, the token generation circuit 186 can generate tokens that reflect changes in compliance levels due to detected security incidents or compliance reviews.

In some implementations, the token generation circuit 186 can generate one or more tokens. For example, the token generation circuit 186 can generate compliance tokens. That is, the compliance generation circuit can capture (e.g., (currently, at a specified point in time, across a timing phase) a compliance level and generate a compliance token. The tokens (e.g., compliance tokens) can include a digital representation and/or records that encapsulate information such as compliance levels or the occurrence of events. The tokens can be used by the validation system 180 to generate alerts, track organizations, validate security postures, detect unauthorized access attempts, monitor network traffic, detect anomalies, and/or any other security action. The token generation circuit 186 can generate tokens for organizations at timing phases. For example, the token generation circuit 186 can generate and store a historical chain of tokens for an organization (e.g., entity, third-party) or organizations across a supply chain. That is, the tokens can be rolled up, showing cyber resilience effectiveness for the organization or organizations over time, similar to a status page. Further, the token generation circuit 186 can generate the tokens over time to create multiple versions of history for organization within a supply chain. The tokens can be stored (e.g., in database 189) as rolled up into rows, wherein at least one (e.g., each) row is a grouping of requirements (e.g., insurability groupings) with one or more requirements tokens within. A cyber resilience stream including tokenization pages will be further discussed in relation to FIG. 20.

In some implementations, the validation system 180 can leverage the tokens relating to compliance levels to facilitate audits, comparing the encapsulated compliance level with regulatory benchmarks or internal policy requirements, identifying gaps for remediation. The validation system 180 can analyze the tokens to ensure organizational adherence to compliance frameworks (e.g., ISO 27001, PCI DSS) and trigger and/or generate notifications, alerts, policies, reports, and/or other interactions.

In some implementations, the validation system 180 can include a validation interface 188. The validation system 180 or validation interface 188 can identify or receive compliance parameters, compliance levels, tokens, organization data, supply chain data, and/or other verification and validation structures and/or data from other systems on the network. Additionally, the validation system 180 or validation interface 188 can transmit compliance parameters, compliance levels, tokens, plans, alerts, data structures, and/or other verification and validation structures and/or data to other systems in communication with the network (e.g., network 120). The systems described herein can interact with the validation interface 188 such as through a user device or other computing system. For example, the validation interface 188 can present compliance parameters, compliance levels, tokens, and/or organizational or supply chain data in an accessible format to stakeholders across the distributed entity or third-party network (DETPN). That is, the validation interface 188 can allow organizations to view and interact with dynamically updated benchmarks, allowing them to identify specific cybersecurity safeguards and configurations that can improve compliance levels for their unique firmographics. For instance, the validation interface 188 can suggest that implementing certain controls, such as advanced threat detection or data encryption, can reduce cybersecurity premiums by 4%, providing actionable insights to drive efficiency.

Figure 18:
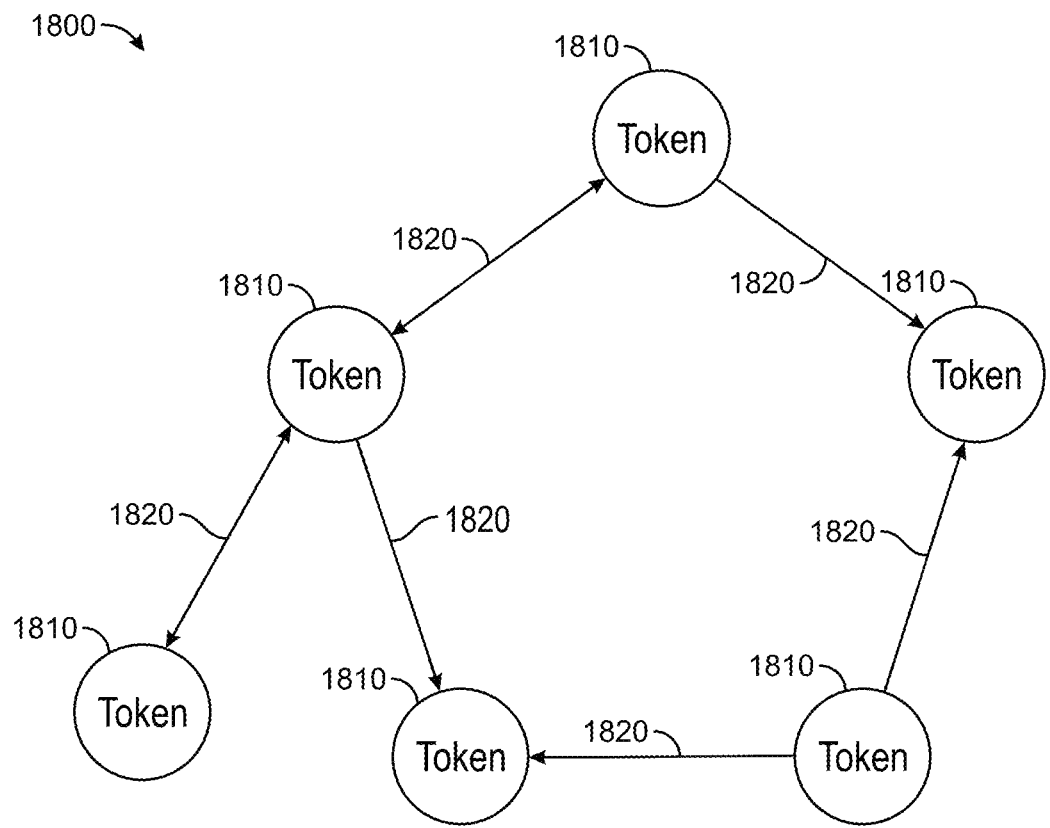
FIG. 18 depicts a knowledge graph for tokens using cyber resilience data, according to some implementations.
Figure 19:
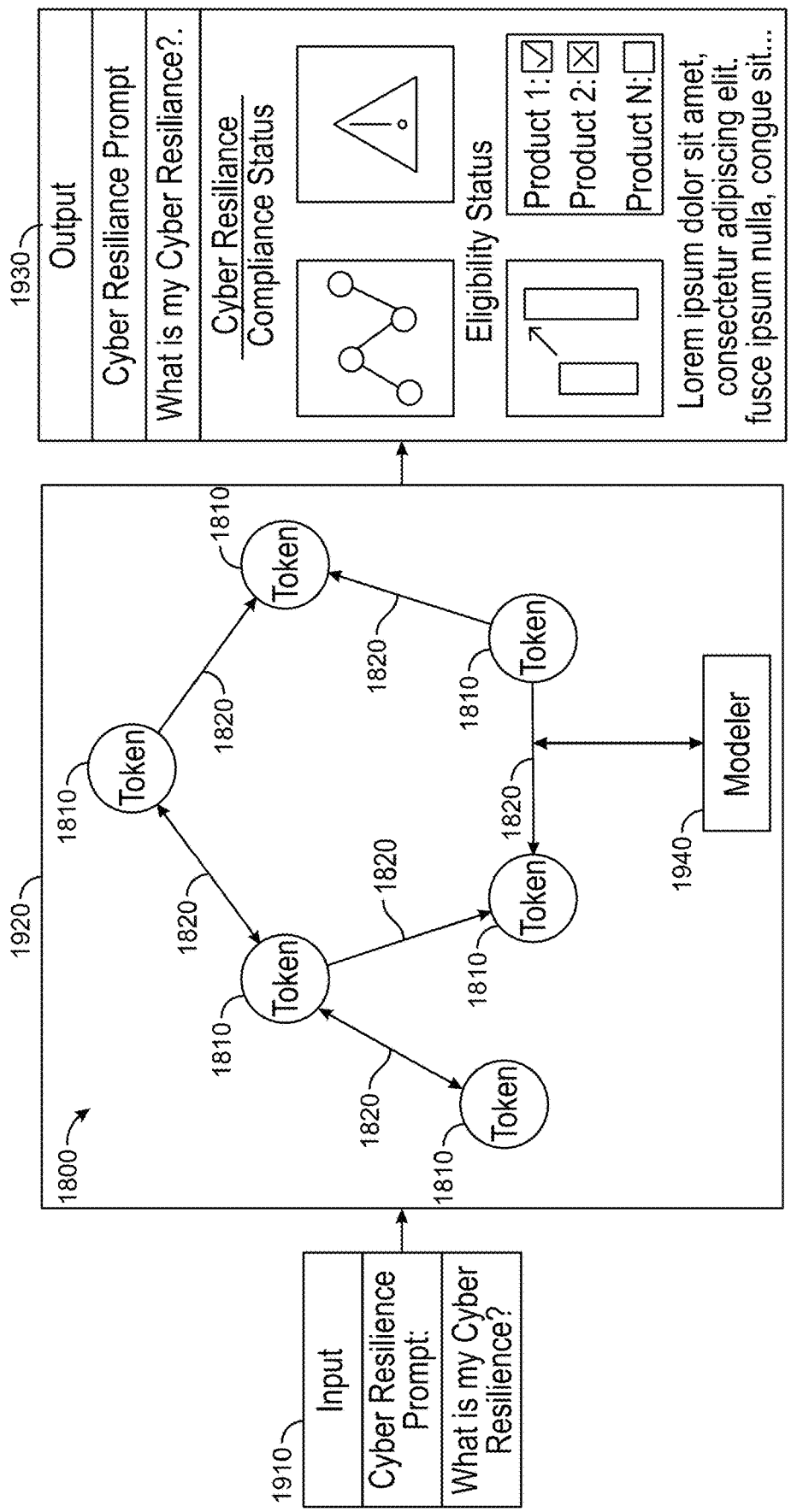
FIG. 19 depicts a flowchart for an implementation of a cyber resilience query system using a knowledge graph, according to some implementations.
Figure 20:
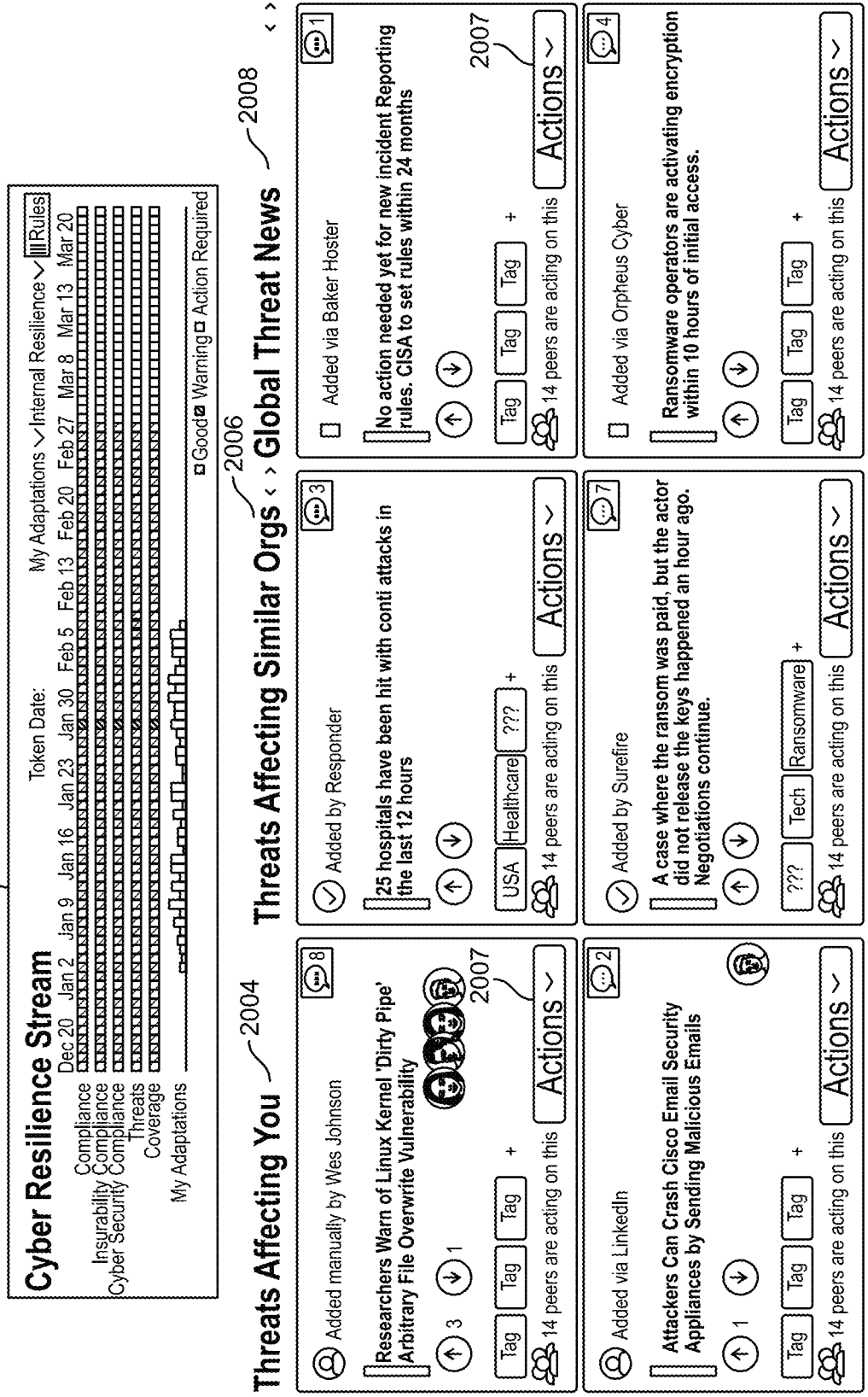
FIG. 20 depicts a cyber resilience dashboard, according to some implementations.

In some implementations, the validation interface 188 can incorporate a knowledge graph powered by semantic relationships between compliance parameters, tokens, and/or contextual data, as further discussed in relation to FIGS. 18-20. at least one (e.g., each) token can act as a node, with edges including relationships such as dependencies between safeguards or mappings to specific regulatory requirements. For example, an organization can query the interface with, "What safeguards do I have?" and receive a context-aware response detailing its specific cybersecurity posture, knowledge graph inferences, and/or recommendations for improvement.

In some implementations, the validation system 180 can include a database 189. In some implementation, the database can include and/or can be used to store the one or more tokens. In some implementations, the database can include and/or be used to store the compliance parameters, compliance levels, and/or other data relating to the computing systems location within the supply chain (e.g., DETPN 170). In some implementations, the database 189 can be communicably coupled or connected to a distributed ledger (e.g., blockchain) or other authoritative data source to provide data integrity and security. For example, the database 189 can be a private ledge and data source(s) 160 can be a public ledger, and/or data transactions (e.g., tokenization, compliance requests, resilience operations, updates to proof/posture state data, cyber security/compliance parameters, cyber security/compliance levels, organization (e.g., entity, third-party) data and/or other transactions) recorded on the database 189 can be validated against entries recorded on the data source(s) 160 to verify compliance requests, cyber resilience operations, and/or other operations are accurately corresponding to organization (e.g., entity, third-party) requests.

The database 189 can include data structures for storing information such as, but not limited to, the front-end information, interfaces, dashboards, incident information, claim information, user information, vendor information, contact information, invoices, a blockchain ledger, and/or other information. That is, the database 189 can include compliance parameters, compliance levels, tokens, and/or other organizational or supply chain data generated, identified, transmitted, and/or received by compliance generation circuit 184, compliance detection circuit 185, token generation circuit 186, validation interface 188, computing system(s) 140, DETPN 170, entity computing system(s) 130, third-party computing system(s) 150, and/or any other system communicably couple to the network (e.g., network 120). In some implementations, the validation system and components thereof can access the data, tokens, and/or other information stored in the database to determine compliance levels, generate tokens, create a graph neural network, generate an alert or plan, generate a data structure and/or other cyber resilience verification and validation.

In some implementations, the validation system 180 can incorporate knowledge graphs to represent relationships between compliance parameters, tokens, and entities within the DETPN. Each token, generated by the token generation circuit 186, can act as a node within the knowledge graph, and edges between nodes can represent relationships such as shared compliance parameters, dependencies between compliance states, and historical correlations. For example, a knowledge graph can model the relationship between a detected vulnerability token and tokens representing the remediation actions taken by different entities within the DETPN (e.g., patch deployments, access control updates, and/or incident response measures). This allows the validation system 180 to visually and programmatically analyze the flow of compliance data and assess the interconnected impact of cybersecurity measures.

The compliance detection circuit 185 can use the knowledge graph to perform contextual analyses of compliance levels across the DETPN. For example, the compliance detection circuit 185 can evaluate the relationship between tokens representing compliance status at different time intervals (e.g., historical compliance states, current compliance metrics, and/or predictive compliance models) to identify trends in resilience. In another example, the circuit can identify patterns of recurring vulnerabilities or delayed remediation actions by analyzing clusters of interconnected tokens. This dynamic analysis allows the validation system 180 to provide targeted recommendations for improving compliance (e.g., prioritizing high-risk entities, strengthening shared safeguards, and/or enhancing coordination between third parties).

The knowledge graph can be used to incorporate external data sources (e.g., regulatory frameworks, threat intelligence feeds, and/or vendor certifications) to enhance the contextual understanding of compliance states. For example, external data nodes can include updated regulatory requirements (e.g., GDPR, PCI DSS, and/or CISA directives), which are linked to compliance tokens to highlight gaps in adherence. In another example, threat intelligence data (e.g., Indicators of Compromise (IoCs), malware signatures, and/or attack patterns) can be linked to tokens representing entities with similar vulnerabilities or risk profiles, allowing the validation system 180 to assess potential attack vectors across the DETPN. This integration ensures that compliance evaluations remain aligned with evolving regulatory and threat landscapes.

The validation interface 188 can interface with the knowledge graph to provide visualizations and actionable insights to users. For example, the interface can generate a graphical representation of the DETPN, with nodes and edges illustrating compliance states and interdependencies. A user can query the knowledge graph (e.g., "Which entities are most vulnerable to ransomware attacks?") to receive context-aware responses based on token relationships and real-time environmental data. In another example, the interface can provide automated recommendations for compliance improvements (e.g., implementing stronger encryption protocols, addressing shared vulnerabilities, and/or updating incident response plans) by analyzing edge attributes in the knowledge graph.

The validation system 180 can also use other models, such as graph neural networks (GNNs), to enhance the analysis of token relationships within the knowledge graph. For example, the GNN can process the graph structure to predict future compliance states based on the current configuration of nodes and edges (e.g., predicting the likelihood of compliance degradation, estimating the impact of remediation actions, and/or identifying critical vulnerabilities). In another example, the GNN can model cascading effects of security incidents across the DETPN by analyzing edge weights and node attributes, allowing the validation system 180 to proactively recommend measures to mitigate widespread risks.

The systems and devices of FIG. 1 can implement artificial intelligence (AI) models, such as language models, across the various processing circuits and memory architectures. For example, the compliance generation circuit 184, compliance detection circuit 185, and/or token generation circuit 186 can utilize AI models implemented with precision configurations (e.g., 8-bit, 16-bit, 32-bit, and/or 64-bit)

to improve resource usage while maintaining accuracy in compliance evaluation and resilience modeling. In another example, the validation system 180 can dynamically adjust bit precision during training or inference phases to accommodate the computational capabilities of the DETPN 170 or third-party computing system(s) 150.

In some implementations, the circuits and systems of FIG. 1 can integrate hardware accelerators (e.g., GPUs, TPUs, FPGAs, and/or ASICs) within the processing circuitry of validation system 180 to improve the performance of AI models. For example, the token generation circuit 186 can leverage tensor cores in GPUs for 8-bit or 16-bit quantized matrix multiplications, accelerating tokenization and compliance parameter processing. In another example, the compliance detection circuit 185 can implement mixed-precision training techniques, where critical calculations (e.g., gradient updates) are performed in 32-bit precision, while less sensitive computations (e.g., activation functions) are executed in 16-bit or 8-bit precision.

Transformer-based language models can be integrated into the systems of FIG. 1 for processing textual or contextual data relevant to compliance and cyber resilience. For example, the validation system 180 can include transformers configured to process compliance parameters and environmental data (e.g., regulatory requirements, Indicators of Compromise (IoCs), and/or policy updates) in parallel across multiple layers. In another example, transformer models implemented within the compliance generation circuit 184 can analyze textual inputs from data sources 160, such as compliance reports, incident logs, and external threat intelligence, to generate compliance tokens. The language models can improve operations by reducing bit precision during inference (e.g., 8-bit or 16-bit quantization) while maintaining high accuracy in evaluating compliance levels.

The components of FIG. 1 can further adapt the deployment of AI models to specific hardware environments within the DETPN 170. For example, third-party computing system(s) 150 with constrained resources can deploy quantized models (e.g., 8-bit) for real-time compliance evaluations, while entity computing system(s) 130 or the validation system 180 with higher computational capacity can utilize 32-bit or 64-bit precision for complex tasks, such as multi-dimensional compliance modeling or knowledge graph generation. The systems can dynamically reconfigure processing circuits to optimize memory usage, energy efficiency, and/or computational speed based on the capabilities of the networked devices.

AI models implemented within the validation system 180 can further incorporate model compression techniques, such as distillation and pruning. For example, the compliance generation circuit 184 can distill a smaller, 8-bit compliance detection model (student) from a larger, 32-bit model (teacher) to maintain real-time responsiveness within the DETPN 170. In another example, pruning techniques can be applied to AI models used by the token generation circuit 186, removing redundant parameters while preserving tokenization accuracy.

Figure 2:
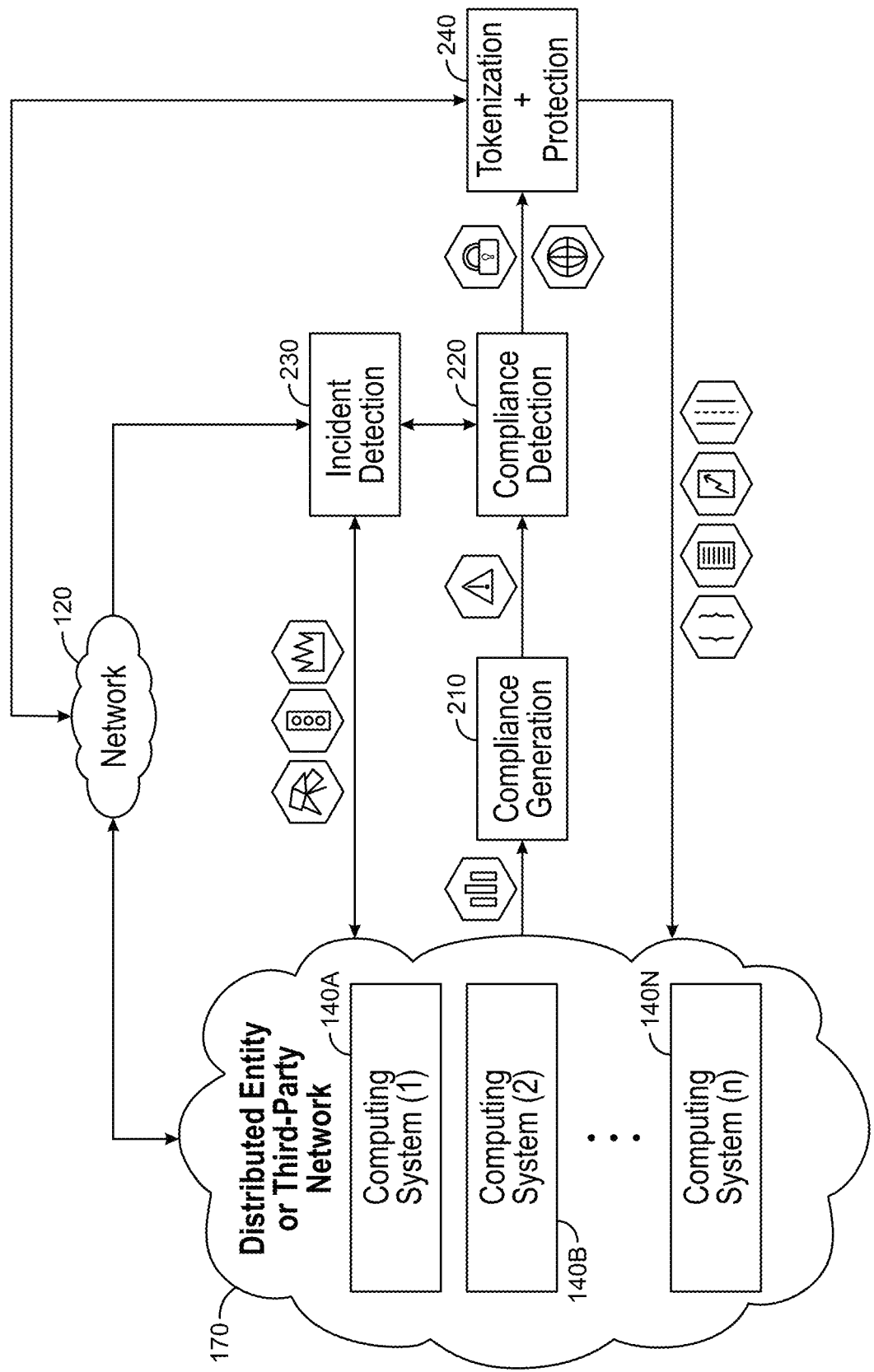
FIG. 2 depicts a flow diagram of an implementation of a system for verifying and validating cyber resilience, according to some implementations.

Referring now to FIGS. 2, a flow diagram of an implementation of a system for verifying and validating cyber resilience is shown, according to some implementations. In some implementations, the implementation shown in FIG. 2 includes a network 120, DETPN 170, computing system(s) 140a-n, compliance generation 210, compliance detection 220, incident detection 230, and/or tokenization and protection 240. In some implementations, the system generates compliance parameters, determines compliance levels, receives environmental and/or incident data, generates and stores tokens, and/or provides resilience protection. It should be understood that, although systems or devices of FIG. 2 can be described or illustrated herein in a singular form, the implementation shown in FIG. 2 can include any number of such systems or devices. Devices, systems, and/or components shown in FIG. 2 can be added, deleted, integrated, separated, and/or rearranged in various implementations of the disclosure.

In some implementations, at compliance generation 210, the system can generate or identify one or more compliance parameters for computing systems on the DETPN. For example, the compliance generation circuit 184 can receive or identify, based on cyber resilience data available on the network through external systems or interfaces (e.g., APIs, GUIs, and/or other systems), such as data stored in a local repository, a distributed leger, and/or any data source. In some examples, compliance generation 210 can include storing the cyber resilience data or retrieving cyber resilience data from computing systems connected via the DETPN. For example, compliance generation can include establishing network connections, parsing historical data, monitoring or detecting incidents, determining attributes associated with organizations, and/or consolidating data from distributed sources using an interface or endpoint (e.g., API, encrypted communication channel, data stream, and/or other endpoints) corresponding to the supply chain.

Compliance generation 210 can identify compliance parameters by identifying at least one (e.g., each) organization (e.g., customer, entity, third-party) on the supply chain (e.g., DETPN) based on accessing or interfacing with one or more endpoints of a computing environment of at least one (e.g., each) organization (e.g., customer, entity, third-party). Additionally, the compliance generation circuit 184 at compliance generation 210 can determine at least one shared parameter between the plurality of organizations (e.g., customer, entity, third-party) on the supply chain (e.g., DETPN). For example, the compliance generation circuit 184 can generate compliance parameters based on a shared parameter (e.g., shared entity or third-party parameter) and a cyber resilience dataset. That is, the cyber resilience dataset can include historical incident data, compliance status records or tokens, vulnerability assessments for the organizations, and/or other data. For example, at compliance generation 210, the system can determine shared compliance parameters relating to a shared insurance policy between organizations on the supply chain, wherein one requirement of the policy is adherence to a network security configuration such as TLS 1.3.

In some implementations, at compliance detection 220, the system can determine compliance levels at a timing phase, via compliance detection circuit 185. That is, the system can determine compliance levels for organizations within the supply chain. For example, the system at compliance detection 220 can assess adherence of at least one (e.g., each) organization to compliance parameters established at compliance generation 210, such as those derived from a shared insurance policy. The system can evaluate whether at least one (e.g., each) organization complies with specific requirements of the policy, such as maintaining a minimum threshold for network security configurations, including the use of TLS 1.3 for secure communication.

In some implementations, at incident detection 230, the system can receive or identify environmental and/or incident data. That is, the system can receive information corresponding to an incident affecting the supply chain. For example, the system can receive information from the network 120 corresponding to a potential cyber attack that would affect all organizations within the supply chain that have a compliance level less than 70% of a threshold. In some implementations, at compliance detection 230, the system can determine updated compliance levels based on the environmental data. For example, if the system identifies an attack that would affect all organizations within the supply chain below a threshold, the system can determine the current threshold levels for at least one (e.g., each) organization.

In some implementations, at tokenization and protection 240, the system can generate and store tokens. The system can generate and store tokens including the compliance levels. Additionally, the system can provide alerts, protection plans, products/and or other functions relating to the compliance levels and events. For example, if an organization within the supply chain has been compliant with the network security configurations at least one (e.g., every) timing phase checked, the system can indicate they are eligible for an insurance policy. Additionally, the system can generate a product (e.g., insurance policy) for the entities compliant at the detection of the cyber incident.

Figure 3A:
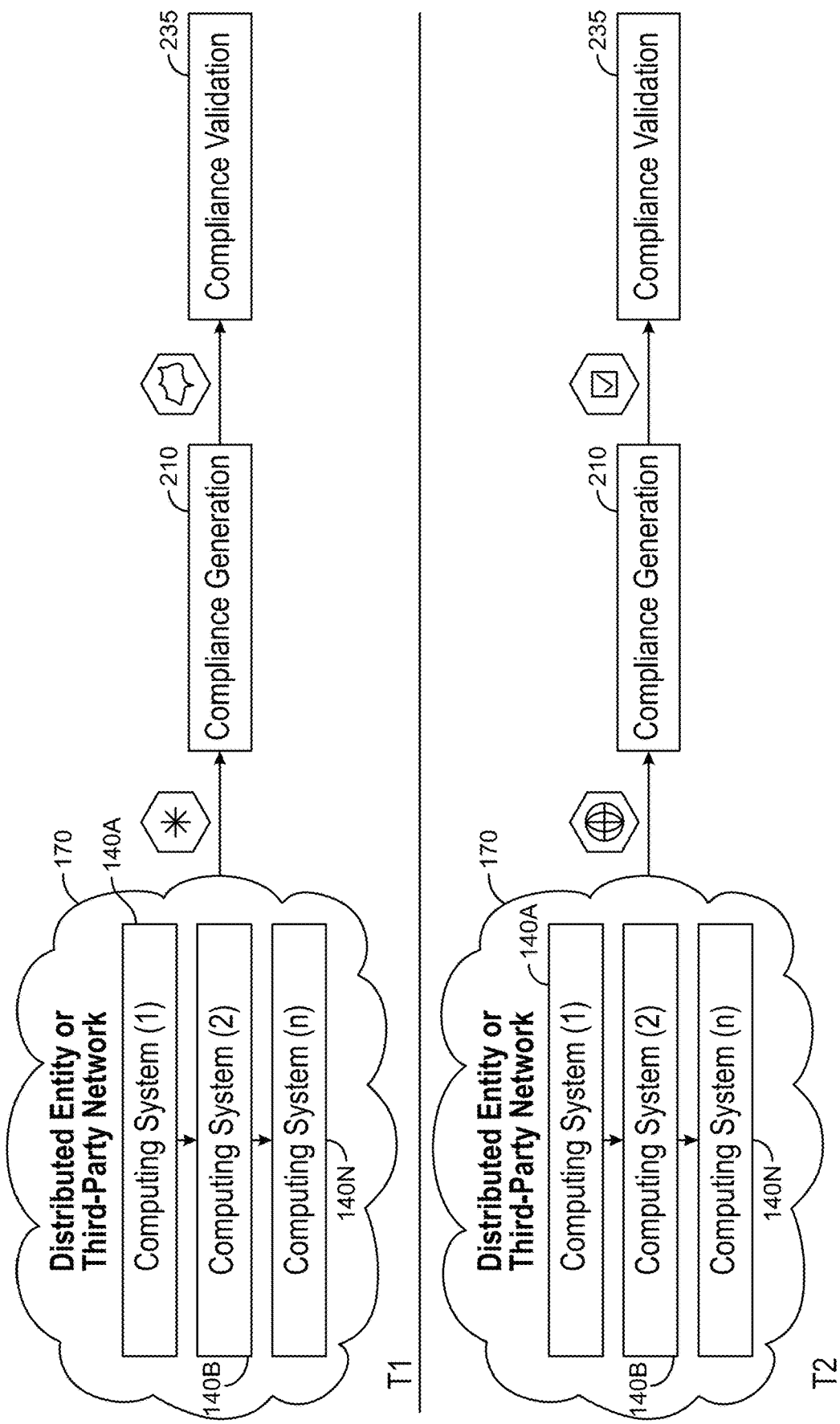
FIGS. 3A-B depict a flow diagram of an implementation of a system for verifying and validating cyber resilience, according to some implementations.
Figure 3B:
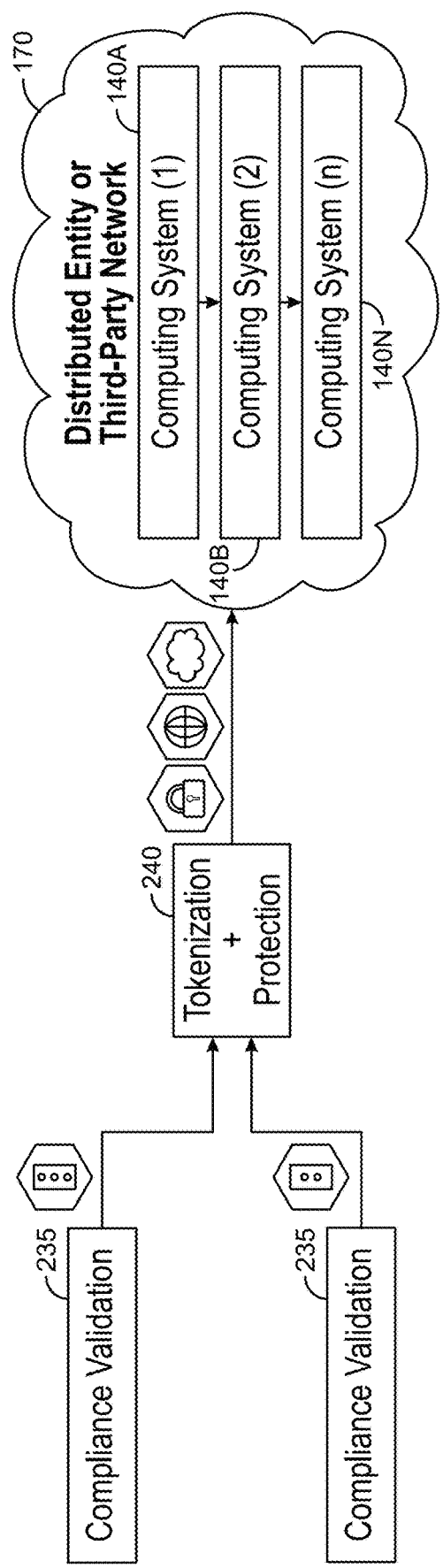

Referring now to FIGS. 3A-3B, a flow diagram of an implementation of a system for verifying and validating cyber resilience is shown, according to some implementations. In some implementations, the implementation shown can include DETPN 170, computing system(s) 140a-n, compliance generation 210, compliance validation 235, and/or tokenization and protection 240. In some implementations, the system generates compliance parameters, determines compliance levels, receives environmental and/or incident data, generates and stores tokens, and/or provides resilience protection. It should be understood that, although systems or devices of FIGS. 3A-3B can be described or illustrated herein in a singular form, the implementation shown in FIGS. 3A-3B can include any number of such systems or devices. Devices, systems, and/or components shown in FIGS. 3A-3B can be added, deleted, integrated, separated, and/or rearranged in various implementations of the disclosure.

In some implementations, compliance validation 235 can include compliance detection 220 and incident detection 230. For example, the system can validate compliance in comparison to environmental data for one or more organizations at multiple timing phases (e.g., T1, T2, T3) or in a multi-tiered structure (e.g., compliance states L1, L2, L3, L4). For example, at compliance generation 210 and compliance validation 235, the system can determine compliance levels at a first timing phase (e.g., T1). At compliance generation 210b and compliance validation 235, the system can determine compliance levels at a second timing phase (e.g., T2). In some implementations, the system can monitor real-time and/or near real-time cybersecurity incidents across the supply chain and generate incident tokens that include details of the detected incidents.

In some implementations, compliance validation 235a and compliance validation 235b can transmit compliance levels to tokenization and protection 240. In some implementations, the compliance levels can be a level of compliance such as, cryptographic proof of provenance (e.g., Level 4 or L4), with subsequent levels corresponding to validations (e.g., Level 3 or L3), documented evidence of actions (e.g., Level 2 or L2), and/or commitments made by the entity (e.g., Level 1 or L1). For example, at T1, the system can validate and determine compliance by entities in comparison to L4. At T2, the system can validate and determine compliance by entities in comparison to L2. At T3, the system generate tokens for the entities corresponding to their compliance levels at different times and/or tiers to provide protection products, alerts, and/or other cyber resilience functions discussed herein. That is, the system can assess the impact of detected incidents on the security posture of the organization and determine potential susceptibility to the same or similar attacks. For example, at T1 the system can determine an attack (e.g., via identified environmental data) on a first computing system 140A of the DETPN 170. At T2, the system can determine the compliance levels of a second computing system 140B. At T3, the system can generate compliance levels and/or tokens for the second computing system corresponding to compliance levels of the attack to determine susceptibility of computing system 140A to the attack that occurred on computing system 140A. The system can provide a plan, product, automated alert, and/or other function back to the DETPN for access by the computing system(s) 140.

Figure 4:
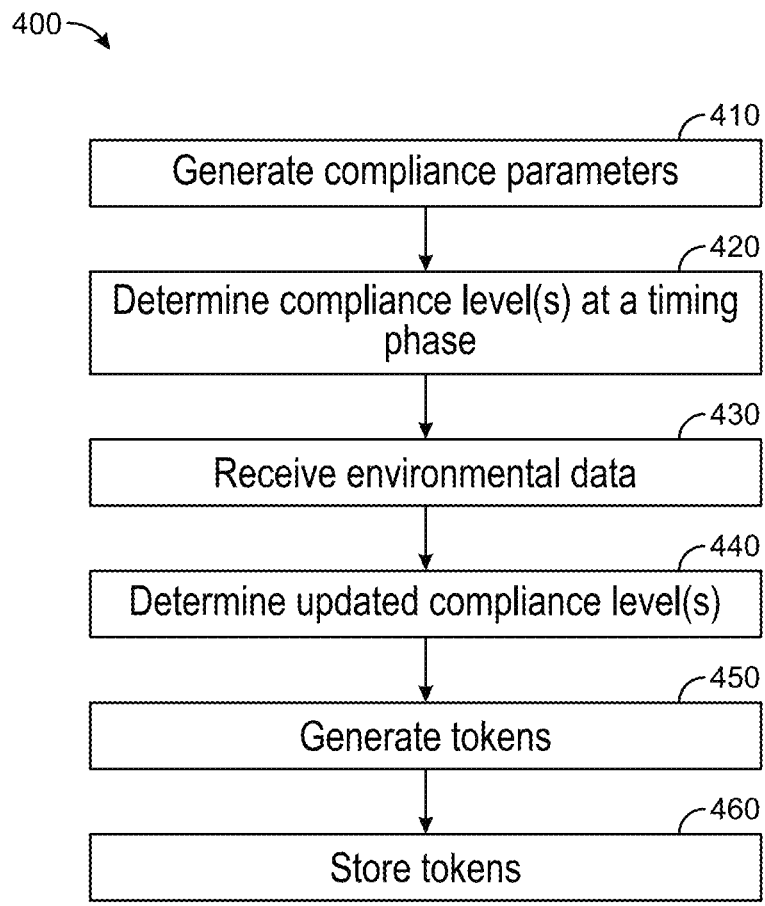
FIG. 4 depicts a flowchart for a method for verifying and validating cyber resilience, according to some implementations.

Referring now to FIG. 4, a method 400 for verification and validation of cyber resilience in a DETPN (e.g., supply chain) is shown, according to some implementations. In some implementations, one or more devices, systems, and/or components described with respect to FIG. 1, FIG. 5, FIG. 12, FIG. 13 and FIG. 14 can perform or be utilized to perform the steps of method 400. In some implementations, some, and/or all operations in method 400 can be performed by one or more processors executing on one or more computing devices, networks, systems, and/or servers. In some implementations, at least one (e.g., at least one (e.g., each)) operation of method 400 can be re-ordered, added, removed, and/or repeated. In some implementations, the method 400 can include additional, fewer, and/or different operations.

In a broad overview of method 400, at block 410, one or more processing circuits of a distributed entity or third-party network (DETPN) (e.g., processing circuits of validation system 180, DETPN 170, computing system 140, and/or any system or device associated with DETPN 170, validation system 180, and/or network 120) can generate or identify one or more compliance parameters. At block 420, the one or more processing circuits can determine compliance levels at a timing phase. At block 430, the one or more processing circuits can receive environmental data. At block 440, the one or more processing circuits can determine updated compliance levels. At block 450, the one or more processing circuits can generate tokens. At block 460, the one or more processing circuits can store the tokens.

In some implementations, at block 410, one or more processing circuits can generate or identify one or more compliance parameters. In some implementations, the compliance parameters can be for or corresponding to a plurality of entities or third-parties on the DETPN. The DETPN can include a plurality of computing systems. In some implementations, the plurality of computing systems can include at least one data interface corresponding to obtaining and/or transmitting supply chain data. The plurality of computing systems included in or connected to the DETPN can include third-party computing system(s) 150, data sources(s) 160, entity computing system(s) 130, validation system 180, and/or any other computing system connected to the DETPN. The DETPN can include an interconnected network (e.g., supply chain) of organizations (e.g., vendors, supplies, distributors) involved in the creation, delivery, and/or maintenance of products or services. That is, organizations can be monitored, evaluated, and/or support in maintaining compliance and resilience against cybersecurity threats with automated processes to facilitate verification, validation, and/or response. In some implementations, the DETPN can be as a neural network, with the computing systems can act as nodes the organizations or systems of the network and edges being communication, data exchange, relationships, etc. between the organizations and/or computing systems.

In some implementations, at block 410, generating or identifying the one or more compliance parameters can include identifying at least one (e.g., each) organization on the DETPN based on accessing or interfacing with one or more endpoints of a computing environment of at least one (e.g., each) organization. Additionally, the one or more processing circuits can determine at least one shared parameter of the organizations. For example, a shared parameter can include a common protocol within the DETPN (e.g., Transport Layer Security, management requirements, minimum requirements for third-party integration, and/or other protocol) Additionally, the compliance parameters can be based on the shared parameter. Further, the compliance parameters can be based on a cyber resilience data set. That is, a cyber resilience data set can include historical incident data, compliance status records or tokens, and/or vulnerability assessments for the datasets.

In some implementations, compliance parameters (e.g., customer parameters, cybersecurity parameters, protection parameters, and/or other parameters discussed herein) can include parameters, criteria, metrics, and/or conditions that are used to evaluate the adherence of customers, entities, and/or third-parties to predefined cybersecurity standards or requirements. In some implementations, the compliance parameters can include benchmarking requirements. That is, the compliance parameters can include comparison for a benchmark, wherein the benchmark can be used to determine eligibility or changes in policies, premiums, safeguards, and/or other organizational levels. The compliance parameters can support advanced recommendations, such as suggesting specific safeguards. For example, the benchmarks can include identifying an organization that implements a new architecture and network segmentation can lead to a percentage reduction in cyber security premiums. Together, compliance parameters can be used to identify cyber resilience for entities or third-parties.

In some implementations, any, and/or at least one (e.g., each) of the plurality of computing systems can include one or more data interfaces corresponding to obtaining or transmitting supply chain data. For example, a data interface can be considered a compliance interface configured to obtain and transmit data related to predefined cybersecurity standards (e.g., encryption policies, access control configurations, audit log retention requirements) to and from the computing systems (e.g., entities, third-parties) on the DETPN to and from other computing systems (e.g., validation system) on the DETPN. The compliance interface can communicate with external systems (e.g., data source(s) 160, validation interface 188, etc.) to retrieve relevant benchmarks or standards for identifying or generating the compliance parameters in the supply chain.

In some implementations, at block 420, one or more processing circuits can determine compliance levels at a timing phase. That is, the one or more processing circuits can determine at least one compliance level for at least one of the organizations on the DETPN (e.g., supply chain). The at least one compliance level can correspond to compliance parameters at a first timing phase. That is, the compliance levels can be a tiered or hierarchical classification (e.g., L1, L2, L3, L4) including the degree to which an entity or third-party meets the cybersecurity compliance parameters. A timing phase can include an interval or snapshot in time (e.g., initial point or interval during which compliance is assessed based on predefined parameters). The one or more processing circuits can operate at least the same, and/or similar functions at block 440.

In some implementations, the timing phase can be a timing interval with a compliance review cycle or a monitoring interval. For example, the timing phase can be a specifical interval aligned with organizational policies or regulatory requirements (e.g., annual audits, reviews, regulatory applications, and/or other requirements). Additionally, the one or more processing circuits can continuously capture data throughout an entire interview. In some implementations, the one or more processing circuits can determine compliance levels as compliance over time or average compliance over an interval. Additionally, a timing phase can include a point in time corresponding with an event triggered instance. For example, a timing phase can include a point in time corresponding to a detected incident to capture compliance levels for compliance verification, a system update, and/or a change in network configuration. Additionally, a timing phase can correspond with a compliance state date. That is, the timing phase can correspond to predefined dates (e.g., start of fiscal year, start of new project, renewal date for policy, and/or other periods).

Additionally, determining a compliance level (e.g., at a timing phase) can include determining a first compliance level at a first timing phase and at least a second compliance level at a second timing phase. The one or more processing circuits can generate a first token corresponding to a compliance level at a first phase and a second token corresponding to the second compliance level at the second phase. Additionally, the one or more processing circuits can generate a first token corresponding to at least one first compliance level at the first timing phase and/or the at least one updated compliance level. For example, a token can relate to a compliance level for an entity against predefined requirements using a distributed verification system (e.g., DETPN, validation system). Additionally, the one or more processing circuits can generate a token corresponding to an updated compliance level. For example, the one or more processing circuits can generate a token (e.g., second token) corresponding to at least one second compliance level at a second timing phase and at least one updated compliance level. That is, the one or more processing circuits can capture a first token comparing a first compliance snapshot and potential incident and capture a second token comparing a second compliance snapshot and potential incident.

In some implementations, the compliance level at the first timing phase can correspond to a cryptographic proof of provenance obtained by the one or more processing circuits directly from at least one organization (e.g., entity, third-party). Additionally, the one or more processing circuits can programmatically, the at least one compliance level at the second timing phase corresponds to a validation by one or more authorized organizations (e.g., entity, third-party. In some implementations, at least one compliance level at a third timing phase can correspond to documented evidence of an action.

In some implementations, the compliance levels can be a level of compliance such as, cryptographic proof of provenance (e.g., Level 4 or L4), with subsequent levels corresponding to validations (e.g., Level 3 or L3), documented evidence of actions (e.g., Level 2 or L2), and/or commitments made by the entity (e.g., Level 1 or L1). For example, the compliance detection circuit 185 can determine and verify a new encryption key's provenance through digital signatures compared to a compliance level, then document the level and deployment across the network as an action taken. It should be understood the various compliance levels are described herein but should not be limited to hierarchical categorizations, as configurations can also be interdependent or require cross-validation for security assessments. In particular, the flexibility of compliance detection circuit 185 allows for dynamic adaptation to emerging security challenges and technological advancements, ensuring that the validation system 180 remains effective in a rapidly evolving cybersecurity landscape.

In some implementations, the highest or best compliance level can be for cryptographic proof of provenance obtained by the validation system 180 directly from the entity and programmatically. For example, the compliance detection circuit 185 can derive and encode the cryptographic proof of provenance for software updates directly from development logs and code repositories, generating compliance levels in response to verified updates applied to an entity system. In another example, the compliance detection circuit 185 can programmatically attest compliance levels to the integrity of third-party components by validating their cryptographic signatures against trusted certificate authorities, bolstering supply chain security.

In some implementations, the second highest or second best compliance level can correspond to an entity being in validation by one or more authorized entities. For example, validation can include cross-referencing the digital signatures of installed applications with a database of verified publishers to confirm authenticity. In another example, validation might include checking the conformity of network configuration changes against industry-standard security protocols, ensuring that the entity network remains resilient against known vulnerabilities.

In some implementations, the third highest or third best compliance level can be the entity containing documented evidence of an action. For example, documented evidence can include logging the sequence of steps taken to apply a security patch, complete with timestamps and system snapshots. In another example, it might involve retaining change logs that detail the rationale and implementation details of new access control policies, providing a clear audit trail for security audits.

In some implementations, the fourth highest or fourth best compliance level can correspond to commitments made by the entity. For example, commitments made by the entity can be encapsulated in a policy document that outlines the entity's approach to data encryption, specifying the algorithms and key management practices to be adhered to. In another example, commitments might be demonstrated through the publication of a regular security newsletter that details the entity's ongoing efforts to maintain and enhance its cybersecurity posture, fostering transparency and accountability.

In some implementations, at block 430, one or more processing circuits can receive environmental data. For example, the one or more processing circuits can receive data representing the operational or situational context of the DETPN (e.g., information about ongoing events, actions, and/or external conditions that affect cybersecurity. In some implementations, the one or more processing circuits can monitor environmental data of a plurality of computing systems (e.g., computing systems with the DETPN). For example, utilizing network monitoring tools to detect and record changes in firewall settings or antivirus software updates. That is, the validation system (e.g., validation system 180) can be used by the processing circuits to authenticate and authorize access to monitored data. For example, the environmental data can correspond to an organization or supply chain by mapping network traffic patterns and system performance metrics to a unique identifier. The environmental data monitored can include at least one, but is not limited to, network traffic, system performance metrics, software integrity, and/or security event logs corresponding with the plurality of computing systems. For example, monitoring can include analyzing logs for indicators of compromise or unauthorized access attempts. To monitor for environmental data, the one or more processing circuits can detect interactions between an end-user and a computing device. The computing devices can be servers, laptops, tablets, phone, and/or the like associated with an entity of the decentralized identity passport. The interactions can reveal or indicate compliance corresponding to the cyber protections of the entity. For example, a first end-user can access a website blocked by a firewall on the computing device of then entity. The one or more processing circuits can flag the interaction as out of compliance with the cyber security protection.

By maintaining a consistent surveillance over the environmental data, the processing circuits can detect any anomalies or deviations that might signify a potential cybersecurity threat or breach. Environmental data in this context refers to an extensive array of information that encapsulates the operational environment of the entities. This data includes network traffic details, system logs, user activity, application activity, and/or other relevant metrics. Environmental data also includes information about the external threat landscape, such as updates about new types of cyber threats, threat intelligence feeds, and/or other relevant details. By monitoring this data, the processing circuits can maintain an updated understanding of the cybersecurity status of the entity in comparison to compliance levels.

In some implementations, at block 440, one or more processing circuits can determine updated compliance levels. In some implementations, the one or more processing circuits can determine, at a second timing phase, at least one updated compliance levels for at least one of the plurality of organizations based at least on the environmental data. That is, a second timing phase can include a subsequent point of interval during which compliance is reassessed (e.g., analyzing updates such as changes in environmental data or detected events). The one or more processing circuits can perform at least the same, and/or similar operations at block 420.

In some implementations, the environmental data includes an indication of an occurrence of an event or action on the supply chain (e.g., DETPN). For example, environmental data can include a detected cybersecurity incident, system behavior, and/or operational activity. That is, the one or more processing circuits can determine changes in vendor performance, deviations from regulatory standards, and/or incident reports to reassess compliance levels periodically. These updated compliance levels can then be used for tokenization at block 450, facilitating a structured and verifiable representation of compliance status.

In some implementations, the one or more processing circuits can process environmental data in conjunction with compliance parameters to determine or adjust compliance levels for at least one (e.g., each) entity. For example, if a vendor reports an attempted breach, the circuits can evaluate the vendor response measures, adherence to predefined cybersecurity protocols, and/or potential impact on downstream entities. Updated compliance levels are then issued, which directly feed into the tokenization process, generating compliance tokens that can be real-time and/or near real-time compliance state of a vendor.

In some implementations, the one or more processing circuits can transmit the at least one compliance level or at least one updated compliance level to a data interface of computing systems with the DETPN. For example, the one or more processing circuits can transmit the compliance levels to a central repository for integration with third-party risk management platforms. That is, the DETPN can serve as an intermediary system that aggregates compliance information across multiple entities and provides visibility into the collective cyber resilience of the supply chain. For example, the transmitted compliance level data can include metadata detailing the timestamp of evaluation, the compliance tier (e.g., L1, L2, L3, L4), and/or the specific environmental parameters influencing the assessment. For example, if a compliance downgrade occurs due to a detected vulnerability in vendor infrastructure, the transmitted data can include information about the vulnerability, the associated regulatory framework, and/or the required mitigation steps.

In some implementations, the one or more processing circuits can transmit the compliance levels directly to data interfaces of the organizations or third-parties on the DEPTN. For example, a dashboard in a risk management system can display updated compliance levels alongside associated risks and recommended actions. Additionally, the transmission of compliance levels to the DETPN can facilitate interoperability with insurance systems. For instance, the compliance tokens linked to transmitted data can be used to validate eligibility for insurance coverage during cyber incidents. If a compliance level of a vendor meets or exceeds predefined thresholds, the system can automate the authorization of claims related to business interruptions or damages.

In some implementations, the one or more processing circuits can receiving a response from the interface. That is, the response can include a request for a cyber resilience action. For example, a user can request a cyber resilience audit for the entity based on the compliance levels and environmental data. The one or more processing circuits can model (via modeler 1940) the cyber resilience data, compliance levels, and/or tokens to generate output, as further discussed in relation to FIG. 19. In some implementations, the one or more processing circuits can generate a cyber resilience action corresponding to at least the request and/or at least one compliance level.

In some implementations, the one or more processing circuits can monitor the DETPN to identify incidents based on accessing one or more endpoints of the DETPN. For example, the one or more processing circuits can retrieve telemetry data, such as system logs, security alerts, and/or network activity metrics, from endpoints associated with vendors, partners, and/or internal systems within the supply chain. That is, the one or more processing circuits can aggregate and analyze this data in real time to detect anomalies, unauthorized access attempts, and/or other indicators of potential cybersecurity incidents. For example, the one or more processing circuits can flag endpoint reports of a vendor including unusual increase in failed login attempts or unexpected data exfiltration activity as a potential security breach.

In some implementations, the one or more processing circuits can, in response to determining at least one of the plurality of entities or third-parties out of compliance with a cybersecurity parameter, issuing, by the one or more processing circuits, an alert to at least one of the plurality of entities or third-parties including a recommendation to update one or more cybersecurity protection actions. For example, the alert can include information about the specific parameter or condition that resulted in non-compliance, such as the use of outdated encryption protocols, failure to patch known vulnerabilities, and/or insufficient access control measures.

In some implementations, the one or more processing circuits can provide compliance levels to a decentralized network, centralized network, and/or data source (DNCNDS). The DNCNDS can be external to the supply chain. For example, the one or more processing circuits can receive or identify, one or more additional compliance parameters from at least one computing system connected to the DNCNDS. For example, the supply chain (e.g., DETPN) can be an interconnected network of organizations, as discussed herein. The DETPN and components therein (e.g., validation system 180) can also be connected to a DNCNDS with computing systems that lay outside the scope of the supply chain. For example, there can be an organization external to the supply chain but connected to the DNCNDS that affects the parameters of the supply chain (e.g., regulatory organization, new organization, industry standards body, and/or other external stakeholders). The one or more processors can, base determining the at least one compliance level or at least one updated compliance level on the one or more additional compliance parameters. For example, a token can be generated based on compliance levels at a first timing phase. Additionally, a token can be generated based on compliance levels or updated compliance levels at a second timing phase. The compliance levels or updated compliance levels are based on the additional compliance parameters received or identified from the computing systems connected to the DNCNDS or DETPN.

In some implementations, at block 450, one or more processing circuits can generate tokens. That is, the tokens can include compliance levels and/or updated compliance levels corresponding with the occurrence of the event or action. The one or more processing circuits can generate tokens via any of the systems and methods described herein (e.g., token generation circuit 186, passport system 1200, token generator 1340, etc.). For example, the one or more processing circuits can generate compliance tokens capturing a current compliance level.

In some implementations, the one or more processing circuits can generate and record an incident token corresponding to the one or more incidents, the updated at least one compliance level, and/or a cybersecurity dimension of a posture of an entity or third party. For example, an incident token can include metadata regarding the incident, (e.g., time of occurrence, affected systems, type of threat (e.g., malware, unauthorized access, denial of service)), and/or its severity.

In some implementations, the one or more processing circuits can generate a series of related tokens that track the evolving compliance state over time and its relationship to ongoing incidents. The one or more processing circuits can link the tokens to other tokens representing a different point in time or stage in the resilience life cycle. For example, the one or more processing circuits can generate tokens including compliance status at the time of the initial breach, subsequent compliance changes after remediation actions, and/or the final compliance state once recovery is achieved. In some implementations, the linked tokens can be populated onto a graph (e.g., knowledge graph), with nodes representing tokens and edges representing relationships between the tokens. In some implementations, the graph can be used by the one or more processing circuits to model cyber resilience and generate a response data structure.

In some implementations, the one or more processing circuits can generate a response data structure, and/or compliance product. For example, the response data structure can be based at least on the incidents and the compliance levels, including the updated compliance levels. That is, the response data structure can include data corresponding with the identified one or more incidents and/or an impact on a security posture of the plurality of entities or third-parties. For example, the one or more processing circuits can generate a data structure for deployment to the affected entities or third parties within the supply chain, detailing the nature of the incident, its impact on their cybersecurity posture, and/or any immediate actions required to address the vulnerabilities. This data structure can include information such as compliance gaps, recommended remediation steps, and/or suggested updates to cybersecurity measures, along with a timeline for compliance restoration. Additionally, the response data structure can be used to initiate automated workflows for incident resolution, including communication with relevant stakeholders, updates to compliance tokens, and/or triggering system-wide security adjustments across the supply chain. In some implementations, the one or more processing circuits can generate a compliance product based on at least one difference between a first and second token.

In some implementations, the one or more processing circuits can provide the response data structure to the DETPN for access by at least one entity or third party. The response data structure can be made accessible through a secure data interface. For example, the one or more processing circuits can utilize secure communication protocols, such as Transport Layer Security (TLS) or Secure Sockets Layer (SSL), to establish a secure transmission channel for the response data structure. The processing circuits can serialize the response data structure into a standardized format, such as JSON or XML, and/or transmit it over the network using protocols like HTTP(S) or Advanced Message Queuing Protocol (AMQP) to ensure reliable delivery and data integrity. Additionally, the processing circuits can implement access control mechanisms, such as public key infrastructure (PKI) or OAuth, to ensure that only authorized entities or third parties within the DETPN can access the response data structure, including role-based access controls (RBAC) to limit access based on the entity's role within the supply chain or network.

In some implementations, the impact on the security posture can include an identification of a vulnerability in a computing environment of at least one of the plurality of entities or third-parties, a quantification of a potential risk associated with the identified vulnerability, an assessment of a likelihood of exploitation of the identified vulnerability, and/or a recommendation or plan for mitigating the identified vulnerability. For example, a quantification of a potential risk can include an evaluation of the severity of the vulnerability, such as the potential damage or loss that can occur if the vulnerability were exploited. The quantification can involve assigning a risk score or level based on factors such as the sensitivity of the data at risk, the criticality of the affected systems, and/or the potential impact on business operations.

Additionally, the assessment of the likelihood of exploitation can involve analyzing historical data on similar vulnerabilities, current threat intelligence, and/or the presence of active exploits targeting the identified vulnerability. The recommendation or plan for mitigating the identified vulnerability can include specific actions such as applying patches or updates, implementing additional security controls, conducting further assessments, and/or even redesigning certain aspects of the system architecture to eliminate the vulnerability.

In some implementations, the one or more processing circuits can determine, using one or more tokens, at least one of the entities or third parties being above a protection threshold corresponding to one or more of the compliance parameters. That is, the processing circuits can evaluate the tokens against predefined protection thresholds for at least one (e.g., each) compliance parameter, which are set based on industry standards, regulatory requirements, and/or internal risk management policies. Additionally, the processing circuits can perform a comparative analysis of the tokens, identifying entities or third parties that surpass the protection thresholds, indicating that their cybersecurity measures are in alignment with the established requirements. This analysis can inform further actions, such as providing enhanced coverage options, granting access to sensitive resources, and/or triggering automated compliance audit.

In some implementations, the one or more processing circuits can generate, for at least one of the entities or third-parties above a protection threshold, a protection product for a third timing phase corresponding with the at least one compliance level or the updated at least one compliance level. For example, the one or more processing circuits can use historical tokens and data to generate a protection plan for the third-party to incorporate, as discussed herein. In some implementations, the one or more processing circuits can generate a compliance product based on at least one difference between the first and second token. In some implementations, the one or more processing circuits can provide the compliance product to an organization or computing system within the DETPN. In some implementations, the one or more processing circuits can, in response to determining at least one of the organizations are out of compliance with a cybersecurity parameter, issue an alert to one or more organizations including a recommendation to update one or more cyber security protection actions.

In some implementations, at block 460, one or more processing circuits can store tokens. That is, the one or more processing circuits can store the tokens on a database or other storage medium (e.g., database 189). In some implementations, the one or more processing circuits can generate or identify a neural network based at least on the one or more generated tokens. In some implementations, the tokens can be stored on a graph. That is, the tokens can be nodes on a knowledge or neural network graph. The graph can include edges. the edges can be the relationships between the tokens. For example, at least one (e.g., each) token in a historical chain of tokens relating to an insurance policy compliance of an entity can include an edge with a relationship to the next token.

Systems and Methods for Security Intelligence Exchange

Figure 5:
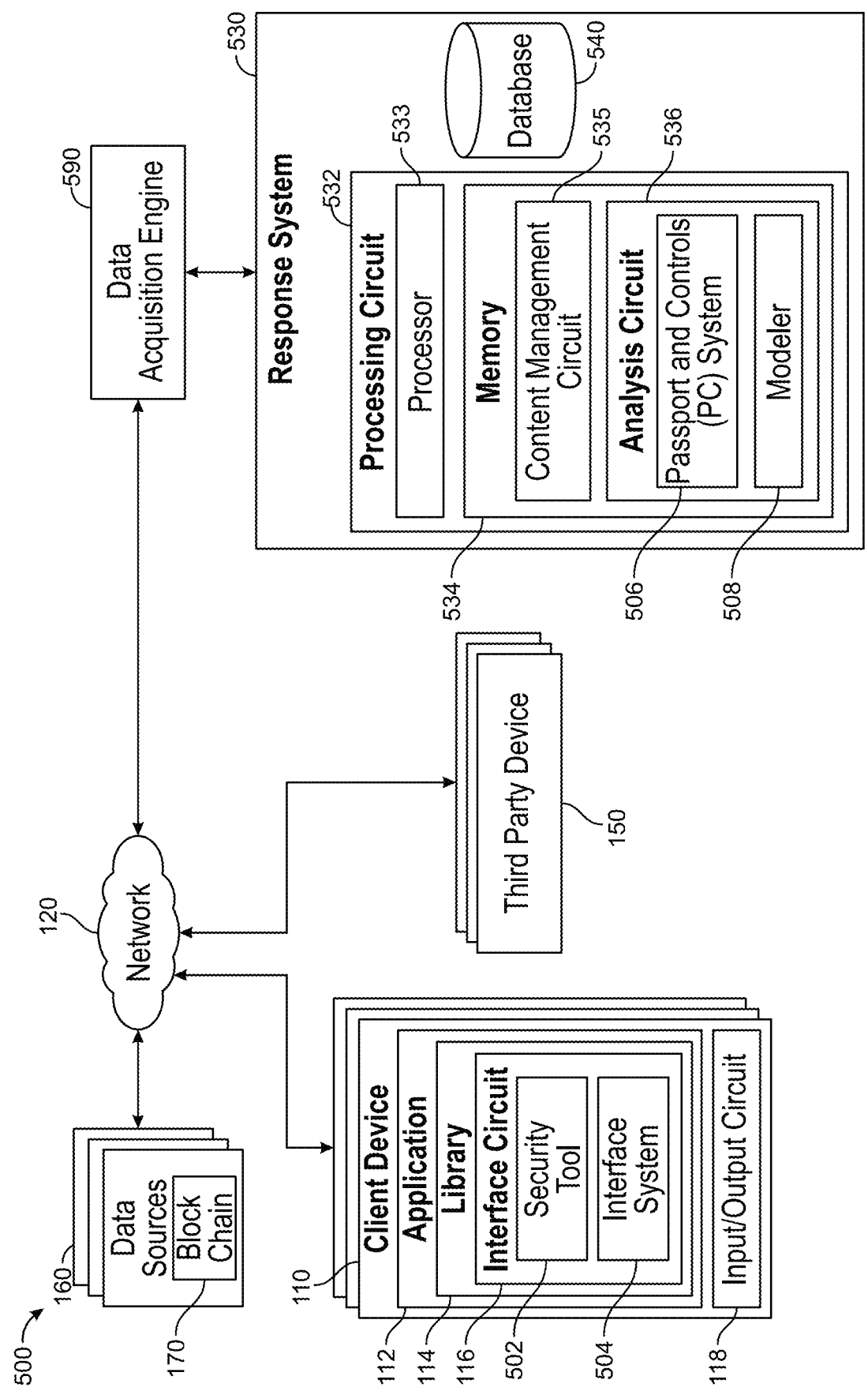
FIG. 5 depicts a block diagram of an implementation of a system for improving cybersecurity protections across a plurality of entities, according to some implementations.

Referring now to FIG. 5, a block diagram depicting an implementation of a system 2500 for improving cybersecurity protections across the plurality of entities. In some implementations, the interface circuit 116 of the client device 110 within the system 100 can include a security tool 502 and an interface system 504. As described herein, the library 114 can include the interface circuit 116. The security tool 502 of the interface circuit 116 can include a plurality of features to enhance the security of the client device 110 or the application 112. The plurality of features can include antivirus software, firewalls, instruction detection systems, vulnerability scanners, endpoint security software, and/or the like. The security tool 502 can monitor, secure, and/or protect the interface system 504 by executing the plurality of features. Using aspects of the technical solution described herein, can improve the cybersecurity protection of the client device 110, the third party device, and/or the data sources 160.

The interface system 504 can collect or identify the incident data associated with the cybersecurity incident. During the claims process of a claim handling system, the interface system 504 can monitor and collect the incident data at steps of the process. For example, the interface system 504 can collect incident data from the environmental data of the entity during the modeling of the plurality of cybersecurity protection plans. The incident data from the environmental data can correspond anomalies or potential cybersecurity incidents in the entity's environment. In some implementations, the interface system 504 can identify incident data from the reports of the claim handling system 408. In some implementations, the interface system 504 can collect incident data from a questionnaire generated by the analysis circuit 536. For example, the questionnaire can gather information related to the incident or the claim submitted. From the information, the interface system 504 can extract incident data associated with the claim.

The interface system 504 can collect the incident data to satisfy a threshold or upon the reception of a signal from the analysis circuit 536. For example, the interface system 504 can identify incident data from an application, the questionnaire, proof of readiness, and/or other components within the analysis circuit 536. The threshold can increase or decrease based on the submitted claim or incident. Responsive to the interface system 504, the interface system 504 can record the incident data within the distributed ledger of the analysis circuit 536.

Figure 6:
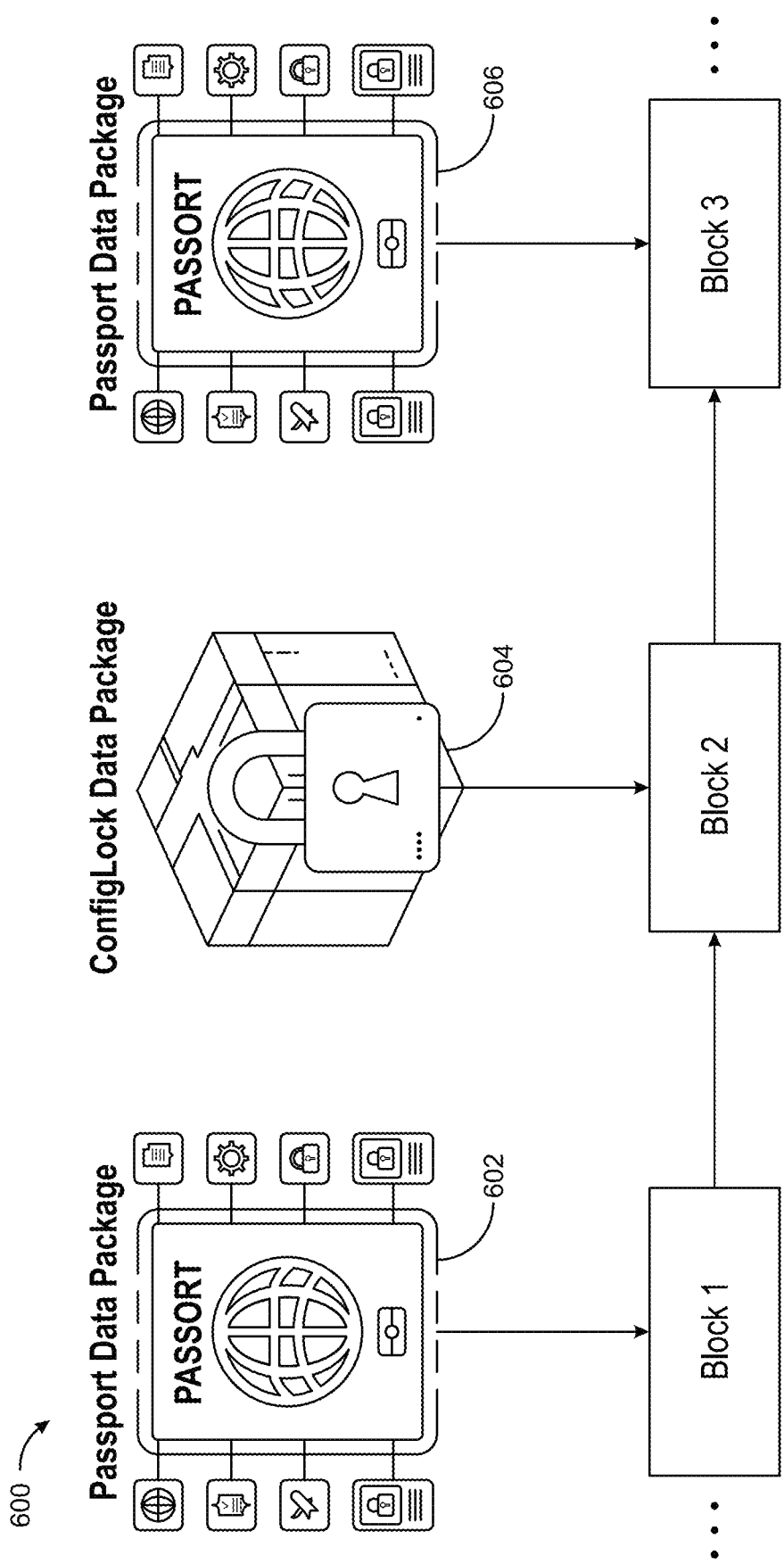
FIG. 6 depicts a block diagram of a system to analyze proof of performance of the plurality of entities to improve cybersecurity protections.

Referring now to FIG. 5 and FIG. 6, FIG. 6 depicts a block diagram 600 depicting a passport and controls (PC) system 506. The analysis circuit 536 can include the passport and controls (PC) system 506 and a modeler 508. The PC system 506 can include a first passport data package 602, a ConfigLock data package 604, and/or a second passport data package 606. In some implementations, the PC system 506 can generate a decentralized identity passport for at least one (e.g., each) entity in the plurality of entities. The decentralized identity passport can be located with the passport data package 602. The decentralized identity passport can be built from a distributed ledger and stored within a blockchain network, as shown in FIG. 6. at least one (e.g., each) decentralized identity passport can include a decentralized identifier to ensure at least one (e.g., each) identify passport is distinct.

In some implementations, the PC system 506 can attach or embed a plurality of proof of controls to the corresponding decentralized identity passport of one entity in the plurality of entities. The plurality of proof of controls can be based on one or more cybersecurity protection actions implemented by the entity. For example, a first entity can use mitigation strategies as a cybersecurity protection action, whereas a second company can use firewalls as a cybersecurity protection action.

The analysis circuit 536 of response system 180 of FIG. 5 can monitor environmental data of the third-party devices (e.g., computing devices) of an entity. To monitor for environmental data, the analysis circuit 536 can detect interactions between an end-user and a computing device. The computing devices can be servers, laptops, tablets, phone, and/or the like associated with an entity of the decentralized identity passport. The interactions can reveal or indicate compliance corresponding to the cyber protections of the entity. For example, a first end-user can access a website blocked by a firewall on the computing device of then entity. The analysis circuit 536 can flag the interaction as out of compliance with the cyber security protection.

When the analysis circuit 536 flags an interaction, the entity can receive an indication that the entity is out of compliance with a cybersecurity parameter from the analysis circuit 536. The indication can be at least one of an alert, a notification, and/or a message. For example, after the analysis circuit 536 flags the interaction, the analysis circuit 536 can transmit the indication to the entity to notify the entity of the lack of compliance. The indication can include a recommendation to update the one or more cybersecurity protection actions. Updating the one or more cyber security protection actions can including updating the security tools 502 of the client device 110.

Each time an entity executes at least one proof control of the plurality of proof controls, the PC system 506 can embed the proof control within the decentralized identity passport. The proof control can indicate that the entity executed the one or more cyber security protection actions in response to a cyberthreat. For at least one (e.g., each) attached proof control, the PC system 506 can record or store the proof control within the data sources 160 or the distributed ledger. When on the distributed ledger, at least one (e.g., each) block corresponding to the attached proof control can link to the decentralized identity passport as one or more exchanges. In some implementations, the analysis system can validate the one or more cyber security protections for at least one (e.g., each) entity. The database 540 can include a collection of cyber security protections for at least one (e.g., each) entity. The analysis circuit 536 can match the cybersecurity protection action with the stored cybersecurity action in the database 540 to validate the one or more cybersecurity protections. Upon validation of the one or more cybersecurity protections, the analysis circuit 536 can record the validation in the distributed ledger or within the data sources 160 as a new exchange linked to the decentralized identity passport.

The PC system 506 can identify a plurality of level 1 (L1) or first level configurations corresponding to at least one operational or security action performed on the plurality of client devices 110 of the entity. The L1 configurations can include at least one of network settings, security tool settings, access control lists, endpoint protection settings, and/or encryption keys. The L1 configurations can include system-level operations or security actions performed on the plurality of computing systems. In some implementations, the PC system 506 can include a plurality of level 2 (L2) configurations that include secondary or maintenance operations or security actions on the plurality of computing systems.

The PC system 506 can tokenize the plurality of L1 configurations within the ConfigLock data package 604. The ConfigLock data package 604 can include the plurality of L2 configurations. To tokenize the plurality of L1 configurations, the PC system 506 can digitize and be the plurality of L1 configurations on a blockchain. The PC system 506 can execute one or more smart contracts to tokenize the L1 configurations. For example, the PC system 506 can execute a first smart contract to tokenize one or more L1 configurations and a second smart contract to tokenize one or more L2 configurations. Upon tokenizing the L1 configurations, the PC system 506 can store or record the L1 and L2 configurations on the distributed ledger or a data source 160 as show in FIG. 6.

In some implementations, the PC system 506 can provide a recovery key to the entity. The recovery key can be configured to allow the recovery of the tokenized L1 configurations. In some implementations, the interface circuit 116 can receive the recovery key and provide the plurality of L1 configurations from the distributed ledger or data source 160. The interface circuit 116 can detokenize or decrypt the plurality of L1 configuration using the recovery key.

The modeler 508 can be an artificial intelligence (AI) or machine learning (ML) model (e.g., 8-bit, 32-bit, 64-bit) designed to identify, detect, and/or respond to incidents, claims, and/or cyber threats. The modeler 508 can include a data collection layer to gather incident data from the interface system 504. The modeler 508 can include a preprocessing layer and a feature engineering layer. The modeler 508 can use a model training layer to train the modeler 508 to model the incident data by using one or more training data sets within the database 540. In some implementations, the modeler 508 can include a model evaluation layer to evaluate the trained model using one or more validation data sets within the database 540. In some implementations, the modeler 508 can execute heuristic analysis, pattern identification, anomaly identification, and/or threat projections.

In some implementations, the modeler 508 can generate verifiable credentials, designed to encapsulate and validate the cybersecurity efforts of entities. Utilizing statistical analysis and correlation techniques, the modeler 508 can analyze, correlate, and/or cross-reference datasets to identify patterns indicative of potential security threats or vulnerabilities. This process can employs algorithms capable of detecting anomalies in network traffic, unauthorized access attempts, and/or the presence of malicious software by comparing observed behaviors against established norms. For example, the modeler 508 can evaluate an organization's security posture by analyzing both historical incident data and existing cybersecurity measures. This thorough assessment aids in the stratification of security priorities. The verifiable credentials generated as a result encapsulate the evaluated security posture, offering entities a means to demonstrably showcase their cybersecurity diligence to partners, regulators, and/or other stakeholders. Moreover, the modeler 508 can integrate domain-specific heuristic analysis to bolster its predictive analysis capabilities. This provides the generation of verifiable credentials that are broad in scope and also customized to address the unique threats pertinent to an entity's operational domain. Additionally, the incorporation of regulatory compliance tracking into the modeler's 508 analytical framework provides that the generated verifiable credentials also reflect adherence to legal and industry standards.

Using the modeler 508, the analysis circuit 536 can model the incident data to generate one or more verified intelligences corresponding to at least one cybersecurity threat. For example, the modeler 508 can model the incident data by generating a cyberthreat and transmit the generated cyberthreat to the analysis circuit 536. Responsive to receiving the generated cyberthreat, the analysis circuit 536 can use the generated cyberthreat to generate one or more verified intelligences to address the cyberthreat. The one or more verified intelligences can include at least one of threat indicators, vulnerability patches, and/or mitigation strategies corresponding to the at least one cybersecurity threat. In some implementations, the generated one or more verified intelligences can be a plurality of steps, a process, and/or a method to protect against the cyber threat.

The analysis circuit 536 can determine the one or more verified intelligences by using the generated cyberthreat. In some implementations, the one or more verified intelligences can correspond to at least one of firmographic data, identified security gaps, and/or existing protection guards. For example, the one or more verified intelligences can be based on firmographic data of the cyberthreat. In another example, the one or more verified intelligences can be based on identified security gaps of the cyberthreat. The firmographic data, the identified security gaps, and/or the existing protection guards can correspond to an entity profile of at least one (e.g., each) of the plurality of entities.

To determine the one or more verified intelligences, the analysis circuit 536 can monitor interactions between an end-user and the interface system 504. The interactions can reveal that the end-user executed intelligences stored within the database 540. For at least one (e.g., each) executed intelligence, the analysis circuit 536 can identify the verified intelligence if the executed intelligence corresponds to the cyberthreat. For example, an entity can execute a mitigation strategy to protect against a cyberthreat. The analysis circuit 536 can detect the mitigation strategy and determine or identify the mitigation strategy as verified intelligence.

The analysis circuit 536 can decode the one or more verified intelligences into entity specific data formats of one entity in the plurality of entities. In this manner, the analysis circuit 126 can automatically generate the one or more verified intelligences in a format of one entity. For example, a first entity can need seven verified intelligences, whereas a second entity can need eight verified intelligences. at least one (e.g., each) of the verified intelligences for the first entity and at least one (e.g., each) of the verified intelligences for the second entity can differ based on the protections of the first entity and the second entity.

During the decoding of the one or more verified intelligences, the analysis circuit 536 can translate the one or more verified intelligences into formats compatible with the security tool 502. The format can define the configuration for the security tool 502. For example, the format can be an API in the programming language of the security tool 502. The format for a first entity can differ from the format for a second entity to ensure the security tools 502 of at least one (e.g., each) entity are not the same.

The analysis circuit 536 can configure or reconfigure the security tool 502 of the respective entity. The analysis circuit 536 can transmit a configuration to the security tool 502 to modify, adjust, and/or change the API of the security tool. The configuration can allow the security tool 502 to protect the entity again the cyberthreat. In some implementations, the analysis circuit 536 can transmit a subsequent configuration that can include the first configuration. The subsequent configuration can update the security tool 502 to protect again a subsequent cyberthreat and the first cyber threat. In this manner, the analysis circuit 536 can continuously update at least one (e.g., each) security tool 502 from at least one (e.g., each) entity to protect the respective entity from the cyberthreat.

Still referring to FIGS. 5-6, the modeler 508 can be configured to generate of a decentralized identity passport (e.g., passport data package 602 and 606) for at least one (e.g., each) entity (or sub-entity, such as group or subsidiary of an entity or company). The generation by the modeler 508 can include collecting and integrating cybersecurity-related actions and measures performed and executed by these entities into their respective identity passports. These actions can be encapsulated in proofs of control, which demonstrate the entity's adherence to prescribed cybersecurity practices and measures. Once generated, these proofs are linked with the entity's decentralized identity passport and recorded on a distributed ledger or data source. Accordingly, the cybersecurity action by an entity can be transparently and immutably documented.

Upon attaching or embedding the proofs of control to the decentralized identity passports, the modeler 508 can validate the cybersecurity measures for at least one (e.g., each) entity. This validation process determines the efficacy and adherence of the implemented cybersecurity actions against established benchmarks or standards. After successful validation, the modeler 508 can record this validation as a new exchange on the distributed ledger or data source, linked to the entity's decentralized identity passport. This recorded validation acts as a verifiable badge of cybersecurity compliance, enhancing the entity's credibility and trustworthiness within a digital ecosystem. Continuously monitoring environmental data across computing systems of the registered entities, the modeler 508 can uphold one or more cybersecurity standards. This monitoring can be used to identify deviations or non-compliance with cybersecurity parameters. In response to any detected discrepancies, the modeler 508 can issue alerts to the entities involved, advising them on updating their cybersecurity measures.

In some implementations, the modeler 508 can identify a plurality of first-level configurations corresponding to operational or security actions performed on computing systems of an entity. The modeler 508 can encrypt or tokenize these configurations and record them on a distributed ledger or data source. For example, the modeler might encrypt network settings adjustments made to enhance security, ensuring that such changes are securely documented and verifiable. That is, the verifiable configurations can be stored in a ConfigLock Data package 604. For example, ConfigLock Data package 604 can be encrypted and compartmentalized into segments, at least one (e.g., each) representing different dimensions or areas of the entity's cybersecurity framework, such as network configurations, access controls, and/or endpoint security settings. Furthermore, the ConfigLock Data package 604 can then be indexed and timestamped. This process ensures that changes to configurations are auditable and resistant to tampering.

In some implementations, the modeler 508 can provide a recovery key to the entity, allowing for the recovery of encrypted or tokenized first-level configurations. For example, a client device 110 (particularly the security tool 502) can use the recovery key to receive the first-level configurations from the distributed ledger based on decrypting or detokenizing with the recovery key by the modeler 508. The modeler 508 can regenerate the recovery key upon detecting a potential compromise or at predefined intervals. For example, in the case of a security breach, the modeler 508 can regenerate the recovery key to maintain the integrity of the stored configurations.

In some implementations, the configurations of the plurality of first-level configurations can be system-level operations or security actions, while a plurality of second-level configurations pertain to secondary or maintenance operations. For example, the modeler differentiates between the application of a critical security patch (first-level) and routine software updates (second-level), ensuring at least one (e.g., each) is appropriately categorized and documented. In some implementations, the first-level configurations include network settings, security tool settings, access control lists, endpoint protection settings, and/or encryption keys. For example, the modeler 508 can record changes to firewall rules or the deployment of new antivirus definitions, capturing essential details for security management.

In some implementations, the configurations can be a level of configuration such as, cryptographic proof of provenance (e.g., Level 4 or L4), with subsequent levels corresponding to validations (e.g., Level 3 or L3), documented evidence of actions (e.g., Level 2 or L2), and/or commitments made by the entity (e.g., Level 1 or L1). For example, the modeler 508 can verify a new encryption key's provenance through digital signatures, then document its deployment across the network as an action taken. It should be understood the various levels of configuration are described herein but should not be limited to hierarchical categorizations, as configurations can also be interdependent or require cross-validation for security assessments. In particular, the flexibility of the modeler 508 allows for dynamic adaptation to emerging security challenges and technological advancements, ensuring that the modeler 508 remains effective in a rapidly evolving cybersecurity landscape.

In some implementations, the highest or best configuration level can be for cryptographic proof of provenance obtained by the modeler 508 directly from the entity and programmatically. For example, the modeler 508 can derive and encode the cryptographic proof of provenance for software updates directly from development logs and code repositories, ensuring that only verified updates are applied to the entity's systems. In another example, the modeler 508 can programmatically attest to the integrity of third-party components by validating their cryptographic signatures against trusted certificate authorities, bolstering supply chain security.

In some implementations, the second highest or second best configuration level can be validation by one or more authorized entities. For example, validation can include cross-referencing the digital signatures of installed applications with a database of verified publishers to confirm authenticity. In another example, validation might include checking the conformity of network configuration changes against industry-standard security protocols, ensuring that the entity's network remains resilient against known vulnerabilities.

In some implementations, the third highest or third best configuration level can be documented evidence of an action. For example, documented evidence can include logging the sequence of steps taken to apply a security patch, complete with timestamps and system snapshots. In another example, it might involve retaining change logs that detail the rationale and implementation details of new access control policies, providing a clear audit trail for security audits.

In some implementations, the fourth highest or fourth best configuration level can be commitments made by the entity. For example, commitments made by the entity can be encapsulated in a policy document that outlines the entity's approach to data encryption, specifying the algorithms and key management practices to be adhered to. In another example, commitments might be demonstrated through the publication of a regular security newsletter that details the entity's ongoing efforts to maintain and enhance its cybersecurity posture, fostering transparency and accountability.

In some implementations, the identifying process includes acquiring and verifying cryptographic proof of provenance based on digital signatures and transaction records. For example, the modeler 508 can use digital signatures to confirm the authenticity of a newly implemented access control list before recording it. In some implementations, the modeler 508 updates second, third, and/or fourth-level configurations in response to updates in operational or security actions. For example, if an entity revises its data retention policy, the modeler 508 can update the relevant configurations to reflect this change, ensuring the ledger remains current and accurate.

In some implementations, the passport and controls (PC) system 506 can prepare and report cyber incidents according to various governmental regulations. In some implementations, the PC system 506 can determine when a cyber incident is substantial based on a government regulation, which can range from significant losses in the confidentiality, integrity, and/or availability of information systems, to serious impacts on operational safety, disruptions in business activities, and/or unauthorized access stemming from third-party compromises. Upon identifying such incidents, the PC system 506 can gather a set of data necessary for reporting. This data collection can encompass all correspondence with threat actors, indicators of compromise, relevant log entries, forensic artifacts, network data, and/or information on how the threat actor compromised the system, among others. Additionally, the PC system 506 can track and document all details related to any ransom payments, including the amount, the decision process, and/or the aftermath of the payment.

For example, a substantial cyber incident can lead to one or more of the following: a substantial loss of confidentiality, integrity or availability of a covered entity's information system or network, a serious impact on the safety and resiliency of a covered entity's operational systems and processes, a disruption of a covered entity's ability to engage in business or industrial operations, and/or deliver goods or services, unauthorized access to a covered entity's information system or network, and/or any nonpublic information contained therein, that is facilitated through or caused by a: compromise of a cloud service provider, managed service provider, and/or other third-party data hosting provider; or supply chain compromise.

Furthermore, in some implementations, the PC system 506 can also be configured to manage and submit follow-up reports as required. This can include generating supplemental reports when new or different information about a cyber incident becomes available or if additional ransom payments are made. Thus, the PC system 506 can provide all relevant data such that it is accurately preserved and maintained for a minimum period (e.g., set at two years), following the submission of the most recent report. This data preservation can include the initial detection of a compromise to the full resolution and analysis of the incident, including any payments made and the identification of exploited vulnerabilities.

In some implementations, the operational framework of the PC system 506 aligns with the need for timely and incident reporting and data preservation to assist organizations in maintaining compliance with regulatory requirements. By automating the process of collecting, preserving, and/or reporting information about cyber incidents and ransom payments, the PC system 506 reduces the manual effort required and enhances the accuracy of the information reported. This approach can be used to fulfil legal and regulatory obligations and strengthen the overall cybersecurity posture of organizations by ensuring a structured response to incidents and facilitating continuous improvement through incident analysis and feedback.

In some implementations, the preservation requirement of the PC system 506 can include all correspondence with the threat actor, regardless of the forum or method; indicators of compromise; relevant log entries; relevant forensic artifacts; network data; data and information that can help identify how a threat actor compromised or potentially compromised an information system; system information that can help identify exploited vulnerabilities; information about exfiltrated data; all data or records related to the disbursement or payment of any ransom payment; and any forensic or other reports concerning the incident, whether internal or prepared for the covered entity by a cybersecurity company or other third-party vendor.

Verified Intelligence

Figure 7:
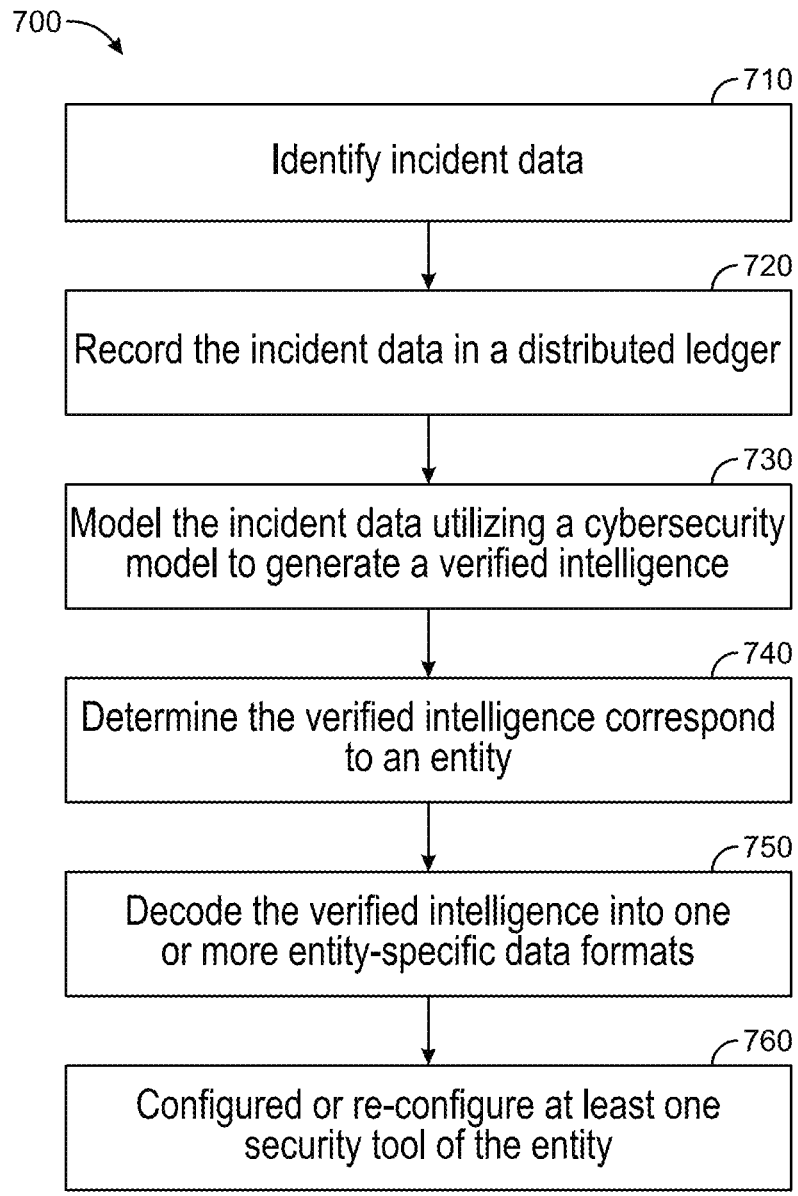
FIG. 7 depicts a flowchart of a method for improving cybersecurity protections across the plurality of entities, according to some implementations.

FIG. 7 depicts a flowchart of a method 700 for improving cybersecurity protections across the plurality of entities. At least the computing/security architecture shown and described regarding FIG. 5 can perform method 700 according to present implementations.

In a broad overview of method 700, at block 710, the one or more processing circuits (e.g., response system 180 of FIG. 5) can identify incident data. At block 720, the one or more processing circuits can record incident data in a distributed ledger. At block 730, the one or more processing circuits can model the incident data utilizing a cybersecurity model to generate a verified intelligence. At block 740, the one or more processing circuits can determine the verified intelligence correspond to an entity. At block 750, the one or more processing circuits can decode the verified intelligence into one or more entity-specific data formats. At block 760, the one or more processing circuits can configure or re-configure at least one security tool of the entity. In some implementations, some, and/or all operations of method 700 can be performed by one or more processors executing on one or more computing devices, systems, and/or servers. In various implementations, at least one (e.g., each) operation can be re-ordered, added, removed, and/or repeated.

At block 710, the processing circuits identify or collect incident data corresponding with a cybersecurity incident. In some implementations, the processing circuits can scan network traffic and log files for abnormal patterns. For example, identifying can include parsing security logs for unauthorized access attempts. In another example, collecting can include aggregating data from intrusion detection systems. Furthermore, the cybersecurity incident can include a detected breach or unauthorized data access attempt. Additionally information related to identifying and collecting incident data is described above with reference to FIGS. 22-24.

At block 720, the processing circuits record the incident data in a distributed ledger or data source. In some implementations, the processing circuits can record the incident data in the distributed ledger (e.g., WEB3 data source) by encrypting and hashing the data to ensure integrity and confidentiality. For example, the process can include generating a unique cryptographic hash for at least one (e.g., each) incident record. In some implementations, the processing circuits can record the incident data in the data source (e.g., WEB2 data source) by structuring the data into predefined formats for consistency and easy retrieval. For example, the data can be formatted according to JSON or XML schemas. Furthermore, recording can include time-stamping at least one (e.g., each) incident entry to establish a chronological order of events.

At block 730, the processing circuits can analyze the incident data utilizing a cybersecurity model to generate one or more verified intelligences corresponding to at least one cybersecurity threat. In some implementations, the cybersecurity model includes at least one of heuristic analysis, pattern identification, anomaly identification, and/or threat projections. For example, the processing circuits can apply machine learning techniques to the incident data to identify patterns indicative of specific types of cyber threats. For example, heuristic analysis can be employed to compare incident data against known threat signatures. In another example, anomaly detection algorithms might identify deviations from baseline network behavior as potential threats. In yet another example, threat projections can be generated by extrapolating current data trends. The cybersecurity model can be executed by processing circuits in response to the cybersecurity incident. That is, the model can dynamically adjust its parameters based on the nature and severity of the incident. For example, the model can prioritize incident data indicating a zero-day vulnerability.

In some implementations, the one or more verified intelligences include at least one of threat indicators, vulnerability patches, and/or mitigation strategies corresponding to the at least one cybersecurity threat. For example, the verified intelligence might include a digital signature of a malware file for antivirus software to block. In another example, it can recommend specific configuration changes to firewall rules to prevent similar incidents. Additionally, the firmographic data, the identified security gaps, and/or the existing protection guards can correspond to an entity profile of at least one (e.g., each) of the plurality of entities. In some implementations, an entity profile can detail the technological infrastructure and software dependencies of an entity. For example, it can list all network endpoints and their respective security statuses. Furthermore, the verified intelligences can guide the refinement of entity-specific cybersecurity measures. For example, they might suggest enhancements to encryption practices based on identified vulnerabilities.

At block 740, the processing circuits can determine the one or more verified intelligences corresponds to at least one of the plurality of entities based on at least one of firmographic data, identified security gaps, and/or existing protection guards. In some implementations, the generated verifiable intelligence can be cross-referenced and analyzed against entity data to determine, for example, if the cybersecurity threat is exploitable or can present a cyber vulnerability to one or more entities. For example, matching the threat indicators to specific network architectures or operating systems prevalent within the target entities. In another example, correlating vulnerability patches to software versions identified in the firmographic data of entities. That is, the processing circuits can use incident data collected during the claims process with a distributed ledger and automation to automatically determine the correct verified intelligence for the correct businesses who need it, based on firmographic, gaps, and/or safeguard matching, with technology translated and usable data that can auto-change configurations of security tools to defend against these verified relevant threats. For example, automation to automatically determine can include analyzing historical breach data against current entity profiles to predict susceptibility. That is, determining the correct business includes evaluating entity-specific IT environments against the threat model to ensure relevance. For example, comparing the unique digital footprint of at least one (e.g., each) entity against the incident pattern to identify potential targets.

In some implementations, the firmographics of the entity can include, but is not limited to, industry sector, size, geographical location, and/or technology stack. For example, the verified intelligence can be determined for an entity using the firmographics when matching industry-specific threats to entities within the same sector. Additionally, the gaps of the entity can include, but is not limited to, outdated software, missing patches, and/or weak encryption protocols. For example, the verified intelligence can be determined for an entity using the gaps when identifying entities running software versions vulnerable to a newly discovered exploit. Furthermore, the safeguards of the entity can include, but is not limited to, firewalls, antivirus software, and/or intrusion detection systems. For example, the verified intelligence can be determined for an entity using the safeguard when matching mitigation strategies to existing security infrastructure. Accordingly, the various data of the entity can be matched to the verified intelligence to customize cybersecurity advice and action plans, ensuring that recommendations are actionable and directly address the entity's specific security needs.

At blocks 750 and 760, the processing circuits can decode the one or more verified intelligences into one or more entity-specific data formats of the at least one of the plurality of entities and configure or re-configure at least one security tool of the at least one of the plurality of entities. For example, configuration or re-configuration can include protecting the at least one of the plurality of entities from the at least one cybersecurity threat. Additionally, decoding into the one or more entity-specific data formats can include translating the one or more verified intelligences into formats compatible with the at least one security tool of the at least one of the plurality of entities. For example, decoding can include converting threat indicators into firewall rule updates to block malicious IP addresses. In another example, decoding can include translating vulnerability patches into specific update commands for antivirus software. That is, decoding transforms threat data into actionable security measures tailored to at least one (e.g., each) entity's systems and protection tools.

In some implementations, configuring the security tool of an entity can include setting up intrusion detection systems to monitor for specific patterns of malicious activity identified in the verified intelligence. For example, adjusting sensitivity levels of the detection algorithms based on the severity of the threat. In another example, configuring can include updating access control lists to restrict traffic from suspect sources. In some implementations, re-configuring the security tool of an entity can include modifying existing firewall rules to address new vulnerabilities revealed by the verified intelligence. For example, adding or removing rules to better protect against the identified threats.

In some implementations, the processing circuits can automatically generate and apply patches or updates to the at least one security tool. Generating can include creating custom patches for proprietary software based on the specific vulnerabilities identified. For example, compiling code changes that neutralize a newly discovered exploit. In some implementations, applying the patches or updates can include remotely pushing updates to endpoint protection tools across the entity's network. For example, automating the deployment of patches during off-peak hours to reduce disruption. That is, the security tool can be kept up-to-date with the latest defenses against emerging threats. For example, ensuring all devices and software within the entity's network are equipped with the latest protective measures.

Passport Data Package

In some implementations, method 700 can further include a method for generating passport data packages (e.g., passport data package 602 and 606 of FIG. 6) with decentralized proof of controls attached for the entities proof of performance. It should be understood that the generation of passport data packages described with reference to method 700 can be executed and completed independently of method 700. For ease of understanding, the generation of passport data packages will be referred to in steps.

Generally, the passport data package can be a digitally encrypted file encapsulating the entity's identity and its cybersecurity practices. For example, the passport data package can include embedded digital certificates and cryptographic proofs. Furthermore, the passport data package can be used as a verifiable credential for demonstrating compliance with cybersecurity standards and practices to partners and regulators.

In some implementations, at step 1, the processing circuit can generate a decentralized identity passport for at least one (e.g., each) of a plurality of entities. Generation can include compiling a record of the entity's cybersecurity protocols and identity verification documents. For example, incorporating business registration documents and cybersecurity policy documents into the passport. Alternatively or in combination, generation can include digitally signing the compiled documents to ensure authenticity and integrity. For example, using SHA-256 for hashing and RSA for digital signatures. In some implementations, generating the decentralized identity passport includes using a public-private key pair unique to at least one (e.g., each) entity of the plurality of entities. For example, the public key can be recorded on the distributed ledger and the private key remains confidential to the entity.

At step 2 of the generation of the passport data package, the processing circuits can attach or embed a plurality of proof of controls to the decentralized identify passport of an entity of the plurality of entities, the plurality of proof of controls corresponding to one or more cybersecurity protection actions implemented by the entity. In some implementations, attaching can include digitally linking cybersecurity protection actions documentation to the passport. For example, appending metadata of security audits and certifications to the passport. Furthermore, the processing circuits can sign the plurality of proof of controls using a digital signature scheme before attaching the plurality of proof of controls to the decentralized identity passport. For example, employing ECDSA for digital signatures. In some implementations, embedding can include integrating QR codes or unique identifiers that link to proofs of control hosted securely online. For example, QR codes that direct to encrypted online repositories containing audit logs. The cybersecurity protection actions can include network encryption enhancements and multi-factor authentication implementation. That is, the entity can demonstrate compliance with industry security standards. Furthermore, the proofs of control are verified and timestamped to ensure their validity.

In some implementations, the processing circuits can validate the one or more cybersecurity protections of at least one (e.g., each) of the plurality of entities and record the validation on the distributed ledger or data source as a new exchange linked to the decentralized identity passport. That is, validating the one or more cybersecurity protections can include comparing the one or more cybersecurity protection actions to a predefined set of security standards or benchmarks. In some implementations, the predefined set of security standards or benchmarks can include ISO/IEC 7001 and NIST cybersecurity frameworks. For example, comparing entity's cybersecurity measures against these frameworks to ensure compliance. In some implementations, recording can include encrypting and hashing the validation data before storage. For example, using blockchain technology to immutably store the validation results. That is, the new exchange linked to the decentralized identity passport can include a timestamped record of the validation, along with references to the specific standards or benchmarks used for validation. For example, a blockchain transaction containing validation metadata and outcomes.

At step 3 of the generation of the passport data package, the processing circuits can record the plurality of proof of controls on a distributed ledger or data source as one or more exchanges linked to the decentralized identity passport. In some implementations, recording the proof of controls on the distributed ledger can include creating a smart contract for at least one (e.g., each) proof of control, ensuring traceability and non-repudiation. For example, deploying smart contracts on Ethereum to beat least one (e.g., each) proof of control. In some implementations, recording the proof of controls on the data sources can include utilizing secure cloud storage services with access control lists tailored for privacy and security. For example, storing proofs of control in buckets with encrypted data transfer. Additionally, linking to the decentralized identity passport can include assigning a unique identifier to at least one (e.g., each) proof of control that corresponds to the passport's digital identity. For example, using UUIDs to link proofs of control to the specific passport within the distributed ledger. In another example, creating hyperlinks within the passport document that lead directly to the recorded proofs of control on the ledger.

In some implementations, the processing circuits can monitor environmental data of a plurality of computing systems of the plurality of entities with the decentralized identity passport. For example, utilizing network monitoring tools to detect and record changes in firewall settings or antivirus software updates. That is, the decentralized identity passport can be used by the processing circuits to authenticate and authorize access to monitored data. For example, the environmental data can correspond to the decentralized identity passport by mapping network traffic patterns and system performance metrics to the passport's unique identifier. The environmental data monitored can include at least one, but is not limited to, network traffic, system performance metrics, software integrity, and/or security event logs corresponding with the plurality of computing systems. For example, monitoring can include analyzing logs for indicators of compromise or unauthorized access attempts.

In some implementations, in response to determining at least one of the plurality of entities out of compliance with a cybersecurity parameter, the processing circuits can issue an alert to at least one of the plurality of entities including a recommendation to update the one or more cybersecurity protection actions. In some implementations, the alert can specify the non-compliance issue and provide steps for remediation. Furthermore, the recommendation can include best practices for updating security protocols or installing specific software patches. For example, the recommendation can be generated based on real-time and/or near real-time threat intelligence and tailored to the entity's specific infrastructure and previously recorded cybersecurity actions.

In some implementations, the processing circuits can update the decentralized identity passport to include additional proof of controls based on successful validation of a newly implemented cybersecurity protection actions by the entity of the plurality of entities. In some implementations, an update to the decentralized identity passport can include appending new proofs of control and re-validating the passport's overall security status. For example, adding digital records of recently passed security audits or newly implemented security measures. Additionally, the additional proof of controls can be determined by assessing the impact and effectiveness of the newly implemented measures. For example, successful validation of a newly implemented cybersecurity protection actions by the entity of the plurality of entities can include conducting a thorough review of the updated security protocols, supported by external audit findings and internal performance metrics. In another example, updating the entity's cybersecurity profile within the passport to reflect the latest security posture and compliance status.

In some implementations, the passport data package can serve as a dynamic, verifiable credential for entities to demonstrate their cybersecurity posture and compliance with relevant standards. Entities can present the passport data package, which includes digital certificates, cryptographic proofs, and/or a record of cybersecurity controls, to partners, regulators, and/or clients. Upon presentation, the recipient can verify the authenticity and integrity of the passport using public keys recorded on a distributed ledger, ensuring the digital signatures and cryptographic hashes match the entity's reported cybersecurity measures. Verification can involve checking the digital signatures against the public keys and ensuring the cryptographic proofs align with the stated security controls and actions. This process can be facilitated by software or digital platforms capable of reading and validating the contents of the passport data package, ensuring the entity adheres to the claimed security practices and standards. Such verification can support trust in digital transactions, facilitate secure partnerships, and/or streamline compliance audits by providing a transparent, immutable record of an entity's cybersecurity efforts.

ConfigLock Data Package

In some implementations, method 700 can further include a method for generating ConfigLock data packages (e.g., ConfigLock data package 604 of FIG. 6) to store configs decentralized to recover, for example during an incident affecting the entities computing structure or network. It should be understood that the generation of ConfigLock data packages described with reference to method 700 can be executed and completed independently of method 700. For ease of understanding, the generation of ConfigLock data packages will be referred to in steps.

Generally, the ConfigLock data package can be a secure, encrypted container for storing various configuration settings and proofs of compliance. For example, the ConfigLock data package can include embedded digital signatures and cryptographic hashes to ensure the integrity and authenticity of the data. Furthermore, the ConfigLock data package can be used as a means to quickly restore system configurations to a known secure state in the event of a cybersecurity incident, facilitating rapid recovery and reducing downtime.

In some implementations, at step 1, the processing circuit can identify a plurality of first level configurations corresponding to at least one of an operational or security action performed on the a plurality of computing systems of an entity of a plurality of entities. Identifying can include scanning and analyzing system logs and configuration files for changes. For example, an operational action can be an update to server software. In another example, a security action can be the application of a new firewall rule.

In some implementations, identifying of step 1 can include (1) accessing one or more data channels of a plurality of computing systems of an entity of a plurality of entities, (2) identifying, by the one or more processing circuits, at least one of an operational or security action performed on the plurality of computing systems of the entity of the plurality of entities, and/or (3) modelling the at least one of an operational or security action using a cryptographic proof of provenance model to generate a plurality of first level configurations. Specifically, accessing can include connecting to system and application logs, network traffic analyses, and/or security event management systems. For example, aggregating data from endpoint detection and response (EDR) systems and security information and event management (SIEM) solutions. Additionally, identifying the operation or security action can include parsing and categorizing event logs based on predefined criteria. For example, classifying actions as routine maintenance or security enhancements or verifying the cryptographic proof of provenance based on one or more digital signatures. Furthermore, modeling can include applying algorithmic analysis to establish the chronological sequence and interdependencies of actions. That is, employing data science techniques to discern patterns that validate the authenticity and integrity of the actions. For example, utilizing blockchain technology to create an immutable record of configurations. In another example, applying machine learning models to predict the impact of configuration changes on system security. In some implementations, the cryptographic proof of provenance model can be a heuristic algorithm or artificial intelligence model that evaluates the reliability and security implications of at least one (e.g., each) action. For example, assessing the compatibility of new software updates with existing security protocols. In some implementations, the cryptographic proof of provenance model can be a statistical analysis algorithm configured to identify outliers in configuration changes that can indicate unauthorized or malicious alterations. In some implementations, the cryptographic proof of provenance model can be a cybersecurity analysis algorithm configured to assess the efficacy of new security configurations against emerging threat vectors. For example, simulating attack scenarios to evaluate the resilience of firewall settings.

In some implementations, a first level configuration can be system-level operations or security actions performed on the plurality of computing systems, and/or a second level configurations can be secondary or maintenance operations or security actions on the plurality of computing systems. For example, a first level configuration can be the implementation of a new network encryption protocol. That is, the first level configurations can include at least one of network settings, security tool settings, access control lists, endpoint protection settings, and/or encryption keys. In another example, a second level configuration can pertain to the scheduling of regular system backups. Accordingly, the configurations can ensure comprehensive security and operational efficiency across the entity's computing systems.

Alternatively or in combination, the configurations can be hierarchical according to the type of proof provided by the entity. For example, a first level configuration can be cryptographic proof of provenance obtained by the one or more processing circuits directly from the entity and programmatically. In this example, the proof of provenance might verify the source and integrity of a new software application before installation. Additionally, a second level configuration can be a validation by one or more authorized entities, for example, through third-party security audits. Furthermore, a third level configuration can be documented evidence of an action, for example, logs showing the successful application of a security patch. Moreover, a fourth level configuration can be commitments made by the entity, for example, a pledge to adhere to specific data protection standards. Generally, the processing circuits can prioritize or weight the first level or better level configurations to emphasize their importance in maintaining system integrity. That is, configurations at higher levels can receive more scrutiny during the verification process.

In some implementations, the processing circuits can verify the cryptographic proof of provenance based on one or more digital signatures and transaction records stored within the distributed ledger or data source. For example, verifying the digital signature of a critical software update to confirm its authenticity. Furthermore, the processing circuits can generate the cryptographic proof of provenance for the plurality of first level configurations. That is, the generation can include creating a secure hash of the software package. For example, using SHA-256 to ensure the integrity of the configuration data.

In some implementations, the processing circuits can update at least one of the plurality of second level configurations, the plurality of third level configurations, and/or the plurality of fourth level configurations, in response to an update in the operational or security action performed on the plurality of computing systems of the entity. For example, adjusting firewall settings in response to new threat intelligence. In another example, updating access control lists to restrict access to sensitive data following a policy change. That is, updates can include the recalibration of security measures to align with the latest security landscape and entity policies.

At step 2 of the generation of the ConfigLock data package, the processing circuits can encrypt or tokenize the plurality of first level configurations. In some implementations, encrypting can include using AES-256 to secure configuration data against unauthorized access. For example, encrypting network configuration settings to prevent tampering. In some implementations, tokenizing can include converting configuration settings into tokens stored on the blockchain, ensuring confidentiality and integrity. For example, representing access control settings as tokens. Accordingly, the ConfigLock data package can be securely stored and readily accessible by entities possessing the correct decryption or detokenization keys.

At step 3 of the generation of the ConfigLock data package, the processing circuits can record the plurality of first level configurations on the distributed ledger or data source. For example, recording the configurations on a distributed ledger can include hashing at least one (e.g., each) configuration setting and storing it on a blockchain to ensure tamper-proof records. In another example, recording the configurations on a data source can include saving them in a secure, encrypted database with restricted access.

In some implementations, the processing circuits can providing a recovery key to the entity. For example, the recovery key can configured to allow the recovery of the encrypted or tokenized plurality of first level configurations by the entity. That is, the recovery key can facilitate secure and controlled access to the stored configurations. For example, a recovery key can be generated by the processing circuits by employing a secure key generation algorithm. For example, using RSA encryption to create a unique recovery key for at least one (e.g., each) entity. In another example, distributing the recovery key to authorized personnel through a secure channel.

In response to receiving the recovery key, the processing circuits can provide the plurality of first level configurations from the distributed ledger or data source based on decrypting or detokenizing the plurality of first level configurations using the recovery key. In some implementations, providing or transmitting the configurations can include securely sending the decrypted or detokenized configurations over a secure communication channel. For example, using TLS to protect the transmission of configuration data. That is, the configurations allow the entity to restore its systems to a secure state following an incident. In some implementations, the processing circuits can regenerate the recovery key based on a detection of a potential compromise or at predefined intervals. For example, automatically updating the recovery key annually or following the detection of a security breach. In another example, implementing a multi-factor authentication process for recovery key regeneration to enhance security.

In some implementations, to restore from a ConfigLock data package, the entity can first authenticate using a predetermined recovery key to access the encrypted package. Upon successful authentication, the entity can decrypt the package, which contains serialized configuration settings, digital signatures, and/or cryptographic hashes of the original state of system configurations. These configurations can include network settings, firewall rules, access control lists, and/or software version information. The restoration process can include deserializing the configuration data and programmatically applying it to the respective systems and devices, ensuring that at least one (e.g., each) component is reverted to its verified secure state. This process can include automated scripts or configuration management tools that validate at least one (e.g., each) setting's integrity using the included cryptographic hashes before applying them, ensuring the restoration does not inadvertently introduce vulnerabilities.

In some implementations, an NFT can be minted for at least one (e.g., each) Passport Data Package or ConfigLock Data Package, encapsulating a unique digital representation of an entity's cybersecurity credentials or configuration settings. The minting process can include the processing circuits generating a digital hash of the package's contents, including digital certificates, cryptographic proofs, and/or configuration details, and/or embedding this hash within the NFT. Following the minting, the processing circuits can record the NFT on a distributed ledger, assigning a unique identifier to at least one (e.g., each) NFT that correlates directly with the respective Passport or ConfigLock Data Package. Furthermore, the processing circuits facilitate the verification of the NFT by external parties, allowing for the authentication of the encapsulated data against the blockchain to confirm its validity and integrity. This mechanism allows entities to prove compliance with cybersecurity standards and the secure status of their system configurations in a decentralized, tamper-proof manner. Accordingly, by integrating NFT technology with method 700's framework and leveraging insights from FIG. 8, the processing circuits can utilize blockchain to enhance cybersecurity management.

In some implementations, generative AI can be employed in creating and validating both Passport Data Packages and ConfigLock Data Packages within the framework of method 700. Initially, generative AI can automate the compilation of an entity's cybersecurity protocols and identity verification documents. This automation can include parsing through databases to extract relevant information, synthesizing cybersecurity policy documents, and/or integrating business registration documents. Furthermore, generative AI can assist in digitally signing these compiled documents, employing cryptographic algorithms to ensure their authenticity and integrity. During the second steps, generative AI can be used in attaching or embedding a plurality of proof of controls to the decentralized identity passport. The generative AI can analyze the cybersecurity protection actions implemented by the entity, generating metadata for at least one (e.g., each) action. This metadata can then be digitally linked to the passport or embedded as QR codes or unique identifiers, directing to encrypted online repositories containing audit logs and certifications. Moreover, generative AI can improve the digital signature process, selecting a secure and efficient digital signature scheme based on the latest advancements in cryptographic technology. The AI can also dynamically update these proofs of control based on new cybersecurity actions or validations, ensuring that the passport data package remains current and reflective of the entity's compliance status. In validating the cybersecurity protections of entities, generative AI can compare the documented cybersecurity protection actions against a predefined set of security standards or benchmarks, such as ISO/IEC 7001 and NIST frameworks. This can include an analysis of the entity's cybersecurity measures, utilizing machine learning algorithms to identify discrepancies or areas of non-compliance. Following validation, GAI can automate the recording of this data on a distributed ledger or data source, encrypting and hashing the validation results for security.

To safeguard the integrity and confidentiality of Passport Data Packages and ConfigLock Data Packages against potential future quantum computing threats, the processing circuits can implement quantum-resistant cryptographic algorithms. These algorithms can be designed to withstand the decryption capabilities of quantum computers, ensuring that digital signatures, cryptographic proofs, and/or the encryption of data remain secure. By incorporating post-quantum cryptography into the encryption process, the processing circuits secure the data against advanced computational attacks, maintaining the long-term viability and security of the stored information. The processing circuits can also integrate decentralized identity verification mechanisms to enhance the security and efficiency of verifying Passport Data Packages. Utilizing blockchain technology, this approach can be used by entities to prove their identity and the authenticity of their digital credentials autonomously, without the need for centralized verification authorities. Through this mechanism, the processing circuits facilitate a secure, privacy-preserving method of identity verification, allowing entities to manage their digital identities and associated proofs of control directly on a blockchain. In some implementations, the processing circuits can use machine learning and statistical modeling to improve anomaly detection capabilities within the cybersecurity framework. These systems can be used to analyze datasets in real time, detecting unusual patterns that can indicate cybersecurity threats or vulnerabilities. By employing algorithms that learn from historical data, the processing circuits equip entities with dynamic monitoring tools that adapt to new and evolving threats.

Figure 8:
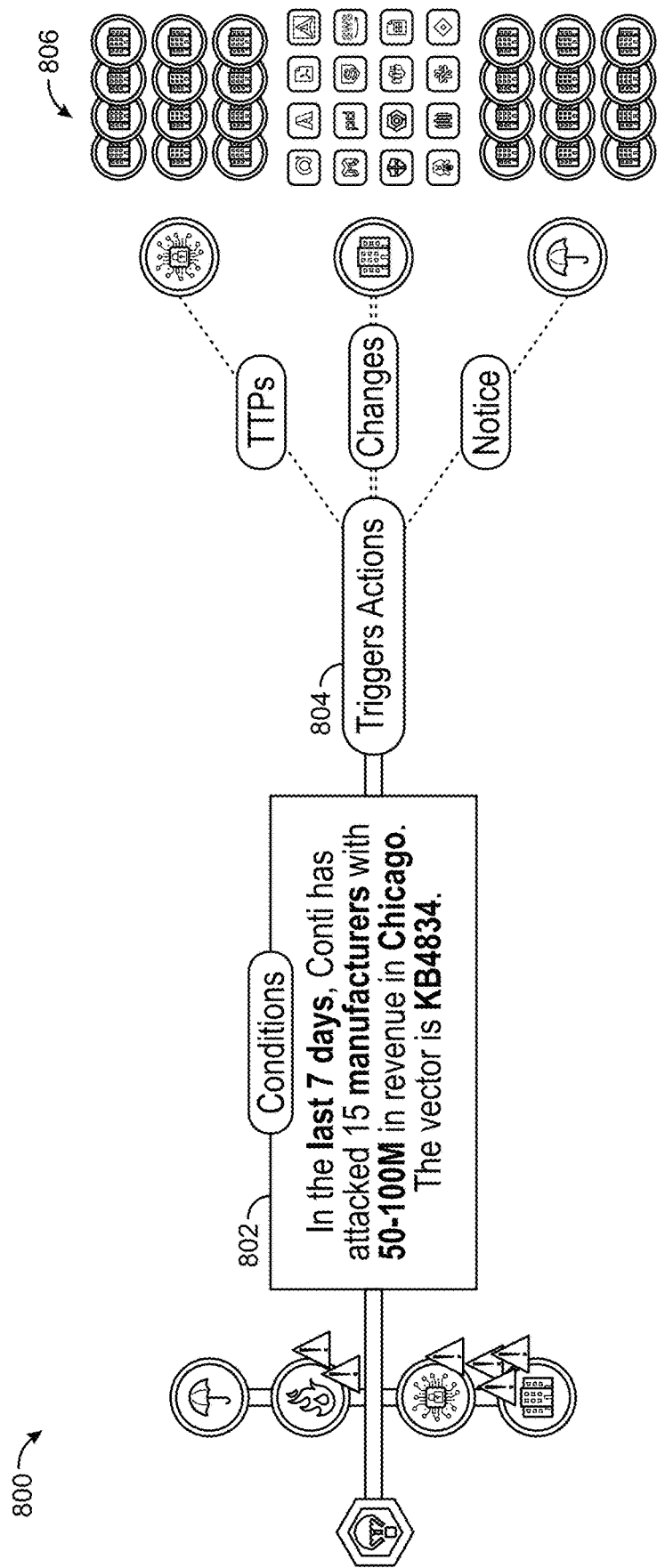
FIG. 8 depicts a block diagram of a more detailed architecture of certain systems or devices of FIG. 5, according to some implementations.

Referring now to FIG. 8, a block diagram depicting a cyber threat intelligence (CTI) model 800 to modify security tools, according to some implementations. The response system 180 of FIG. 5 can be configured to perform the various actions and functions described in FIG. 8. At block 802, a processing circuit of the response system 180 can be configured to determine various cyber threats such as phishing attacks, ransomware, and/or DDoS attacks. For example, the depiction of a locked processor with an explanation point can indicate. Additionally, the processing circuits can determine one or more conditions. For example, the cyber threat intelligence (CTI) model 800 depicts the condition that "In the last 7 days, Conti has attached 15 manufacturers with 50-100M in revenue in Chicago. The vector is KB4B4834." In this example, the affected sector is manufacturing, and/or the impact location is Chicago. In particular, the vector can be a specific malware signature or attack methodology.

Next, at block 804, the processing circuits of the response system 180 of FIG. 5 can determine or model one or more trigger actions to perform on the security tools of companies, security vendors, and/or insurers/brokers. The security tools can be firewalls, intrusion detection systems, and/or antivirus software. In some implementations, the trigger actions can be, but are not limited to, TTPs, changes, notices, and/or so on. The processing circuit of the response system 180 can model and determine trigger actions by analyzing threat intelligence and predicting likely attack vectors. For example, the processing circuits can determine TTPs of the security tools to address emerging threats identified through real-time and/or near real-time data analysis. In another example, the processing circuit can determine changes of the security tools to enhance their responsiveness to specific threat indicators. In yet another example, the processing circuits can generate notices to be provided to the security to inform about necessary updates or patches. At 806, the security tools of the various entities can implement the trigger actions. For example, automatic updates to threat definitions. In yet another example, configuration changes to improve threat detection and response. In some implementations, the TTPs can be provided to an entity, the changes can be provided to a vendor, and/or notices can be provided to a protection entity.

For example, in the context of the CTI model's scenario, Conti, a cybercriminal group, has launched targeted attacks against 15 manufacturing companies within the Chicago area, all of which report revenues between 50 to 100 million dollars. This selection indicates Conti's preference for industries with significant financial turnovers but potentially weaker cybersecurity measures compared to larger conglomerates. The vector, identified as KB4B4834, would indicate a specific malware or attack methodology that has been previously associated with Conti's operations, for example, exploiting vulnerabilities that these mid-sized entities have overlooked. This incident can be modeling by the processing circuits to customize cybersecurity responses that are predictive, leveraging real-time and/or near real-time threat intelligence to anticipate and mitigate such targeted attacks. The use of a vector such as KB4B4834 allows cybersecurity systems (e.g., response system 180 of FIG. 5) to trace the attack pattern back to its source, allowing for a more directed and efficient countermeasure implementation. In this example, the cybersecurity model's is used to provide actionable intelligence based on firmographic data and specific threat vectors for the affected manufacturing entities in Chicago.

In some implementations, FIG. 8's CTI model 800 can incorporated into method 600 through its functionality for dynamically adapting security tools in response to cyber threat intelligence. Method 600 outlines a process for capturing, verifying, and/or updating the cybersecurity capabilities of an organization, including configurations and technologies in use. The CTI model 800, as part of this method, can determine the nature of cyber threats (e.g., phishing, ransomware) and model trigger actions for security tool adjustments. This is similar to method 600's steps of receiving capabilities, verifying their state, and/or adjusting configurations based on identified needs. In the framework of method 600, the CTI model 800's can be shown in the analysis and application phases where cyber threats are analyzed, and/or appropriate responses are formulated. This include the CTI model providing real-time and/or near real-time threat intelligence that informs the process of verifying the state of cybersecurity capabilities and deciding on necessary adjustments. When the CTI model 800 identifies a threat, such as a specific malware vector, method 600's mechanisms for changing state or configuration can be executed, allowing for an immediate and informed response to the identified threat. Thus, the integration of CTI model 800 within the broader scope of method 600 enhances the capability to dynamically adapt cybersecurity measures. It does so by leveraging threat intelligence to inform the verification and adjustment steps of method 600, ensuring that security configurations and technologies remain effective against current cyber threats.

Systems and Methods for Configuration Locking

Figure 9:
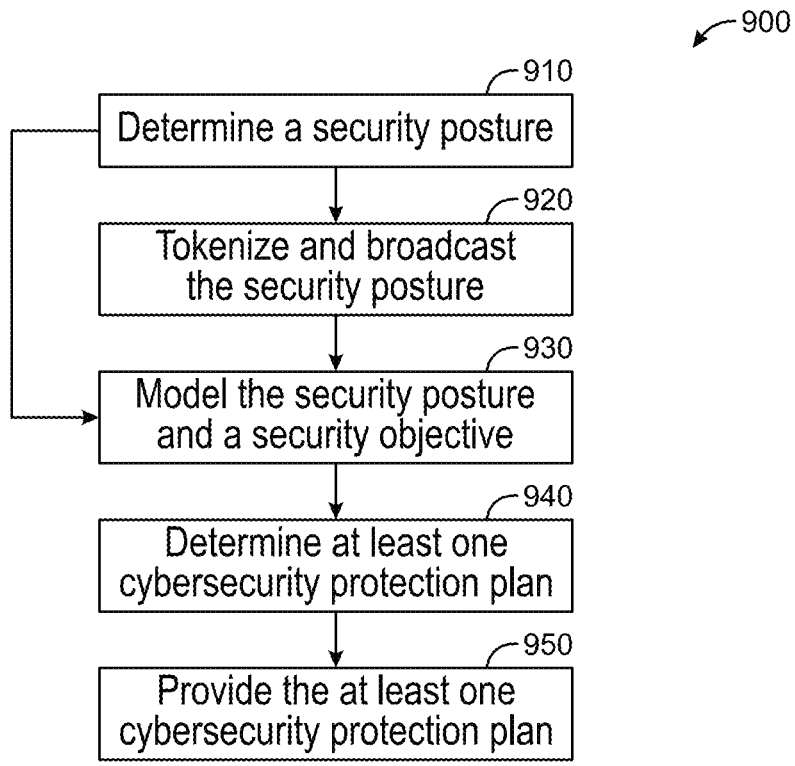
FIG. 9 depicts a flowchart for a method to protect data, according to some implementations.

Referring now to FIG. 9, a flowchart for a method 900 to protect data, in accordance with present implementations. At least system 100 can perform method 900 according to present implementations.

In broad overview of method 900, at block 910, the one or more processing circuits (e.g., response system 180 of FIG. 1A) can determine a security posture. At block 920, the one or more processing circuits can tokenize and broadcast the security posture. At block 930, the one or more processing circuits can model the security posture and a security objective. At block 940, the one or more processing circuits can determine at least one cybersecurity protection plan. At block 950, the one or more processing circuits can provide the at least one cybersecurity protection plan. Additional, fewer, and/or different operations can be performed depending on the particular implementation. In some implementations, some, and/or all operations of method 900 can be performed by one or more processors executing on one or more computing devices, systems, and/or servers. In various implementations, at least one (e.g., each) operation can be re-ordered, added, removed, and/or repeated.

At block 910, the one or more processing circuits can determine the security posture based on the entity data. In some implementations, this can include analyzing the data storage systems of the entity to determine the various types of data being handled. Additionally, the processing circuits can assess the entity data to identify potential cybersecurity threats that can pose a risk to the organization. In some implementations, the processing circuits can identify entity assets by accessing the data channels that are communicatively linked to these assets. Accordingly, this allows the processing circuits to understand and evaluate the resources, devices, and/or networks that include the entity's infrastructure.

In general, the security posture corresponds to an assessment of the entity's overall cybersecurity risk profile. In some implementations, the security posture encompasses multiple dimensions, including the current entity state and current entity index. For example, the current entity state represents the current cybersecurity conditions of the entity, such as system configurations, security policies, and/or incident response readiness. In another example, the current entity index can serve as references or pointers to the entity assets, facilitating efficient retrieval and access of critical information. Accordingly, the security posture is an aggregate representation of various aspects, such as the entity's firmographics, data types, asset locations, cybersecurity safeguards, coverage, gaps, cyber hygiene practices, third-party attestations, cybersecurity incidents, and/or cybersecurity claims. By considering these factors, the processing circuits can determine a comprehensive view of the entity's cybersecurity posture, facilitating organizations and third-parties to assess their security risks and make informed decisions. Thus, the security posture can refer to the overall cybersecurity stance of an entity, encompassing various factors that contribute to its risk profile and resilience against potential threats.

For example, to determine a security posture of an eCommerce business with a significant online presence that processes large amounts of consumer data daily, including sensitive information such as credit card details and personal identities can include analyzing the entity data of the eCommerce business. In some implementations, the processing circuits can evaluate the entity data, involving an analysis of the types of data stored in the company's databases. These databases might include customer records, transaction logs, and/or financial records. Additionally, in this example the processing circuits can identify the assets of the company. This can include accessing various data channels linked to these assets, which can include servers, computers, software applications, and/or network infrastructure. In the above example, after the entity data is analyzed, the processing circuits can begin to assess the current cybersecurity conditions of the company. This current entity state includes the company's system configurations, security policies, and/or the readiness of their incident response team. The processing circuits can also identify the current entity index, which provides as references or pointers to the entity's assets. Considering these elements, the processing circuits can now determine the company's security posture. In particular, the security posture provides a holistic assessment that includes the company's firmographics, data types, asset locations, cybersecurity safeguards, coverage, gaps in security, cyber hygiene practices, third-party attestations, past cybersecurity incidents, and/or cybersecurity claims. By considering all these factors, the processing circuits can provide a comprehensive view of the entity's cybersecurity posture.

At block 920, the one or more processing circuits can tokenize and broadcast the security posture to a distributed ledger. In general, tokenization is the process of converting rights to an asset into a digital token on a blockchain. In this case, the asset is the security posture of the company. The processing circuits convert the security posture into a digital token that can be stored, transmitted, and/or processed. In some implementations, the digital token is a representation of the security posture that is unique, tamper-resistant, and/or encrypted. Broadcasting refers to the process of sending this digital token to all nodes in the distributed ledger or blockchain network. The distributed ledger is a decentralized database that is maintained by multiple nodes or participants in the network. Broadcasting the token to the distributed ledger ensures that the token, representing the security posture, is stored in a decentralized, immutable, and/or transparent manner. In some implementations, any changes to the security posture will require a new token to be generated and broadcasted, ensuring that there is a historical record of all changes.

Over time, the circumstances, assets, and/or the data that the entity handles can change. For instance, the company can adopt new technologies, handle new types of data, and/or face new threats. As a result, it can be important to keep the security posture updated. In some implementations, the processing circuits continuously monitor the entity's data and systems for any changes. When new data is accessed, the processing circuits analyze it to determine how it impacts the current security posture. For example, this can include reassessing the types of data the entity handles, the technologies it uses, its cybersecurity policies, and/or its overall threat landscape. Accordingly, the updated security posture provides a current and accurate representation of the entity's cybersecurity status, reflecting the most recent changes and developments.

In some implementations, once the updated security posture is determined, the next step can include tokenizing this updated posture. As mentioned earlier, tokenization involves converting the updated security posture into a digital token. After tokenizing the updated security posture, the processing circuits broadcast this new token to the distributed ledger. In some implementations, the processing circuits provide a public address of the tokenized updated security posture on the distributed ledger. The public address is a unique identifier that allows third parties to locate and access the token on the blockchain. Providing the public address to a plurality of third parties allows these parties to verify the updated security posture.

In some implementations, the public address provided by the processing circuits acts as a unique identifier on the distributed ledger, and/or blockchain, for the tokenized security posture. By providing this address to third parties, they can locate and access the specific token, which represents the company's current security posture. That is, the ability for third-parties to access the tokenized security posture allows third parties to independently verify its contents. This is because the tokenization process ensures that the data representing the security posture is both tamper-proof and transparent, lending credibility to its contents. Furthermore, the decentralized nature of a distributed ledger ensures that the tokenized data has not been altered without consensus, adding an extra layer of verification. This means that third parties, be it auditors, partners, and/or cybersecurity firms, can trust the authenticity of the information encapsulated in the token, thus facilitating them to accurately evaluate the organization's cybersecurity posture.

At block 930, the one or more processing circuits can model the security posture and a plurality of security objectives to generate a set of cybersecurity attributes of the entity. In some implementations, modeling the security posture includes constructing a representation of the entity's current cybersecurity state. This includes the data collected and analyzed in previous blocks, such as the types of data the entity handles, the assets it possesses, its system configurations, its security policies, its cybersecurity incidents, and/or other relevant factors. In some implementations, the processing circuits can also model a plurality of security objectives. As user herein, "security objectives" refer to the goals or targets that the entity aims to achieve in terms of its cybersecurity. For example, the entity might aim to reduce its vulnerability to specific types of cyberattacks, improve its incident response time, and/or achieve compliance with certain cybersecurity standards or regulations. These objectives provide a framework for evaluating the entity's security posture and identifying areas for improvement. In some implementations, block 920 can be skipped or performed at a later point in time.

In some implementations, based on the modeled security posture and the security objectives, the processing circuits generate a set of cybersecurity attributes of the entity. at least one (e.g., each) cybersecurity attribute represents a specific aspect of the entity's cybersecurity. For example, one attribute might be the entity's vulnerability to phishing attacks, while another might be its adherence to data encryption standards. Accordingly, the attributes provide a more and granular view of the entity's cybersecurity posture. In some implementations, at least one (e.g., each) cybersecurity attribute is associated with at least one of a required cybersecurity attribute, an additional cybersecurity attribute, and/ or an existing cybersecurity attribute. A required attribute can be a cybersecurity attribute that the entity must possess to meet its security objectives. An additional attribute can be a cybersecurity attribute that the entity can benefit from but is not mandatory. An existing attribute is a cybersecurity attribute that the entity already possesses. By categorizing the attributes in this way, the processing circuits can identify the entity's strengths, weaknesses, and/or areas for improvement in its cybersecurity.

In some implementations, generating the set of cybersecurity attributes also involves creating a security roadmap. This is a strategic plan that outlines how the entity can improve its cybersecurity over time. The roadmap consists of multiple phases, at least one (e.g., each) associated with a subset of the cybersecurity attributes. at least one (e.g., each) attribute is assigned to a phase based on its importance, urgency, and/or the entity's ability to implement it. For example, the first phase might involve implementing the required attributes, while later phases might involve adding the additional attributes. In some implementations, modeling the security posture and security objectives together is a strategic approach that provides a comprehensive understanding of an entity's cybersecurity landscape. This process provides an interplay between the entity's current state of security (security posture) and its desired state of security (security objectives).

In this context, the security posture represents the entity's current cybersecurity status. It includes all relevant factors such as the types of data the entity handles, the system configurations, the cybersecurity policies in place, the incident response readiness, and/or the history of cybersecurity incidents, among others. On the other hand, the security objectives represent the entity's goals or targets in terms of cybersecurity. These might include reducing vulnerability to specific types of cyberattacks, improving incident response time, achieving compliance with certain cybersecurity standards, and/or enhancing the security of specific assets. In some implementations, when modeling the security posture and security objectives together, the processing circuits can map out the path from the current state to the desired state. For example, the map can identify the gaps between the security posture and the security objectives, and/or outline the steps that need to be taken to bridge these gaps.

In various implementations, the modeling process also involves generating a set of cybersecurity attributes of the entity, at least one (e.g., each) reflecting a specific aspect of the entity's cybersecurity. By considering the security posture and the security objectives together, the processing circuits can develop a nuanced understanding of the entity's cybersecurity landscape. They can identify the strengths and weaknesses in the current security posture, align these with the security objectives, and/or define a clear path towards achieving these objectives. This holistic approach ensures that the entity's cybersecurity strategy is both grounded in its current reality and focused on its future goals.

It should be understood that modeling the security posture and security objectives can involve executing computational algorithms and machine learning techniques. The processing circuits would analyze various data points, including system configurations, network structures, user behaviors, security incident history, and/or more, to create a multi-dimensional model of the entity's current security posture. This model can be represented in various forms, such as a statistical model, a graphical model, and/or a neural network, depending on the complexity of the data and the specific needs of the analysis. Concurrently, the security objectives would be defined and encoded in a format that can be integrated into the model. This can involve setting target values for certain metrics, specifying desired states for different aspects of the cybersecurity, and/or defining specific conditions that should be met. The processing circuits can then map the security posture onto the security objectives, identifying the gaps and generating the set of cybersecurity attributes that represent specific areas for improvement. This mapping process can involve various computational techniques, such as optimization algorithms, decision tree analysis, and/or reinforcement learning, depending on the complexity of the security posture and objectives. In some implementations, the output would be a model that represents the entity's current security posture, its security objectives, and/or the path to bridge the gap between them.

At block 940, the one or more processing circuits can determine utilizing one or more protection parameters, at least one cybersecurity protection plan corresponding to a new cybersecurity attribute to protect the entity. In some implementations, the new cybersecurity attribute is an attribute from the generated set of cybersecurity attributes of the entity after modeling the security posture and a plurality of security objectives. Protection parameters refer to specific criteria or guidelines that are used to design the cybersecurity protection plan. For example, these can include, but are not limited to, the entity's resources, the severity of the threats it faces, the criticality of its assets, its regulatory requirements, and/or its risk tolerance. In particular, the protection parameters provide a framework for tailoring the cybersecurity protection plan to the entity's specific needs and circumstances.

In some implementations, at least one (e.g., each) cybersecurity protection plan corresponds to a new cybersecurity attribute. As discussed herein, the cybersecurity attributes represent specific aspects of the entity's cybersecurity that were identified in the modeling process. A new cybersecurity attribute might represent an area for improvement, a gap in the current security posture, and/or a step towards achieving a security objective. The process of determining a cybersecurity protection plan can include defining the actions, measures, and/or strategies that will improve the entity develop or strengthen the new cybersecurity attribute. For instance, if the new attribute relates to improving incident response readiness, the protection plan might involve training staff, establishing an incident response team, and/or implementing an incident management system. In some implementations, the cybersecurity protection plan is also designed to be adaptable. This means it can be updated or modified based on changes in the entity's security posture, security objectives, and/or the cybersecurity landscape. This adaptability ensures that the protection plan remains effective and relevant over time. Furthermore, while a cybersecurity protection plan is designed for a specific attribute, it can also have broader effects on the entity's overall cybersecurity. For instance, a plan designed to improve incident response readiness might also enhance the entity's resilience to cyberattacks, reduce downtime in the event of an incident, and/or improve its reputation for cybersecurity.

In various implementations, once the processing circuits have determined a cybersecurity protection plan based on the entity's security posture and objectives, the processing circuits can consider the practical implementation of the plan. It's important to note that there can be multiple cybersecurity protection plans that offer the same essential protection but come from different vendors and have different price points, features, support levels, and/or other variables. at least one (e.g., each) of these elements can significantly influence the choice of protection plan. For example, suppose the determined cybersecurity protection plan involves the deployment of a specific type of firewall to enhance network security. There can be several vendors in the market that offer firewall solutions. While at least one (e.g., each) solution essentially serves the same purpose—protecting the network from unauthorized access—there can be significant differences in their features, performance, ease of use, compatibility with the existing IT infrastructure, and/or more. Some firewalls might offer advanced features such as deep packet inspection, intrusion prevention systems, and/or integrated virtual private network (VPN) support, while others might focus on providing a user-friendly interface or extensive customization options.

Furthermore, price can be another factor in choosing a protection plan. Different vendors can offer their solutions at different price points, depending on factors such as the sophistication of the technology, the reputation of the vendor, the level of customer support provided, and/or the licensing model (for example, one-time purchase versus subscription-based). The entity can be presented with one or more plans corresponding to a new cybersecurity attribute to protect the entity with different price points so that the entity can consider its budget and the potential return on investment of at least one (e.g., each) solution. Additionally, other factors such as the vendor's reputation, the quality of customer support, the vendor's understanding of the entity's industry, and/or the vendor's commitment to future updates and enhancements can also influence the choice of a cybersecurity protection plan. Therefore, the processing circuits can consider all these factors and potentially integrate additional data (e.g., vendor information, product reviews, and/or budget constraints) to select or offer the most suitable cybersecurity protection plan for the entity. This ensures that the chosen plan not only meets the entity's cybersecurity needs but also aligns with its financial, operational, and/or strategic requirements.

In general, the processing circuits can connect the organizations with the relevant cybersecurity vendors. They can do this by integrating with a database or network of vendors, and/or by utilizing a platform that facilitates such connections. By acting as a bridge between the organization and the vendors, the processing circuits can streamline the process of finding and implementing cybersecurity solutions. They can automatically match the organization's needs, as defined by the cybersecurity protection plans, with the offerings of various vendors, taking into account factors such as features, price, vendor reputation, and/or support levels. This not only improves accessibility for both the organization and vendors by improving the selection process, but it also leads to improved technology and security for the organization. The automation and data-driven approach of the processing circuits ensure that the organization is connected with the most suitable vendors, allowing it to benefit from the latest cybersecurity technologies that align with its security posture and objectives. This ultimately contributes to a stronger and more effective cybersecurity infrastructure for the organization.

In some implementations, at block 940, the processing circuits can determine at least one cybersecurity protection plan based on an assortment of qualifying and additional cybersecurity protection plans. These plans can come from a diverse set of third-party vendors and are presented to the entity computing system via a cybersecurity marketplace. For example, a qualifying cybersecurity protection plan refers to a plan that meets the minimum requirements established by the entity's security objectives and the identified cybersecurity attributes. This can include factors such as the type of protection needed, compliance with certain standards, compatibility with the existing IT infrastructure, and/or others. The qualifying plan provides the basic level of security that the entity needs to address its identified cybersecurity attributes. In another example, an additional cybersecurity protection plan refers to a plan that goes beyond the minimum requirements to provide extra features, higher performance, and/or other benefits. This can include advanced threat detection capabilities, integrated incident response tools, superior customer support, and/or more. The additional plan can offer a higher level of protection and can provide more value to the entity, although it might also come at a higher cost. In some implementations, the security objectives used to guide this determination process can be entity-specific. That is, they can be tailored to the unique needs, risks, and/or goals of the entity, which ensures that the determined protection plans are highly relevant and targeted.

At block 950, the one or more processing circuits can provide the at least one cybersecurity protection plan to an entity computing system of the entity. In some implementations, the cybersecurity protection plan is provided to the entity's computing system through a cybersecurity marketplace. For example, this can be a digital platform that connects entities with a wide range of third-party cybersecurity vendors. The marketplace allows the entity to easily browse, compare, and/or select from various cybersecurity protection plans. It also allows vendors to showcase their offerings to potential customers. Within the cybersecurity marketplace, the processing circuits identify the cybersecurity protection plans associated with a plurality of third parties. This includes a first cybersecurity protection plan offered by a first third-party and a second cybersecurity protection plan offered by a second third-party. at least one (e.g., each) of these plans is associated with the new cybersecurity attribute identified during the modeling process, meaning they are designed to address this specific aspect of the entity's cybersecurity. In some implementations, at least one (e.g., each) cybersecurity protection plan is associated with one of a plurality of availability states. These states indicate whether the plan is currently available for the entity to implement (an "available now" state), whether it will become available in the future (an "available pending" state), and/or whether it is not available at all (an "unavailable" state).

In addition to identifying and providing the cybersecurity protection plans, the processing circuits can also facilitate the implementation of these plans. This can involve, for instance, integrating the chosen protection plan with the entity's existing IT systems, configuring the plan's settings according to the entity's needs and preferences, and/or monitoring the plan's deployment to ensure its functioning as expected. The processing circuits can also provide ongoing support for the protection plan, such as troubleshooting issues, providing updates, and/or adapting the plan based on changes in the entity's security posture or the cybersecurity landscape. Moreover, the processing circuits can manage the entity's interactions with third-party vendors. The processing circuits can handle communications between the entity and the vendors, negotiate contracts or service agreements, manage payment transactions, and/or ensure that the vendors fulfill their obligations. By acting as an intermediary, the processing circuits can help streamline the vendor management process, reduce the entity's administrative burden, and/or ensure a smooth and successful collaboration.

In some implementations, the processing circuits can also provide valuable analytics and reporting capabilities. For example, the processing circuits can track the performance of the cybersecurity protection plans, measure their impact on the entity's security posture, and/or generate reports that provide insights into the entity's cybersecurity progress. This can help the entity understand the effectiveness of its cybersecurity efforts, identify areas for improvement, and/or make informed decisions about its future cybersecurity strategy. These analytics and reporting capabilities can be particularly valuable in demonstrating the entity's compliance with regulatory requirements or industry standards, as well as in building trust with stakeholders such as customers, partners, and/or investors.

In some implementations, the processing circuits can scan the plurality of data channels to access third-party data from a range of third-parties. For example, this can include data about third-party vendors, partners, customers, and/or other entities that interact with the organization. Such third-party data can provide insights into the external aspects of the entity's cybersecurity, such as the security practices of its partners or the threats posed by its digital ecosystem. In this context, modeling involves integrating this third-party data into the determination of the set of cybersecurity attributes of the entity. This ensures that the model captures a holistic view of the entity's cybersecurity, encompassing both internal and external factors. In some implementations, the processing circuits can determine a set of existing security attributes of the entity based on both the entity data and the third-party data. These existing security attributes represent the current state of the entity's cybersecurity, including its existing defenses, vulnerabilities, and/or threat exposures. By comparing these existing attributes with the desired attributes identified in the modeling process, the processing circuits can pinpoint the gaps that need to be addressed and guide the development of the cybersecurity protection plan.

In some implementations, the processing circuits can determine an incident readiness based on the set of cybersecurity attributes of the entity. In particular, the incident readiness corresponds to a calculated level that indicates how prepared the entity is to respond to a cybersecurity incident. For example, this can involve factors such as the robustness of the entity's incident response plan, the skills and resources of its incident response team, the effectiveness of its communication channels, and/or its capacity for detecting, analyzing, and/or containing incidents. Similarly, the processing circuits can determine an insurance readiness based on the set of cybersecurity attributes. The insurance readiness refers to a calculated level that indicates how prepared the entity is to obtain cybersecurity insurance. For example, this can consider factors such as the entity's risk profile, its compliance with insurance requirements, the adequacy of its security controls, and/or its history of cybersecurity incidents. In some implementations, the set of cybersecurity attributes of the entity is associated with at least the incident readiness or the insurance readiness. That is, these readiness levels can be parts of the entity's overall cybersecurity profile, reflecting its ability to respond to incidents and its readiness to obtain insurance. By considering these readiness levels in its analysis, the processing circuits can provide a more nuanced and comprehensive assessment of the entity's cybersecurity posture.

In various implementations, the incident readiness and insurance readiness can be calculated through a weighted scoring system that combines various cybersecurity attributes. For example, the incident readiness score might take into account the robustness of the entity's incident response plan (weighted at 30%), the skills and resources of its incident response team (30%), the effectiveness of its communication channels (20%), and/or its capacity for detecting, analyzing, and/or containing incidents (20%). at least one (e.g., each) attribute can be scored on a scale from 1 to 10, with the scores then multiplied by their respective weights and summed to produce the overall incident readiness score. Similarly, the insurance readiness score might consider the entity's risk profile (weighted at 40%), its compliance with insurance requirements (30%), the adequacy of its security controls (20%), and/or its history of cybersecurity incidents (10%). Again, at least one (e.g., each) attribute can be scored on a scale from 1 to 10, with the scores multiplied by their weights and summed to produce the insurance readiness score. Accordingly, the scores provide a quantitative measure of the entity's readiness levels, allowing for comparison and tracking over time.

In some implementations, the one or more processing circuits can (1) receive a portion of the entity data from a user device via an application programming interface (API), (2) tokenize and extract content of the portion of the entity data into a plurality of tokens, (3) generate a unique identifier for at least one (e.g., each) of the plurality of tokens, (4) store a mapping between the unique identifier and at least one (e.g., each) of the plurality of tokens, (5) populate, from at least one (e.g., each) of the plurality of tokens, a plurality of fields of a data object associated with the security posture based on the extracted content of the portion of entity data stored in at least one (e.g., each) of the plurality of tokens, and/or (6) verify accuracy of the populated plurality of fields. In general, the processing circuits can enhance the entity's security posture assessment by actively engaging with user devices via an application programming interface (API). Through this interface, they can receive a portion of the entity data, tokenize and extract content, generate unique identifiers for at least one (e.g., each) token, and/or store a mapping between these identifiers and tokens. This process allows a granular analysis of the entity data, allowing the processing circuits to identify specific security attributes and nuances that can be concealed in the aggregated data.

In some implementations, the processing circuits can populate a data object associated with the security posture using the extracted content from the tokens. at least one (e.g., each) field of the data object corresponds to a specific aspect of the security posture, such as incident readiness, insurance readiness, risk profile, and/or compliance status. By populating these fields with precise data extracted from the tokens, the processing circuits can ensure that the data object accurately represents the entity's security posture. Furthermore, the processing circuits can verify the accuracy of the populated fields. For example, this can involve cross-checking the data with other sources, applying data validation rules, and/or using machine learning algorithms to detect anomalies or inconsistencies.

In some implementations, the processing circuits can receive a request to set up a cybersecurity protection account. This request can come from an entity that wants to enhance its cybersecurity posture or from a third-party such as a cybersecurity vendor or consultant. Setting up a cybersecurity protection account is the first step towards building a robust cybersecurity strategy, as it provides a centralized platform for managing all cybersecurity-related activities. Upon receiving the request, the processing circuits can generate a first graphical user interface (GUI) including interactable elements. The GUI serves as the main interface for users to interact with the cybersecurity protection account. The interactable elements can include menus, buttons, forms, and/or other components that allow users to input data, navigate the platform, and/or perform specific actions. When a user interacts with one of these elements, the processing circuits can receive, via the first GUI, a portion of the entity data. This data can correspond to various aspects of the entity's operations, such as team information, asset information, current third-party providers, and/or current cybersecurity protection plans.

Next, the processing circuits can model the current cybersecurity protection plans. This involves analyzing the plans to understand their features, benefits, limitations, and/or effectiveness. It also includes implementing the plan, which can involve coordinating with the vendor, integrating the plan with the entity's systems, and/or ensuring its proper operation. By modeling the current plans, the processing circuits can identify potential improvements or gaps that need to be addressed in the new cybersecurity strategy. In some implementations, the processing circuits can generate a second GUI including additional interactable elements. These elements are associated with the security posture, a plurality of incidents, and/or the plurality of security objectives. This second GUI provides users with a more view of their cybersecurity situation, including their current posture, past incidents, and/or future objectives.

In some implementations, the processing circuits can implement, test, and/or manage (sometimes referred to collectively as "modeling") the cybersecurity protection plans. After a plan is selected, the processing circuits can facilitate the integration (or modeling) process between the vendor's solution and the entity's systems. For example, this might involve configuring the entity's networks, devices, and/or applications to work with the vendor's cybersecurity tools, testing the integrated solution to ensure that it functions correctly, and/or addressing any issues or conflicts that arise during this process. Moreover, the processing circuits can continuously monitor the entity's systems to assess the effectiveness of the protection plan. This can include analyzing system logs, network traffic, user behavior, and/or other relevant data to detect any signs of cybersecurity incidents. It also includes coordinating with the vendor to receive updates about new threats, patches, and/or improvements to the protection plan. These updates can then be incorporated into the entity's systems to ensure that the protection plan remains up-to-date and effective against evolving cybersecurity threats. In the event of a potential incident, the processing circuits can alert the entity and the vendor, providing information about the incident's nature, scope, and/or potential impact. This allows the entity and the vendor to respond quickly and effectively, reducing the damage and downtime caused by the incident. Furthermore, the processing circuits can analyze the incident to understand its causes, impacts, and/or lessons, and/or use this information to further improve the protection plan and the entity's overall cybersecurity posture.

In some implementations, the processing circuits can model the selected cybersecurity protection plan by testing it within the entity's infrastructure. This can include simulating various scenarios to evaluate the plan's effectiveness and resilience against potential threats. Through this testing process, the processing circuits can identify any gaps, vulnerabilities, and/or implementation issues, ensuring that the plan is not only compatible with the entity's systems but also robust enough to provide the necessary level of protection. In some implementations, a vendor plan can be tested by stepping through the incident response plan as documented, including taking iterative steps to check if the plan would indeed work for a particular modeled threat scenario. By virtually executing the plan and monitoring its response to simulated threats, the processing circuits can assess its practicality and effectiveness, making any necessary adjustments or improvements to ensure optimal incident response readiness. This testing approach enhances the confidence in the selected cybersecurity protection plan, allowing the entity to deploy a proactive and reliable security strategy.

In some implementations, the one or more processing circuits can generate a security posture stream including a timeline of incidents, changes in the security posture, and/or corresponding cybersecurity threat levels. This timeline provides a historical record of the entity's security posture over time. By reviewing the posture stream, the entity can gain insights into the effectiveness of their cybersecurity measures, identify recurring vulnerabilities or patterns, and/or make data-driven decisions for future enhancements. The processing circuits can also apply advanced analytics and machine learning algorithms to the posture stream, facilitating predictive capabilities to anticipate potential threats and proactively strengthen the entity's security posture.

In addition to the aforementioned capabilities, some implementations can leverage generative artificial intelligence (AI) algorithms to enhance the security posture analysis. Generative AI algorithms can analyze large volumes of data from various sources, such as threat intelligence feeds, incident reports, and/or security best practices, to identify patterns, trends, and/or potential vulnerabilities that human analysts can not have detected. By utilizing generative AI, the processing circuits can uncover hidden insights, predict emerging threats, and/or recommend proactive security measures to fortify the entity's defenses. In various implementations, the use of generative AI further augments the capabilities of the processing circuits, enhancing the accuracy, efficiency, and/or scalability of the security posture analysis, and/or ultimately contributing to the overall resilience and robustness of the entity's cybersecurity framework.

Figure 10:
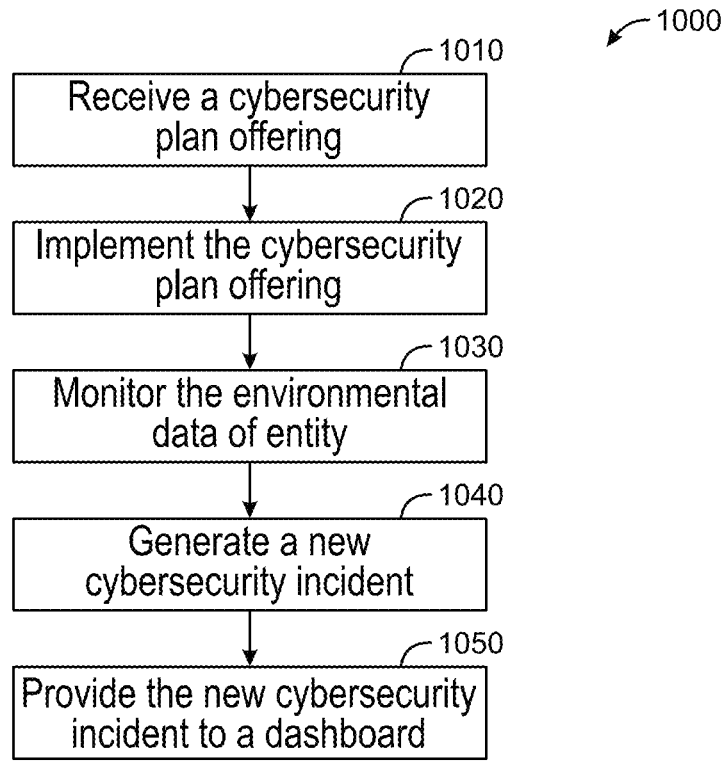
FIG. 10 depicts a flowchart for a method to protect data, according to some implementations.

Referring now to FIG. 10, a flowchart for a method 1000 to protect data, in accordance with present implementations. At least system 100 can perform method 1000 according to present implementations.

In broad overview of method 1000, at block 1010, the one or more processing circuits (e.g., response system 180 of FIG. 1A) can receive a cybersecurity plan offering. At block 1020, the one or more processing circuits can implement the cybersecurity plan offering. At block 1030, the one or more processing circuits can monitor the environmental data of an entity. At block 1040, the one or more processing circuits can generate a new cybersecurity incident. At block 1050, the one or more processing circuits can provide the new cybersecurity incident to a dashboard. Additional, fewer, and/or different operations can be performed depending on the particular implementation. In some implementations, some, and/or all operations of method 1000 can be performed by one or more processors executing on one or more computing devices, systems, and/or servers. In various implementations, at least one (e.g., each) operation can be re-ordered, added, removed, and/or repeated.

At block 1010, the processing circuits can receive one or more cybersecurity plan offerings associated with a third-party. These offerings represent a variety of cybersecurity solutions that the third-party has developed to address different types of threats and vulnerabilities. The offerings can include active plans, which are ready to be implemented immediately, as well as plans that are to be offered on the marketplace for entities to activate. In general, the marketplace is a digital platform where entities can be provided, explore, compare, and/or select the cybersecurity plans that best meet their needs. It provides a wide range of options, catering to entities with different risk profiles, business models, and/or budget constraints. Upon receiving the cybersecurity plan offerings, the processing circuits then provide these offerings to the marketplace. The plans can be made available for activation by a plurality of entities, broadening the third-party vendor's reach and giving them access to a wider customer base. The processing circuits facilitate this process, ensuring that the offerings are presented accurately and attractively in the marketplace.

In some implementations, the processing circuits can receive an activation of a cybersecurity plan offering from an entity's computing system. This signals that the entity has selected a plan from the marketplace and is ready to implement it. The activation triggers a series of processes, including setting up the necessary connections between the entity and the third-party (described in block 1020), configuring the plan according to the entity's specific requirements, and/or monitoring the implementation to ensure that it is successful. In some implementations, the processing circuits can provide the cybersecurity plan offerings to entities for purchase before the modeling process at block 1020 takes place. This is based on one or more third-party customer parameters, which can include factors such as the entity's size, industry, risk profile, and/or specific cybersecurity needs.

In some implementations, the cybersecurity offerings can be tailored and made available only to certain entities based on both or either of the entity and vendor preferences. On one hand, an entity can have specific preferences or needs for cybersecurity protection plans based on their industry, size, geographical location, and/or regulatory requirements. On the other hand, the vendor can also have preferences for the types of entities they cater to, depending on factors such as the entity's risk profile, the vendor's area of expertise, and/or strategic business decisions. This customization of offerings ensures that at least one (e.g., each) entity is presented with cybersecurity plans that are most relevant and suitable for their specific needs, while vendors can focus on providing services to entities that align with their capabilities and business strategy. This bespoke approach to cybersecurity planning enhances the efficiency and effectiveness of the cybersecurity marketplace.

At block 1020, the one or more processing circuits can model the one or more cybersecurity plan offerings, setting the stage for the application of the plans within the entity's infrastructure. For example, this process can being with the generation and activation of a cybersecurity protection obligation between the entity and the third-party vendor. These attributes encapsulate the specifics of the cybersecurity plan, detailing parameters such as the scope of coverage, the service level agreements, the roles and responsibilities of at least one (e.g., each) party, and/or the cost and payment terms, among others. In some implementations, the processing circuits can provide the entity's security posture, entity data, and/or the details of the cybersecurity protection obligation to a third-party computing system of the third-party. This sharing of information can be important to the successful implementation of the cybersecurity plan. The entity's security posture and data allow the third-party to understand the unique cybersecurity landscape of the entity and tailor their offerings accordingly. In some implementations, the processing circuits can provide a public address to the tokenized security posture of the entity. The security posture can provide insights into the entity's existing security framework, potential vulnerabilities, and/or overall security objectives, thereby equipping the third-party with the context necessary to deliver effective protection.

In some implementations, the processing circuits, in response to the activation of the cybersecurity protection obligation, model the activated cybersecurity plan offering. This modeling phase translates the theoretical aspects of the plan into practical measures that are incorporated into the entity's existing infrastructure. It can involve the configuration and deployment of specific cybersecurity tools, the establishment of monitoring protocols, and/or the set-up of incident response mechanisms, among other actions. The completion of this modeling phase signifies the full integration of the cybersecurity plan into the entity's infrastructure, positioning the entity to benefit from enhanced cybersecurity protection. For example, when a state is inconsistent or identified the processing circuits automatically analyze the current configurations of security tools employed by the vendor and the operating systems of the organization. Based on this analysis, appropriate modifications are made to the configurations or the agreement between the vendor and organization, ensuring that the security measures are aligned with the specific needs and risks of the entity.

In some implementations, prior to generating and activating the cybersecurity protection obligations, the one or more processing circuits can underwrite the cybersecurity plan by leveraging the data collected from the insured's security tools and configurations. This data, which provides a and accurate representation of the insured's security posture, is assessed against the underwriting criteria established by the insurer. The processing circuits analyze various factors, including the effectiveness of the security measures implemented, the coverage level provided by the cybersecurity plan, and/or the compliance history of the insured.

For example, a Fortune 500 company is seeking cybersecurity insurance. The processing circuits can collect data from the company's security tools and configurations, including information about their network infrastructure, access controls, incident response protocols, and/or data protection measures. By analyzing this data, the processing circuits can assess the company's overall security posture and identify any potential vulnerabilities or gaps in their defenses. The processing circuits can also evaluate the company's compliance history, including past incidents or breaches, and/or their adherence to industry best practices and regulatory requirements. Based on this analysis, the processing circuits can determine the level of threat associated with insuring the company and provide an accurate underwriting assessment.

In another example, a small business owner who is applying for cybersecurity insurance. The processing circuits can collect data from the business owner's security tools, such as firewalls, antivirus software, and/or intrusion detection systems, as well as information about their data encryption practices and employee training programs. The processing circuits can also assess the business owner's compliance with relevant cybersecurity regulations and their incident response capabilities. By analyzing this data, the processing circuits can evaluate the effectiveness of the security measures in place and determine the level of threat associated with insuring the business. The processing circuits can identify any areas where additional safeguards or improvements can be needed and provide recommendations to mitigate potential risks. Based on this underwriting assessment, the processing circuits can generate a tailored cybersecurity plan that aligns with the business owner's specific needs and offers appropriate coverage for their computing environment.

In some implementations, the processing circuits takes a proactive approach to modeling the cybersecurity plan offerings by engaging in deployment and configuration activities. This involves deploying and configuring third-party tools and various systems within the computing infrastructure of the entity, in accordance with the specific requirements outlined in the cybersecurity plan offerings. Furthermore, in the modeling of the cybersecurity plan offerings, the processing circuits can establish connections and integrate the third-party tools within the existing computing infrastructure of the entity. By establishing these connections and integrating the tools, the processing circuits ensures that the cybersecurity measures are incorporated into the entity's computing environment, creating a holistic and robust defense against potential threats.

At block 1030, the one or more processing circuits initiate a monitoring process, leveraging the plurality of data channels to keep a watch on the environmental data of the entities that are being modeled using the one or more cybersecurity plan offerings. This monitoring process provides real-time and/or near real-time threat detection and response mechanisms. By maintaining a consistent surveillance over the environmental data, the processing circuits can detect any anomalies or deviations that might signify a potential cybersecurity threat or breach. Environmental data in this context refers to an extensive array of information that encapsulates the operational environment of the entities. This data includes network traffic details, system logs, user activity, application activity, and/or other relevant metrics. Importantly, environmental data also includes information about the external threat landscape, such as updates about new types of cyber threats, threat intelligence feeds, and/or other relevant details. By monitoring this data, the processing circuits can maintain an updated understanding of the entity's cybersecurity status.

In some implementations, the monitoring process is carried out using a variety of data channels. These channels can include direct network connections, API feeds, and/or other communication interfaces that allow the processing circuits to tap into the entity's systems. The choice of data channels can depend on the specific architecture and requirements of the entity's information systems. Once the monitoring process is set in motion, the processing circuits are not just passively observing the data flow. They are actively scanning, analyzing, and/or interpreting the environmental data to pick up on any signs of cyber threats. For example, algorithms and artificial intelligence mechanisms can be deployed to sift through the vast volumes of data, identifying patterns and correlations that might escape human scrutiny. Any detected anomalies are promptly flagged, triggering appropriate response mechanisms as in the cybersecurity plan offerings. This continuous, vigilant monitoring is instrumental in ensuring the entity's cybersecurity is always one step ahead of potential threats.

At block 1040, the one or more processing circuits are configured to generate a new cybersecurity incident, this operation is triggered upon detecting an anomaly or potential threat within the environmental data associated with any entity from the plurality of entities. The generation of a new cybersecurity incident is a step in the cybersecurity workflow. It signifies the identification of a potential threat, vulnerability, and/or breach within the entity's systems, based on the analysis of the environmental data. It should be understood that can times the detection of a new cybersecurity incident is not a simple binary process; it can include a multi-faceted analysis of the environmental data. For example, machine learning algorithms, statistical models, neural networks, and/or heuristic rules can be employed to analyze the data for signs of malicious activity. For instance, sudden spikes in network traffic, unusual login attempts, and/or patterns that match known attack signatures can all trigger the generation of a new cybersecurity incident. This incident is then logged and tracked, with all relevant information captured for further analysis and response.

In some implementations, the processing circuits can identify and engage with one or more partners of the third-party vendor. For example, the partners can be other cybersecurity service providers, third-party software vendors, and/or even internal teams within the entity's organization. Through job routing for cases and conditions, as shown in FIG. 15F, the processing circuits categorize the identified gaps and match them to suitable solutions or vendors capable of remedying those gaps. This matching process can be facilitated through an insurer marketplace portal, leveraging the capabilities provided by response system 180. By collaborating with partners, the processing circuits ensure that the entity gains access to the expertise, technologies, and/or resources necessary to address specific security gaps effectively.

In some implementations, the processing circuits facilitate the linking of preferred products or solutions to pre-existing relationships between vendors, customers, and/or insurers. By leveraging the data and insights gathered from the ecosystem partner APIs, the processing circuits can identify vendors that have established relationships with the entity's preferred customers or insurers. This linkage facilitates a streamlined procurement process, where the entity can benefit from pre-negotiated contracts, favorable pricing, and/or tailored solutions. The processing circuits can evaluate the compatibility of preferred products with the entity's security objectives and seamlessly integrate them into the existing cybersecurity infrastructure.

In some implementations, once partners are identified, the processing circuits can configure one or more routing rules that dictate the flow of information and action items in response to the detected cybersecurity incident. These rules can be based on various factors such as the nature of the incident, the specific systems or data affected, the capabilities of the partner, and/or even pre-defined response plans. For instance, if a certain type of cybersecurity incident requires the expertise of a specific partner, the routing rules would ensure that all relevant action items are automatically sent to that partner. In particular, the routing rules facilitate improved and efficient response to cybersecurity incidents, ensuring that the right people are alerted at the right time with the right information. This coordinated, automated response mechanism significantly enhances the overall efficacy of the cybersecurity protection plan, reinforcing the entity's defenses against cyber threats.

At block 1050, the one or more processing circuits can be configured to deliver the newly identified cybersecurity incident to a dashboard managed by the one or more processing circuits In some implementations, the dashboard includes a set of categories under which incidents are organized. These categories include inbound incidents, active incidents, and/or past incidents, at least one (e.g., each) of which provides a different perspective on the entity's cybersecurity status. Inbound incidents refer to newly detected threats or vulnerabilities that have not yet been addressed. They include the security posture information associated with the entity, which gives context about the entity's overall cybersecurity health and potentially vulnerable areas. The information might encompass details about the entity's network architecture, the nature of its data, its existing cybersecurity measures, and/or its previous history of incidents.

In some implementations, active incidents, pertain to ongoing issues that are currently being handled. These incidents come with real-time and/or near real-time status updates and states, providing the third-party with a dynamic view of the incident's progression. The real-time and/or near real-time statuses can include information on the current stage of incident response, such as investigation, containment, eradication, and/or recovery. The states can describe the condition of the incident, like open, pending, escalated, and/or closed, which helps in understanding the immediate attention that an incident requires.

In some implementations, past incidents consist of resolved threats or breaches and serve as a historical record of the entity's cybersecurity events. Moreover, the dashboard can include an Incident Room for at least one (e.g., each) of the active incidents. An Incident Room can serve as a dedicated space for collaborative incident response, where all relevant parties can communicate, share updates, and/or coordinate their actions. It consolidates all information related to a particular incident, such as logs, alerts, action plans, timelines, and/or other relevant data, thereby facilitating a streamlined and efficient response process. In some implementations, the Incident Room also facilitates the tracking of response efforts, ensuring accountability and promoting continuous improvement in the entity's cybersecurity practices.

In some implementations, the one or more processing circuits can automatically renew at least one of the one or more cybersecurity plan offerings with at least one of the plurality of entities. The automation process is designed to ensure continuity of protection by eliminating the risk of lapses due to manual renewal processes. This can be achieved by tracking the expiry dates of the cybersecurity plans and triggering the renewal process in advance. The renewal terms can be based on the existing contract between the entity and the third-party, and/or they can be subject to negotiation. The process also includes updating the entity's profile and security posture, and/or recalibrating the cybersecurity plan's specifications to align with any changes that can have occurred in the entity's environment or needs. Notifications about the renewal process, including any changes in terms or pricing, can be sent to the entity and vendor.

In some implementations, the automatic renewal process for cybersecurity plan offerings is built on procedures to ensure a seamless and efficient experience for both the entities and vendors. The processing circuits keep track of the expiration dates of the cybersecurity plans and initiates the renewal process in advance, eliminating the need for manual intervention and mitigating the risk of coverage lapses. The renewal terms and conditions can be based on the existing contract between the entity and the third-party vendor, ensuring consistency and alignment with the agreed-upon terms. In addition to the contractual aspects, the processing circuits can also takes into account any changes in the entity's profile, security posture, and/or specific needs, allowing for the recalibration of the cybersecurity plan's specifications to provide tailored protection. Throughout the renewal process, notifications are sent to the entity and the vendor, providing updates on any changes in terms, pricing, and/or other relevant information, facilitating transparency and effective communication between all parties involved.

In some implementations, in response to receiving an indication of the completion of the new cybersecurity incident, the processing circuits can automatically generate and provide an invoice of the new cybersecurity incident to the entity. The invoice can include details such as the type of incident, the duration of the response, resources utilized, and/or the cost associated with at least one (e.g., each) line item. The processing circuits can also include explanations of at least one (e.g., each) charge, allowing the entity to understand the cost drivers. Furthermore, upon completion of the new cybersecurity incident, the processing circuits can generate an incident summary. The summary can include a report that provides an overview of the incident from origination to resolution. It includes performance metrics such as the time to detect the incident, time to respond, time to contain, and/or time to recover. These metrics can provide insights into the effectiveness and efficiency of the entity's incident response process. Origination details can provide information about the source of the incident, its nature, and/or how it infiltrated the entity's defenses, which can be crucial for future prevention strategies. The incident timeline can be a chronological representation of the incident's progression and the response activities, providing a clear picture of the incident's lifecycle. The incident summary can be provided to the entity and relevant stakeholders, serving as a valuable resource for post-incident reviews, improvement of security strategies, and/or compliance reporting.

In some implementations, the processing circuits can collect cybersecurity data from the third-party tool interface and analyze and identify the data that aligns with the underwriting requirements. This analysis involves matching the collected cybersecurity data with the specific underwriting criteria, ensuring that the plan meets the necessary standards and guidelines. Once the data has been identified and categorized, the processing circuits package the information and seamlessly provide it to an application programming interface (API). This API serves as a conduit for transmitting the wrapped cybersecurity data, along with the underwriting requirements, to the underwriting system.

Figure 11:
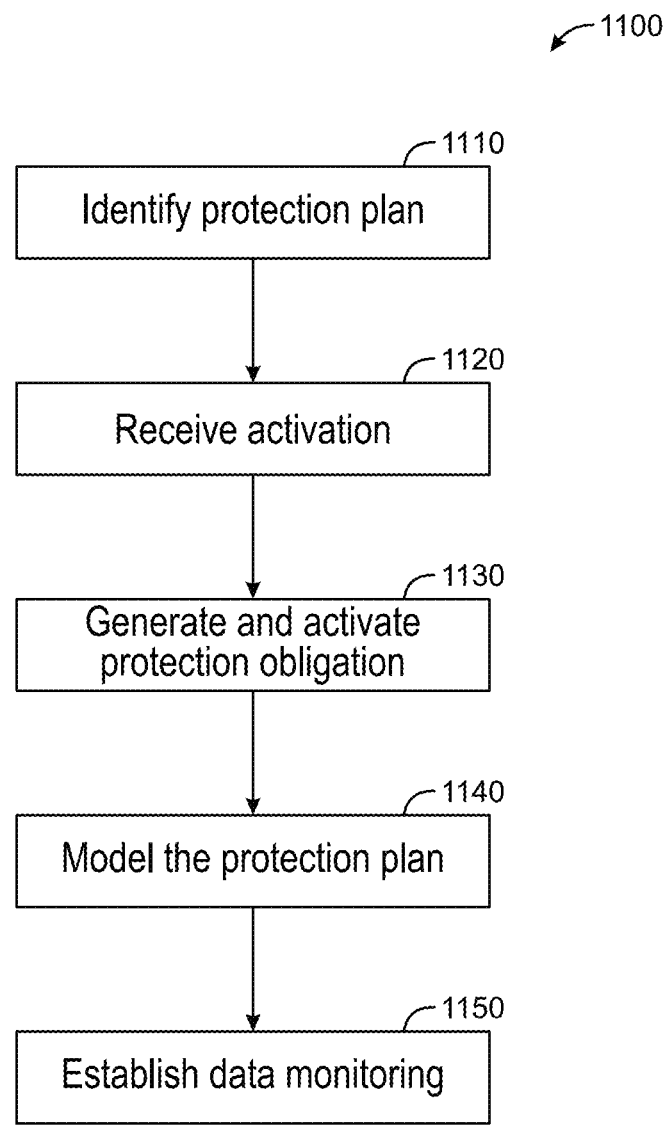
FIG. 11 depicts a flowchart for a method to protect data, according to some implementations.

Referring now to FIG. 11, a flowchart for a method 1100 to protect data, in accordance with present implementations. At least system 100 can perform method 1100 according to present implementations.

In broad overview of method 1100, at block 1110, the one or more processing circuits (e.g., response system 180 of FIG. 1A) can identify a protection plan. At block 1120, the one or more processing circuits can receive activation. At block 1130, the one or more processing circuits can generate and activate protection obligation. At block 1140, the one or more processing circuits can model the protection plan. At block 1150, the one or more processing circuits can establish data monitoring. Additional, fewer, and/or different operations can be performed depending on the particular implementation. In some implementations, some, and/or all operations of method 1100 can be performed by one or more processors executing on one or more computing devices, systems, and/or servers. In various implementations, at least one (e.g., each) operation can be re-ordered, added, removed, and/or repeated.

At block 1110, the processing circuits identify at least one cybersecurity protection plan associated with a plurality of third-parties. This identification process is guided by the previously modelled cybersecurity attributes, ensuring that the identified protection plan is relevant to the entity's cybersecurity needs. For example, the protection plan can be offered by a first third-party and a second third-party. at least one (e.g., each) of these plans is associated with the new cybersecurity attribute, demonstrating their capacity to address the specific cybersecurity needs identified during the modeling process. To provide more choice and flexibility for the entity, at least one (e.g., each) cybersecurity protection plan is associated with one of several availability states.

At block 1120, the processing circuits are configured to receive an activation request from the entity's computing system for a selected cybersecurity protection plan. This activation signifies the entity's commitment to implementing the chosen protection plan. It might be, for example, that the entity has decided to proceed with the cybersecurity protection plan associated with the first third-party. The activation request signals the entity's decision to the processing circuits and triggers the next step in the process. Still at block 1120, the processing circuits generate and activate a cybersecurity protection obligation between the entity and the first third-party. This protection obligation represents a formal agreement between the entity and the third-party provider, stipulating the provision of cybersecurity services as per the selected protection plan. In some implementations, the protection obligation includes a plurality of protection attributes, which can include the specific services to be provided, the duration of the agreement, the obligations of at least one (e.g., each) party, and/or the terms for monitoring, reporting, and/or responding to cybersecurity incidents. The activation of this obligation effectively sets the selected cybersecurity protection plan into motion, transitioning the entity into a phase of enhanced cybersecurity protection.

The process of generating and activating a cybersecurity protection obligation involves several steps, for example, the creation of a formal contractual agreement between the entity and the third-party vendor. This contract outlines the scope and specifics of the cybersecurity services to be provided, in line with the selected protection plan. The document can detail the responsibilities and obligations of both parties, including the specific cybersecurity tasks to be undertaken by the vendor, and/or the cooperation and access required from the entity. The contract can be reviewed by both parties, and/or sometimes the processing circuits can automatically begin executing to fulfil contract terms based on previous relationship or authorizations by the vendor and/or entity. In some implementations, the processing circuits can generate an invoice for the entity, reflecting the cost of the cybersecurity services as per the agreed-upon protection plan. This invoice might include details such as the price of individual services, any discounts or package deals, taxes, and/or payment terms. Payment processing can also be facilitated through the processing circuits, providing a seamless and convenient transaction experience for the entity.

At block 1130, the processing circuits provide the security posture, the entity data, and/or the cybersecurity protection obligation to the third-party computing system of the chosen vendor. This information transfer allows the vendor to understand the current cybersecurity state of the entity, their specific needs, and/or the obligations outlined in the protection plan. In particular, following financial settlement or prior to financial settlement based on the agreement, the processing circuits can provide the vendor the necessary access to the entity's infrastructure. In some implementations, this can be achieved through a secure Application Programming Interface (API), which allows the vendor's systems to interact directly with the entity's systems. The API can provide the vendor with access to various aspects of the entity's infrastructure, depending on the services outlined in the protection plan. For instance, it can allow the vendor to monitor network traffic, manage security protocols, and/or deploy software patches. In some implementations, there can be two separate APIs where the entity communicates with the processing circuits via a first API and the vendor communicates with the processing circuits via a second API. Thus, the activation of the cybersecurity protection obligation signifies the commencement of the cybersecurity services. It represents the implementation phase of the protection plan, where the vendor starts executing the agreed-upon services, guided by the contract terms and facilitated by the access provided through the API. This activation indicates a transition from the planning stage to the action stage, setting the entity on a path towards improved cybersecurity.

At block 1140, the processing circuits model the cybersecurity protection plan. This involves configuring the vendor's tools and systems to work within the entity's infrastructure, based on the agreed-upon rules of engagement. This configuration process can be automated, with the processing circuits sending specific instructions to the vendor's systems via an API. These instructions can include access permissions, monitoring parameters, alert settings, and/or various other operational details that will guide the execution of the protection plan. The successful modeling of the protection plan at this stage provides that the vendor's systems are well-integrated into the entity's infrastructure and are ready to provide the required cybersecurity services.

In order to implement (or deploy/configure) (e.g., model) the protection plan and integrate the vendor's tools into the entity's infrastructure, several steps can be taken. In some implementations, the organization can establish the necessary credentials and permissions for the vendor to access the relevant systems or platforms. For example, if the entity utilizes AWS for its cloud infrastructure, the organization can provide the vendor with the required AWS credentials to facilitate the deployment of their tools on the entity's EC2 instances. In various implementations, the organization can leverage automation capabilities to streamline the deployment process. This automation can be set up to automatically deploy the vendor's tools to the appropriate systems within the entity's infrastructure. By defining clear rules and configurations, the automation system can ensure that the deployment is consistent, efficient, and/or aligned with the organization's security requirements. During the deployment process, the processing circuits can monitor the progress and provide real-time and/or near real-time feedback on the integration of the vendor's tools. They can validate that the tools are properly installed, configured, and/or connected to the relevant components within the entity's infrastructure.

For example, suppose an organization operates a cloud-based infrastructure using platforms like Amazon Web Services (AWS). To integrate the vendor's tools into this environment, the organization can leverage automation tools. They can create infrastructure-as-code templates that define the desired state of the infrastructure and include the necessary configurations for deploying the vendor's tools. Using these templates, the organization can automatically provision the required infrastructure components, such as EC2 instances, security groups, and/or networking resources. The templates can be configured to install and configure the vendor's tools on the provisioned instances, ensuring that they are integrated into the organization's cloud environment.

In another example, in the case of endpoint security solutions, the organization can have a diverse range of devices and operating systems across its network. To integrate the vendor's endpoint security tools into these devices, the organization can utilize a unified endpoint management (UEM) platform (e.g., executed and deployed by the response system 180 and stored in database 540). The UEM platform can provide a centralized management console and agent-based deployment capabilities. The organization can configure the UEM platform to push the vendor's endpoint security agent to all managed devices within the network. The agent can be configured to communicate with the vendor's cloud-based security platform or an on-premises management server. Through the UEM platform, the organization can enforce security policies, monitor endpoint activities, and/or receive alerts and notifications from the vendor's tools.

In some implementations, the configuration of vendor tools is carried out by customizing the settings and parameters to align with the organization's specific security requirements. This includes defining rules, policies, and/or thresholds within the tools to effectively monitor, detect, and/or respond to security incidents. For instance, configuring firewalls to enforce access control policies, fine-tuning intrusion detection systems to detect specific attack patterns, and/or setting up encryption protocols for secure data transmission. In some implementations, establishing connections between the vendor's tools and the organization's infrastructure allows for data flow and security monitoring. This involves integrating the tools with existing systems, such as log management platforms, identity and access management solutions, and/or security information and event management (SIEM) systems. Through these integrations, the organization can consolidate and correlate security events, streamline incident response workflows, and/or gain a comprehensive view of the overall security posture. In some implementations, the deployment and implementation of vendor tools encompass the installation, activation, and/or configuration of the tools within the organization's environment. This can involve deploying software agents on endpoints, installing network appliances or sensors, and/or provisioning virtual instances in cloud environments. The deployment process ensures that the vendor tools are properly installed, connected, and/or ready to perform their intended functions. In some implementations, testing and validation procedures are conducted after the deployment phase to ensure the effectiveness and reliability of the vendor tools and connections. This includes testing the tools' functionality, performance, and/or interoperability with other systems. Security assessments, vulnerability scans, and/or penetration testing can also be conducted to verify the tools' capability to detect and respond to various threats and attacks.

In some implementations, modeling, as part of the implementation process, refers to the systematic and strategic approach of configuring, integrating, and/or deploying vendor tools and connections within an organization's infrastructure. This involves a series of steps to ensure that the tools are appropriately tailored to meet the organization's specific security needs and seamlessly integrated with existing systems and processes. During the modeling phase, organizations collaborate closely with the vendor to define and customize the configuration settings of the tools. This includes determining the appropriate thresholds, policies, and/or rules that align with the organization's security objectives. For example, the modeling process can involve fine-tuning intrusion detection systems to detect specific attack patterns or configuring security information and event management (SIEM) systems to correlate and analyze security events effectively. Once the configuration settings are defined, the modeling process moves to the deployment stage. This can include the installation, activation, and/or integration of the vendor tools within the organization's infrastructure. The tools are deployed across various components, such as endpoints, network devices, servers, and/or cloud environments, to provide comprehensive security coverage. To ensure the successful integration and functionality of the vendor tools, thorough testing and validation are conducted during the modeling phase. Accordingly, the modeling process encompasses the implementation and deployment of vendor tools and connections. It involves configuring the tools to match the organization's security requirements, integrating them within the existing infrastructure, and/or conducting thorough testing to ensure their effectiveness.

At block 1150, the processing circuits establish a continuous data monitoring channel between the entity and the vendor. This involves the creation of two secure communication connections using APIs. The first connection is established between the entity's computing system or assets and the processing circuits, allowing the circuits to monitor the entity's systems in real-time and/or near real-time. The second connection is established between the vendor's computing system and the processing circuits, allowing the vendor to receive real-time and/or near real-time updates and alerts about the entity's security status. This continuous data monitoring channel can be a component of the protection plan, as it allows for immediate (or periodic) detection and response to any cybersecurity incidents. It ensures that the vendor is up-to-date with the entity's security status and can provide the necessary support promptly and efficiently.

In some implementations, the processing circuits can respond to changes in the security objectives or the security posture of the entity. When the processing circuits receive an updated security objective from the plurality of security objectives or detect a new security objective, and/or when they detect a change in the security posture, the processing circuits can determine an updated cybersecurity attribute of the set of cybersecurity attributes of the entity. This can be a dynamic process, reflecting the fact that cybersecurity is not a static data structure. As threats evolve and the entity's business environment changes, its security objectives and posture can need to be adjusted. The processing circuits are designed to handle such changes, updating the entity's cybersecurity attributes as needed to ensure that the protection plan remains effective.

Once the updated cybersecurity attribute has been determined, the processing circuits then reconfigure the security objective via the second API. This reconfiguration can involve adjusting the parameters of the security objective, changing its priorities, and/or even replacing it entirely with a new objective. In some implementations, this process can be done in consultation with the vendor and the entity, ensuring that any changes to the security objective align with the entity's current needs and risk tolerance. The reconfiguration via the second API allows these changes to be implemented promptly and seamlessly, reducing any potential disruption to the entity's operations. In some implementations, when an objective of the entity is updated, the processing circuits analyze the corresponding state data, which includes information about the entity's safeguards, coverage, threats, insurance, and/or other relevant factors. If the analysis reveals an imbalance or a gap in the combination of these factors, the processing circuits notify the entity (e.g., through a gap manager). For example, this notification prompts the entity to take automated actions to address the gap, such as modifying insurance policies, adjusting technology configurations, and/or implementing additional security measures.

For example, assume a Fortune 500 company has experienced a significant increase in targeted cyber threats aimed at their customer data. Through the analysis of the state data, the processing circuits identify a gap in the entity's existing security objective related to data protection. The gap manager alerts the entity about this imbalance and triggers an automated response. The processing circuits, in consultation with the entity and the vendor, reconfigure the security objective to prioritize enhanced data encryption, real-time and/or near real-time monitoring, and/or incident response measures. In the above example, the second API can be utilized to promptly implement these changes across the organization's infrastructure, ensuring that the security objective is aligned with the heightened threat landscape.

Figure 12:
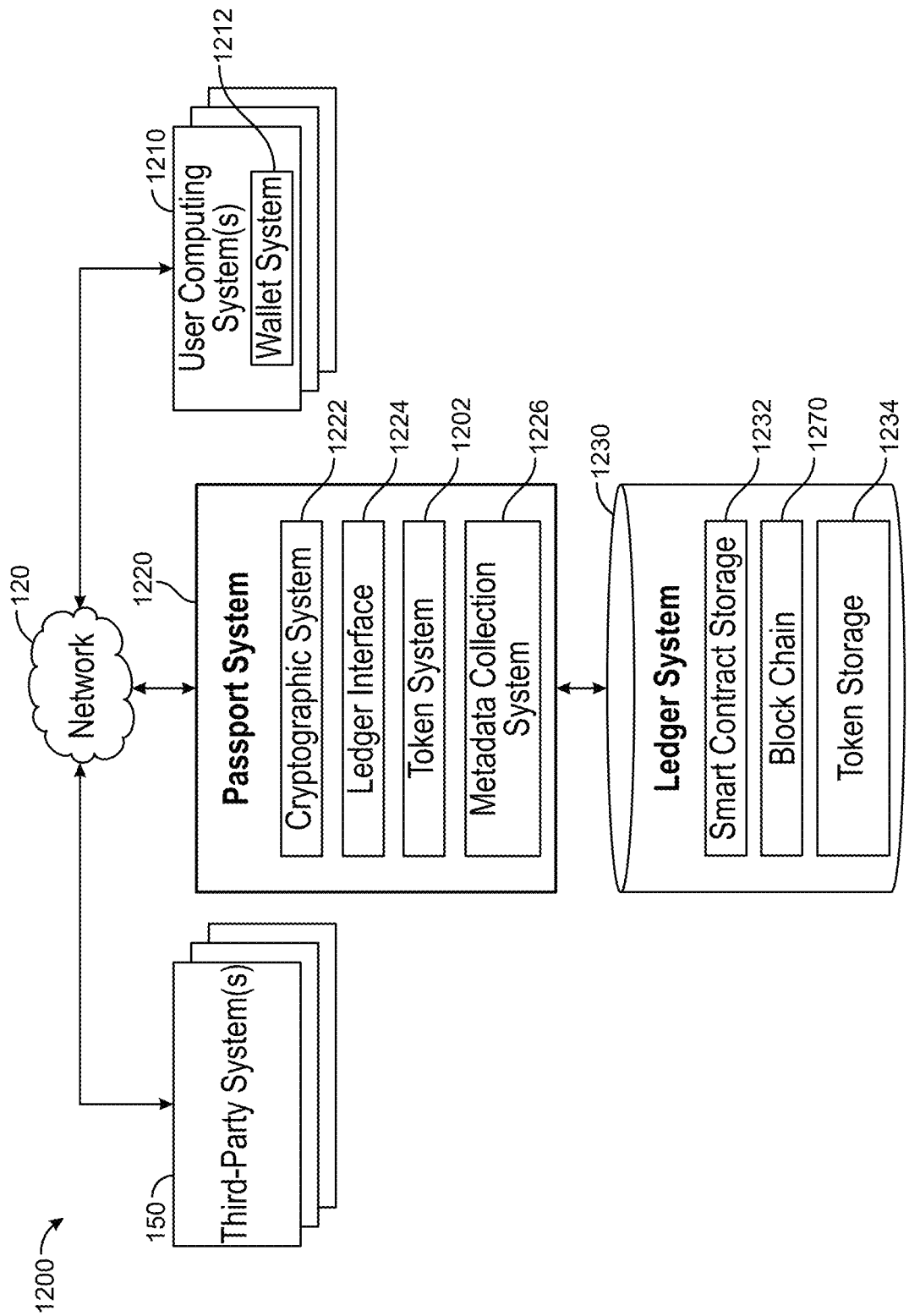
FIG. 12 depicts a block diagram of an implementation of a system for cyber resilience tokenization, according to some implementations.

Systems and Methods for Security Intelligence Exchange Cyber Resilience Tokenization Referring to FIG. 12, a block diagram of an implementation of a system for cyber resilience tokenization is shown, according to some implementations. The implementation shown in FIG. 12 can include user computing system(s) 1210, third-party system(s) 150 (also referred to herein as "third-party devices 150", "third-party systems 150", and/or "third-party devices 150"), a passport system 1220, and/or a ledger system 1230. In some implementations, the user computing system(s) 1210 can include a wallet system 1212. In some implementations, the user computing system(s) 1210 can be similar to entity computing system(s) 130 described herein. In some implementations, the passport system 1220 can include a cryptographic system 1222, a ledger interface 1224, a token system 1202, and/or a metadata collection system 1226. In some implementations, the ledger system 1230 can include smart contract storage 1232, blockchain 1270, and/or token storage 1234. These components can be interconnected through a network 120 that supports secure communications profiles (e.g., TLS, SSL, HTTPS, etc.). In some implementations, the passport system 1220 can incorporate the same or similar features and/or functionality as described regarding the response system 530 of FIG. 5. Although the various computing elements of FIG. 12 can be described in the singular form (e.g., user computing system 1210, third-party system 150, etc.), it should be understood that the implementation shown in FIG. 12 can include two or more of any device/system described herein (e.g., two or more user computing system(s) 1210, two or more third-party system(s) 150, etc.).

Each system or device of FIG. 12 can include one or more processors, memories, network interfaces (sometimes referred to herein as a "network circuit") and user interfaces (e.g., GUIs). The memory can store programming logic that, when executed by the processor, controls the operation of the corresponding computing system or device. The memory can also store data in databases. For example, memory can store programming logic that when executed by a processor within a processing circuit, causes a database to update parameters or store a system or event log. The network interfaces can allow the computing systems and devices to communicate wirelessly or otherwise. The various components of devices in system 1200 can be implemented via hardware (e.g., circuitry), software (e.g., executable code), and/or any combination thereof. Devices, systems, and/or components in FIG. 12 can be added, deleted, integrated, separated, and/or rearranged in various implementations of the disclosure.

Generally, the user computing system(s) 1210, third-party system(s) 150, passport system 1220, and/or ledger system 1230, wallet system 1212, cryptographic system 1222, ledger interface 1224, token system 1202, metadata collection system 1226, smart contract storage 1232, blockchain 1270, token storage 1234, and/or network 120 can include one or more logic devices, which can be one or more computing devices equipped with one or more processing circuits that run instructions stored in a memory device to perform various operations. The processing circuit can be made up of various components such as a microprocessor, an ASIC, and/or an FPGA, and/or the memory device can be any type of storage or transmission device capable of providing program instructions. The instructions can include code from various programming languages commonly used in the industry, such as high-level programming languages, web development languages, and/or systems programming languages. The user computing system(s) 1210, third-party system(s) 150, passport system 1220, and/or other various components of FIG. 12 can also include one or more databases for storing data that receive and provide data to other systems and devices on the network 120.

In some implementations system 1200 can incorporate or otherwise perform operations as previously discussed in regards to FIGS. 1-3. For example, the passport system 1200 can be used by system 100 to generate tokens including compliance levels and other data of an entity (e.g., via the token generation circuit 186). Token system 1202 can include or be communicable coupled with a token generation circuit (e.g., token generation circuit 186) to generate any of the various tokens described herein for one or more organizations. For example, token system 1202 and/or token generation circuit 186 can generate a compliance token, an insurability compliance token, a cyber security compliance token, a coverage token, a threat token, and/or other tokens relating to the cyber resilience of an organization.

Generally, the passport system 1220 can execute and/or be utilized to execute various processes and/or tasks corresponding with modeling cyber resilience data. In some implementations, the passport system 1220 can be utilized by an agent system such as a function or subfunction of an agent system. For example, agent system can have as a function, the passport system 1220, which can provide a single sign-on gateway (e.g., using an identity management system like Auth0) facilitating access to an associated security posture of a user, threat, incident, and/or insurance data sets using data sets encapsulated within various tokens. For example, the passport system 1220 can generate a token (e.g., a passport) linked to various additional tokens and further linked to a control structure restricting access to one or more of the additional tokens based on rules (e.g., RBACs). For example, a cyber resilience identifier (e.g., passport) of an entity can include entity data and/or additional cyber resilience data stored in tokens, and/or the passport system 1220 can provide and/or restrict access to one or more portions of the tokenized data based on various conditions, entity types, data types, regulations, etc. That is, an entity can have a control structure with access controls and a passport created by the passport system 1220 linked to both sensitive (e.g., private) and non-sensitive (e.g., public) data, and/or the passport system 1220 can deny access (e.g., to sensitive data) and provide access (e.g., to non-sensitive data) based the access control (e.g., whether the user to access the data is a customer, insurer, vendor, MDR/XDR provider, etc.).

Generally, the passport system 1220 can provide secure access to token-related data and facilitate interactions between different cybersecurity systems and data sources of FIG. 12 (e.g., user computing systems 1210, third-party systems 150, ledger system 1230, etc.) based on various access controls. For example, the passport system 1220 can create a cyber resilience identity with tokens and rule-based access controls controlling access to the tokens. For example, the passport system 1220 can generate a passport for a third-party linked to controls such that the third-party can only access their own data within the token structure. In some implementations, a third-party entity can use the passport system 1220 to access performance tokens stored in the token structure, such as in a passport associated with the cybersecurity status of an entity, with RBAC rules restrict other entities from viewing or modifying these tokens. Another example can include third-party vendors having access to their own evaluation tokens that include the results of security assessments relevant to their services, without the ability to access data from other vendors.

In some implementations, the passport system 1220 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the passport system 1220 can include an interface circuit and function circuit.

In some implementations, the passport system 1220 can model cyber resilience data using cyber resilience identities and associated metadata. For example, the passport system 1220 can use templates to structure cyber resilience data and apply attributes to model various cyber resilience metrics (e.g., threat detection capabilities, response readiness). In some implementations, the passport system 1220 can receive or identify cyber resilience data. For example, the passport system 1220 can collect data from various sources, including security incident reports, vulnerability assessments, and/or system performance metrics. In some implementations, the passport system 1220 can encrypt a portion of the cyber resilience data. For example, the passport system 1220 can apply cryptographic techniques to secure sensitive information within the cyber resilience dataset, such as private keys or confidential incident data. In some implementations, the passport system 1220 can generate a metadata object including metadata of cyber resilience data. For example, the metadata object can include information such as data creation timestamps, data source identifiers, and/or encryption keys. In some implementations, the passport system 1220 can generate a cyber resilience identity including at least a link with the metadata object, a unique identifier (UID), and/or a performance event dataset. For example, the cyber resilience identity can include a URI linking to the metadata object, a UID for tracking the identity, and/or a dataset summarizing key performance events. In some implementations, the cyber resilience identity and/or associated data (e.g., linked tokens) can be secured or protected using quantum-safe encryption and/or digital signature techniques.

In some implementations, the passport system 1220 can encapsulate the cyber resilience identity within a control structure restricting one or more updates and redemptions of the metadata object. For example, the control structure can use access controls and permission rules to prevent unauthorized modifications or access to the metadata object. In some implementations, the passport system 1220 can determine at least one access data structure being compatible with the control structure. For example, the passport system 1220 can analyze data structures such as access control lists (ACLs) or role-based access controls (RBAC) to facilitate compatibility with the control structure. In some implementations, the passport system 1220 can broadcast, using the control structure, the cyber resilience identity to a ledger or distributed ledger. For example, the passport system 1220 can publish the cyber resilience identity to an agent network, and/or the identify can be securely recorded and accessed by authorized entities via the agent network.

In some implementations, the token system 1202 can generates various tokens. In some implementations, the token system 1202 can generate cyber resilience identities (e.g., a passport including a token linked to various additional tokens with metadata). That is, generating the cyber resilience identities can include generating tokens that include metadata objects or metadata with information corresponding to components and/or metrics of a cybersecurity posture of an entity, such as firmographic information, security safeguards, threat detection capabilities, incident response data, compliance metrics, and/or other relevant cybersecurity information. For example, the token system 1202 can generate, mint, and/or otherwise create unified safeguard tokens, unified requirements tokens, performance tokens, coverage tokens, incident readiness tokens, insurability readiness tokens, gap tokens, effectiveness tokens, and/or various additional tokens. For example, the token system 1202 can structure a token to encapsulate data sets related to different aspects of cybersecurity such that a set of tokens can facilitate an evaluation of a security status of an entity (e.g., by an insurer or vendor). The various tokens generated by the token system 1202 and encapsulated in cyber resilience identities are described in greater detail herein.

In some implementations, the cyber resilience identities can include a coverage token. The coverage token can be structured to store information about insurance policies, including policy numbers, premium amounts, and/or coverage data. That is, the token system 1202 can generate a coverage token when insurance coverage of entity data is to be documented and managed. For example, the coverage token can be created to include policy information such as the insured client, domain, and/or premium data. In generating the cyber resilience identities, the coverage token generated by the token system 1202 can include data on insurance coverage, retention terms, and/or claims associated with the policy. For example, the coverage token can store data related to premium payment schedules, policy numbers, and/or claim UIDs that are linked to an insurance policy of an entity corresponding to a cyber resilience identity. In some examples, a coverage agent can generate, receive, transmit, update, and/or otherwise model one or more coverages tokens.

In some implementations, the cyber resilience identities can include an effectiveness token. The effectiveness token can be structured to store a record of security effectiveness of an organization over time, linking to historical data through performance tokens and capturing outcomes related to incidents and claims. That is, the token system 1202 can generate an effectiveness token to document and evaluate the results of past and ongoing security measures within an organization. For example, the effectiveness token can be generated to include the effectiveness token UID, the creation date, a list of performance tokens, and/or outcomes related to security incidents and claims. In generating the cyber resilience identities, the effectiveness token generated by the token system 1202 can include references to associated performance tokens, incident tokens, and/or claims tokens, providing a longitudinal view of security effectiveness. For example, the effectiveness token can include data indicative of how various incidents have impacted the security posture of the organization over time, including the effectiveness of response efforts and any gaps identified during evaluations. In some examples, an effectiveness agent can generate, receive, transmit, update, and/or otherwise model one or more effectiveness tokens.

In some implementations, the cyber resilience identities can include a gaps token. The gaps token can be structured to record and track information about vulnerabilities and compliance issues within IT infrastructure of an organization. That is, the token system 1202 can generate a gaps token to identify and monitor security gaps that can affect cybersecurity posture of an organization. For example, the gaps token can be generated to include a gap UID, timestamp, description of the vulnerability, impact description, severity rating, and/or recommended actions for remediation. In generating the cyber resilience identities, the gaps token generated by the token system 1202 can include metadata about at least one (e.g., at least one (e.g., each)) identified gap, including the category of the threat, impact on confidentiality, integrity, and/or availability, and/or references to external resources for further information. For example, the gaps token can capture the severity of a local privilege escalation vulnerability in an IT infrastructure of an organization and provide recommendations for mitigating the threat. In some examples, a gaps agent can generate, receive, transmit, update, and/or otherwise model one or more gaps tokens.

In some implementations, the cyber resilience identities can include an IOC (Indicators of Compromise) token. The IOC token can be structured to store and describe indicators of malicious activity detected within an environment of an organization. That is, the token system 1202 can generate an IOC token to catalog and track known indicators of compromise that are associated with cybersecurity incidents. For example, the IOC token can be generated to include a indicator UID, type of indicator (e.g., file hash), description of the indicator, and/or a pattern representing the malicious activity. In generating the cyber resilience identities, the IOC token generated by the token system 1202 can include data such as the confidence level in the indicator (e.g., high, medium, low, and/or a scale between 1 and 10), the type of malicious activity it represents, and/or the pattern or signature detected. For example, the IOC token can store information about a malicious file hash associated with a known malware instance, helping to identify and respond to similar threats in the future. In some examples, a compliance agent can generate, receive, transmit, update, and/or otherwise model one or more compliance tokens.

In some implementations, the cyber resilience identities can include an incident token. The incident token can be structured to capture information about a cybersecurity incident, including the type, date, outcome, and/or associated claims data. That is, the token system 1202 can generate an incident token to document and manage the lifecycle of a cybersecurity incident within an organization. For example, the incident token can be generated to include a incident UID, the title of the incident, incident data such as the type of attack, impacted data, response actions taken, and/or the associated costs. In generating the cyber resilience identities, the incident token generated by the token system 1202 can include references to related tokens, such as TTPs (Tactics, Techniques, and/or Procedures) tokens, IOC tokens, and/or breach team data, providing an overview of the incident. For example, the incident token can document the timeline of a ransomware attack, the response efforts, the root cause analysis, and/or the financial impact on the organization. In some examples, an incident response agent can generate, receive, transmit, update, and/or otherwise model one or more incident tokens.

In some implementations, the cyber resilience identities can include a performance token. The performance token can be structured to provide a record of evaluations associated with safeguards and requirements within an organization at a time. That is, the token system 1202 can generate a performance token to store the results of evaluations and assessments related to the cybersecurity safeguards of the organization. For example, the performance token can be generated to include a performance token UID, the date of creation, safeguard results, safeguard transformation results, and/or comparison results against predefined requirements. In generating the cyber resilience identities, the performance token generated by the token system 1202 can include outcomes of safeguard evaluations, transformation proofs, and/or any identified gaps in compliance at a point in time. For example, the performance token can track the effectiveness of endpoint security measures, document how well the measures meet the thresholds, and/or identify areas for improvement. In some examples, a performance agent can generate, receive, transmit, update, and/or otherwise model one or more performance tokens.

In some implementations, the cyber resilience identities can include a ransom token. The ransom token can be structured to capture data about a ransomware incident, including ransom demands, payment data, and/or outcomes. That is, the token system 1202 can generate a ransom token to document and manage the specifics of a ransomware event within an organization. For example, the ransom token can be generated to include a ransom UID, the incident UID it is associated with, data of the ransomware attack such as the group involved, payment wallet address, currency type, and/or the outcome of the payment. In generating the cyber resilience identities, the ransom token generated by the token system 1202 can include references to the breach team involved, post-incident follow-up data, and/or information about the threat actor. For example, the ransom token can document the financial impact of the ransom payment, the success rate of data decryption, and/or ongoing risks posed by the threat actor.

In some implementations, the cyber resilience identities can include a TTPs (Techniques, Tactics, and/or Procedures) token. The TTPs token can be structured to provide an overview of a detected cybersecurity threat event, outlining the tactics, techniques, and/or procedures identified. That is, the token system 1202 can generate a TTPs token when to document and analyze adversarial behaviors detected during a cybersecurity incident. For example, the TTPs token can be generated to include a TTP UID, the event data such as the event code, provider, start and end time, and/or description of the event, as well as information about the threat, including the tactic employed, techniques used, procedures followed, and/or the threat actor involved. In generating the cyber resilience identities, the TTPs token generated by the token system 1202 can include observations from the event, such as the actions taken by the adversary, the outcome of those actions, and/or any data artifacts observed. For example, the TTPs token can document a phishing attack, detailing how it was executed, the tools used by the attacker, and/or the impact on the organization.

In some implementations, the cyber resilience identities can include a unified asset token. The unified asset token can be structured to provide information about the assets managed within an organization, including types, operational statuses, and/or associated identifiers. That is, the token system 1202 can generate a unified asset token when to document and manage the lifecycle of assets within an IT infrastructure of an organization. For example, the unified asset token can be generated to include an asset UID, the date of creation, asset data such as type, name, description, location, and/or owner, and/or the operational status of the asset. In generating the cyber resilience identities, the unified asset token generated by the token system 1202 can include identifiers and sources related to the asset, such as inventory data, cloud provider information, and/or any additional metadata. For example, the unified asset token can document an operational status of a server, its cloud instance data, and/or any associated identifiers such that an organization can track and monitor assets.

In some implementations, the cyber resilience identities can include an incident readiness token. The incident readiness token can be structured to capture the attributes that demonstrate a preparedness of an organization for responding to cybersecurity incidents. That is, the token system 1202 can generate an incident readiness token to document and verify a capability of an organization to handle cybersecurity incidents effectively. For example, the incident readiness token can be generated to include a incident readiness UID, the associated passport UID, and/or a description of the readiness of the organization to respond to cybersecurity incidents. In generating the cyber resilience identities, the incident readiness token generated by the token system 1202 can include attributes such as the incident response plan, training and awareness programs, tools and technologies used, and/or testing exercises conducted. For example, the incident readiness token can document the annual incident response plan updates of the organization, quarterly training sessions, and/or various additional tools and technologies in place to detect and mitigate cybersecurity threats.

In some implementations, the cyber resilience identities can include an insurability readiness token. The insurability readiness token can be structured to capture the attributes used for an organization to qualify for cybersecurity insurance, including risk assessments, security measures, and/or incident history. That is, the token system 1202 can generate an insurability readiness token to document and assess a preparedness of an organization for obtaining cybersecurity insurance. For example, the insurability readiness token can be generated to include a insurability readiness UID, the carrier UID, the associated passport UID, and/or a description of the preparedness of the organization for cybersecurity insurance. In generating the cyber resilience identities, the insurability readiness token generated by the token system 1202 can include attributes such as risk assessments, security measures, documentation and compliance, and/or incident history. For example, the insurability readiness token can document the annual risk assessments of the organization, the implementation of strong cybersecurity controls, and/or the effective mitigation of past incidents, providing an overview of the qualifications of the organization for cybersecurity insurance.

In some implementations, the cyber resilience identities can include or be associated with a passport, which can be a token or a distinct entity interacting with other tokens. The passport can be structured to encapsulate information about an entity, including firmographic data, indicators of cybersecurity readiness, and/or more. That is, the token system 1202 can generate or link to a passport to provide certain information corresponding to an cybersecurity posture and readiness for insurance purposes of the organization. For example, the passport can contain or link to various tokens, such as unified safeguard tokens, unified requirements tokens, performance tokens, coverage tokens, incident readiness tokens, insurability readiness tokens, gap tokens, effectiveness tokens, and/or various additional tokens. For example, the token system can generate a cyber resilience identity or passport providing access to metadata inclusive of various cyber resilience data (e.g., legal structure, number of protected records, preparedness for cyber insurance, etc.) through linked tokens. Additional, token system 1202 can generate the passport linked with a control structure to limit access to data and updates, as further described herein.

In some implementations, the wallet system 1212 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the wallet system 1212 can include an interface circuit and function circuit. In some implementations, the wallet system 1212 can be secured and/or protected using quantum-safe computing techniques (e.g., quantum encryption algorithms and/or quantum-safe digital signature protocols).

In some implementations, the wallet system 1212 can include a storage mechanism for holding digital assets, including cyber resilience tokens, private keys, and/or access credentials. In some examples, the wallet system 1212 can perform cryptographic operations to encrypt and decrypt token-related data and sign transactions, authenticating the user computing system 1210 during interactions with the passport system 1220 and the ledger system 1230. The wallet system 1212 can manage permissions and access control so that authorized can entities initiate or authorize updates to the cyber resilience tokens stored within the ledger system 1230. In some implementations, the wallet system 1212 can communicate with dynamic non-fungible tokens (DNFTs) or other various tokens (e.g., fungible tokens, semi-fungible tokens, fractionalized tokens, synthetic tokens, quantum-resistant tokens, cross-chain tokens) or cryptographic elements (e.g., digital signatures, hashes, encryption keys, zero-knowledge proofs, homomorphic encryption keys, lattice-based cryptographic keys, quantum entanglement signatures) associated with the cyber resilience identity. For example, the wallet system 1212 can store and manage multiple NFTs or DNFTs representing different aspects of a cybersecurity posture (e.g., cyber resilience status) of an organization or entity. The wallet system 1212 can facilitate updates to the tokens by performing cryptographic operations that validate and record changes to the cybersecurity data encapsulated within the DNFTs. The wallet system 1212 can also provide an interface that authorized entities use to access and manage the DNFTs, facilitating the review and assessment of the cybersecurity posture of the entity over time. In some implementations, the wallet system 1212 can be an agent function and/or can be stored in an agent database.

In another example, a quantum-resistant token can be structured to secure cyber resilience data against potential attacks from quantum computers using post-quantum cryptographic techniques, and/or the wallet system 1212 can store, manage, and/or facilitate access to these tokens within a cyber resilience identity framework. In yet another example, a zero-knowledge proof can be a cryptographic method allowing verification of certain cybersecurity attributes (e.g., compliance status) without revealing the underlying sensitive data, and/or the wallet system 1212 can process and validate these proofs as part of secure interactions with the cyber resilience identity. In yet another example, a quantum entanglement signature can be a method for facilitating data authenticity and integrity using entangled quantum states, and/or the wallet system 1212 can generate, store, and/or apply these signatures to authenticate and validate the integrity of cyber resilience data. In yet another example, a fractionalized token can be a representation of a cyber resilience asset divided into smaller units (e.g., portions of an insurance policy or coverage token), and/or the wallet system 1212 can manage the distribution, ownership, and/or transactions involving these fractionalized units within the tokenized cyber resilience identity.

In some implementations, the wallet system 1212 can store, create, and/or update a variety of tokens associated with the cybersecurity posture of an organization or entity. The wallet system 1212 can create and update performance tokens, which can include results of cybersecurity events, assessments, and/or incident responses (e.g., a security breach response or a periodic vulnerability assessment). The wallet system 1212 can create and maintain unified tokens, which can include data representing the state of various cybersecurity elements over time (e.g., safeguards implemented across the organization, internal and third-party requirements compliance, and/or asset management). The wallet system 1212 can capture and record evaluation tokens, which can include cybersecurity data captured at multiple points in time (e.g., snapshots of the organization cybersecurity posture at regular intervals). The wallet system 1212 can aggregate and store roll-up tokens, which can include combined data from unified and real-time and/or near real-time tokens to provide a view of the cybersecurity performance over a specified period (e.g., annual security performance summary). The wallet system 1212 can create and update resilience tokens, which can include tokens representing different dimensions of the organization cybersecurity posture (e.g., tokens for cybersecurity resilience metrics). The wallet system 1212 can further provide interfaces for entities to access, manage, and/or review the various tokens.

In some implementations, the systems or components of FIG. 12 can communicate over network 120. Network 120 can include computer networks such as the Internet, local, wide, metro or other area networks, intranets, satellite networks, other computer networks such as voice or data mobile phone communication networks, combinations thereof, and/or any other type of electronic communications network. Network 120 can include or constitute a display network. As a non-limiting example, network 120 can implement transport layer security (TLS), secure sockets layer (SSL), hypertext transfer protocol secure (HTTPS), and/or any other secure communication protocol. In some implementations, network 120 can be composed of various network devices (nodes) communicatively linked to form one or more data communication paths between participating devices. The network 120 can facilitate communication between the various nodes, such as the user computing system(s) 1210, third-party system(s) 150, passport system 1220, etc. (e.g., using an OSI layer-4 transport protocol such as the User Datagram Protocol (UDP), the Transmission Control Protocol (TCP), Stream Control Transmission Protocol (SCTP), etc.). At least one (e.g., at least one (e.g., each)) networked device can include at least one network interface for receiving and/or transmitting data, typically as one or more data packets. An illustrative network 120 is the Internet (however, other networks can be used). Network 120 can be an autonomous system (AS), e.g., a network that is operated under a consistent unified routing policy (or at least appears to from outside the AS network) and is generally managed by a single administrative entity (e.g., a system operator, administrator, and/or administrative group).

In some implementations, the ledger system 1230 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the ledger system 1230 can include an interface circuit and function circuit.

In some implementations, the ledger system 1230 can be a ledger or a decentralized ledger. For example, the ledger system 1230 can include a distributed ledger technology (DLT) that supports immutable record-keeping and secure data transactions. The ledger system 1230 can store various types of tokens and cybersecurity data, including performance tokens, unified tokens, evaluation tokens, roll-up tokens, and/or resilience tokens. The ledger system 1230 can securely record updates and changes to tokens (e.g., providing data integrity and traceability). For example, the ledger system 1230 can use blockchain to provide a tamper-evident record of token-related transactions.

In some implementations, the ledger system 1230 can include smart contract storage 1232, blockchain 1270, and/or token storage 1234. In some implementations, the smart contract storage 1232, blockchain 1270, and/or token storage 1234 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the smart contract storage 1232, blockchain 1270, and/or token storage 1234 can include an interface circuit and function circuit.

In some implementations, smart contract storage 1232 can manage and execute predefined agreements related to token transactions and updates. In one example, smart contract storage 1232 can store role-based access controls (RBACs or other rule-based control systems) or other access control mechanisms restricting access or updates to tokenized cyber resilience data stored via the ledger system 1230. In some examples, the smart contract storage 1232 can store rules or other data to automate processes such as token validation, data access control, and/or compliance checks. For example, smart contract storage 1232 can store smart contracts that define the rules and logic for managing token transactions and updates. That is, smart contracts can define rules or logic used by agent computing systems to perform operations or used by an agent management system to coordinate operations between various agent computing systems. In some examples, smart contract storage 1232 can manage contract templates that specify access permissions, including RBACs to restrict access based on user roles. That is, the smart contract storage 1232 can implement RBAC to control permissions for executing transactions or modifying token data. Smart contract storage 1232 can execute stored access controls/smart contracts to enforce access permissions, validate transactions, and/or verify compliance of entities or organizations with various cyber resilience parameters. In some implementations, smart contract storage 1232 can process transactions according to terms, parameters, and/or rules to restrict access to tokens or other cyber resilience data.

In some implementations, blockchain 1270 can include a decentralized ledger that records and validates token transactions. For example, blockchain 1270 can utilize consensus mechanisms (e.g., proof of provenance, proof of work, proof of stake) to validate transactions involving tokenized cyber resilience data across a distributed network or other computing environment. In some examples, blockchain 1270 can provide a tamper-evident and/or immutable record of token data by employing cryptographic techniques (e.g., hashing functions) to record and verify token transactions. That is, blockchain 1270 can provide transparency and traceability of token-related activities by securely recording token transactions on a distributed computing architecture.

In some implementations, token storage 1234 can store tokenized cyber resilience data. For example, token storage 1234 can store and/or manage tokens including performance tokens, unified tokens, evaluation tokens, and/or roll-up tokens generated and/or provided by the token system 1202. In some examples, token storage 1234 interfaces with blockchain 1270 to manage and organize token data. For example, token storage 1234 can handle different token types, including performance tokens, unified tokens, evaluation tokens, and/or roll-up tokens. Token storage 1234 can utilize data structures such as relational databases, NoSQL databases, and/or file systems to organize and manage tokens and/or corresponding data. In some examples, token storage 1234 can maintain data accuracy by integrating with blockchain 1270 to validate and update token records.

In some implementations, the passport system 1220 can include one or more systems and/or subsystems to model cyber resilience data using cyber resilience identities and associated metadata (e.g., cryptographic system 1222, ledger interface 1224, token system 1202, and/or metadata collection system 1226). In some implementations, the cryptographic system 1222, ledger interface 1224, token system 1202, and/or metadata collection system 1226 can include one or more processing circuits, including processor(s) and memory. The memory can have instructions stored thereon that, when executed by processor(s), cause the one or more processing circuits to perform the various operations described herein. The operations described herein can be implemented using software, hardware, and/or a combination thereof. The processor(s) can include a microprocessor, ASIC, FPGA, etc., and/or combinations thereof. In many implementations, the processor(s) can be a multi-core processor or an array of processors. Memory can include, but is not limited to, electronic, optical, magnetic, and/or any other storage devices capable of providing processor(s) with program instructions. The instructions can include code from any suitable computer programming language. In some implementations, the cryptographic system 1222, ledger interface 1224, token system 1202, and/or metadata collection system 1226 can include an interface circuit and function circuit.

In some implementations, the metadata collection system 1226 can receive or identify cyber resilience data. That is, receiving or identifying can include the metadata collection system 1226 acquiring, processing, and/or categorizing data from various sources, such as cybersecurity events, system performance metrics, and/or vulnerability assessments stored on ledger system 1230. For example, the metadata collection system 1226 can gather and/or organize data attributes like event timestamps, sources, and/or types corresponding to a cyber resilience status of an entity and other cyber protection information. Additionally, the metadata collection system 1226 can link these data attributes to cyber resilience metrics and update the corresponding records to reflect changes in the cyber protection posture of the entity.

In some implementations, the cryptographic system 1222 can encrypt a portion of the cyber resilience data. That is, encrypting can include the cryptographic system 1222 securing sensitive data using cryptographic techniques tailored to the requirements of the data. For example, the cryptographic system 1222 can apply encryption algorithms to protect sensitive data, such as performance metrics or identifiers of an organization or entity. Further, the cryptographic system 1222 can utilize key management techniques to facilitate secure data encryption and decryption process such that authorized entities can access the encrypted data. Additionally, the cryptographic system 1222 can use asymmetric encryption to secure data before it is stored or transmitted. For example, the cryptographic system 1222 (e.g., cryptography system) can apply hashing algorithms to verify the integrity of data associated with cyber resilience events and assessments such that the data remains unaltered during transmission or storage. In some examples, the cryptographic system 1226 can be configured to apply quantum-resistant protections, techniques, and/or protocols configured to resist quantum-based computing attacks.

In some implementations, the token system 1202 and/or metadata collection system 1226 can generate a metadata object including metadata of cyber resilience data. That is, the token system 1202 can create structured metadata objects that include information about tokenized data, such as fields, tags, headers, and/or other relevant attributes like data type, source, and/or context. For example, the token system 1202 can organize metadata into formats that provide descriptions and classifications for at least one (e.g., at least one (e.g., each)) element of cyber resilience data. Further, the metadata collection system 1226 can collect and integrate various metadata elements, such as timestamps, source identifiers, and/or data relevance indicators, into the metadata object. Additionally, the token system 1202 can structure the metadata to improve the understanding and usability of the collected cyber resilience data.

In some implementations, the token system 1202 can generate a cyber resilience identity including at least a link with the metadata object, a unique identifier (UID), and/or a performance event dataset. That is, generating can include creating, associating, and/or linking metadata objects, identifiers, and/or performance datasets (e.g., historical performance data) with an identifier of n organization or entity. For example, the token system 1202 can generate a passport that links to metadata stored in one or more tokens, at least one (e.g., at least one (e.g., each)) containing data related to different aspects of a cyber resilience of an entity. The passport can include an identifier for tracking and linking the metadata object to other associated tokens. Further, the performance event dataset within the passport can capture and store cyber resilience performance data, such as that stored in multiple performance tokens, which can be collected at different points in time. For example, the token system 1202 can issue or mint tokens linked to a single token that reference metadata objects and include identifiers for tracking, and/or the token system 1202 can embed performance metrics and historical data within the tokens to provide insights into cyber resilience.

In some implementations, the token system 1202 can encapsulate the cyber resilience identity within a control structure restricting one or more updates and redemptions of the metadata object. That is, encapsulating can include implementing token gating mechanisms or smart contracts to enforce rules on who can update or redeem the cyber resilience identity, based on predefined criteria and access control policies. For example, the token system 1202 can establish a control structure that allows a customer to view relevant data within their own passport while restricting access of an insurer to tokenized data used for underwriting decisions. Generally, the passport system 1220 can implement a control structure that enforces rules on who can update or redeem the cyber resilience identity based on predefined criteria (e.g., entity type, user preferences/selections, etc.)

In some implementations, the ledger interface 1224 can determine at least one access data structure that is compatible with the control structure. That is, determining can include analyzing various data structures to identify or determine alignment with the access control policies and update restrictions defined by the control structure. For example, the ledger interface 1224 can evaluate different data structures to verify compatibility with access levels and permissions for interacting with the cyber resilience identity. Additionally, the ledger interface 1224 can select and implement data structures that support the secure and compliant management of access and updates within the token system 1202.

The control structure (e.g., implemented as a smart contract) governs access to a token structure containing various tokens, such as performance tokens, unified tokens, evaluation tokens, and/or roll-up tokens. The token structure can include metadata, such as unique identifiers (UIDs), creation timestamps, and/or links to related data sets. The smart contract specifies predefined rules for accessing and updating these tokens. The ledger interface 1224 can process the smart contract to extract rules that define role-based access control (RBAC) permissions. For example, the smart contract can specify that at least one (e.g., at least one (e.g., each)) third-party can access their own data within the token structure. In some implementations, a third-party entity can have access its own performance tokens stored in the token structure, such as in a passport associated with the cybersecurity status of an entity. The RBAC rules restrict other entities from viewing or modifying these tokens. Another example can include third-party vendors having access to their own evaluation tokens that detail the results of security assessments relevant to their services, without the ability to access data from other vendors. In some examples, the RBAC can restrict or provide access to one or more autonomous or independent agents. That is, an orchestration system can allocate data for operations or determine a distribution for transmitting requests to various agents based on roles or permissions of the agents defined by the RBAC.

The ledger interface 1224 can configure the selected access data structure to enforce these RBAC permissions as extracted from the smart contract. That is, the configuration can include an agent or any computing system mapping the access permissions to the token structure and linking at least one (e.g., at least one (e.g., each)) token type to the appropriate access control mechanisms. For example, performance tokens related to a particular third-party can be linked to a role of the third-party. Similarly, unified tokens related to internal compliance can be accessible by authorized roles within the organization itself (e.g., excluding third-party access). The ledger interface 1224 can integrate the configuration within the ledger system 1230 to apply the rules of the control structure to token-related operations. The RBAC can facilitate access to tokens to entities or individuals that have been granted access or authorized to read, update, and/or add. For example, the control structure can use an access level of an entity or individual to determine whether to allow a user to read data but not update or add to the data (e.g., a third-party or regulatory entity or insurer can access performance datasets on performance tokens linked to a passport of the prosecutive insured, but can be restricted from modifying certain performance data stored thereon), to have full rights (e.g., read/update/add, etc.), etc. That is, the passport system 1220 can determine, identify, and/or provide an access level or permissions to a person or entity attempting to access or otherwise interact with tokenized data corresponding to a cyber resilience identity, and/or the access level/permissions can be used by the passport system 1220 to restrict or allow the user or entity to perform various actions related to the tokens.

In some implementations, if the smart contract is modified, the ledger interface 1224 can reconfigure the access data structures to match the updated RBAC rules. For example, if the smart contract is updated to change access permissions for a particular third-party or regulatory entity, the ledger interface 1224 can adjust the RBAC configurations to reflect this change such that the access control mechanisms allows access and is consistent with the control structure. In some implementations, an access data structure can function as a token or another access control mechanism within the token structure. That is, the access data structure can facilitate operations, such as reading, writing, adding, and/or removing metadata objects associated with tokens in the cyber resilience identity (e.g., also operating and implemented as a token). For example, an access control token can link to other tokens representing performance, evaluation, and/or resilience data. The access control token can encapsulate the permissions for interacting with the tokens and can include metadata defining allowed operations and roles or entities authorized to perform at least one (e.g., at least one (e.g., each)) operation. Additionally, an access data structure can implement write access to one or more metadata objects within the token structure. For example, an access control token can identify which entities have permission to update particular aspects of the cyber resilience identity, such as modifying performance metrics or altering the status of an evaluation token. Another access data structure can be used to manage read permissions, restricting a third-party or regulatory entity to viewing metadata associated with its own tokens within the structure without granting modification rights. In some implementations, an access control structure can function as a token that defines hierarchical permissions across multiple tokens. For example, a control structure token can specify that a designated role within an organization has the authority to add or remove tokens from the cyber resilience identity. Additionally, the access control token can be used to facilitate interactions with other tokens within the token structure to apply these permissions.

In some implementations, the ledger interface 1224 can broadcast, using the control structure, the cyber resilience identity to a ledger or distributed ledger. That is, broadcasting can include publishing, sharing, and/or otherwise transmitting a passport (e.g., cyber resilience identity) of an entity to authorized participants on the distributed ledger network, including insurers, regulators, and/or cybersecurity vendors, to facilitate secure access, auditing, and/or validation of the cybersecurity posture of the entity or for use in in providing protection or insurance quotes, verifying compliance, offering targeted cybersecurity services (e.g., through advertisements), and/or generating analytical insights based on the data of the entity. For example, the ledger interface 1224 can transmit the cyber resilience identity to a blockchain, distributed ledger, and/or other data source (e.g., agent network) to maintain an immutable record of the cyber resilience identity and associated data. In this example, the transmission process can include creating a transaction that includes the cyber resilience identity, signing the transaction using cryptographic keys associated with the control structure, and/or broadcasting the transaction to the distributed ledger network. The network nodes can then validate the transaction through a consensus mechanism (e.g., proof of work, proof of stake) and, once validated, add it to a block in the blockchain. Additionally, the ledger interface 1224 can store the cyber resilience identity locally (e.g., in a back-end database or other local data store). Further, the ledger interface 1224 can transmit or send the cyber resilience identity (e.g., via a shareable link) to various entities, who can access a portion of the data corresponding with the cyber resilience identity but not access another portion of the data based on various access controls.

Referring to the control structure (e.g., smart contract) generally, the one or more control structures can be embedded within the transaction or linked via an identifier or hash, which can be included in the transaction data. That is, the rules and conditions defined by the smart contract can be linked with the cyber resilience identity, facilitating the automated enforcement of access controls and other predefined operations when the identity is accessed or modified on the distributed ledger. In some implementations, the one or more control structures can be referenced by a smart contract address included in the transaction. That is, the reference can allow the distributed ledger to call and execute the smart contract independently when events are triggered, such as a request to access or update the cyber resilience identity. In some implementations, the one or more control structures can be included as a separate transaction linked to the cyber resilience identity transaction via a cryptographic reference. The smart contract transaction can be broadcasted and stored on the blockchain, where it can autonomously enforce the conditions and permissions associated with the cyber resilience identity when an interaction with the identity occurs on the distributed ledger. In some implementations, the one or more control structures can be encoded into the blockchain transaction as executable code. That is, the smart contract can automatically execute its logic in response to blockchain events, such as validation of the cyber resilience identity transaction.

Figure 13:
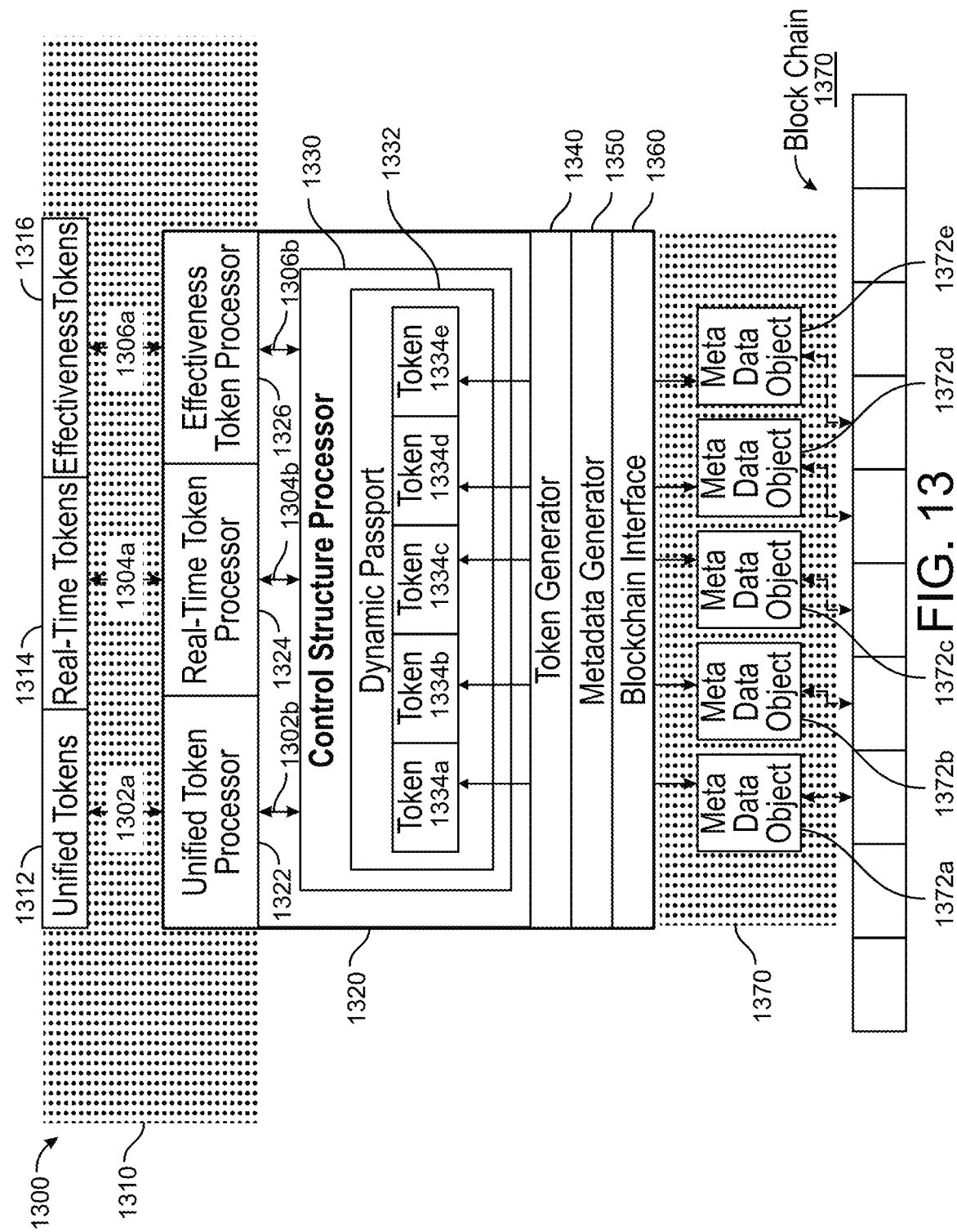
FIG. 13 depicts a block diagram of another architecture of certain systems or devices of FIG. 11, according to some implementations.

Referring now to FIG. 13, a block diagram of an architecture of certain systems or devices of FIG. 12 is shown, according to some implementations. The implementation shown in FIG. 13 can include a token interface 1310 including unified tokens 1312, real-time and/or near real-time tokens 1314, and/or effectiveness tokens 1316. The implementation shown in FIG. 13 can also include a smart contract control structure 1320 including a unified token processor 1322, a real-time and/or near real-time token processor 1324, and/or an effectiveness token processor 1326. Further, the smart contract control structure 1320 can include a control structure processor 1330, a token generator 1340, a metadata generator 1350, and/or a blockchain interface 1360. In some implementations, the control structure processor 1330 can include a dynamic passport 1332, and/or dynamic passport 1332 can include tokens 1334a-1334e (collectively, 1334). at least one (e.g., at least one (e.g., each)) of the tokens 1334 can be linked to a metadata interface 1370 including one or more metadata objects 1372a-1372e (collectively, metadata objects 1372). In some implementations, the implementation shown in FIG. 13 can include blockchain 1270.

In some implementations, FIG. 13 depicts an example smart contract control structure 1320. In some examples, the unified token processor 1322, real-time and/or near real-time token processor 1324, and/or effectiveness token processor 1326 can detect a presence of a token (fungible, non-fungible, partially-fungible, etc.), and/or can transmit the token to a compatibility processor (e.g., 1322, 1324, 1326) compatible with that particular token. The detection can be responsive to an action by the token interface 1310 to transmit the tokens to the smart contract control structure 1320. In some examples, the token interface 1310 can include a communication channel between one or more of the smart contract control structure 1320 and one or more of the unified tokens 1312, real-time and/or near real-time tokens 1314, and/or effectiveness tokens 1316. The token interface 1310 can include an application programming interface compatible with the smart contract control structure 1320 to detect various cyber resilience tokens. At least the token interface 1310 or the smart contract control structure 1320 can execute one or more instructions to determine whether one or more of the tokens are compatible with the smart contract control structure 1320.

In some implementations, the unified token processor 1322 can perform detection of unified tokens 1312 via a link 1302a or other communication channel (e.g., via a network such as network 120). The detection can be responsive to receiving a unified token from token system 1202, user computing systems 1210, and/or third-party systems 150, over link 1302a. The unified token processor 1322 can be configured to be compatible with a unified token 1312, and/or can be generated to be compatible with a particular unified token 1312. For example, the unified token processor 1322 can be integrated with or store a hash based on a unified token 1312 and a hash processor operable to generate a hash based on any unified token 1312. The unified token processor 1322 can generate a hash in response to detecting the presence of the unified token 1312, and/or can determine whether the unified token 1312 is compatible with the smart contract control structure 1320 by comparing the generated hash with the stored hash. The unified token processor 1322 can include logic to detect a unified token 1312 passed to it, by, for example, a JSON object or a header argument. Additionally, the unified token processor 1322 can provide the detected unified token to the control structure processor 1330 via link 1302b.

In some implementations, the real-time and/or near real-time token processor 1324 can perform detection of real-time and/or near real-time tokens 1314 via link 1304a. The detection can be responsive to receiving a real-time and/or near real-time token 1314 from token system 1202, user computing systems 1210, and/or third-party systems 150, over link 1304a. For example, the real-time and/or near real-time token processor 1324 can be integrated with or store a hash based on a real-time and/or near real-time token 1314 and a hash processor operable to generate a hash based on any real-time and/or near real-time token 1314. The real-time and/or near real-time token processor 1324 can generate a hash in response to detecting the presence of the real-time and/or near real-time token 1314, and/or can determine whether the real-time and/or near real-time token 1314 is compatible with the smart contract control structure 1320 by comparing the generated hash with the stored hash. The real-time and/or near real-time token processor 1324 can include logic to detect a real-time and/or near real-time token 1314 passed to it, by, for example, a JSON object or a header argument. Additionally, real-time and/or near real-time token processor 1324 can provide the detected real-time and/or near real-time token 1314 to the control structure processor 1330 via link 1304a.

In some implementations, the effectiveness token processor 1326 can perform detection of effectiveness tokens 1316 via link 1306a. The detection can be responsive to receiving an effectiveness token 1316 from token system 1202, user computing systems 1210, and/or third-party systems 150, over link 1306a. For example, the effectiveness token processor 1326 can be integrated with or store a hash based on an effectiveness token 1316 and a hash processor operable to generate a hash based on any effectiveness token 1316. The effectiveness token processor 1326 can generate a hash in response to detecting the presence of the effectiveness token 1316, and/or can determine whether the effectiveness token 1316 is compatible with the smart contract control structure 1320 by comparing the generated hash with the stored hash. The effectiveness token processor 1326 can include logic to detect an effectiveness token 1316 passed to it, by, for example, a JSON object or a header argument. Additionally, the effectiveness token processor 1326 can provide the detected effectiveness token 1316 to the control structure processor 1330 via link 1306b.

In some implementations, the smart contract control structure 1320 can include a control structure processor 1330 configured to generate and/or store tokens 1334. The tokens 1334 can include one or more unified tokens 1312, real-time and/or near real-time tokens 1314, and/or effectiveness tokens 1316. That is, responsive to receiving one or more of the unified tokens 1312, real-time and/or near real-time tokens 1314, and/or effectiveness tokens 1316 from the unified token processor 1322, real-time and/or near real-time token processor 1324, and/or effectiveness token processor 1326, the control structure processor 1330 can receive the tokens 1334 via links 1302b, 1304b, and/or 1306b. It should be understood that a control structure (or smart contract control structure) used herein can refer to a logical or structural construct that encapsulates one or more elements, such as tokens, and/or metadata objects, within a defined boundary. The control structure serves as an organizational framework that groups these elements together, allowing them to be referenced, accessed, and/or transmitted as a single unit. The smart contract control structure 1320 or other control mechanisms can manage interactions and enforce access controls based on predefined rules. For example, a control structure can be a data structure that stores references or pointers to the encapsulated elements. In another example, it can be a structure that includes metadata defining relationships and dependencies between the elements.

In some implementations, a container or wrapper can encapsulate a cyber resilience identity having a control structure, which can include multiple tokens linked to metadata objects. Encapsulation can be implemented by defining a data structure within a memory or storage system that can include relevant tokens and their associated metadata objects. The container itself can be a structured data object, such as a JSON object, a database schema, and/or a serialized data structure, that stores pointers, references, and/or data fields corresponding to at least one (e.g., at least one (e.g., each)) token and its linked metadata. The smart contract control structure 1320, such as a smart contract, can be included within the container by referencing its address or embedding its bytecode within the container data structure. When the container is instantiated or accessed, the control structure processor 1330 can reference the smart contract control structure 1320 to enforce the rules and permissions associated with the cyber resilience identity.

In some implementations, a smart contract can encapsulate a cyber resilience identity, which can include multiple tokens linked to metadata objects. The smart contract can encapsulate the cyber resilience identity by defining a set of rules and data fields within its code that represent the cyber resilience identity and its components. The control structure processor 1330 can create and maintain a mapping or registry within the blockchain 1270 or distributed ledger that associates at least one (e.g., at least one (e.g., each)) token with its corresponding metadata objects. The encapsulation occurs as the smart contract control structure 1320 references these tokens and metadata objects within its execution environment, using internal storage variables or linked data structures (e.g., mappings) to track and enforce relationships between them. The smart contract control structure 1320 can encapsulate the cyber resilience identity by controlling access to these mappings, allowing authorized operations as defined by the logic of the contract.

In some implementations, the control structure processor 1330 can generate a metadata object, such as a wrapper, where a smart contract control structure 1320 (e.g., a smart contract) is wrapped or otherwise linked to dynamic passport 1332, which can further include links to metadata (e.g., stored data, fields, etc.) of tokens 1334. For example, the dynamic passport 1332 can be encapsulated in a smart contract control structure 1320 and can generated by metadata generator 1350 as part of the metadata interface 1370. The linking dynamic passport 1332 and the smart contract processor 1330 can provide access to the tokenized cyber information based on the smart contract control structure 1320.

In some implementations, the control structure processor 1330 can generate a dynamic passport 1332 including a token with a link to (e.g., encapsulated in) the smart contract control structure 1320. The link can be established via a digital signature or cryptographic hash that securely associates the dynamic passport 1332 with corresponding metadata. The dynamic passport 1332 can be provided to a metadata interface 1370 such that a blockchain (e.g., blockchain 1270) can verify and store the metadata securely on the chain. Additionally, the control structure processor 1330 can encapsulate the dynamic passport 1332 and tokens 1334 within the smart contract control structure 1320. For example, encapsulating can include encrypting the data and setting permissions for data access. That is, the encapsulation can restrict outputs of the metadata objects 1372. For example, when the dynamic passport 1332 and tokens 1334 are encapsulated, the control structure processor 1330 can output when conditions or permissions are verified. In another example, when the dynamic passport 1332 and tokens 1334 are encapsulated in a smart contract control structure 1320, the control structure processor 1330 can output when a valid decryption key is presented. For example, the control structure processor 1330 can authorize transactions after verifying that compliance and regulatory requirements are met based on data of the tokens 1334.

In some implementations, the control structure processor 1330 can be configured to perform segmentation or allocation of tokens 1334 of the dynamic passport 1332 based on parameters by accessing the metadata of a token and evaluating compliance with cyber resilience standards. Accordingly, the control structure processor 1330 can automatically pool (or tranche) asset tokens (associated with underlying assets) based on parameters. For example, the parameters can be programmed into smart contracts of the control structure processor 1330. For example, the dynamic passport 1332 can include one or more segmented allocations of the tokens 1334 (e.g., with token 1334a and 1334b segmented into an allocation and tokens 1334c-1334e segmented into another allocation). While not shown in FIG. 13, a segmented allocation smart contract control structure can be within the smart contract control structure 1320 and be operated by the control structure processor 1330. In some examples, this integration facilitates automated re-segmentation based on real-time and/or near real-time data analysis. In another example, this integration facilitates compliance checks and performance tracking without external system intervention.

In some implementations, at least one (e.g., at least one (e.g., each)) of the tokens 1334 can include metadata objects 1372. For example, links can connect at least one (e.g., at least one (e.g., each)) token 1334 to a respective metadata object 1372. In some examples, the metadata interface 1370 can be utilized to connect at least one (e.g., at least one (e.g., each)) token 1334 to its metadata object 1372. For example, the token 1334a can be connected to the metadata object 1372a via a link, the token 1334b can be connected to the metadata object 1372b via a link, etc.

In some examples, the metadata interface 1370 can include a communication channel between one or more of the tokens in the smart contract control structure 1320 and metadata objects of blockchain 1270. That is, metadata objects 1372 can be accessed and verified through blockchain transactions to verify integrity and authenticity. Furthermore, blockchain 1270 can store links to the metadata objects 1372 or store the metadata objects 1372 in blocks of the blockchain 1270. For examples, the blockchain 1270 can store the metadata objects 1372 in blocks to verify that participants have consistent and unalterable access to the cyber resilience information stored in the tokens 1334 of the dynamic passport 1332. For example, one or more autonomous agents can record objects or other data corresponding with transactions on a blockchain or ledger.

In some implementations, the token interface 1310 can include an application programming interface compatible with the smart contract control structure 1320 to detect various cyber resilience tokens. In some examples, at least the token interface 1310 or the smart contract control structure 1320 can execute one or more instructions to determine whether one or more of the tokens (e.g., tokens 1334 or corresponding unified tokens 1312, real-time and/or near real-time tokens 1314, and/or effectiveness tokens 1316) are compatible with the smart contract control structure 1320.

In some implementations, the token generator 1340 (e.g., token system 1202) can generate one or more tokens (e.g., fungible, semi-fungible, and/or non-fungible tokens, collectively referred to herein as "controllable electronic records") in accordance with a token obtained at one or more of the unified token processor 1322, real-time and/or near real-time token processor 1324, and/or effectiveness token processor 1326. For example, the token generator 1340 can generate tokens based on a number of new metadata objects indicated by an obtained token, and/or linked with respective smart contract control structures. For example, the token generator 1340 can generate a cyber resilience identity (e.g., dynamic passport 1332) with links to one or more tokens at least one (e.g., at least one (e.g., each)) linked with a particular smart contract control structure 1320 with which the respective token is compatible. The token generator 1340 can thus generate a corresponding number of keys that can control restrictions on output by the particular metadata object linked with the particular smart contract control structure compatible with the particular token. The token generator 1340 can modify and delete tokens (e.g., tokens 1334) linked with cyber resilience identity (e.g., dynamic passport 1332), to update control of a partial distribution or exchange of metadata object control. In some examples, one or more autonomous agent can include and/or interface with token generator 1340 to generate or update tokens.

In some implementations, the metadata generator 1350 can generate one or more metadata objects (e.g., metadata objects 1372) in accordance with a token obtained at one or more of the unified token processor 1322, real-time and/or near real-time token processor 1324, and/or effectiveness token processor 1326 (e.g., at a compatibility processor). That is, the metadata object can include metadata of cyber resilience data. For example, metadata generator 1350 can generate multiple tokens based on a number of new metadata objects linked with respective smart contract control structure(s) 1320 and encapsulated with a cyber resilience identity (e.g., passport). For example, the metadata generator 1350 can generate one or more metadata objects 1372 at least one (e.g., at least one (e.g., each)) linked to respective tokens 1334 and further linked, via the tokens 1334, to the dynamic passport 1332 with a particular smart contract control structure 1320 by which the metadata object co is controlled. In some examples, the metadata generator 1350 can modify and delete metadata objects linked with tokens or smart contract control structures to update control of a partial transfer of metadata object control. Further, the metadata generator 1350 can modify and/or update tokens and/or associated information of existing tokens (e.g., tokens 1334) corresponding to a cyber resilience identity (e.g., passport 1332).

In some implementations, the blockchain interface 1360 can include an API compatible with the blockchain 1270 via metadata generator 1350. The blockchain interface 1360 can selectively add, modify, and/or delete blocks from the blockchain 1270. The blockchain interface 1360 can add, modify, and/or delete blocks in accordance with restrictions or interfaces of the blockchain 1270, and/or can add, modify, and/or delete blocks independently of the restrictions or interfaces of the blockchain 1270 at any portion or index of the blockchain 1270. The systems of FIG. 12 can be implemented by an autonomous agent for performing cyber resilience tasks or by an orchestration computing system for allocating or distributed tasks between various autonomous agents.

Figure 14:
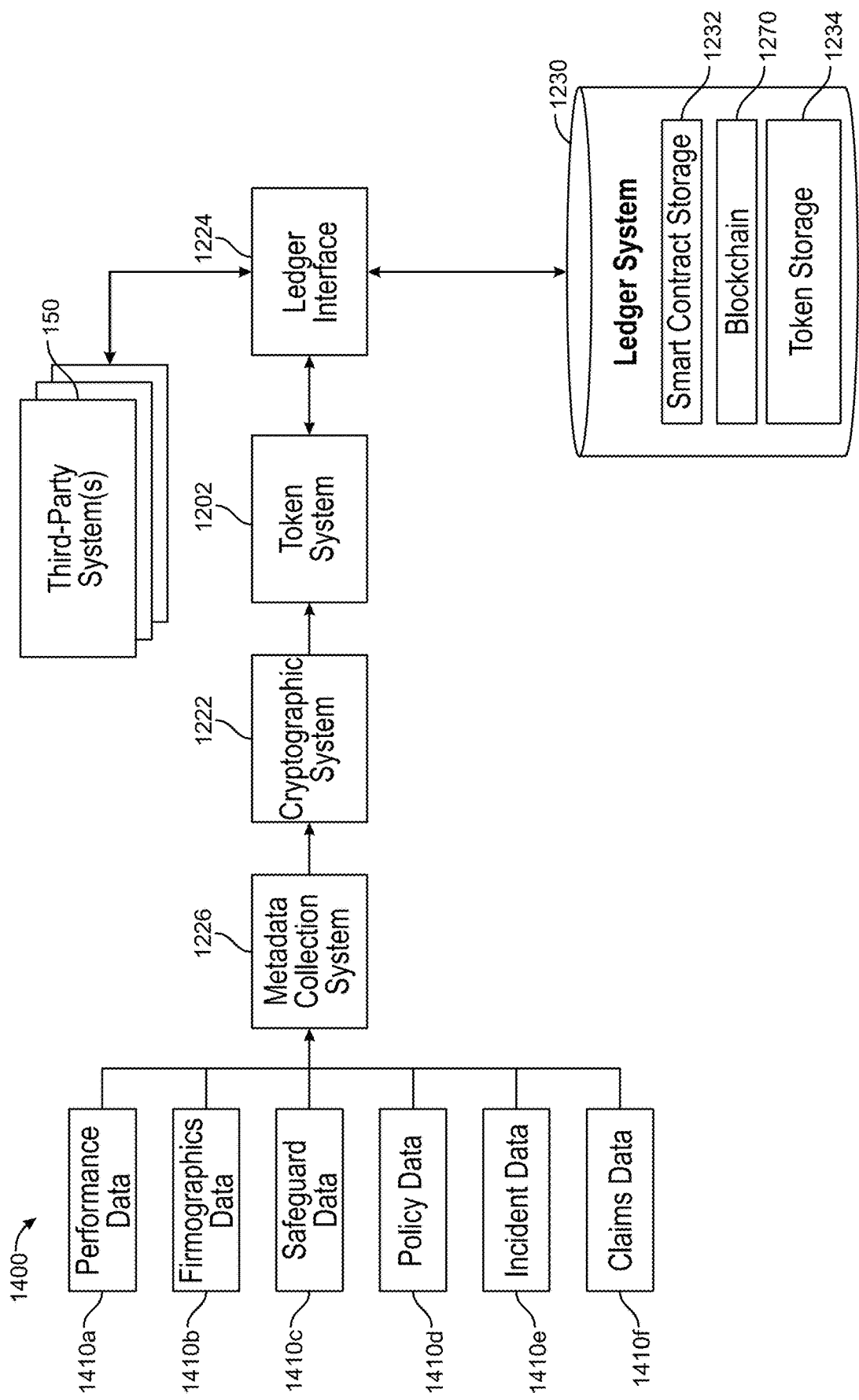
FIG. 14 depicts a block diagram of another architecture of certain systems or devices of FIG. 11, according to some implementations.

Referring now to FIG. 14, a block diagram of an architecture of certain systems or devices of FIG. 12 is shown, according to some implementations. The implementation shown in FIG. 14 includes third-party systems 150 and ledger system 1230. The ledger system 1230 can include smart contract storage 1232, blockchain 1270, and/or token storage 1234. The implementation shown in FIG. 14 can also include metadata collection system 1226, cryptographic system 1222, token system 1202, and/or ledger interface 1224. The implementation shown in FIG. 14 can also include performance data 1410*a*, firmographics data 1410*b*, safeguard data 1410*c*, policy data 1410*d*, incident data 1410*e*, and/or claims data 1410*f* (collectively, cyber resilience data 1410). In some implementations, the system 1400, metadata collection system 1226, cryptographic system 1222, token system 1202 and/or other systems described herein can be implemented as an agent function or sub-function for performing autonomous cyber resilience tasks.

In some implementations, the metadata collection system 1226 can receive or identify cyber resilience data 1410. For example, the metadata collection system 1226 can collect or retrieve performance data 1410*a* (e.g., historical performance data, metrics related to cybersecurity incidents or system performance), firmographics data 1410*b* (e.g., company size, industry type, and/or geographic location), safeguard data 1410*c* (e.g., implemented security controls or measures), policy data 1410*d* (e.g., security policies or compliance requirements), incident data 1410*e* (e.g., records of security breaches or system failures), and/or claims data 1410*f* (e.g., insurance claims or risk assessments) of an entity or organization. In some examples, the metadata collection system 1226 can integrate data from various cybersecurity tools and databases (e.g., third-party systems 150, blockchain 1270, etc.) to compile a cyber resilience dataset. In some implementations, the metadata collection system 1226 can provide the received or identified cyber resilience data to the cryptographic system 1222. In some examples, one or more autonomous or independent agents can receive, transmit, and/or process performance data 1410*a*, firmographics data 1410*b*, safeguard data 1410*c*, policy data 1410*d*, incident data 1410*e*, and/or claims data 1410*f* to perform various cyber resilience operations.

In some implementations, the cryptographic system 1222 can encrypt a portion of the cyber resilience data. For example, the cryptographic system 1222 can apply symmetric encryption algorithms (e.g., AES) to secure sensitive data such as performance data 1410*a* or firmographics data 1410*b*. In another example, the cryptographic system 1222 can use asymmetric encryption techniques (e.g., RSA) to protect keys and authentication credentials. Further, the cryptographic system 1222 can implement hashing algorithms (e.g., SHA-256) to verify the integrity of the data by generating hash values for at least one (e.g., at least one (e.g., each)) data record. In another example, the cryptographic system 1222 can apply quantum-safe encryption protocols and/or digital signature schemes. In some implementations, the cryptographic system 1222 can provide the portion of encrypted cyber resilience data to the token system 1202.

In some implementations, the token system 1202 can generate a metadata object including metadata of cyber resilience data. For example, the token system 1202 can create metadata objects that encapsulate encrypted performance data, safeguard records, and/or compliance data. In some implementations, the token system 1202 can include additional metadata such as timestamps, data sources, and/or integrity checks. In some implementations, the token system 1202 can generate a cyber resilience identity including at least a link with the metadata object, a unique identifier (UID), and/or a performance event dataset. For example, the cyber resilience identity can include a UID to identify the entity, a link to a metadata object (e.g., data of one or more tokens), and/or include a dataset with performance events or incidents. In some implementations, the token system 1202 can encapsulate the cyber resilience identity within a control structure restricting one or more updates and redemptions of the metadata object. The control structure can be a data structure or other system including a cyber resilience identifier (e.g., passport) with linked tokens and restricting accessing to metadata object (e.g., data) of certain tokens. In some implementations, the token system 1202 can determine at least one access data structure being compatible with the control structure. For example, the token system 1202 can utilize various access management techniques, such as access control lists (ACLs), role-based access controls (RBACs), and/or attribute-based access controls (ABACs), to verify that the access data structure aligns with the permissions and restrictions defined within the control structure. The passport system 1220 can assess these access data structures to determine whether the structures comply with predefined standards or policies (e.g., determining whether an entity or authorized user has the appropriate credentials or attributes to access, modify, and/or update the metadata objects encapsulated within the control structure). Additionally, the token system 1202 can dynamically adjust the access parameters based on changes in roles, permissions, and/or security requirements such that the control structure remains consistent with the evolving resilience of various entities and users involved in managing or interacting with the cyber resilience identity.

In some implementations, access controls, such as role-based access controls (RBACs) or access parameters, can be implemented in various forms to manage permissions for entities interacting with the metadata object (e.g., token). Access controls can include any method or mechanism that limits, restricts, and/or authorizes access to certain data based on predefined criteria. Examples of access controls can involve establishing rules that dictate who can view, modify, and/or delete data elements within the metadata object or cyber resilience identity. Such controls can be used to regulate access across different entities, such as allowing a third-party like an insurer to view certain data, modify data, and/or be restricted from accessing other sensitive data. These access controls can also be configured within a broader access management framework, such as ACLs or RBACs, that dynamically adapts to the roles and permissions associated with different users or systems.

In some implementations, the token system 1202 can generate a cyber resilience identity including at least a link with the metadata object, a unique identifier (UID), and/or a performance event dataset. For example, the cyber resilience identity can incorporate a UID to identify the entity, link to the metadata object to reference encrypted data, and/or include a dataset detailing performance events or incidents. The token system 1202 can encapsulate the cyber resilience identity within a control structure restricting one or more updates and redemptions of the metadata object. Further, the token system 1202 can determine at least one access data structure that aligns with the control structure. For example, the token system 1202 can use access control lists or role-based access controls to verify alignment with the control structure for control over which data elements can be accessed or modified by different entities. In some implementations, the ledger interface 1224 can broadcast, using the control structure, the cyber resilience identity to a ledger or distributed ledger. For example, the ledger interface 1224 can interact with the ledger system 1230, including smart contract storage 1232, blockchain 1270, and/or token storage 1234, to submit the cyber resilience identity and associated metadata and publish the cyber resilience identity to blockchain 1270. In some examples, the ledger interface 1224 can also communicate with third-party systems 150 to share and verify the cyber resilience identity across different platforms and networks (e.g., to transmit to a vendor or insurer).

Figure 15:
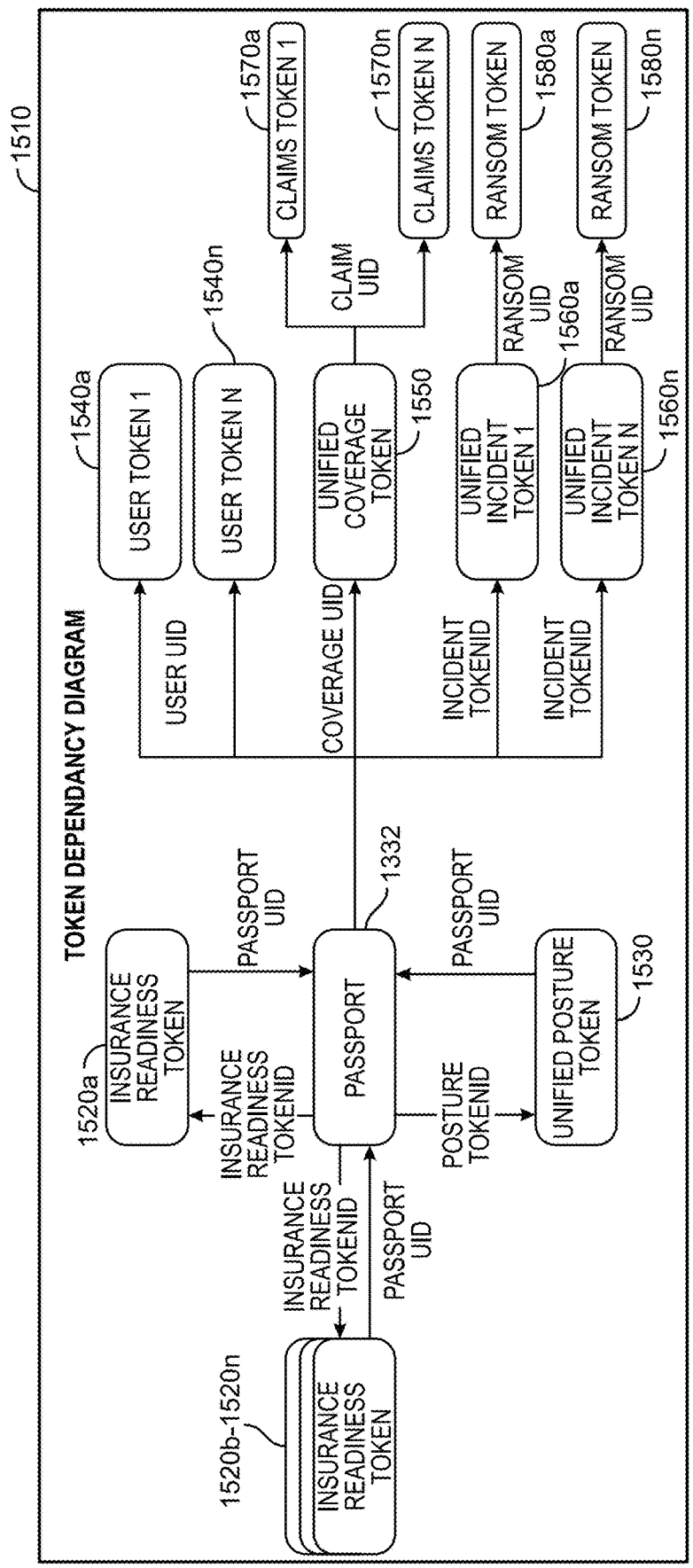
FIG. 15 depicts a block diagram of a token dependency system for tokenized cyber resilience data, according to some implementations.

Referring now to FIG. 15, a block diagram of a token dependency system 1510 for tokenized cyber resilience data is shown, according to some implementations. The implementation shown in FIG. 15 includes a dynamic passport 1332 and one or more insurance readiness tokens 1520*a*-1520*n* (collectively, 1520), a unified posture token 1530, one or more user tokens 1540*a*-1540*n* (collectively 1540), a unified coverage token 1550, one or more unified incident tokens 1560*a*-1560*n* (collectively 1560), claims tokens 1570*a*-1570*n* (collectively 1570 tokens), and/or ransom tokens 1580*a*-1580*n*. In some implementations, the token dependency system 1510, and/or systems and/or functions described can be implemented as an agent function or sub-function for performing autonomous cyber resilience tasks. In some examples, an orchestration system can allocate or distribute tokens described with regard to FIG. 15 and/or token-related operations (e.g., instructions to generate a token) to various autonomous or independent agents.

In some implementations, the dynamic passport 1332 can operate as a central node and be linked to tokenized cyber resilience data (e.g., tokens) to facilitate interactions across the various tokens in managing, accessing, and/or updating cyber resilience data. For example, the dynamic passport 1332 can be linked to the insurance readiness tokens 1520 via the passport UID and/or insurance readiness token ID. In another example, the dynamic passport 1332 can be linked to the unified posture token 1530 through the passport UID and/or posture token IDs. Further, the dynamic passport 1332 can be linked to user tokens 1540 through a user UID. The dynamic passport 1332 can further be linked to the user to a unified coverage token 1550 via a coverage UID. In some examples, the unified coverage token 1550 can be linked to claims tokens 1570 via a claim UID, and/or the link can provide the dynamic passport 1332 with access to the claims tokens 1570. Further, the dynamic passport 1332 can be linked with the unified incident tokens 1560 via an incident token ID. In some examples, the unified incidents tokens 1560 can be linked to the ransom tokens 1580 via a ransom UID, and/or the link can provide the dynamic passport 1332 with access to the ransom tokens 1580.

Figure 16A:
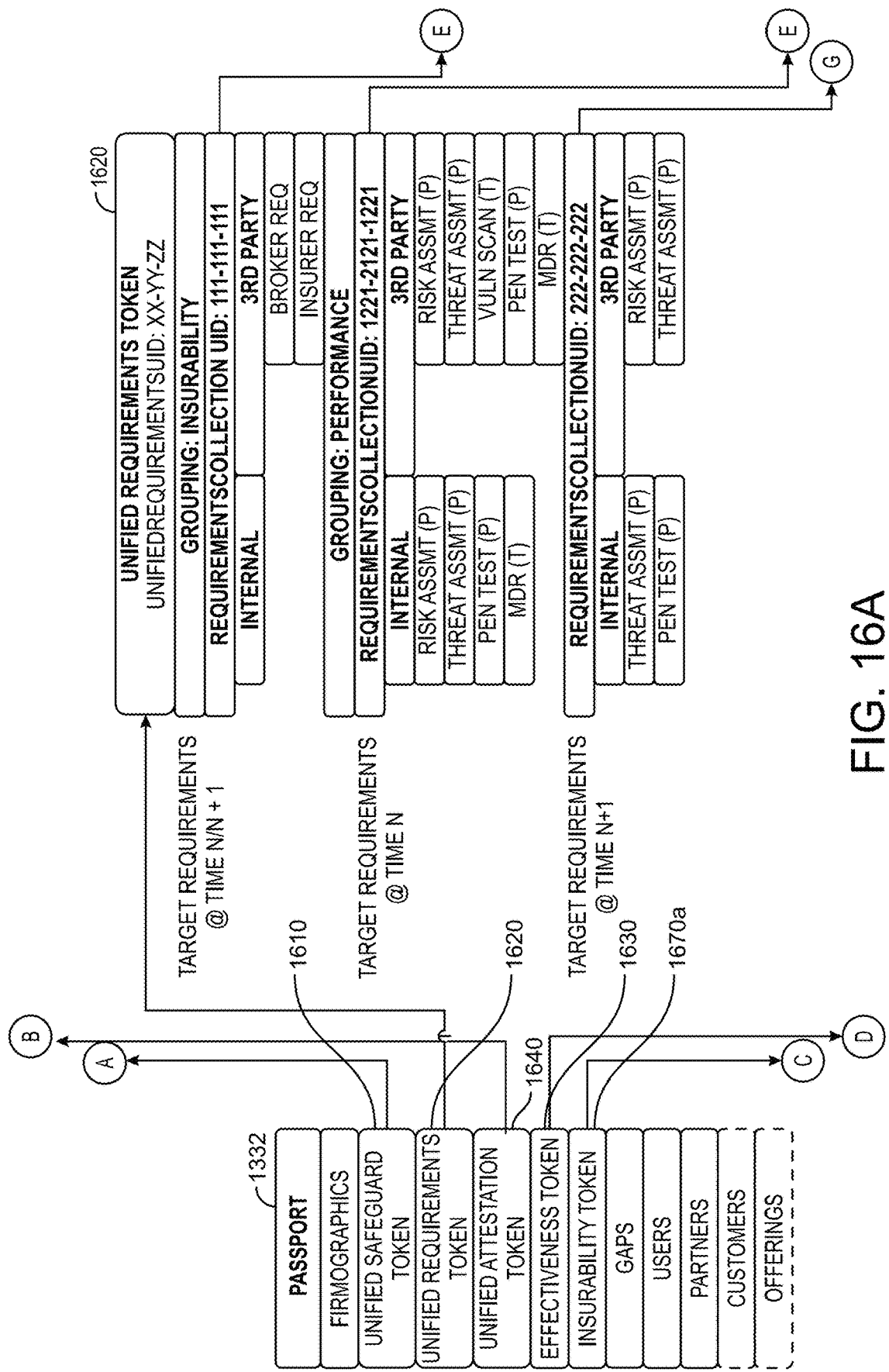
FIGS. 16A-16I depict an architecture for tokenized cyber resilience data, according to some implementations.
Figure 16B:
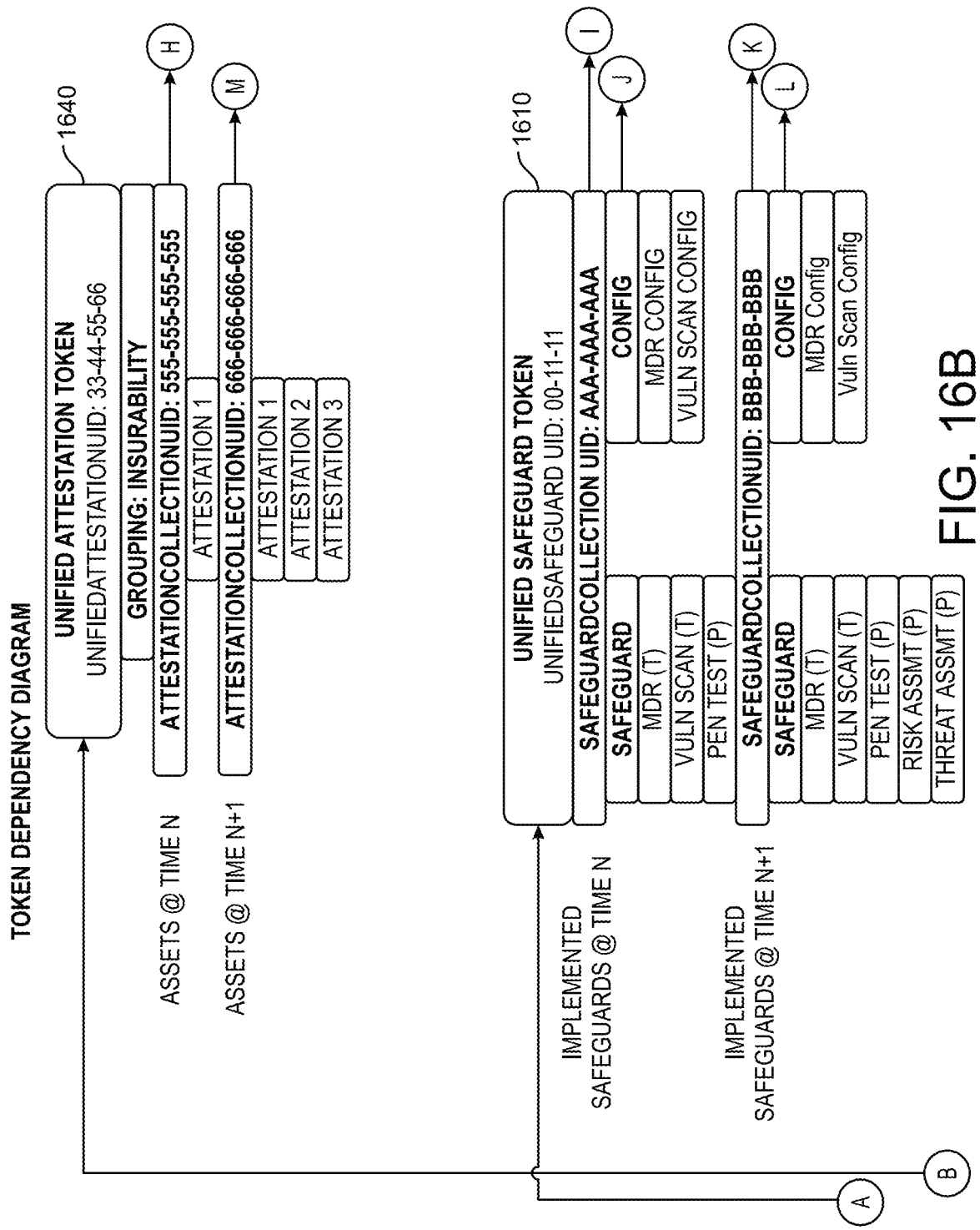

Referring generally to FIGS. 16A-16I, an architecture for tokenized cyber resilience data is shown, according to some implementations. Referring now to FIG. 16A, the dynamic passport 1332 can include various cyber resilience data, such as firmographics data, unified safeguards token 1610, unified requirements token 1620, unified attestation token 1640, effectiveness token 1630, insurability token 1670a, gap information, users, partners, customers, offerings, etc. In some examples, the unified safeguards token 1610 can receive data/be linked with other systems or data via node A, the unified attestation token 1640 can receive data/be linked with other systems or data via node B, the effectiveness token can receive data/be linked with other systems or data via node C, and/or the insurability token 1670a can receive data/be linked with other systems or data via node D, as further described herein. In some implementations, entities can interact with and/or access the dynamic passport 1332 and/or linked tokens (e.g., unified safeguards token 1610, unified requirements token 1620) based on various rules (e.g., access controls with various access parameters). In some implementations, the tokenized cyber resilience data implementation can be implemented as an agent function or sub-function for performing autonomous cyber resilience tasks. In some examples, an orchestration system can allocate or distribute tokens described with regard to FIG. 16 and/or token-related operations (e.g., instructions to generate a token) to various autonomous or independent agents.

In some implementations, FIGS. 16A-16I illustrates tokenized cyber security data over various times (e.g., time N/N+1, time N, time N+1, etc.). In some implementations, unified tokens (e.g., unified safeguards token 1610, unified requirements token 1620, unified attestation token 1640, etc.) can store metadata of cyber resilience data over a time period. For example, the unified requirements token 1620 can be generated by the token system 1202 and can include a unified requirements UID and an insurability grouping with grouped cyber resilience data. In another example, the unified requirements token 1620 can include a first requirements collection UID corresponding to requirements (e.g., cyber resilience standards for a policy) at a first time (e.g., time N/N+1), which can be linked with other systems/and or data via node E, as further described herein. In another example, the unified requirements token 1620 can include a second requirements collection UID corresponding to requirements at a second time (e.g., time N+1), which can be linked with other systems/and or data via node F, as further described herein. Still yet, in another example, the unified requirements token 1620 can include a third requirements collection UID corresponding to requirements at a third time (e.g., time N), which can be linked with other systems/and or data via node G, as further described herein. For example, the first, second, and/or third UID can correspond to various internal and/or third-party cyber resilience requirements at different times, such as risk assessment data, threat assessment data, other testing data, MDR data, pen test data, vulnerability scan data, broker requirements, insurer requirements, etc.

Referring now to FIG. 15B, the unified attestation token 1640 can be linked to the dynamic passport 1332 via node A. As described regarding the unified requirements token 1620, the unified attestation token 1640 can include groupings and/or data corresponding to attestations at various times. For example, the unified attestation token 1640 can be generated by the token system 1202 and can include an insurability grouping with a first attestation collection UID corresponding with assets (e.g., attestation 1) at a first time (e.g., time N), and/or the first attestation collection UID can be linked with other systems/data via node H. Further, the unified attestation token 1640 can include a second attestation collection UID corresponding with assets (e.g., attestation 1, attestation 2, attestation 3, etc.) at a second time (e.g., time N+1), and/or the second attestation collection UID can be linked with other systems/data via node M. In some implementations, the unified safeguard token 1610 can be linked to the dynamic passport 1332 via node B. For example, as described above, the unified safeguard token 1610 can include groupings and/or data corresponding to safeguards at various times. For example, the unified safeguard token 1610 can include a first safeguard collection UID corresponding with safeguards (e.g., MDR, vulnerability scans, penetration test rules, etc.) at a first time (e.g., time N), and/or the first safeguard collection UID can be linked with other systems/data via node I. The unified safeguard token 1610 can further include a first configuration, which can be linked to other data/systems via node J and include data corresponding to cyber resilience systems and/or protection techniques implemented in a cyber resilience architecture of an organization (e.g., MDR configurations, vulnerability scan configurations, etc.). Further, the unified safeguard token 1610 can include a second safeguard collection UID corresponding with safeguards implemented at a second time (e.g., time N+1), and/or the second attestation collection UID can be linked with other systems/data via node K. The unified safeguard token 1610 can further include a second configuration, which can be linked to other data/systems via node L.

Figure 16C:
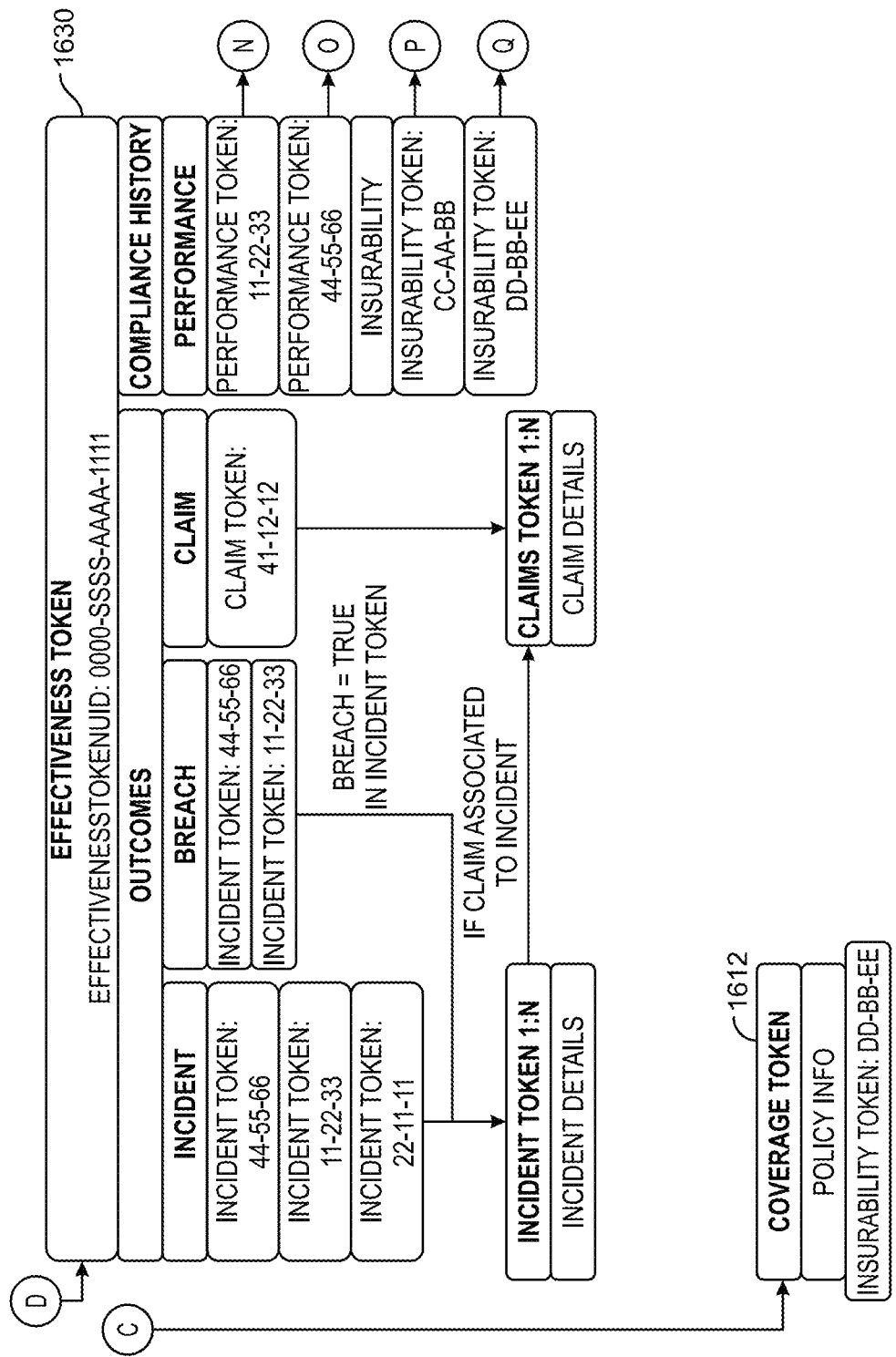
Figure 16D:
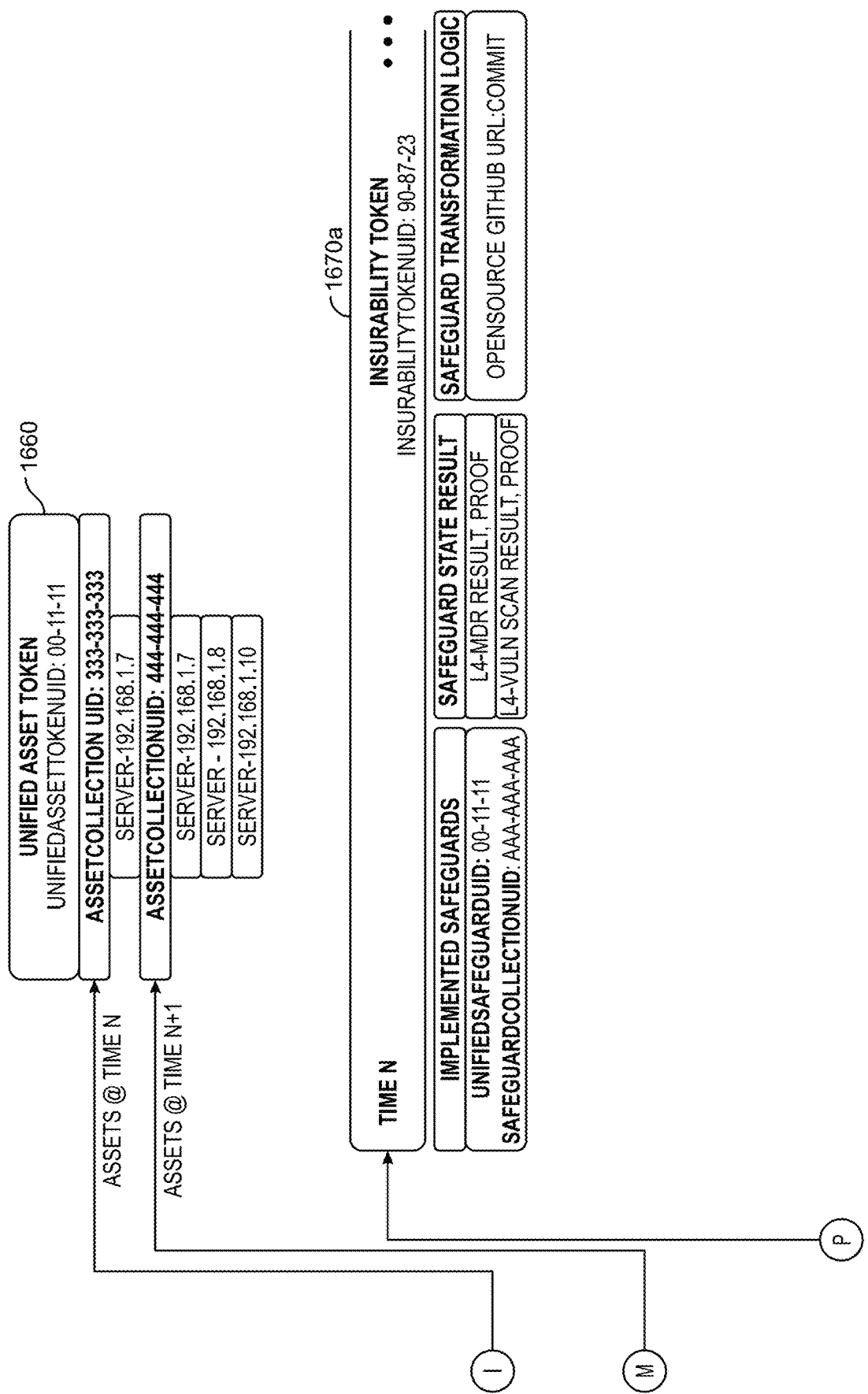

Referring now to FIG. 16C, a coverage token 1612 can be linked to the dynamic passport 1332 via node C. In some examples, the coverage token 1612 can be generated by the token system 1202 can include cyber protection information such as policy information (e.g., policy number, type, etc.) and various tokens including insurability information (e.g., an insurability token). In some implementations, the effectiveness token 1630 can be linked to the dynamic passport 1332 via node D. The effectiveness token 1630 can include various data corresponding to cyber resilience outcomes, such as incident data (e.g., via incident tokens 1 through N), corresponding breach data (e.g., via incident tokens 1 through N), and/or corresponding claims data (e.g., via claims tokens 1 through N associated with incident tokens 1 through N). In some implementations, the effectiveness token 1630 can include various data corresponding to cyber resilience compliance history, such as historical performance data. For example, the performance data can include multiple performance tokens including respective timestamps or identifiers corresponding to cyber resilience performance of an entity during one or more incidents/breaches or claims associated with incident tokens and/or claims tokens, and/or the performance tokens (e.g., performance tokens 1680a-1680b) can be linked to other data/systems via node N and node O. In some implementations, the effectiveness token 1630 can include insurability data, such as one more insurability tokens (e.g., received via coverage token 1612). In some examples, the insurability tokens (e.g., insurability tokens 1670a-1670b) can be linked to other data/systems via node P and node Q.

Figure 16E:
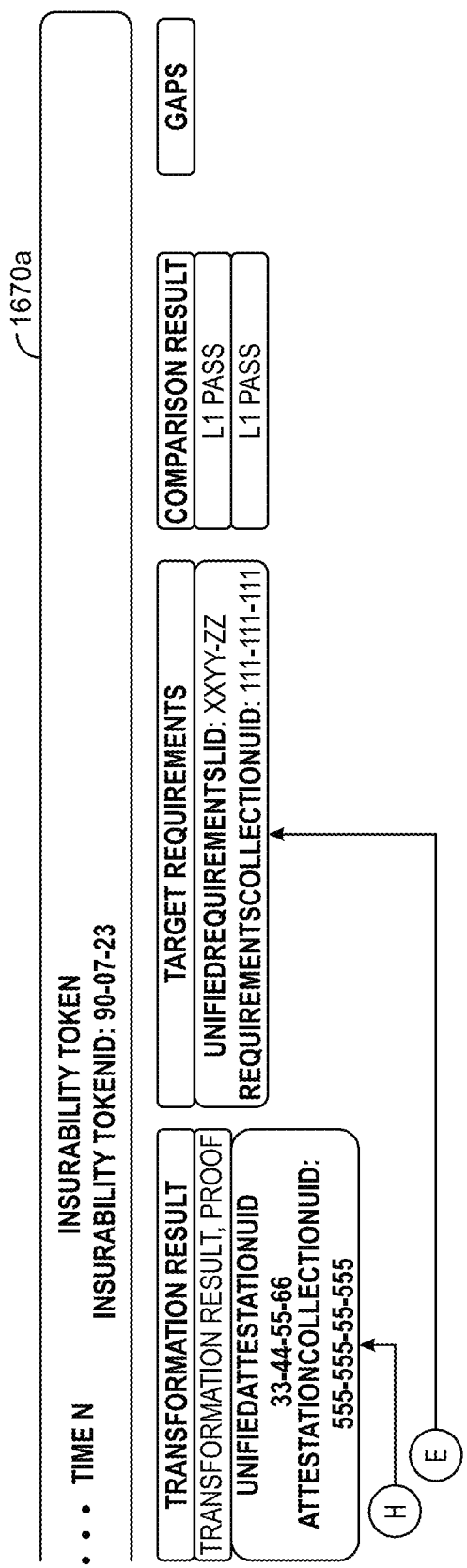

Referring now to FIG. 15D, the dynamic passport 1332 can be linked to the unified asset token 1660 via node I and/or via node M. For example, the unified asset token 1660 can be generated by the token system 1202 and can include a first grouping of assets (e.g., server identifier 1) at a first time (e.g., time N) and a second grouping of assets (e.g., server identifier 1, server identifier 2, server identifier 3, etc.) at a second time (e.g., time N+1). In some implementations, the insurability token 1670a can be linked to the dynamic passport 1332 via node P with the effectiveness token 1630. For example, the insurability token 1670a can include insurability data at a first time (e.g., time N), such as implemented safeguards and associated identifiers, safeguard state results (e.g., L4-MDR result and proofs, L4-vulnerability scan results and proofs), and/or safeguard transformation logic (e.g., accessible via a URL or other link). Referring now to FIG. 16E, the insurability token 1670*a* can further include a transformation result and/or proof, which can be linked via UIDs to node H with the unified attestation token 1640. The insurability token 1670*a* can further include target requirements, which can be linked via UIDs or other identifiers with the unified requirements token 1620. The insurability token 1670*a* can further include comparison results (e.g. L1) pass, gap data (e.g., data of missing and/or inadequate cyber protections), and/or more.

Figure 16F:
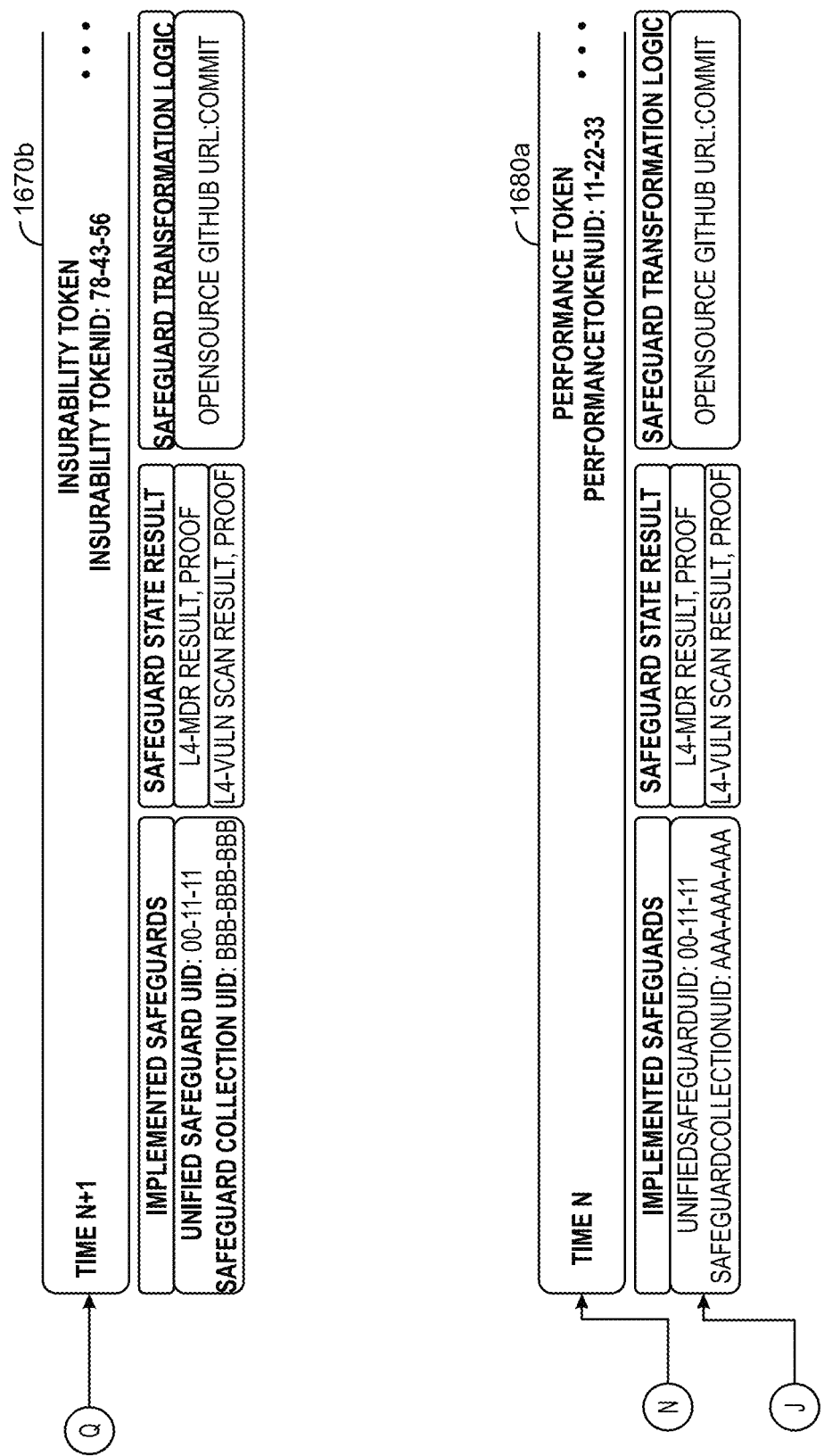

Referring now to FIG. 16F, the dynamic passport 1332 can be linked to the insurability token 1670*b* via node Q. As shown in FIG. 16F, the insurability token 1670*b* can be generated by the token system 1202 and can include insurability data at a second time (e.g., time N+1), such as implemented safeguards and associated identifiers, safeguard state results, and/or safeguard transformation logic. For example, the insurability token 1670*b* can include encrypted data of implemented safeguards, such as firewall configurations or endpoint protection settings, verified against cyber resilience requirements. The encrypted data can be encapsulated within a control structure configured to restrict updates or access based on cryptographic proofs, allowing authorized entities (e.g., those with permitted access based on RBACs) to modify, create, view, and/or retrieve the data in accordance with access controls defined for the dynamic passport 1332. In some implementations, the dynamic passport 1332 can be linked to the performance token 1680*a* via node N with the effectiveness token 1630. In some examples, the performance token 1680*a* can include performance data of an entity at a first time (e.g., time N), including implemented safeguards, results, transformation logic, etc. In some implementations, the implemented safeguards can be linked, via node J, with a configuration of the unified safeguard token 1610.

Figure 16G:
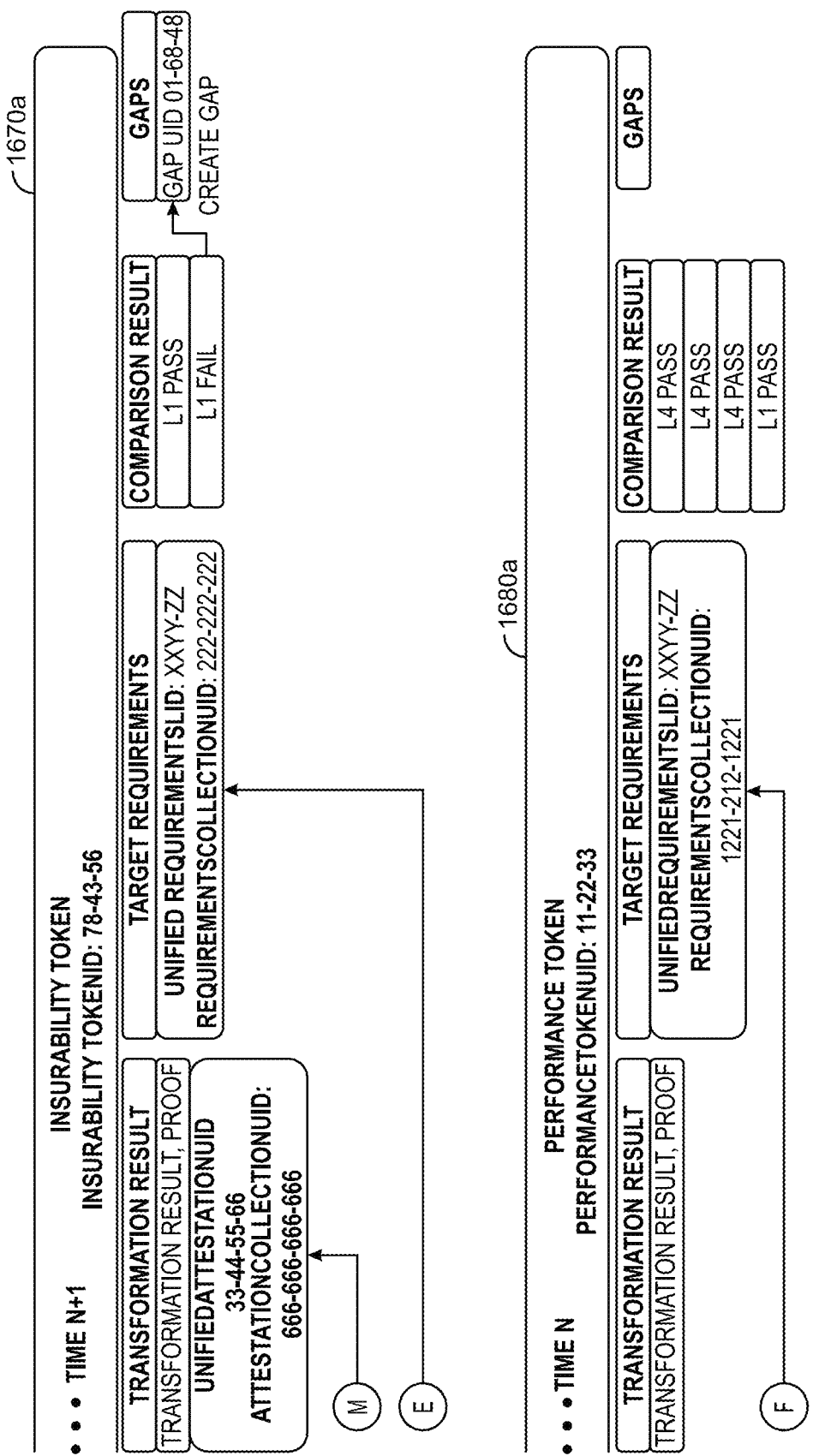

Referring now to FIG. 16G, the insurability token 1670*b* can further include a transformation result and/or proof, which can be linked via UIDs to node M with the unified attestation token 1640. In some implementations, the insurability token 1670*b* can be generated by the token system 1202 and can further include target requirements, which can be linked via UIDs or other identifiers with the unified requirements token 1620 via node E. Further, the insurability token 1670*a* can further include comparison results (e.g. L1 pass/fail), gap data (e.g., gap UIDs), etc. In some implementations, the performance token 1680*a* can further include transformation results and/or proofs, comparison results (e.g., L4 pass/fail), and/or gaps. Further, the insurability token 1670*b* (or another token) can store cryptographic proofs of provenance corresponding with and entity and/or associated cyber resilience data. In some examples, the performance token 1680*a* can include target requirements and associated IDs, accessible via node F, from the unified requirements token 1620.

Figure 16H:
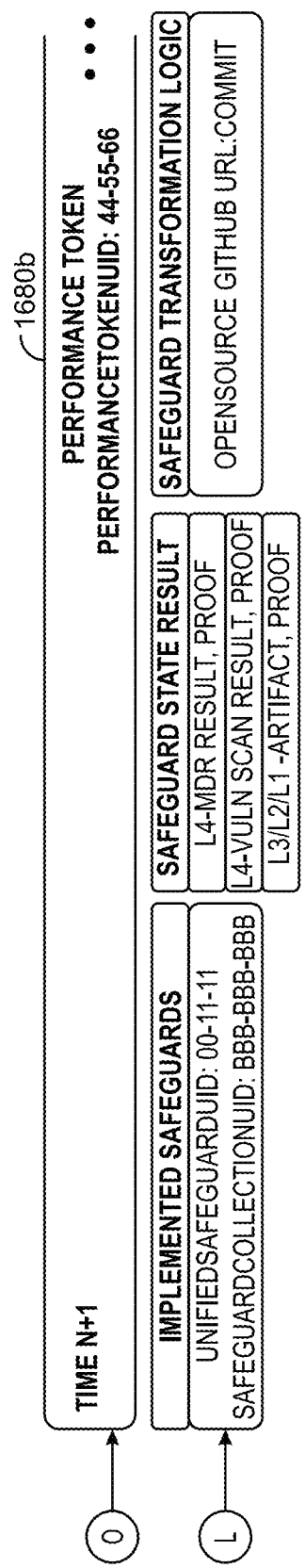
Figure 16I:
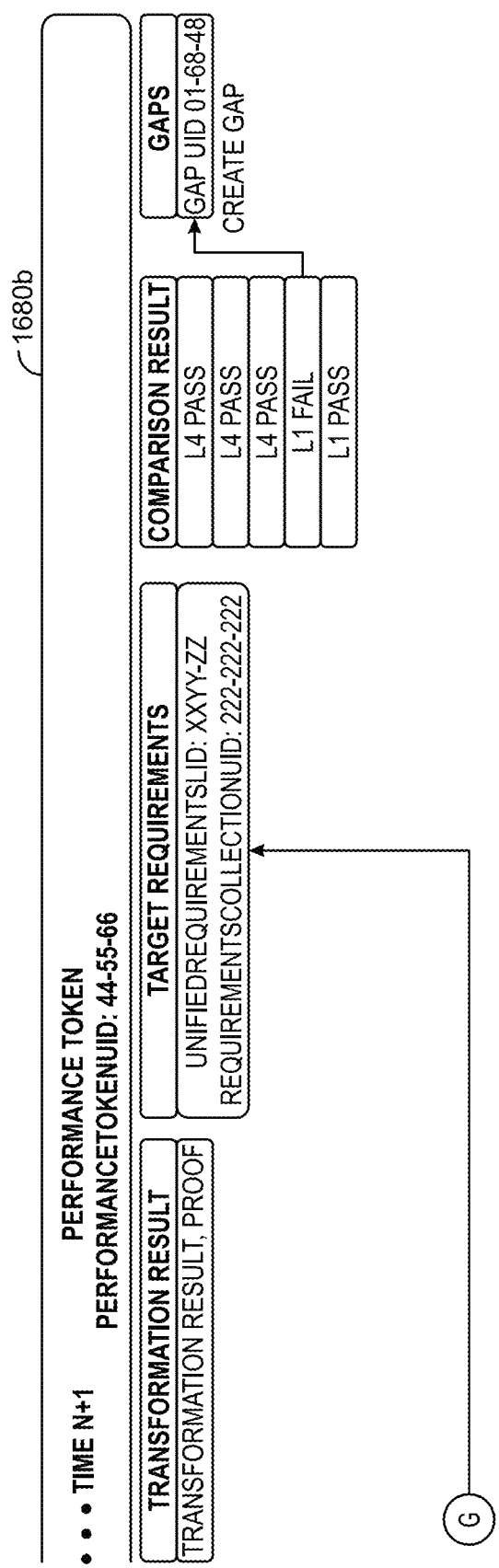

Referring now to FIG. 16H, the dynamic passport 1332 can be linked to the performance token 1680*b* via node O with the effectiveness token 1630. In some examples, the performance token 1680*b* can be generated by the token system 1202 and can include performance data of an entity at a second time (e.g., time N+1), including implemented safeguards, results, transformation logic, etc. For example, the performance token 1680*a* and the performance token 1680*b* can include performance data sets encapsulated within a control structure corresponding to the dynamic passport 1332, and/or access to data of the performance tokens 1680*a*-1680*b* can be granted based on an access data structure compatible with a control structure (e.g., allowing authorized entities to retrieve and/or update metadata of the performance token 1680*b* based on access controls, restricting access and/or updates to the performance data based on access controls, etc.). In some implementations, the implemented safeguards can be linked, via node L, with a configuration of the unified safeguard token 1610. Referring now to FIG. 16I, the performance token 1680*b* can further include transformation results and/or proofs, comparison results, and/or gaps. The performance token 1680*b* can also include target requirements and identifiers received via node G with the unified requirements token 1620.

Figure 17:
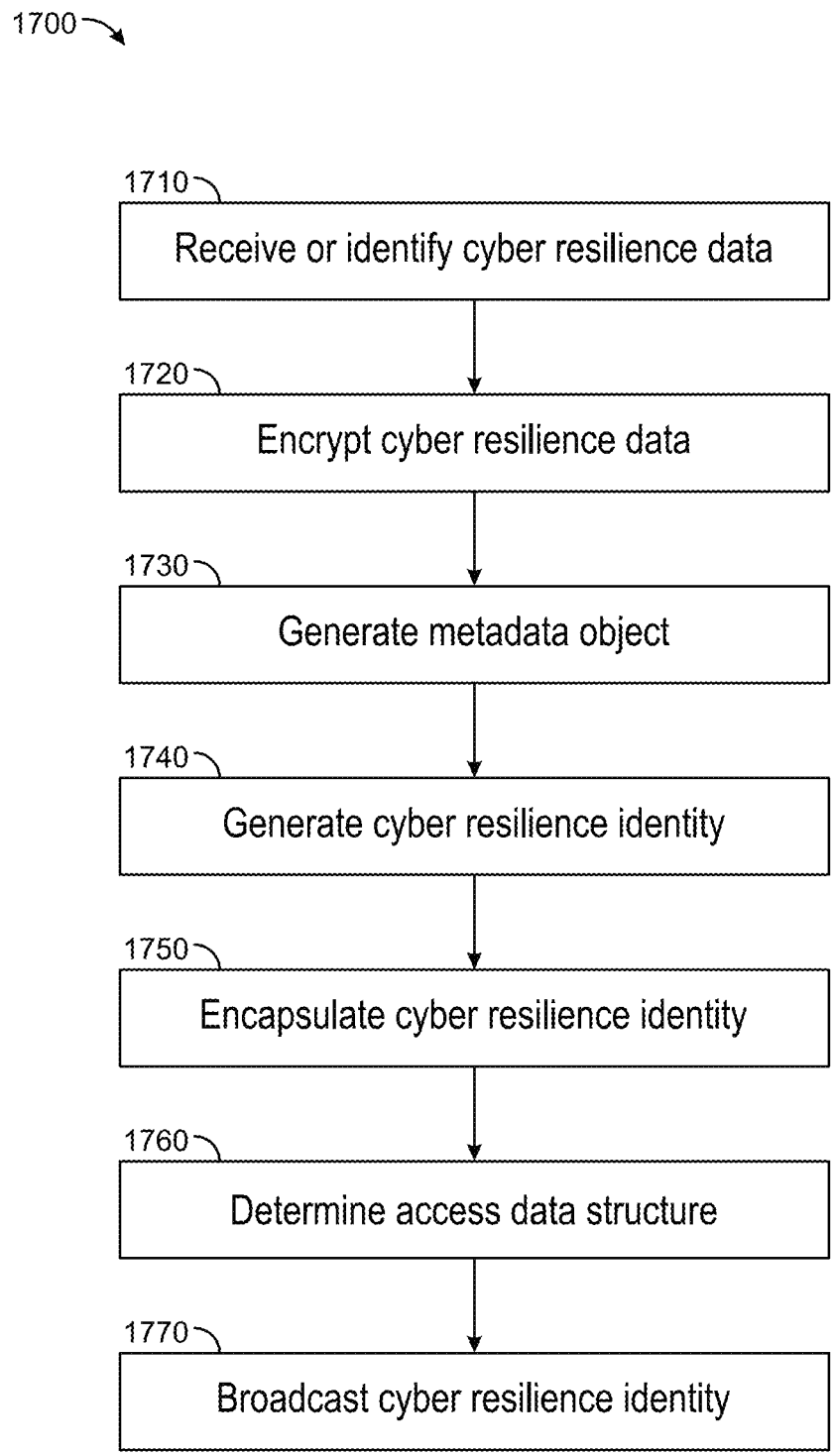
FIG. 17 depicts a flowchart for a method of modeling cyber resilience data using cyber resilience identities and associated metadata, according to some implementations.

Referring now to FIG. 17, a flowchart for a method 1700 of modeling cyber resilience data using cyber resilience identities and associated metadata is shown, according to some implementations. One or more of the components described with respect to FIG. 1, FIG. 5, and/or FIG. 12 can be used to perform the steps of method 1700. For example, the response system 530 of FIG. 5 or the passport system 1220 of FIG. 12 can perform one or more of the steps of the method 1700. Additional, fewer, and/or different operations can be performed depending on the particular implementation. In some implementations, some, and/or all operations of method 1700 can be performed by one or more processors executing on one or more computing devices, systems, and/or servers. In some implementations, at least one (e.g., at least one (e.g., each)) operation can be re-ordered, added, removed, and/or repeated.

In a broad overview of method 1700, at block 1710, the one or more processing circuits (e.g., passport system 1220 of FIG. 12) can receive or identify cyber resilience data. At block 1720, the one or more processing circuits can encrypt the cyber resilience data. At block 1730, the one or more processing circuits can generate a metadata object. At block 1740, the one or more processing circuits can generate a cyber resilience identity. At block 1750, the one or more processing circuits can encapsulate the cyber resilience identity. At block 1760, the one or more processing circuits can determine an access data structure. At block 1770, the one or more processing circuits can broadcast the cyber resilience identity.

In some implementations, at block 1710, the one or more processing circuits can receive or identify cyber resilience data. For example, the metadata collection system 1226 of the passport system 1220 can gather performance data 1410*a*, firmographics data 1410*b*, safeguard data 1410*c*, policy data 1410*d*, incident data 1410*e*, and/or claims data 1410*f*. In some examples, the passport system 1220 can interface with blockchain 1270 to retrieve historical cybersecurity events and insurance-related data. In another example, the token system 1202 can provide data corresponding to token transactions and associated cyber resilience metadata, and/or the passport system 1220 can receive or identify the tokenized cyber resilience data via interactions with various tokens (e.g., performance tokens, roll-up tokens, etc.). In another example, the metadata collection system 1226 can receive cyber resilience data from user computing systems 1210 or from third-party systems 150 through the ledger interface 1224. In another example, the metadata collection system 1226 can receive encrypted cybersecurity posture information and insurance data when a company signs up on the platform. In some implementations, the passport system 1220 can collect and process retrieved cyber resilience data related to the historical cybersecurity performance of the company and current risk assessments. Further, in another example, the passport system 1220 can gather data from external cybersecurity assessment tools integrated via the ledger interface 1224. For example, the passport system 1220 can collect data from outputs of autonomous agent operations.

In some implementations, at block 1720, the one or more processing circuits can encrypt the cyber resilience data. For example, the cryptographic system 1222 of the passport system 1220 can apply various encryption algorithms or techniques (e.g., AES-256, RSA, ECC (Elliptic Curve Cryptography), etc.) to encrypt various types of cyber resilience data (e.g., performance data 1410*a*, safeguard data 1410*c*, etc.). For example, the cryptographic system 1222 can apply a quantum-safe encryption protocol to generate a protected data package including the cyber resilience data. In some implementations, at block 1720, the one or more processing circuits can encrypt a portion of the cyber resilience data. That is, the passport system 1220 can selectively encrypt portions of the cyber resilience data (e.g., encrypting attributes within policy data 1410*d* or particular records in claims data 1410*f*) received at block 1710 based on determined parameters (e.g., sensitivity, relevance, etc.) corresponding to the data or based on various additional factors (e.g., entity preferences, regulations, policy requirements, etc.). For example, the cryptographic system 1222 can selectively encrypt attributes within policy data 1410*d*, such as encryption of policy coverage data, while leaving other attributes unencrypted. In another example, the passport system 1220 can apply encryption to claims data 1410*f* to encrypt sensitive or private data such as financial amounts or claim descriptions based on determined sensitivity levels or regulatory requirements, and/or the passport system 1220 can not apply encryption to other received data (e.g., firmographics data 1410*b*) such that at least a portion of data received at block 1710 is encrypted. Further, the passport system 1220 can perform encryption dynamically as data is ingested or updated (e.g., encrypting transaction data when such data is entered into the system or encrypting data subsets based on access control policies).

In some implementations, at block 1730, the one or more processing circuits can generate a metadata object. In some examples, a metadata object generally refers to a structured set of data that provides information about other data, including data such as identification information, descriptive information, administrative information, structural information, and/or contextual information to assist in organizing, finding, and/or understanding the underlying data. For example, the passport system 1220 can generate a metadata object including various attributes such as data collection timestamps, data source identifiers, and/or categorization tags. In another example, the metadata object can be generated to include information about the cyber resilience data, such as data on the origin of the data (e.g., user computing systems 1210 or third-party systems 150), data processing stages, and/or data types (e.g., performance data 1410*a* or policy data 1410*d*). In some implementations, at block 1730, the one or more processing circuits can generate a metadata object including metadata of cyber resilience data. For example, the passport system 1220 can generate a metadata object (e.g., information of a token) to encapsulate data related to the encrypted cyber resilience data (e.g., encryption algorithms used, encryption timestamps) and include references to related events or records (e.g., linking policy data 1410*d* that can be encrypted to security incidents or compliance checks). Further, the metadata object generated by the passport system 1220 can incorporate contextual information about data handling practices (e.g., data access controls, audit trails) and compliance measures (e.g., adherence to industry standards or internal policies) corresponding to cyber resilience data received or collected at block 1710.

In some implementations, at block 1740, the one or more processing circuits can generate a cyber resilience identity. In some examples, a cyber resilience identity generally refers to a dynamic, identifier that encapsulates various aspects of an entity or organization cyber resilience posture (e.g., dynamic passport 1332). For example, the passport system 1220 can generate a dynamic passport 1332 that includes a link to the metadata object, and/or the metadata object can provide context about the cyber resilience data (e.g., data type, encryption data, data source information, etc.). In some implementations, the passport system 1220 can generate a cyber resilience identity linked to a unique identifier (UID) of an entity or organization. For example, the UID can be assigned by the passport system 1220 to reference and track the cyber resilience data of the entity and provide the entity with access to such data. Further, in some examples, the passport system 1220 can generate a cyber resilience identity incorporating or being otherwise linked to a performance event dataset (e.g., cyber resilience dataset used to record performance metrics, security incidents, and/or compliance activities linked to the data of the entity). For example, the passport system 1220 can generate the dynamic passport 1332 to reflect updates from performance tokens, track incident logs, and/or link such records with relevant compliance checks. Further, as new data or events occur, the passport system 1220 can update the cyber resilience identity (e.g., dynamic passport 1332) to reflect new or updated information.

In some implementations, at block 1750, the one or more processing circuits can encapsulate the cyber resilience identity. For example, encapsulation can generally include securing, containerizing, and/or packaging the cyber resilience identity within a data structure. In some implementations, at block 1750, the one or more processing circuits can encapsulate the cyber resilience identity within a control structure restricting one or more updates or redemptions of the metadata object. For example, the passport can be linked to a control structure which can define permissions or conditions under which a metadata object (e.g., data of tokens) can be altered or accessed. In some examples, the control structure can include tokens that represent secure access points or validation measures for the encapsulated identity. In another example, the passport system 1220 can use a digital signature within the control structure to verify the authenticity of the encapsulated cyber resilience identity and protect the identity and corresponding resilience data from tampering. Additionally, the passport system 1220 can implement access controls (e.g., RBACs) within the control structure that restrict access based on user roles or access levels to verify that authorized entities can modify or view elements of the cyber resilience identity. For example, the control structure can incorporate a dynamic passport 1332, which can include tokens 1334*a*-1334*e* (e.g., resilience tokens), at least one (e.g., at least one (e.g., each)) linked to a metadata interface 1370 with metadata objects 1372*a*-1372*e*. In some examples, encapsulating can include the passport system 1220 storing or aggregating the dynamic passport 1332 and tokens 1334 and setting corresponding access permissions (e.g., based on compliance with cyber resilience standards). For example, the control structure processor 1330 can output the encapsulated data when conditions or permissions are verified or when a valid decryption key is presented. For example, encapsulating can include or refer to encrypting the cyber resilience identity using quantum-safe encryption protocols or signing the identity based on a quantum-safe digital signature protocol.

In some implementations, at block 1760, the one or more processing circuits can determine an access data structure. For example, an access data structure can define a format and/or organization of data that specifies how access permissions and conditions are structured and/or enforced. For example, the access data structure can incorporate access control lists (ACLs) or attribute-based access control (ABAC) mechanisms to specify access rights and restrictions based on user attributes or roles. In some implementations, at block 1760, the one or more processing circuits can determine at least one access data structure being compatible with the control structure. For example, the passport system 1220 can identify an access data structure that aligns with the permissions and constraints established by control structure processor 1330. For example, the passport system 1220 can identify an access data structure that conforms to the permissions and constraints established by the smart contract control structure 1320. Additionally, the passport system 1220 can integrate the access data structure with the smart contract control structure 1320 by implementing token-based authorization or rule-based access controls to manage access to the cyber resilience identity. Further, the passport system 1220 can configure the access data structure to enforce access permissions and conditions using control protocols (e.g., token validation procedures through token interface 1310 or multi-factor authentication settings within the smart contract control structure 1320). For example, the passport system 1220 can configure an access data structure that uses token-based authorization to allow entities with valid tokens (e.g., tokens 1334a-1334e) generated by token generator 1340 to access certain metadata objects 1372 within the dynamic passport 1332.

In some implementations, at block 1770, the one or more processing circuits can broadcast the cyber resilience identity. For example, the passport system 1220 can broadcast the generated cyber resilience identity, including its associated metadata and performance event dataset, to a distributed ledger such as blockchain 1270 or to agent network. In some examples, broadcasting can include the passport system 1220 using the blockchain interface 1360 to transmit the identity and associated data so that it is securely recorded and accessible across the distributed ledger network. In some implementations, at block 1770, the one or more processing circuits can broadcast the cyber resilience identity to a ledger or distributed ledger. For example, the passport system 1220 can use the blockchain interface 1360 to broadcast the cyber resilience identity to blockchain 1270, where it can be immutably stored and made accessible for future verification and audit. In another example, the passport system 1220 can broadcast the identity to multiple nodes within a distributed ledger, distributing the validation and recording of the cyber resilience identity across the network. Further, the broadcast can include cryptographic proofs or signatures to authenticate the identity, restricting updates or accesses to the identity as recorded on the ledger to authorized entities. For example, the passport system 1220 can broadcast the dynamic passport 1332, along with linked tokens 1334a-1334e and associated metadata objects 1372a-1372e, to blockchain 1270, where the broadcasted information can be validated by consensus mechanisms and securely stored across the distributed ledger.

In some implementations, the one or more processing circuits can receive an access request for the cyber resilience identity. In some implementations, the one or more processing circuits can receive, from an entity computing system corresponding to the cyber resilience identity or from an authorized entity computing system corresponding to an authorized entity of a plurality of authorized entities, an access request including at least one access data structure compatible with a control structure for restricting one or more updates and redemptions of a metadata object corresponding with the cyber resilience identity. That is, the passport system 1220 can receive an access request that includes data structures, such as access tokens or certificates, which are evaluated against role-based access controls (RBACs) defined by the control structure (e.g., smart contract). In some examples, the cyber resilience identity can be associated with an entity and can be encapsulated within a control structure that links the identity to various tokens, such as performance tokens or safeguard tokens, which authorized entities (e.g., vendors, insurers) can request access to (e.g., a type of access such as read access, write access, etc.).

In some implementations, the one or more processing circuits can verify the access data structure. In some implementations, the one or more processing circuits can verify the at least one access data structure using the control structure. For example, the control structure (e.g., smart contract) can assess whether the access request complies with the predefined role-based access controls (RBACs) and cryptographic validation protocols. That is, verifying can include determining if the requesting entity has the permissions to access or modify tokens or tokenized data within the cyber resilience identity, allowing authorized entities to interact with the associated metadata objects or performance event datasets in various ways based on various access controls.

In some implementations, the one or more processing circuits can grant access to the metadata object and the performance event dataset of the cyber resilience identity. In some implementations, the one or more processing circuits can grant access to the metadata object and the performance event dataset to the entity or the authorized entity. For example, after verifying the access request, the passport system 1220 can grant access to tokens within the cyber resilience identity, such as performance tokens or safeguard tokens. That is, granting access can include permitting or allowing the user computing system 1210 or the authorized entity computing system (e.g., third-party system 150 or user computing system 1210) to retrieve information about the cyber resilience performance of the entity over time or to view and interact with tokenized data, depending on the permissions defined by the RBACs.

In some implementations, the one or more processing circuits can decrypt the metadata object. In some implementations, the one or more processing circuits can decrypt the metadata object after access is granted. For example, the passport system 1220 can use the cryptographic system 1222 to decrypt tokens or portions of tokenized data as permitted by the verified access request. That is, the decryption process can be applied selectively, allowing the data segments authorized by the RBACs to be decrypted and made accessible to the requesting entity. Additionally, the decryption can be performed in real-time and/or near real-time as the access request is processed, maintaining the security of the metadata object throughout the interaction.

In some implementations, the one or more processing circuits can provide access to the metadata object and the performance event dataset. In some implementations, the one or more processing circuits can provide access to the metadata object and the performance event dataset by facilitating retrieval using a secure interface between the one or more processing circuits and the entity computing system or the authorized entity computing system. For example, the passport system 1220 can use a secure interface, such as a blockchain interface 1360, to allow the user computing system 1210 or the authorized entity computing system to retrieve and interact with the decrypted metadata object and performance event dataset. That is, the interface enforces the RBACs and control structure policies during data retrieval, restricting access to the performance tokens and other sensitive information to authorized entities. Additionally, encryption protocols can be applied during data transmission to protect the integrity and confidentiality of the data as it is accessed by the requesting entity.

In some implementations, the control structure includes a verification function to restrict the one or more updates and redemptions of the metadata object. For example, the smart contract control structure 1320 can include a verification function that validates requests to update or redeem the metadata object based on predefined rules or policies. This function can operate within the control structure to restrict any attempted updates or redemptions to those that meet verification criteria. In some implementations, the verification function is executable by control structure to validate one or more of the one or more updates and redemptions of the metadata object by verifying one or more cryptographic proofs of authorization of authorized entities prior to updating the cyber resilience identity. For example, the smart contract control structure 1320 can execute a verification function that checks cryptographic proofs, such as digital signatures or hashed authentication tokens, from multiple authorized entities before processing any changes to the metadata object. In another example, the verification function can cross-reference these cryptographic proofs with a list of pre-approved entities stored within the smart contract control structure 1320 to verify that entities with the correct authorization can initiate updates. Additionally, the verification function can include multi-factor authentication protocols, where authorized entities provide multiple forms of verification (e.g., a combination of cryptographic proofs and biometric data) before any updates to the cyber resilience identity (e.g., dynamic passport 1332) are processed.

In some implementations, the one or more processing circuits can be further configured to receive or identify additional cyber resilience data of an entity corresponding to the cyber resilience identity. For example, the metadata collection system 1226 of the passport system 1220 can gather additional data that complements the performance data 1410*a*, safeguard data 1410*c*, and/or other cyber resilience data previously received at block 1710. This additional data can include updated incident data 1410*e* or newly identified vulnerabilities from third-party systems 150. In some implementations, the one or more processing circuits can be further configured to receive at least one cryptographic proof of provenance of the additional cyber resilience data. For example, the passport system 1220 can generate a cryptographic proof of provenance by creating a secure hash (e.g., using SHA-256) of the additional cyber resilience data, such as a software update or new compliance report. This proof of provenance can be used to verify the origin and integrity of the data, ensuring that it has not been tampered with during transmission or storage. In some implementations, the one or more processing circuits can be further configured to verify, using the verification function of the control structure, the at least one cryptographic proof of provenance. For example, the smart contract control structure 1320 can compare the cryptographic proof with existing transaction records and digital signatures stored within blockchain 1270 or other distributed ledgers, validating the authenticity and integrity of the newly received data before it is appended to the cyber resilience identity.

In some implementations, the one or more processing circuits can be further configured to update, using the control structure, the cyber resilience identity by updating the metadata object or appending the additional cyber resilience data to the performance event dataset. For example, the smart contract control structure 1320 can automatically update the metadata object to reflect new security incidents or append the additional data to the performance event dataset, linking the metadata object with existing records in dynamic passport 1332. In some implementations, the one or more processing circuits can be further configured to broadcast, using the control structure, the updated cyber resilience identity to the ledger or the distributed ledger. For example, the passport system 1220 can use blockchain interface 1360 to broadcast the updated cyber resilience identity and verify that nodes within blockchain 1270 receive the update and that the updated identity is securely recorded across the distributed ledger for future verification and access.

In some implementations, the one or more processing circuits can be further configured to receive, from an entity computing system of an entity corresponding to the cyber resilience identity or from an authorized entity computing system corresponding to an authorized entity of a plurality of authorized entities, an access request for the cyber resilience identity. For example, the passport system 1220 can receive an access request from third-party systems 150 or user computing systems 1210, where the request can originate from an entity seeking to access or update the cyber resilience identity. This request can be routed through the ledger interface 1224, which can validate the origin of the request and determine the appropriate access level. The request can involve accessing data, such as policy data 1410*d* or performance data 1410*a*, with verification against stored access control policies. In some implementations, the access request includes the at least one access data structure. For example, the request can include an access data structure such as a token-based authentication key or a cryptographic certificate that aligns with the predefined access protocols of the smart contract control structure 1320 to identify and authenticate the requesting entity.

In some implementations, the one or more processing circuits can verify, using the control structure, the at least one access data structure. For example, the smart contract control structure 1320 can cross-reference the access data structure with stored access permissions, checking against the ACLs or ABAC mechanisms to determine if the requesting entity is authorized to access or modify the cyber resilience identity. In some implementations, the one or more processing circuits can be further configured to grant access to the metadata object and the performance event dataset within the cyber resilience identity to an entity or an authorized entity. For example, upon successful verification, the passport system 1220 can unlock portions of the metadata object and performance event dataset, allowing the authorized entity to retrieve and view the data through a secure access protocol. In some implementations, the one or more processing circuits can be further configured to decrypt the metadata object. For example, the cryptographic system 1222 of the passport system 1220 can apply decryption algorithms to the metadata object, such as decrypting policy data or incident logs for an authorized entity to review. In some implementations, the one or more processing circuits can be further configured to provide access to the metadata object and the performance event dataset by facilitating retrieval using a secure interface between the one or more processing circuits and the entity computing system or the authorized entity computing system. For example, the passport system 1220 can establish a secure communication channel with the entity computing system via the ledger interface 1224, transmitting the metadata object and performance event dataset to the verified entity or authorized entity.

In some implementations, the cyber resilience identity is a data structure encapsulating a plurality of resilience tokens. For example, the passport system 1220 can generate a dynamic passport 1332 that includes multiple resilience tokens 1334. In some implementations, at least one (e.g., at least one (e.g., each)) of the plurality of resilience tokens corresponds to a cybersecurity dimension of a posture of an entity corresponding to the cyber resilience identity. For example, the unified tokens 1312, real-time and/or near real-time tokens 1314, and/or effectiveness tokens 1316 can at least one (e.g., at least one (e.g., each)) represent distinct cybersecurity dimensions, such as implemented safeguards, compliance with requirements, and/or ongoing security assessments. That is, a cybersecurity dimension can correspond to an aspect or category of an overall cybersecurity posture of the entity, such as a performance, requirements, insurability, and/or incident response readiness category. For example, one dimension can include the technical measures in place to prevent unauthorized access (e.g., encryption standards, firewall configurations), and/or another dimension can assess the adherence of the entity to industry regulations (e.g., GDPR compliance). The various tokens described herein collectively provide a multi-faceted or multi-dimensional perspective on the cybersecurity posture of the entity, reflecting various aspects or dimensions of the security over time.

In some implementations, the plurality of resilience tokens can include at least one unified token including the cyber resilience data captured over a period of time, at least one evaluation token including the cyber resilience data captured at a plurality of points in time over the period of time, and/or at least one roll-up token including data of the at least one unified token and the at least one real-time and/or near real-time corresponding with a security performance of the entity over the period of time. For example, the unified token processor 1322 of the smart contract control structure 1320 can generate unified tokens 1312 that aggregate cybersecurity data (e.g., safeguards, policies, incidents) over a period of time, providing an overview of the cybersecurity measures of the entity. The real-time and/or near real-time token processor 1324 can generate real-time and/or near real-time tokens 1314 (e.g., evaluation) that capture snapshots of the cybersecurity posture of the entity at various intervals, reflecting the ongoing security status of the entity. The effectiveness token processor 1326 can generate effectiveness tokens 1316 (e.g., roll-up) by combining data from the unified tokens 1312 and real-time and/or near real-time tokens 1314, providing an assessment of the security performance of the entity over time, including significant events or changes in security posture.

In some implementations, the at least one unified token can include a unified safeguard token including data of implemented safeguards and configurations over the period of time, a unified requirements token including data of entity-specific requirements and third-party requirements over the period of time, a unified asset token including data of a plurality of assets of the entity over the period of time, and/or a unified attestation token including data of entity attestations over the period of time. For example, the unified token processor 1322 can generate a unified safeguard token that includes records of security measures implemented by the entity, such as firewall settings or encryption protocols, over a specified period. In another example, the unified token processor 1322 can generate a unified requirements token that captures compliance data related to internal policies and third-party security standards, tracking how the entity meets these requirements over time. The unified token processor 1322 can also generate a unified asset token that records information about the assets of the entity, such as servers, network devices, and/or software licenses, and/or their associated security configurations during the period. Additionally, the unified token processor 1322 can generate a unified attestation token that includes data on certifications, audits, and/or attestations made by the entity regarding its cybersecurity posture over the period.

In some implementations, the at least one real-time and/or near real-time token can include a plurality of evaluation tokens including data of at least one of a posture of the entity, a state of the entity, and/or a protection of the entity at a point in time of the plurality of points in time over the period of time. For example, the real-time and/or near real-time token processor 1324 of the smart contract control structure 1320 can generate evaluation tokens that capture snapshots of the cybersecurity posture of the entity at various points in time. These tokens can include data on the state of implemented security measures (e.g., firewall rules, encryption status), the overall security posture of the entity (e.g., risk levels, compliance status), and/or the effectiveness of protection mechanisms deployed across the infrastructure of the entity. In another example, the evaluation tokens can reflect the response of the entity to incidents or threats, documenting how the security systems were adjusted or enhanced in real-time and/or near real-time. The real-time and/or near real-time token processor 1324 can also generate tokens that track the operational status of systems within the entity, such as the availability of services or the integrity of key data at intervals. These tokens provide a time-stamped record of the security environment of the entity, which supports analysis of how the cybersecurity posture of the entity changes over time.

In some implementations, the one or more processing circuits can be further configured to generate the at least one access data structure for at least one of an entity computing system of an entity corresponding to the cyber resilience identity or an authorized entity computing system corresponding to an authorized entity of a plurality of authorized entities. For example, the passport system 1220 can generate an access data structure that defines access permissions and conditions for the cyber resilience identity, incorporating attributes such as user roles, access levels, and/or data access rights. In another example, the passport system 1220 can generate a role-based access control (RBAC) mechanism, where at least one (e.g., at least one (e.g., each)) role is associated with predefined access rights and permissions linked to aspects of the cyber resilience identity. Alternatively, in some implementations, the one or more processing circuits can be further configured to receive, from at least one of the entity computing system or the authorized entity computing system, the at least one access data structure. For example, the passport system 1220 can receive an access data structure from a third-party system 150, where the structure includes access control lists (ACLs), attribute-based access control (ABAC) definitions, RBAC policies, and/or various additional and/or alternative controls. In another example, the passport system 1220 can receive access tokens or digital certificates from the authorized entity computing system, specifying access permissions and conditions for interacting with the cyber resilience identity.

In some implementations, the least one access data structure can include a token, key, certificate, and/or access mechanism. For example, the passport system 1220 can generate a digital token that grants access rights to an authorized entity to interact with certain components of the dynamic passport 1332. In another example, the passport system 1220 can issue a cryptographic key or digital certificate to decrypt certain portions of the cyber resilience data or verify the authenticity of transactions related to the dynamic passport 1332. In some implementations, the one or more processing circuits are further configured to, in determining the at least one access data structure being compatible with the control structure, in response to receiving the at least one access data structure, configure the at least one access data structure by updating the control structure to enforce restrictions on the one or more updates and redemptions of the metadata object. For example, the passport system 1220 can receive a token from an authorized entity computing system and update the smart contract control structure 1320 to restrict the modification of metadata objects linked to the dynamic passport 1332 based on the permissions encoded within the token. In another example, the passport system 1220 can update the smart contract control structure 1320 to incorporate the received access data structure, thereby enforcing restrictions on how and when metadata objects can be accessed or modified.

In some implementations, updating the control structure includes updating one or more access parameters of the control structure. For example, the passport system 1220 can modify access control lists (ACLs) or role-based access control (RBAC) settings within the smart contract control structure 1320 to align with the permissions granted by the new access data structure. For example, RBACs can include rules for accessing tokenized data (e.g., metadata object) based on roles (e.g., entity types or roles of a user within an entity) or other access control parameters (e.g., date/time, user preferences, etc.) In some examples, users or entities associated with a cyber resilience identity (e.g., passport) can select or provide information used for generated RBACs (e.g., based on consent preferences selected via a user interface, other data sharing preferences associated with an entity, regulations, etc.). For example, the passport system 1220 can modify access control lists (ACLs) or role-based access control (RBAC) settings within the smart contract control structure 1320 to align with the permissions granted by the new access data structure. That is, the passport system 1220 can dynamically adjust the control structure to reflect changes in authorized entities, permission levels, and/or data access restrictions as defined by the new access data structure. Further, the passport system 1220 can update cryptographic keys or tokens associated with the control structure to ensure that the entities with the updated permissions can access or modify the cyber resilience identity. Additionally, the passport system 1220 can track and log these updates in the distributed ledger.

In another example, the passport system 1220 can adjust encryption parameters or key management policies within the smart contract control structure 1320 to confirm that entities with a correct or matching access data structure can interact with the dynamic passport 1332. In some implementations, the one or more processing circuits are further configured to, in determining the at least one access data structure being compatible with the control structure, in response to generating the at least one access data structure, provide, to the entity computing system or the authorized entity computing system, the at least one access data structure. For example, the passport system 1220 can generate a digital certificate or token and transmit it to the authorized entity computing system, granting access to components of the dynamic passport 1332 based on the permissions encoded within the access data structure. In another example, the passport system 1220 can provide an access key to the entity computing system, authorizing interaction with the metadata object or performance event dataset associated with the dynamic passport 1332 (e.g., interaction with the tokens 1334) to one or more entities (e.g., an entity corresponding to the passport, another authorized entity such as an insurer of a group of approved insurers, etc.).

In some implementations, the cyber resilience data can include at least one of firmographics data, safeguard data, performance data, policy data, incident data, and/or claims data. For example, the passport system 1220 can collect and categorize cyber resilience data from various sources, such as firmographics data 1410*b* detailing organizational characteristics, safeguard data 1410*c* describing implemented security measures, performance data 1410*a* capturing cybersecurity performance metrics, policy data 1410*d* outlining internal and external security policies, incident data 1410*e* reporting security breaches or vulnerabilities, and/or claims data 1410*f* related to insurance or legal claims following security incidents. For example, the one or more processing circuits can receive cyber resilience data from one or more agents and/or via outputs of one or more operations performed by the one or more agents. In some implementations, the control structure can include a smart contract, and/or the control structure can include a smart contract control structure. For example, a smart contract generally refers to a self-executing contract with the terms of the agreement written into code. In some examples, the smart contract control structure can manage the execution of rules and conditions tied to the cyber resilience identity. For example, the smart contract control structure can automate token transactions, verify cryptographic proofs, and/or enforce access control measures without manual intervention. The smart contract can interact with the tokens (e.g., unified tokens 1312, real-time and/or near real-time tokens 1314, effectiveness tokens 1316) to validate actions such as updating the metadata object, transferring ownership of tokens, and/or adjusting permissions within the control structure. The smart contract control structure can also execute predefined functions based on the conditions encoded in the smart contract, such as triggering updates to the dynamic passport 1332 when new resilience data is received or when certain criteria are met.

In some implementations, tokenization of the data can provide a secure and efficient method for clients to share their cyber risk information with brokers and carriers. For example, the passport system 1220 can use a tokenization process to convert cyber resilience data into tokens that can be securely shared and managed. In some implementations, DNFTs can include a journal of performance history events, such as cybersecurity management events or insurance-related events. For example, the passport system 1220 can generate DNFTs verifiable through a multi-signature wallet or a signature verification mechanism within the smart contract, involving trusted entities to sign off on events they participated in. In some implementations, insureds can create and manage their DNFTs using an interface provided by the passport system 1220, securely storing their cybersecurity posture and insurance information for updates. In some examples, DNFTs can track and verify performance history events, maintaining authenticity and transparency.

In some implementations, access to sensitive data can be controlled through an access control mechanism within the smart contract, restricting decryption and access to authorized parties. For example, the passport system 1220 can manage access controls to sensitive data, ensuring authorized entities can decrypt and access data. The DNFT structure can feature an identifier, encrypted metadata, and/or a list of performance history events. The passport system 1220 can use an updateDNFT function (e.g., DNFT.updateDFNT( )) to update the encrypted metadata link in the DNFT, and/or a signEvent function to verify the authenticity of performance history events by including a fee in tokens, allowing the DNFT owner to add event signatures. The passport system 1220 can implement DNFT visibility and access control through an access control mechanism in the smart contract or the API.

In some implementations, the components and data flow for creating a dynamic NFT (DNFT) for at least one (e.g., at least one (e.g., each)) business that tokenizes its security posture can include business registration and data collection. For example, the passport system 1220 can facilitate the registration process, where businesses provide information, including firmographics, posture information, and/or insurance data. Once the data is collected, it can be encrypted using key management via an API and stored in a secure data storage service. The passport system 1220 can deploy a smart contract to facilitate the creation, update, and/or transfer of DNFTs, using blockchain oracles to access encrypted data from the API and include it in the DNFT as metadata.

In some implementations, the DNFT structure can include an identifier, encrypted metadata linked to data accessible via the API, and/or a journal of performance history events. For example, as a cybersecurity posture of a company and insurance information change, the encrypted data can be updated in secure storage, and/or the metadata link in the DNFT can be revised. The passport system 1220 can use a multi-signature wallet or a signature verification mechanism within the smart contract to maintain the authenticity of performance history events, involving trusted entities to sign off on events they were involved in. For example, authorized parties can access the encrypted information via an access control mechanism in the smart contract or the API, restricting decryption and access to the DNFT owner, authorized insurers, and/or brokers. The architecture of the passport system 1220 can achieve tokenization of a cybersecurity posture of a business while maintaining data confidentiality and allowing authorized parties to securely access the information.

In some implementations, a company can register on a platform and create an account. For example, the passport system 1220 can facilitate the company in uploading its encrypted cybersecurity posture and insurance information to the platform. The company can create metadata from the uploaded information, encrypt it with key management systems, and/or upload it to a secure data storage service. The passport system 1220 can facilitate the creation of the DNFT using platform-acquired tokens and incorporate the encrypted data as metadata within the DNFT. In some implementations, the company can view and manage its DNFTs through an interface provided by the passport system 1220. For example, this can involve handling performance history events, such as cybersecurity management events or insurance-related events, and/or updating the encrypted metadata link. The passport system 1220 can use a signEvent function to verify the authenticity of events, including a fee paid in tokens and engaging trusted entities to sign off on events they participated in. In some implementations, insurers or brokers can access the encrypted information in the DNFTs with the permission of the company to assess risk and propose suitable insurance policies. For example, the passport system 1220 can provide a method for authorized parties to securely manage and verify the cybersecurity posture and insurance information of a company, improving trust and reducing the likelihood of fraud.

Cyber Resilience Graph and Cyber Resilience Stream Applications

Referring now to FIG. 18, a graph 1800 for tokens using cyber resilience data is shown, according to some implementations. In some examples, the graph 1800 can be a knowledge graph, neural network, and/or any other graph model designed to analyze and derive insights from cybersecurity data. The graph can include nodes 1810 and edges 1820. The knowledge graph 1800 can include semantic relationships between a cybersecurity passport and cyber requirements. In some implementations, the nodes 1810 of the knowledge graph can represent tokens and at least one (e.g., each) edge 1820 can be a relationship. That is, at least one (e.g., each) node 1810 can correspond to a digital representation of a compliance state or cybersecurity event within a distributed entity or third-party network (DETPN), encapsulating critical data such as compliance parameters met, incident resolutions, and/or timing phases. That is, at least one (e.g., each) node 1810 can be one or more generated tokens including at least one compliance level. For example, a node can be the compliance level of a vendor at a specific time (e.g., L3 compliance on January 15th) and/or the details of an incident (e.g., a ransomware attack resolved within 48 hours). Additionally, the nodes can include metadata such as timestamps, affected systems, and/or actions taken to improve resilience.

For example, the relationships can include unique identifiers (UIDs) to other tokens. That is, the edges 1820 of the knowledge graph can be relationships between the tokens, such as dependencies, causal links, and/or shared attributes across different nodes. That is, at least one (e.g., each) edge can include one or more associations between the first token and additional tokens. That is, an edge can denote that compliance in one organization is dependent on the security safeguards of a vendor in the supply chain or that two nodes share a common cybersecurity framework (e.g., NIST compliance). For example, edges can indicate relationships (e.g., "Vendor A's compliance validated by Vendor B's safeguards", "Incident X leads to compliance downgrades across multiple entities"). Additionally, the edges can be weighted to reflect the strength, frequency, and/or criticality of the relationships (e.g., a stronger weight for dependencies on critical infrastructure).

In some implementations, the graph 1800 can incorporate both unilateral and bilateral edge relationships. That is, a unilateral edge can 1820 signify a one-directional relationship between organizations. For example, a unilateral edge 1820 can indicate when the compliance of the tokenized entity for the respective node 1810 depends exclusively on another organization without reciprocity. For example, a unilateral edge can be "Vendor A's security posture relies on Vendor B's data transmissions". The ability of weighted and directional edges 1820 allows the graph 1800 to reflect the strength, frequency, and/or criticality of the relationships between the nodes 1810 (e.g., tokens), further allowing the system to model hierarchical dependencies or cause-effect relationships for entities within a supply chain, as will be further discussed in relation to FIG. 19.

In some implementations, a bilateral edge 1820 can signify a two-way relationship including mutual influence between nodes. For example, bilateral edges 1820 can indicate interdependencies, including when two organizations collaborate to maintain a shared compliance state or when a detected incident impacts both parties. For example, a bilateral edge 1820 can be Vendor C and Vendor D sharing a mutual reliance on a centralized identity management system, wherein a change in one directly affects the other. Additionally, unilateral and bilateral edges 1820 can be dynamically weighted to capture varying degrees of influence or dependence over time. For example, a bilateral edge can have a higher weight during an active compliance audit involving both parties and a unilateral edge can be weighted more heavily during a detected cybersecurity event affecting a single entity.

In some implementations, the graph 1800 can facilitate advanced analytics and AI-driven insights for cybersecurity and risk management. Directionality and weights of edges can be used to identify critical points of failure, modeling cascading effects of incidents, improving resource allocation, and/or other functions to strengthen overall resilience. That is, the graph can allow systems to infer vulnerabilities, predict compliance trends, and/or recommend tailored security products to organizations. For example, an AI model can traverse the graph to identify high-risk entities based on their interconnectedness with non-compliant vendors and suggest specific measures such as deploying endpoint detection and response (EDR) solutions or upgrading to multi-factor authentication (MFA). Additionally, the knowledge graph can support insurance underwriting by facilitating insurers to assess cumulative risks and recommend premiums based on aggregated compliance and resilience data across a supply chain. In some implementations, the graph can serve as a dynamic repository for visualizing the cybersecurity posture of interconnected organizations, assisting regulators, insurers, and/or internal stakeholders in decision-making, as discussed in relationship to FIG. 19. For example, an organization querying its vulnerability to supply chain attacks can leverage the graph to identify unilateral dependencies with high-risk vendors or bilateral relationships requiring improved safeguards.

Additionally, FIG. 18 illustrates a tokenized knowledge graph 1800 representing a structure for tracking compliance data and cybersecurity states in the context of the DETPN. The nodes 1810 represent tokens generated and stored by the compliance detection circuit 185 of the system 100. Each token corresponds to compliance data or cybersecurity states (e.g., compliance levels, cybersecurity incidents, risk indicators, and/or any resilience metrics) of entities within the DETPN. The edges 1820 represent relationships between tokens (e.g., shared vulnerabilities, temporal dependencies, causal relationships, and/or any associated metrics), which can include shared compliance parameters or other dependencies. For example, the edges can indicate associations between detected vulnerabilities and corresponding incident responses, where tokens are connected to represent the flow of compliance states across entities in the DETPN.

The compliance detection circuit 185 of the system 100 can generate tokens 1810 based on environmental data collected from the DETPN (e.g., system logs, network activity metrics, telemetry data, and/or any operational signals). For example, the compliance detection circuit 185 can receive environmental data such as system logs, network activity metrics, or indications of detected anomalies. In another example, the compliance detection circuit 185 can store compliance levels (e.g., adherence to patch policies, configuration validation, incident records, and/or any compliance indicators) derived from this environmental data as tokens in the graph. The edges 1820 can define the contextual relationships between tokens (e.g., operational dependencies, shared compliance factors, historical correlations, and/or any system metrics), such as shared vulnerabilities between interconnected entities or dependencies between compliance events across operational phases.

The processing circuits of the system 100 can evaluate the relationships 1820 between tokens (e.g., compliance dependencies, operational impacts, temporal sequences, and/or any risk factors) to assess dependencies and impacts within the DETPN. For example, the system 100 can analyze an edge to determine whether a compliance violation at one entity is linked to downstream effects on other interconnected entities. In another example, the compliance detection circuit 185 can compare relationships between compliance levels (e.g., pre-incident and post-incident compliance states, updated vulnerability assessments, and/or any environmental changes) before and after operational changes, such as onboarding a new vendor or updating network configurations. In yet another example, the edges can be used to identify recurring patterns or conditions (e.g., misconfigurations, recurring vulnerabilities, interrelated threats, and/or any incident trends) that contribute to compliance deviations.

The hierarchical structure of the tokenized graph 1800 can support the tracking of compliance data over time (e.g., compliance trends, incident history, vulnerability tracking, and/or any temporal data). For example, the system 100 can store multiple tokens 1810 corresponding to different compliance levels observed at specific intervals. In another example, the compliance detection circuit 185 can compare tokens generated at different timing phases to detect trends in cybersecurity states (e.g., compliance degradation, security improvements, evolving attack vectors, and/or any environmental changes), such as gradual compliance degradation or improvements following incident remediation. In yet another example, the system 100 can utilize the temporal relationships between tokens to identify long-term vulnerabilities or recurring security issues within the DETPN.

The system 100 can integrate the tokenized graph 1800 with additional computational frameworks (e.g., knowledge graphs, semantic models, graph-based algorithms, and/or any external systems) to enhance compliance verification and validation. For example, the processing circuits can correlate token data with external threat intelligence (e.g., IoCs, threat actor profiles, vulnerability databases, and/or any external data) to refine compliance evaluations. In another example, the compliance detection circuit 185 can utilize graph-based algorithms to determine the shortest paths between critical compliance nodes (e.g., high-risk nodes, interconnected entities, critical infrastructure, and/or any system components), identifying the most vulnerable connections in the DETPN. In yet another example, the system 100 can update the graph dynamically as new tokens are generated (e.g., incident response tokens, updated compliance states, correlation metrics, and/or any system data), facilitating continuous tracking of compliance states and relationships across the DETPN.

Referring now to FIG. 19, a workflow for an implementation of a cyber resilience query system using a knowledge graph is shown, according to some implementations. The workflow can include input 1910, resilience modeling 1920, and/or output 1930. That is, the cyber resilience query system can be used by an organization to model their cyber resilience and access compliance across interconnected organizations (e.g., entities, third-parties, customers, and/or other organizations) across a supply chain. For example, the workflow can facilitate a query into the vulnerabilities, safeguards, and/or potential cascading risks of an organization based on relationships represented in a graph (e.g., knowledge graph). Additionally, the workflow can generate dynamic updates to reflect real-time and/or near real-time incident data, enhancing the organization's ability to respond proactively to threats.

In some implementations, the input 1910 can include a prompt for cyber resilience. That is, the system can receive input (e.g., via user device) for a user regarding a cyber resilience query. For example, a user can query "What is my cyber resilience?", "What safeguards do we have in place against ransomware attacks targeting third-party data repositories?", and/or "How compliant are our vendors with NIST 800-171 standards?". For example, a user can query "What safeguards reduce susceptibility to ransomware attacks in entities with similar profiles?" or "Which organizations are most affected by a specific type of vulnerability in the supply chain?" The input can be received or identified by the modeler to interpret the prompt, identify relevant nodes and edges in the graph, and/or use contextual information to frame a response. Additionally, an input can include organization-specific data including compliance benchmarks, incident history, and/or operational parameters to add additional context to the query or to provide additional information and/or data for interpreting during resilience modeling 1920. For example, an entity can ask for a summary of their cyber resilience and include new third-party benchmarks for the model to compare the tokenized information in their graph to.

In some implementations, resilience modeling 1920 can processes for modeling, interpreting, generating, mapping, digesting, storing, and/or otherwise interacting with resilience data. Resilience modeling in FIG. 19 is shown to include a graph 1800 and modeler 1940, as an exemplary embodiment. Resilience modeling 1920 can include implementation of any of the systems and processes described in, such as implementation of the validation system 180, including processes performed by the compliance generation circuit 184, compliance detection circuit 185, and token generation circuit 186. The graph 1800 can be a knowledge graph or neural network with nodes and edges as previously discussed used to model tokenized cyber resilience of entities by modeler 1940 to generate the cyber resilience output. The modeler 1940 can include one or more processing circuits (e.g., processing circuit 181 of validation system 180) and/or can be integrated onto any system described herein (e.g., validation system 180, response system 530, etc.)

The modeler 1940 can be an artificial intelligence (AI) or machine learning (ML) system implemented to process tokenized data from the graph 1800 to generate outputs based on cyber resilience input. The modeler 1940 can include various components, such as a data collection layer, preprocessing layer, feature engineering layer, and/or a model training layer. For example, the data collection layer can interface with the knowledge graph 1800, collecting relevant nodes (e.g., compliance tokens) and edges (e.g., relationships or dependencies) to provide contextual insights into cybersecurity states. The preprocessing layer can clean and normalize the data, ensuring compatibility with downstream analysis tasks. The feature engineering layer can extract critical features such as compliance trends, dependency strength, and/or incident frequency, which are integral to the model's functionality.

In some implementations, the transformation stage can be the stage in the CVV pipeline in which the system 100 can generate or identify a graph neural network. The system 100 can include at least one modeler 1940. The modeler 1940 can generate or identify a graph neural network based at least on the one or more generated tokens, wherein the graph neural network includes a plurality of nodes and a plurality of edges. That is, the modeler 1940 can create a graph neural network that represents the relationships and interactions between different entities or third-parties within the DETPN. For example, during the transformation stage, the modeler 1940 can construct a graph neural network where nodes represent entities or compliance tokens, and edges represent associations or interactions between them.

In some implementations, the modeler 1940 can utilize tokenized data to model the relationships and dependencies within the cyber resilience landscape of an organization. For example, a node representing a compliance token for Vendor A (e.g., L3 compliance with ISO 27001) can be linked via an edge to another node indicating that Vendor B's safeguards validate Vendor A's compliance. The modeler 1940 can analyze these connections to infer potential vulnerabilities, evaluate the impact of cybersecurity incidents, and/or predict future compliance states. Additionally, the modeler 1940 can execute heuristic analysis, anomaly detection, and/or trend identification to identify hidden risks or emerging threats.

In some implementations, the modeler 1940 can generate outputs such as verifiable credentials or actionable insights. That is, the modeler 1940 can analyze tokenized compliance data and generate credentials that encapsulate an organization's adherence to cybersecurity standards, such as NIST 800-171 or GDPR. For example, the output can detail the organization's compliance level, recent improvements, and/or dependencies on other entities within the supply chain. These credentials can serve as proof of compliance for regulators, stakeholders, and/or partners.

Furthermore, the modeler 1940 can integrate domain-specific predictive analytics, leveraging the graph 1800 to project future compliance levels or incident probabilities. For instance, by identifying patterns in tokenized data, such as repeated compliance downgrades following similar incidents, the modeler 1940 can recommend preemptive actions to mitigate risks. Additionally, the modeler 1940 can incorporate scenario-based modeling to simulate potential events, such as the compromise of a critical vendor, and/or evaluate its cascading effects across the supply chain.

In some implementations, the modeler 1940 can generate executable functions or plans for organizations to address identified cybersecurity gaps or enhance their resilience strategies. That is, based on tokenized data from the graph 1800, the modeler can create actionable workflows that align with the organization's current compliance level and target objectives. For example, if an organization is determined to be at L2 compliance and aims to achieve L4 compliance, the modeler can generate a step-by-step implementation plan. This plan can include tasks such as deploying specific security controls, conducting employee training programs, upgrading outdated software, and/or implementing advanced monitoring solutions. Additionally, the modeler can create executable scripts or configurations tailored to the organization's environment, such as configuring firewall rules, setting up intrusion detection systems, and/or automating incident response protocols.

In some implementations, the modeler 1940 can generate executable functions or plans for organizations to address identified cybersecurity gaps or enhance their resilience strategies. That is, based on tokenized data from the graph 1800, the modeler can create actionable workflows that align with the current compliance level and target objectives of an organization. For example, if an organization is determined to be at L2 compliance and aims to achieve L4 compliance, the modeler can generate a step-by-step implementation plan. This plan can include tasks such as deploying specific security controls, conducting employee training programs, upgrading outdated software, and/or implementing advanced monitoring solutions. Additionally, the modeler can create executable scripts or configurations tailored to the organization's environment, such as configuring firewall rules, setting up intrusion detection systems, and/or automating incident response protocols.

Additionally, the modeler can leverage predictive analytics to prioritize actions within the plan based on the potential risk or impact of non-compliance. For instance, the modeler can identify a critical dependency in the supply chain that poses a significant risk to compliance and recommend addressing it as a high-priority task. The generated plan can also include milestones, timelines, and/or resource allocation guidelines to ensure efficient implementation. Moreover, the modeler can provide adaptive functions, such as dynamically updating the plan in response to real-time and/or near real-time changes in compliance levels, detected incidents, and/or shifts in regulatory requirements. By offering executable plans grounded in data-driven insights, the modeler 1940 allows organizations to enhance their cyber resilience systematically and effectively.

In some implementations, the output 1930 can include an output for cyber resilience. That is, the output can include data, natural language responses, resilience plans, executable code and/or functions as generated by the modeler. The output can be transmitted to a user device or computing system associated with an organization (e.g., entity computing system(s) 130, third-party computing system(s) 150, computing system(s) 140). For example, the system can generate a resilience scorecard outlining a compliance status corresponding to tokenized compliance levels. The output can include susceptibility to attacks, and/or actionable recommendations for improvement. In some implementations, the system can provide natural language explanations (e.g., your organization has a high dependency on Vendor X, whose compliance with critical safeguards is rated at L1. Consider implementing shared encryption protocols or diversifying vendor relationships." In some implementations, the output can include executable code. For example, the output can include scripts to deploy enhanced security measures automatically or to integrate additional monitoring tools. In some implementations, the output can include resilience plans tailored to specific risks, detailing steps for recovery, resource allocation, compliance upgrades, and/or other resilience posture.

Additionally, FIG. 19 illustrates a system 1800 that processes input 1910 through a tokenized knowledge graph to generate a cyber resilience compliance status 1930. The input 1910 can include a prompt, such as "What is my Cyber Resilience?", representing a query to evaluate compliance or resilience levels across a distributed entity or third-party network (DETPN). Tokens 1810 in the tokenized knowledge graph represent compliance data (e.g., compliance levels, vulnerability metrics, incident records, and/or any environmental factors) or operational states derived from entities in the DETPN. Edges 1820 define relationships between tokens (e.g., temporal dependencies, shared compliance metrics, incident correlations, and/or any contextual inferences). The modeler 1940 can process the tokens and edges to derive outputs, which can be displayed as the cyber resilience compliance status 1930.

The compliance detection circuit 185 can process the input 1910 to identify tokens 1810 relevant to the query and their corresponding edges 1820. For example, the compliance detection circuit 185 can match the input query with tokens representing compliance states associated with a specific timeframe, such as tokens generated from recent security events. In another example, the compliance detection circuit 185 can extract tokens related to operational metrics, such as patch management adherence, endpoint security configurations, or data transfer activities. In yet another example, the compliance detection circuit 185 can identify edges connecting tokens that indicate causal relationships or dependencies, such as connections between a detected vulnerability and subsequent incident responses.

The modeler 1940 can utilize the tokenized knowledge graph 1800 to evaluate relationships and generate compliance outputs. For example, the modeler 1940 can analyze token edges (e.g., historical dependencies, compliance correlations, shared vulnerability paths, and/or any risk relationships) to calculate the overall impact of changes in one compliance state of an entity on interconnected entities. In another example, the modeler 1940 can process tokens representing compliance states across different intervals to evaluate trends, such as improvements in compliance levels following remediation actions or recurring vulnerabilities linked to specific nodes. In yet another example, the modeler 1940 can use the relationships defined by edges to assess operational dependencies, such as the impact of a compromised node on the broader DETPN.

The output 1930 can represent the processed cyber resilience compliance status derived by the modeler 1940. For example, the output can include visualizations of compliance metrics (e.g., compliance trends, incident thresholds, risk scores, and/or any resilience indicators), eligibility status for processes (e.g., product approvals, service authorizations, compliance certifications, and/or any operations), and/or insights into compliance deviations. In another example, the output 1930 can present comparisons of the detected compliance levels with predefined parameters (e.g., patch schedules, incident response timelines, encryption standards, and/or any system benchmarks). In yet another example, the output can highlight tokens or edges associated with critical vulnerabilities or noncompliance factors contributing to risks within the DETPN.

The modeler 1940 can integrate the tokenized knowledge graph 1800 with computational frameworks to enhance its response to the input query. For example, the modeler 1940 can incorporate external threat intelligence (e.g., Indicators of Compromise, attack patterns, vulnerability databases, and/or any external datasets) into the evaluation of tokens and edges to refine compliance outputs. In another example, the modeler 1940 can use machine learning algorithms to predict future compliance states (e.g., risk forecasts, compliance decay models, operational projections, and/or any predictive metrics) based on token relationships. In yet another example, the system 100 can dynamically update the tokenized knowledge graph by generating new tokens (e.g., updated compliance levels, recent incident records, environmental updates, and/or any operational data) and relationships as environmental data changes, ensuring the system maintains accurate and timely compliance tracking across the DETPN.

Referring now to FIG. 20, a cyber resilience dashboard is shown, according to some implementations. That is, a cyber resilience dashboard 2000 that includes a cyber resilience stream 2002 and real-time and/or near real-time (or near real-time and/or near real-time) information associated with threats (e.g., threats affecting you 2004, threats affecting similar orgs 2006, and/or global threat news 2008). The cyber resilience dashboard 2000 can also provide three different lenses through which to view the cybersecurity threat landscape. The "threats affecting you" section 2004 offers information about threats directly targeting the entity, providing real-time and/or near real-time updates and context. For instance, it can show whether peers within the industry are also addressing the same threat, offering comparative insights and potentially guiding response strategies. For example, the treats affecting you can include real-time and/or near real-time information about the particular threat, if the entities peers are acting on it, and/or action buttons allowing the entity to perform various actions. Action buttons within this section allow the entity to quickly respond to threats. These can include options to investigate further, escalate the threat to a response team, and/or activate specific protection measures. The "threats affecting similar orgs" section 2006 provides an overview of threats impacting entities with similar profiles. The "global threat news" section 2008 offers a wider perspective, delivering updates on significant cybersecurity incidents and trends worldwide.

The resilience dashboard 2000 can be used for defining goals through a self-guided, partner guided, and/or benchmark systems. For example, the resilience dashboard can be displayed by a user device to show the validation, response, and/or passport outputs of any of the systems described herein with a plan for the entity to reach those coals. The resilience dashboard 2000 exemplifies how the systems described herein can be used to capture current states (e.g., such as through surveys, voice-to-text, drag n drop, connectors, and/or other data processing functions) to display the current resilience status of the entity. Additionally, the resilience dashboard 2000 allows for and entity to manage gaps through an interface to change configurations, change coverage, change policies, buy tools, buy services, add people to plans or coverage, adjust insurance, change goals, do nothing, and/or otherwise manage resilience corresponding to resilience data. The resilience dashboard 2000 allows the user to implement human assisted actions or can display the result of automated actions and identifies changes.

Expanding on FIG. 20, the cyber resilience dashboard 2000 provides a view of the cybersecurity threat landscape, allowing the entity to stay informed and proactive in addressing potential risks. The cyber resilience stream 2002 captures and records the entitys cyber resilience and coverage levels over time, taking into account various factors such as the locations of data (e.g., EC2 servers in AWS), the implemented safeguards (e.g., EPP, CSPM), and/or the specific threats that can target the entity's environment based on real incidents. The cyber resilience stream 2002 can capture and record the cyber resilience of an entity as tokens. For example, the systems described herein can generate tokens for organizational compliance levels corresponding to compliance parameters and environmental data. The cyber resilience stream 2002 can capture (e.g., via systems described herein, e.g., validation system 180) compliance levels and generate tokens to display on the cyber resilience dashboard.

For example, the cyber resilience stream 2002 can display the tokens generate for an organization. The tokens can be captured compliance levels and can display compliance, insurability compliance, cyber security compliance, threats, coverage, and/or organizational adaptations captured within captured within the tokens or in comparison to the tokens (e.g., tokens captured across time) for one or more organizations within a supply chain. The cyber resilience stream 2002 can capture a historical chain of tokens to show cyber resilience effectiveness state over time. The cyber resilience stream 2002 and cyber resilience dashboard 2000 can be similar to a dashboard, showing multiple versions of cyber history. at least one (e.g., each) row can be a grouping of requirements (e.g., one or more insurability requirements) that include one or more requirements tokens within at least one (e.g., each) row. For example, one row can relate to the insurability requirements of an entity over time. The cyber resilience stream 2002 can include a row for insurability compliance showing tokens indicating whether the entity complied with insurability requirements over time (e.g., periodically, weekly, monthly, daily, etc.). For example, the cyber resilience stream 2002 can display the tokens in comparison to the requirements to indicate whether the entity has been compliant, eligible for coverage, ready for incidents on the supply chain.

By continuously monitoring and assessing this combination of factors, the system can determine the current state of the security posture of an entity, representing it as a dynamic and immutable record (e.g., via captured tokens). The system can generate the security readiness of an entity and identify any areas that require attention or improvement. By providing visual indicators such as green, yellow, and/or red, the cyber resilience dashboard 2000 offers an overview of the entity's overall security status at any given point in time. This empowers the entity to make informed decisions, allocate resources effectively, and/or implement timely measures to mitigate risks and maintain a robust cybersecurity posture. For example, the dashboard can allow a user to define and set cyber goals. That is, a user can decide to implement a plan to achieve a specific resilience outcome. For example, a user can define a plan to have no incidents for a quarter or obtain $5M in cyber insurance coverage, and/or the resilience dashboard can be used to measure progress towards a clear success target.

The cyber resilience dashboard 2000 can incorporate goal-setting by prompting a user to pick a desired 'green box' outcome. That is, the user can be prompted for a compliance milestone, incident limits, coverage amounts, and/or other goals. The cyber resilience dashboard 2000 can be an output for the systems described herein to aggregate data from tools (e.g., firewalls, endpoints, backups, and/or other cyber tools) to compare against the user chosen goal to fix (either automatically or via assistance) to get to a "green" state of desired compliance. If some implementations, the cyber resilience dashboard 2000 can include a "Fix Now" button to prompt the user to allow the system to incorporate changes to their security posture. In some implementations, the cyber resilience dashboard 2000 can include an embedded insurance workflow to qualify users for insurance based on posture data, removing lengthy applications or broker calls. In some implementations, the users can define tolerance for the thresholds, and/or the stream incorporates the tolerance levels to fix, insure, and/or accept a cap. In some implementations, the cyber resilience dashboard 2000 can include one-stop fallbacks, including readiness modules can be quickly added if immediate fixes are not possible.

Additionally, the cyber resilience dashboard 2000 can include recommended capabilities tailored to the entity's specific needs. These capabilities can be easily added by selecting the interactable buttons 2008 and 2010, streamlining the process of enhancing the entity's cybersecurity posture. Further, the entity can configure automated protection measures through "adaptation rules" like assessment management 2012. These are automated actions designed to protect the entity's assets and environment, such as initiating vulnerability scans or activating intrusion prevention systems when certain conditions are met.

Additionally, FIG. 20 illustrates a system 2000 for monitoring and visualizing cybersecurity data, including a cyber resilience stream 2002 and panels displaying threat data. The cyber resilience stream 2002 includes a timeline of token dates, tracking compliance parameters such as compliance, insurability compliance, cybersecurity compliance, threats, coverage, and adaptations (e.g., patching efforts, incident responses, configuration updates, and/or any security-related adjustments). Tokens within the stream represent the states of these parameters at specific intervals (e.g., daily updates, triggered events, scheduled audits, and/or any operational assessments). The rows in the cyber resilience stream display variations in compliance metrics across time, categorized into statuses (e.g., good, warning, action required, and/or any other predefined classifications).

The threats affecting you panel 2004 displays detailed information regarding detected vulnerabilities or incidents relevant to the user's organization. For example, the panel can display vulnerabilities associated with Linux Kernel exploits (e.g., arbitrary file overwrites, privilege escalations, misconfigurations, and/or any exploitation vectors). In another example, the panel can display phishing attempts (e.g., malicious emails, credential harvesting attempts, and/or data exfiltration), tagging them with peer response metrics and actionable recommendations. Each threat includes metadata (e.g., date added, peer actions, incident source, and/or any context tags) for tracking responses and deriving insights on current threats.

The threats affecting similar organizations panel 2006 visualizes threats identified across organizations with shared characteristics. For example, it can include ransomware activity reports (e.g., encryption of critical data, ransom demands, negotiation timelines, and/or follow-up actions) targeting healthcare institutions. In another example, it can display breaches reported by industry peers (e.g., supply chain disruptions, vendor vulnerabilities, and/or credential leaks). Each entry includes associated data points (e.g., industry type, geographic region, peer response counts, and/or attack timelines), allowing users to correlate their cybersecurity posture with industry trends.

The global threat news panel 2008 displays general threat intelligence aggregated from multiple sources (e.g., regulatory updates, vendor advisories, and/or geopolitical events). For example, the panel can highlight compliance-related updates such as new CISA reporting rules (e.g., deadlines, reporting requirements, and/or enforcement policies). In another example, it can display information about ransomware operations (e.g., attack timelines, encryption tactics, and/or associated malware types). Metadata accompanying each entry includes tags (e.g., threat type, affected regions, impacted industries, and/or mitigation suggestions) and peer response metrics (e.g., organizations tracking the same threats, suggested actions, and/or relevant feedback).

The system 2000 integrates the cyber resilience stream 2002 with the threat panels 2004, 2006, and 2008 to provide actionable insights. For example, tokens in the resilience stream 2002 can dynamically update based on threats identified in panel 2004 (e.g., newly detected vulnerabilities, incident trends, and/or mitigation actions). In another example, the resilience stream can highlight correlations between local compliance issues and industry-wide incidents from panel 2006 (e.g., recurring attack patterns, shared vendor exposures, and/or coordinated responses). In yet another example, the global threat news from panel 2008 can be integrated to adjust compliance metrics or trigger adaptations based on external intelligence (e.g., regulatory changes, emerging threats, and/or geopolitical risks).

The cyber resilience stream 2002 can be configured to model temporal changes in compliance parameters across various cybersecurity dimensions (e.g., compliance levels, threat detection rates, incident response timelines, and/or adaptation frequencies). For example, it can track variations in cybersecurity compliance for specific entities within the DETPN by updating tokens dynamically based on real-time environmental data. In another example, the stream can display aggregated metrics such as the average threat coverage over a defined time period or the frequency of adaptations executed in response to incidents. The stream can also segment data by specific parameters (e.g., compliance categories, threat types, adaptation scopes, and/or incident severities) to allow for focused analysis and trend identification.

The stream can provide predictive modeling capabilities for anticipating cybersecurity trends and compliance lapses. For example, the system 2000 can analyze token data from the cyber resilience stream 2002 to identify patterns indicating potential compliance degradation, such as increasing threats combined with delayed adaptations. In another example, the stream can correlate token relationships with external threat intelligence to forecast high-risk periods, such as elevated ransomware activity based on observed vulnerabilities. The model can further provide recommendations for improving compliance metrics, such as targeted incident response protocols, scheduled patch deployments, or enhanced monitoring practices.

The cyber resilience stream 2002 can also support adaptive compliance evaluation and resource allocation. For example, it can prioritize adaptations based on the severity of identified compliance deviations or the criticality of affected systems. In another example, the stream can align internal resilience metrics with external compliance frameworks (e.g., ISO standards, NIST guidelines, and/or regulatory requirements) to dynamically adjust compliance criteria. The stream can also integrate with tokenized knowledge graphs to visualize dependencies between compliance parameters, highlighting cascading impacts across the DETPN. By integrating these capabilities, the cyber resilience stream 2002 serves as a centralized interface for monitoring, modeling, and/or adapting compliance metrics over time.

Configuration of Exemplary Implementations

While this specification contains many specific implementation details and/or implementation details, these should not be construed as limitations on the scope of any inventions or of what can be claimed, but rather as descriptions of features specific to particular implementations and/or implementations of the systems and methods described herein. Certain features that are described in this specification in the context of separate implementations and/or implementations can also be implemented and/or arranged in combination in a single implementation and/or implementation. Conversely, various features that are described in the context of a single implementation and/or implementation can also be implemented and arranged in multiple implementations and/or implementations separately or in any suitable subcombination. Moreover, although features can be described above as acting in certain combinations and even initially claimed as such, one or more features from a claimed combination can in some cases be excised from the combination, and/or the claimed combination can be directed to a subcombination or variation of a subcombination.

Additionally, features described with respect to particular headings can be utilized with respect to and/or in combination with illustrative implementation described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, and/or that all illustrated operations be performed, to achieve desirable results. In some cases, the actions recited in the claims can be performed in a different order and still achieve desirable results. In addition, the processes depicted in the accompanying figures do not necessarily require the particular order shown, and/or sequential order, to achieve desirable results.

In certain circumstances, multitasking and parallel processing can be advantageous. Moreover, the separation of various system components in the implementations and/or implementations described above should not be understood as requiring such separation in all implementations and/or implementations, and/or it should be understood that the described program components and systems can generally be integrated together in a single software product or packaged into multiple software products.

Having now described some illustrative implementations, implementations, illustrative implementations, and/or implementations it is apparent that the foregoing is illustrative and not limiting, having been presented by way of example. In particular, although many of the examples presented herein involve specific combinations of method acts or system elements, those acts, and/or those elements can be combined in other ways to accomplish the same objectives. Acts, elements and features discussed only in connection with one implementation and/or implementation are not intended to be excluded from a similar role in other implementations or implementations.

The phraseology and terminology used herein is for the purpose of description and should not be regarded as limiting. The use of "including" "including" "having" "containing" "involving" "characterized by" "characterized in that" and variations thereof herein, is meant to encompass the items listed thereafter, equivalents thereof, and/or additional items, as well as alternate implementations and/or implementations consisting of the items listed thereafter exclusively. In one implementation, the systems and methods described herein consist of one, at least one (e.g., each) combination of more than one, and/or all of the described elements, acts, and/or components.

Any references to implementations, implementations, and/or elements or acts of the systems and methods herein referred to in the singular can also embrace implementations and/or implementations including a plurality of these elements, and/or any references in plural to any implementation, implementation, and/or element or act herein can also embrace implementations and/or implementations including only a single element. References in the singular or plural form are not intended to limit the presently disclosed systems or methods, their components, acts, and/or elements to single or plural configurations. References to any act or element being based on any information, act or element can include implementations and/or implementations where the act or element is based at least in part on any information, act, and/or element.

Any implementation disclosed herein can be combined with any other implementation, and/or references to "an implementation," "some implementations," "an alternate implementation," "various implementation," "one implementation" or the like are not necessarily mutually exclusive and are intended to indicate that a particular feature, structure, and/or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

Any implementation disclosed herein can be combined with any other implementation, and/or references to "an implementation," "some implementations," "an alternate implementation," "various implementations," "one implementation" or the like are not necessarily mutually exclusive and are intended to indicate that a particular feature, structure, and/or characteristic described in connection with the implementation can be included in at least one implementation. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and/or all of the described terms.

Where technical features in the drawings, description or any claim are followed by reference signs, the reference signs have been included for the sole purpose of increasing the intelligibility of the drawings, description, and/or claims. Accordingly, neither the reference signs nor their absence have any limiting effect on the scope of any claim elements. The systems and methods described herein can be embodied in other specific forms without departing from the characteristics thereof. Although the examples provided herein relate to controlling the display of content of information resources, the systems and methods described herein can include applied to other environments. The foregoing implementations and/or implementations are illustrative rather than limiting of the described systems and methods. Scope of the systems and methods described herein is thus indicated by the appended claims, rather than the foregoing description, and/or changes that come within the meaning and range of equivalency of the claims are embraced therein.

What is claimed is:

1. A method for compliance verification and validation of cyber resilience in a distributed entity or third-party network (DETPN), comprising:

generating or identifying, by one or more processing circuits, one or more compliance parameters for a plurality of entities or third-parties on the DETPN;

determining, by the one or more processing circuits, at least one compliance level for at least one of the plurality of entities or third-parties, the at least one compliance level corresponding with one or more of the one or more compliance parameters at a first timing phase;

receiving or identifying, by the one or more processing circuits, environmental data of the DETPN;

determining, by the one or more processing circuits at a second timing phase, an updated at least one compliance level for at least one of the plurality of entities or third-parties based at least on the environmental data, wherein the environmental data comprises an indication of an occurrence of an event or action on the DETPN;

generating, by the one or more processing circuits, one or more tokens comprising the updated at least one compliance level corresponding with the occurrence of the event or the action; and storing, by the one or more processing circuits, the one or more tokens.

2. The method of claim 1, wherein the DETPN comprises a plurality of computing systems, at least one of the plurality of computing systems comprising at least one data interface corresponding to obtaining or transmitting supply chain data, wherein the method further comprises:

transmitting, by the one or more processing circuits, the at least one compliance level or at least one updated compliance level to the at least one data interface;

receiving, by the one or more processing circuits, a response from the interface, wherein the response comprises a request for a cyber resilience action; and generating, by the one or more processing circuits, a cyber resilience action corresponding to at least the request and at least one compliance level.

3. The method of claim 1, further comprising:

monitoring, by the one or more processing circuits, the DETPN to identify one or more incidents based on accessing one or more endpoints of the DETPN;

generating and recording, by the one or more processing circuits, an incident token corresponding to at least (i) the one or more incidents, (ii) the updated at least one compliance level, and (iii) a cybersecurity dimension of a posture of an entity or third-party;

generating, by the one or more processing circuits, a response data structure based at least on the one or more incidents and the updated at least one compliance level, wherein the response data structure comprises data corresponding with the identified one or more incidents and an impact on a security posture of at least one of the plurality of entities or third-parties; and providing, by the one or more processing circuits, the response data structure to the DETPN for access by at least one entity or third-party of the plurality of entities or third-parties.

4. The method of claim 3, wherein the impact on the security posture comprises at least one of (i) an identification of a vulnerability in a computing environment of at least one of the plurality of entities or third-parties, (ii) a quantification of a potential risk associated with the identified vulnerability, (iii) an assessment of a likelihood of exploitation of the identified vulnerability, or (iv) a recommendation or plan for mitigating the identified vulnerability.

5. The method of claim 1, wherein generating or identifying the one or more compliance parameters for a plurality of entities or third-parties on the DETPN comprises:

identifying at least one entity or third-party of the plurality of entities or third-parties on the DETPN based on accessing or interfacing with one or more endpoints of a computing environment of at least one entity or third-party of the plurality of entities or third-parties; and determining at least one shared entity or third-party parameter of the plurality of entities or third-parties on the DETPN;

wherein generating the one or more compliance parameters is further based on the shared entity or third-party parameter and a cyber resilience dataset, the cyber resilience dataset comprising at least (i) historical incident data, (ii) compliance status records or tokens, or (iii) vulnerability assessments for the plurality of entities or third parties dataset.

6. The method of claim 1, comprising:

determining, by the one or more processing circuits using the one or more tokens, at least one of the plurality of entities or third-parties being above a protection threshold corresponding to the one or more compliance parameters; and generating, by the one or more processing circuits, for at least one of the plurality of entities or third-parties being above a protection threshold, a protection product for a third timing phase corresponding with the at least one compliance level or the updated at least one compliance level.

7. The method of claim 1, wherein the timing phase is at least one of (i) a timing interval corresponding with a compliance review cycle or a monitoring interval or (ii) a point in time corresponding with an event triggered instance or entity or third-party compliance state date.

8. The method of claim 1, wherein determining at least one compliance level for at least one of the plurality of entities or third-parties comprises determining at least one first compliance level at a first timing phase and at least one second compliance level at a second timing phase, and generating one or more tokens comprises generating a first token corresponding to (1) the at least one first compliance level at the first timing phase and (2) the at least one updated compliance level and generating a second token corresponding to (1) the at least one second compliance level at the second timing phase and (2) the at least one updated compliance level, the method comprising:

generating, by the one or more processing circuits, an entity or third-party response data structure based on at least one difference between the first token and second token; and providing, by the one or more processing circuits, the entity or third-party response data structure to at least one entity or third-party within the DETPN.

9. The method of claim 1, wherein the at least one compliance level at the first timing phase corresponds to a cryptographic proof of provenance obtained by the one or more processing circuits directly from at least one entity or third-party of the plurality of entities or third-parties and programmatically, wherein the at least one compliance level at the second timing phase corresponds to a validation by one or more authorized entities or third-parties, wherein a at least one compliance level at a third timing phase correspond to documented evidence of an action, and wherein a at least one compliance level at a fourth timing phase correspond to commitments made by the entity or third-party.

10. The method of claim 1, further comprising:

monitoring, by the one or more processing circuits, environmental data of a plurality of computing systems of the plurality of entities or third-parties with the DETPN; and in response to determining at least one of the plurality of entities or third-parties out of compliance with a cybersecurity parameter, issuing, by the one or more processing circuits, an alert to at least one of the plurality of entities or third-parties comprising a recommendation to update one or more cybersecurity protection actions.

11. The method of claim 1, further comprising:

generating or identifying, by the one or more processing circuits, a graph neural network based at least on the one or more generated tokens, wherein the graph neural network comprises a plurality of nodes and a plurality of edges,
wherein at least one node of the plurality of nodes represents at least one first generated token comprising at least one compliance level and at least one edge of the plurality of edges represents at least one or more associations between the at least one first generated token and an at least one additional generated token.

12. The method of claim 1, comprising:
providing, by the one or more processing circuits, the at least one compliance level to a decentralized network, centralized network, or data source (DNCNDS);
receiving or identifying, by the one or more processing circuits, one or more additional compliance parameters from at least one computing system connected to the DNCNDS;
wherein determining (i) the at least one compliance level or (ii) the updated at least one compliance level is further based on the one or more additional compliance parameters.

13. A system for compliance verification and validation of cyber resilience in a DETPN, the system comprising:
one or more processing circuits comprising memory and at least one processor configured to:
generate or identify one or more compliance parameters for a plurality of entities or third-parties on a distributed entity or third-party network (DETPN);
determine at least one compliance level for at least one of the plurality of entities or third-parties or third-parties or at least one of a plurality of entities or third-parties, the at least one compliance level corresponding with one or more of the one or more compliance parameters at a first timing phase;
receive or identify environmental data of the DETPN;
determine, at a second timing phase, an updated at least one compliance level for at least one of the plurality of entities or third-parties or at least one of the entities based at least on the environmental data, wherein the environmental data comprises an indication of an occurrence of an event or action on at least one of the distributed entity network or the DETPN;
generate one or more tokens comprising the updated at least one compliance level corresponding with the occurrence of the event or the action; and
store the one or more tokens.

14. The system of claim 13, wherein the DETPN comprises a plurality of computing systems, at least one of the plurality of computing systems comprising at least one data interface corresponding to obtaining or transmitting supply chain data, and the one or more processor is further configured to:
transmit the at least one compliance level or at least one updated compliance level to the at least one data interface;
receive a response from the interface, wherein the response comprises a request for a cyber resilience action; and
generate a cyber resilience action corresponding to at least the request and at least one compliance level.

15. The system of claim 13, wherein the at least one processor is further configured to:
monitor the DETPN to identify one or more incidents based on accessing one or more endpoints of the DETPN;
generate and record an incident token corresponding to at least (i) the one or more incidents, (ii) the updated at least one compliance level, and (iii) a cybersecurity dimension of a posture of an entity or third-party;
generate, a response data structure based at least on the one or more incidents and the updated at least one compliance level, wherein the response data structure comprises data corresponding with the identified one or more incidents and an impact on a security posture of at least one of the plurality of entities or third-parties; and
provide the response data structure to the DETPN for access by at least one entity or third-party of the plurality of entities or third-parties.

16. The system of claim 13, wherein generating or identifying the one or more compliance parameters for a plurality of entities or third-parties on the DETPN comprises:
identifying at least one entity or third-party of the plurality of entities or third-parties on the DETPN based on accessing or interfacing with one or more endpoints of a computing environment of at least one entity or third-party of the plurality of entities or third-parties; and
determining at least one shared entity or third-party parameter of the plurality of entities or third-parties on the DETPN;
wherein generating the one or more compliance parameters is further based on the shared entity or third-party parameter and a cyber resilience dataset, the cyber resilience dataset comprising at least (i) historical incident data, (ii) compliance status records or tokens, or (iii) vulnerability assessments for the plurality of entities or third parties dataset.

17. The system of claim 13, wherein the at least one processor is further configured to:
determine, using the one or more tokens, at least one of the plurality of entities or third-parties being above a protection threshold corresponding to the one or more compliance parameters; and
generate for at least one of the plurality of entities or third-parties being above a protection threshold, a protection product for a third timing phase corresponding with the at least one compliance level or the updated at least one compliance level.

18. The system of claim 13, wherein determining at least one compliance level for at least one of the plurality of entities or third-parties comprises determining at least one first compliance level at a first timing phase and at least one second compliance level at a second timing phase, and generating one or more tokens comprises generating a first token corresponding to (1) the at least one first compliance level at the first timing phase and (2) the at least one updated compliance level and generating a second token corresponding to (1) the at least one second compliance level at the second timing phase and (2) the at least one updated compliance level, wherein the at least one processor is further configured to:
generate an entity or third-party response data structure based on at least one difference between the first token and second token; and
provide the entity or third-party response data structure to at least one entity or third-party within the DETPN.

19. The system of claim 13, wherein the at least one compliance level at the first timing phase corresponds to a cryptographic proof of provenance obtained by the one or more processing circuits directly from at least one entity or third-party of the plurality of entities or third-parties and programmatically, wherein the at least one compliance level at the second timing phase corresponds to a validation by one or more authorized entities or third-parties, wherein a at least one compliance level at a third timing phase correspond to documented evidence of an action, and wherein a at least one compliance level at a fourth timing phase correspond to commitments made by the entity or third-party.

20. A non-transitory computer readable medium (CRM) comprising one or more instructions stored thereon and executable by one or more processors to:
  generate or identify one or more compliance parameters for a plurality of entities or third-parties on a distributed entity or third-party network (DETPN);
  determine at least one compliance level for at least one of the plurality of entities or third-parties or third-parties or at least one of a plurality of entities or third-parties, the at least one compliance level corresponding with one or more of the one or more compliance parameters at a first timing phase;
  receive or identify environmental data of the DETPN;
  determine, at a second timing phase, an updated at least one compliance level for at least one of the plurality of entities or third-parties or at least one of the entities based at least on the environmental data, wherein the environmental data comprises an indication of an occurrence of an event or action on at least one of the distributed entity network or the DETPN;
  generate one or more tokens comprising the updated at least one compliance level corresponding with the occurrence of the event or the action; and
  store the one or more tokens.

* * * * *